US007076736B2

(12) United States Patent
Hugh

(10) Patent No.: US 7,076,736 B2
(45) Date of Patent: Jul. 11, 2006

(54) METHOD AND APPARATUS FOR SHARING MANY THOUGHT DATABASES AMONG MANY CLIENTS

(75) Inventor: Harlan M. Hugh, Los Angeles, CA (US)

(73) Assignee: Thebrain Technologies Corp., Marina Del Rey, CA (US)

(*) Notice: Subject to any disclaimer, the term of this patent is extended or adjusted under 35 U.S.C. 154(b) by 530 days.

(21) Appl. No.: 10/007,152

(22) Filed: Nov. 30, 2001

(65) Prior Publication Data

US 2003/0117434 A1 Jun. 26, 2003

Related U.S. Application Data

(63) Continuation-in-part of application No. 09/919,656, filed on Jul. 31, 2001, now abandoned.

(51) Int. Cl.
*G09G 5/00* (2006.01)

(52) U.S. Cl. ...................... 715/743; 715/835; 715/836; 715/837; 707/8; 707/9; 707/102; 709/224; 709/229

(58) Field of Classification Search ................ 345/700, 345/708, 713, 733, 740, 744, 748, 751, 752, 345/764, 765; 715/500, 500.1, 740–744, 715/524, 516, 738, 853–855; 709/100, 224, 709/229; 707/8, 9, 200, 202, 102, 204
See application file for complete search history.

(56) References Cited

U.S. PATENT DOCUMENTS

| | | | | | |
|---|---|---|---|---|---|
| 5,535,375 | A | * | 7/1996 | Eshel et al. | 703/27 |
| 5,675,752 | A | * | 10/1997 | Scott et al. | 345/866 |
| 5,724,556 | A | * | 3/1998 | Souder et al. | 703/2 |
| 5,878,431 | A | * | 3/1999 | Potterveld et al. | 707/103 R |
| 5,999,930 | A | * | 12/1999 | Wolff | 707/8 |
| 6,009,427 | A | * | 12/1999 | Wolff | 707/10 |
| 6,122,629 | A | * | 9/2000 | Walker et al. | 707/8 |
| 6,311,187 | B1 | * | 10/2001 | Jeyaraman | 707/10 |
| 6,332,197 | B1 | * | 12/2001 | Jadav et al. | 714/6 |
| 6,393,419 | B1 | * | 5/2002 | Novak et al. | 707/8 |
| 6,401,104 | B1 | * | 6/2002 | LaRue et al. | 707/203 |
| 6,493,804 | B1 | * | 12/2002 | Soltis et al. | 711/152 |
| 6,564,215 | B1 | * | 5/2003 | Hsiao et al. | 707/8 |
| 6,604,143 | B1 | * | 8/2003 | Nagar et al. | 709/229 |
| 6,615,223 | B1 | * | 9/2003 | Shih et al. | 707/201 |
| 6,850,938 | B1 | * | 2/2005 | Sadjadi | 707/8 |
| 2002/0161855 | A1 | * | 10/2002 | Manczak et al. | 709/219 |
| 2003/0014462 | A1 | * | 1/2003 | Bennett et al. | 709/100 |
| 2003/0016237 | A1 | * | 1/2003 | Hickey | 345/700 |

* cited by examiner

*Primary Examiner*—Tadesse Hailu
(74) *Attorney, Agent, or Firm*—Liu & Liu

(57) ABSTRACT

The Brain system employs a graphical user interface to facilitate user interaction with highly flexible, associative "matrices" that enable users to conveniently organize digitally-stored "thoughts" (inter-related information) and their network of inter-relationships. The Brain system offers a solution that facilitates the capture of information from a company's repositories and showcases it in an engaging and dynamic visual interface. The Brain accomplishes this by providing a connector system that serves as an interface between the Brain server and whatever repositories are employed to store data. By use of a special type of connector, the Brain can permit a single user to collaborate with a number of different repositories at different locations and of different sorts under a single associative interface. A client can also interface directly with multiple data stores that are configured for interaction with the associative interface described herein. Multiple nodes on a network can access common sources of associative data in real-time or by way of synchronization techniques. Lastly, methods are further described permitting single items of associative data to reference multiple documents at once.

13 Claims, 79 Drawing Sheets

```
boolean CheckForIsolation(int centralThought, int targetThought)
{
        // this function checks if centralThought is related to targetThought
        // via any of targetThought's relations (not directly)

        // remove centralThought as a direct relation from targetThought
        RemoveRelation(targetThought, centralThought);

        // create an empty thought list to keep track of the search
        intList searchList = CreateEmptyList();

        // start recursive searches on each of targetThought's direct relations
        int relation = GetFirstRelation(targetThought);
        boolean found;
        do {
                found = Search(relation, centralThought, searchList);
                if(found) {
                        // centralThought was found, no need to search any further
                        break;
                }
                // this loop will end when there are no more relations
        } while(relation = GetNextRelation(targetThought);

        // add centralThought back onto target as a relation
        AddRelation(targetThought, centralThought);

        return found;
}
```

Fig. 10a

```
boolean Search(source, dest, searchList)
{
	if(Find(source, searchList)) {
		// source has already been searched
		return FALSE;

	}

	// add source to the searchList
	Add(source, searchList)

	if(source == dest) {
		// this is the destination, we have found it
		return TRUE;
	}

	// recursive searches on each of sources direct relations
	int relation = GetFirstRelation(source);
	boolean found;
	do {
		found = Search(relation, dest, searchList);
		if(found) {
			// centralThought was found, no need to search any further
			break;
		}
		// this loop will end when there are no more relations
	} while(relation = GetNextRelation(targetThought);

	return found;

}
```

```
ForgetThought (fNum)
{
 // mark all the children of the selected thought
 list.Clear();
 MarkChildren(fNum, list);
 // unmark the active thought
 list.RemoveThought(activeThought);
 // unmark thoughts with unmarked parents
 lNum = list.GetFirstNum();
 while(lNum !=0)
 {
   if(lNum != fNum)  // don't unmark the selected thought
   {
     pNum = GetFirstThoughtParent(lNum);
     while(pNum != 0)
     {
       if(list.Contains(pNum) == FALSE)
       {
         if(IsThoughtInLongTermMemory(pNum)  == FALSE)
         {
           // unmark all the children of the unmarked parent
           childList.Clear();


           MarkChildren(pNum, childList);
           list.RemoveList(childList);
         }
       }
       pNum = GetNextThoughtParent(lNum);
     }
   }
   lNum = list.GetNextNum();
 }
 // now forget all the thoughts left on the list
 lNum = list.GetFirstNum();
 while(lNum != 0)
 {
   ForgetThought(lNum);
   lNum = list.GetNextNum();
 }
}

RememberThought(rNum)
{
 // mark all the children of the selected thought
 list.Clear();
 MarkChildren(rNum, list);
 // remember all the thoughts on the list
 lNum = list.GetFirstNum();
 while(lNum != 0)
 {
   RememberThought(lNum);
   lNum = list.GetNextNum();
 }
}

MarkChildren(num, list)
{
 list.AddThought(num);
 cNum = GetFirstChild(num);
 while(cNum != 0)
 {
   MarkChildren(cNum, list);
   cNum = GetNextChild(num);
 }
}
```

FIG. 17

Algorithm for drawing the plex with distant thoughts

1. Create a list of thoughts to be drawn and their screen locations:
    2. Add the central thought to the list.
    3. Add children to the list.
    4. Add parents to the list.
    5. Add jumps to the list.
    6. Add siblings to the list, checking first that they are not already on the list.
    7. Add distants of children to the list, checking first that they are not already on the list.
    8. Add distants of parents to the list, checking first that they are not already on the list.
    9. Add distants of jumps to the list, checking first that they are not already on the list.
    10. Add distants of siblings to the list, checking first that they are not already on the list.
11. Draw the lines that connect each thought:
    12. For each item in the list:
        13. Get each item in the list:
            14. If the two items are related, draw lines between them from and to the appropriate gates.
15. Draw the distant thoughts:
    16. For each item in the list:
        17. If it is a distant thought, draw it.
18. Draw the other thoughts:
    19. For each item in the list:
        20. If it is not a distant thought, draw it.

Fig. 23

```
// the non recursive method for searching thoughts
// tries to find a route from nSrc to nDest other than a direct relation
// returns TRUE if found
boolean Search(int nSrc, int nDest)
{
     //create the lists
     ThoughtList posList;    //list of thoughts that possibly connect
     ThoughtList notList;    //list of thoughts that do not connect
     //empty the lists
     posList.Initialize();
     notList.Initialize();

     //add the source to the not list since we cannot go directly
     to the destination,
     notList.Add(nSrc);

     //since we cannot go directly to the destination,
     //add all relates except the destination to the possible list
     Thought src(nSrc);
     for(int n = 0;;n++)
     {
          int nRel = src.GetRelate(n);
          if(!nRel)
          {
               //no more relations, done
               break;
          }
          if(nRel != nDest)
          {
               //add it to the possibly connect list
               posList.Add(nRel);
          }
     }

     while(TRUE)
     {
          //check the first possibility
          int nTest = posList.GetFirst();
          if(!nTest)
          {
               //nothing on the list, done
               break;
          }
          Thought test(nTest);
          if(test.IsRelated(nDest))
          {
               //this one is related to the destination, we're done
               return TRUE;
          }
          // does not connect, add it to the does not connect list
          notList.Add(nTest);
          // add all related thoughts except those already checked to
          possible list for
          (int n = 0;; n++)
          {
               int nRel = test.GetRelate(n);
               if(!nRel)
               {
                         //no more relations, done
                         break;
               }
               if(!notList.Exists(nRel))
               {
                         //not checked yet, add to possible list
                         posList.Add(rel);
               }
          }
          //remove this one from the possible list
          posList.Remove(nTest);
     }
     //we've checked everything there is no other way to get from
     nSrc to nDest
     return FALSE;
}
```

Fig. 24

CONNECTOR

EXAMPLE

RELATED DATA IN DATABASE TABLES MAPPED TO THEBRAIN

ALLOWED INHERITANCE

NOT ALLOWED INHERITANCE

CHECKING PERMISSIONS

ASSIGNING/INHERITING PERMISSIONS FOR NEW THOUGHT

CREATING LINKS

UNLINKING

PROPAGATION OF PERMISSIONS

ASSIGNING INHERITANCE

CREATING A PARENT THOUGHT --
NO PARENTS OR JUMPS

CREATING A PARENT THOUGHT

CREATING A PARENT THOUGHT-- ONE OR MORE PARENTS, CHILD INHERITING FROM ONE PARENT

CREATING A PARENT THOUGHT

CREATING A PARENT THOUGHT -- ONE OR MORE PARENTS, CHILD PERMISSIONS ARE SPECIFIED

CREATING A PARENT THOUGHT

CREATING A PARENT THOUGHT -- NO PARENTS, ONE OR MORE JUMPS

CREATING A PARENT

CREATING A CHILD THOUGHT

CREATING A CHILD THOUGHT

CREATING A JUMP THOUGHT

CREATING A JUMP THOUGHT

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING PARENT-CHILD LINKS

CREATING JUMP LINKS

CREATING JUMP LINKS

EXAMPLE

ACTIONS FOR FOLDERS / CABINETS

| Refresh | Inbox | Checked Out | Search | Bookmark | Change Docbase | My Cabinet |

POWERED BY THEBRAIN

KnowledgeMgmt

Business Intelligence — Financial Reports
CAD — Larry's Cabinet
Categorization — Content Management — Research
— Document Management
Corporate Portals — Email
Doc admin — Exchanges KnowledgeMgmt KnowledgeMgmt            Show [10 ▼] items per page
[-select action- ▼]

| Name | Menu | Last Modified | Lock Owner |
|---|---|---|---|
| Business Intelligence | -select action- ▼ | 3/20/2001 | |
| CAD | -select action- ▼ | 3/20/2001 | |
| Categorization | -select action- ▼ | 3/20/2001 | |
| Content Management | -select action- ▼ | 3/20/2001 | |
| Corporate Portals | -select action- ▼ | 3/20/2001 | |
| Doc admin | -select action- ▼ | 3/20/2001 | |
| Email | -select action- ▼ | 3/20/2001 | |

Showing items 1-10 of 18                    ◄ Back    Next ►

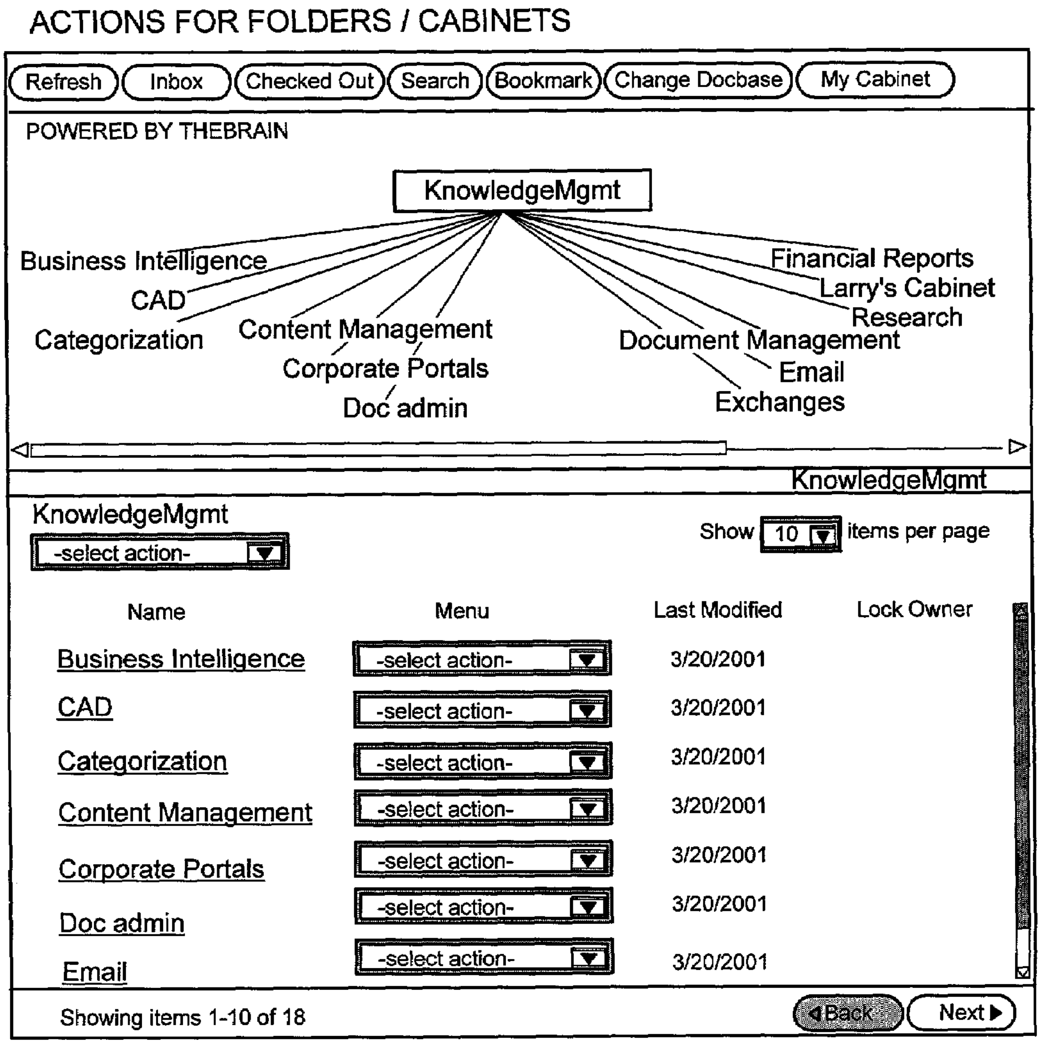

FIG. 60

ACTIONS FOR FOLDERS / CABINETS

| Refresh | Inbox | Checked Out | Search | Bookmark | Change Docbase | My Cabinet |

POWERED BY THEBRAIN

KnowledgeMgmt

Business Intelligence — Financial Reports
CAD — Larry's Cabinet
Categorization — Content Management — Research
Corporate Portals — Document Management
Doc admin — Email
Exchanges KnowledgeMgmt

KnowledgeMgmt
E-Solutions working clients database          Show [10 ▼] items per page

[-select action- ▼]

| Name | Menu | Last Modified | Lock Owner |
|---|---|---|---|
| Business Intelligence | -select action- ▼ | 3/20/2001 | |
| | -select action- | | |
| CAD | Standard view... | 3/20/2001 | |
| Categorization | Delete ... | 3/20/2001 | |
| | Import ... | | |
| Content Management | New Document... | 3/20/2001 | |
| Corporate Portals | New Folder ... | 3/20/2001 | |
| | Permissions... | 3/20/2001 | |
| Doc admin | Properties... | | |
| Email | -select action- ▼ | 3/20/2001 | |

Showing items 1-10 of 18     ◀ Back   Next ▶

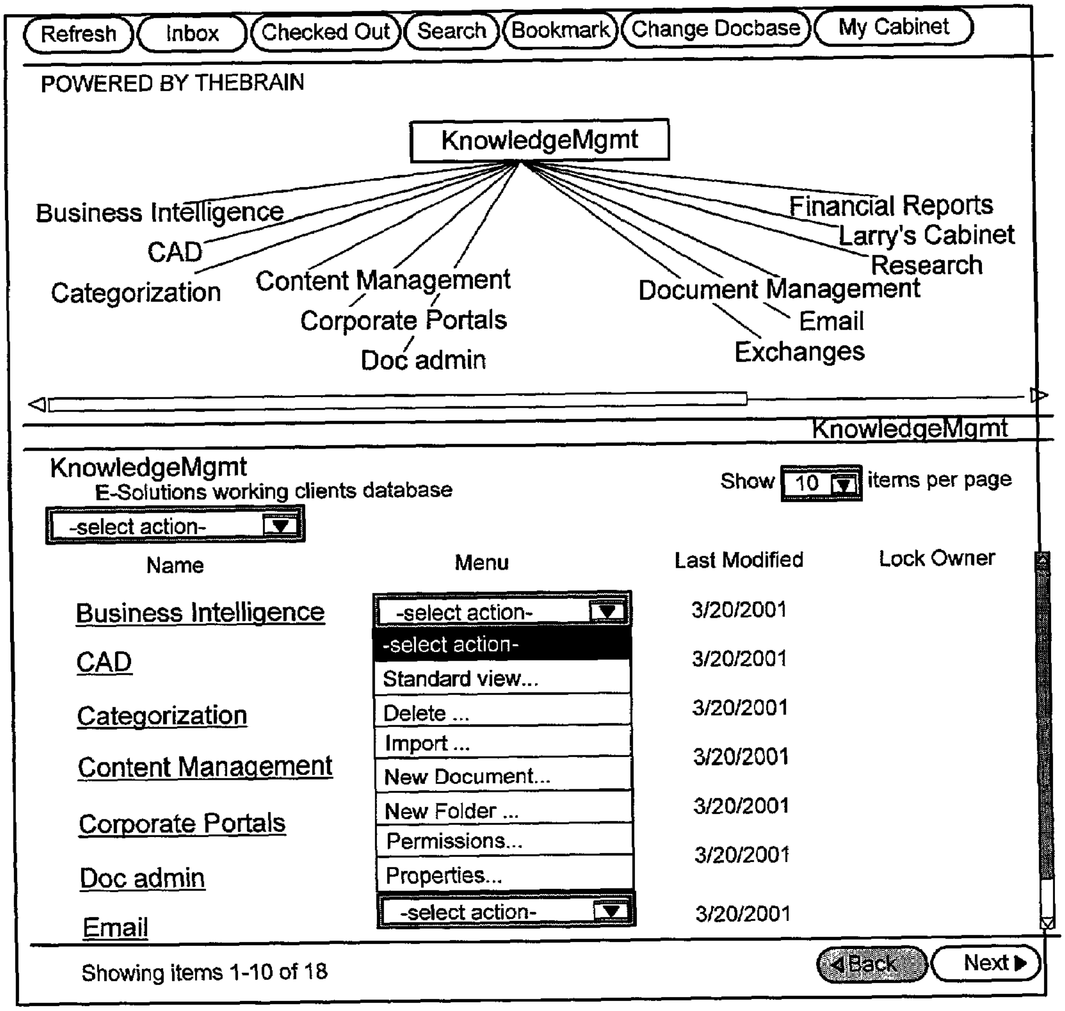

FIG. 61

ACTIONS FOR DOCUMENTS

| Refresh | Inbox | Checked Out | Search | Bookmark | Change Docbase | My Cabinet |

POWERED BY THEBRAIN

KnowledgeMgmt
— Content Management
— Corporate Portals
— Doc admin
Categorization — Salesforce Automation Acme, Inc.
Widget Mfg.
XYZ & Co.  Able, Inc.
Team & Co.
Smith & Jones
J & J, Inc.
Williams Co.
Categorization KnowledgeMgmt   Categorization Categorization Show [10 ▼] items per page

[-select action- ▼]

| Name | Menu | Last Modified | Lock Owner |
|---|---|---|---|
| Acme, Inc. | [-select action- ▼] | 3/20/2001 | |
| Categorization | [-select action- ▼] | 3/20/2001 | |
| Word 97/2000 document, Categorization | -select action- | | |
| Widget Mfg. | Standard view... | 3/20/2001 | |
| XYZ & Co. | Checkout... | 3/20/2001 | |
| | Delete... | | |
| Able, Inc. | Edit... | 3/20/2001 | |
| | Export ... | | |
| Smith & Jones | Permissions... | 3/20/2001 | |
| Team & Co. | Properties... | 3/20/2001 | |
| | Versions and Renditions... | | |
| | View ... | | |

Showing items 1-9 of 9       ◁ Back   Next ▷

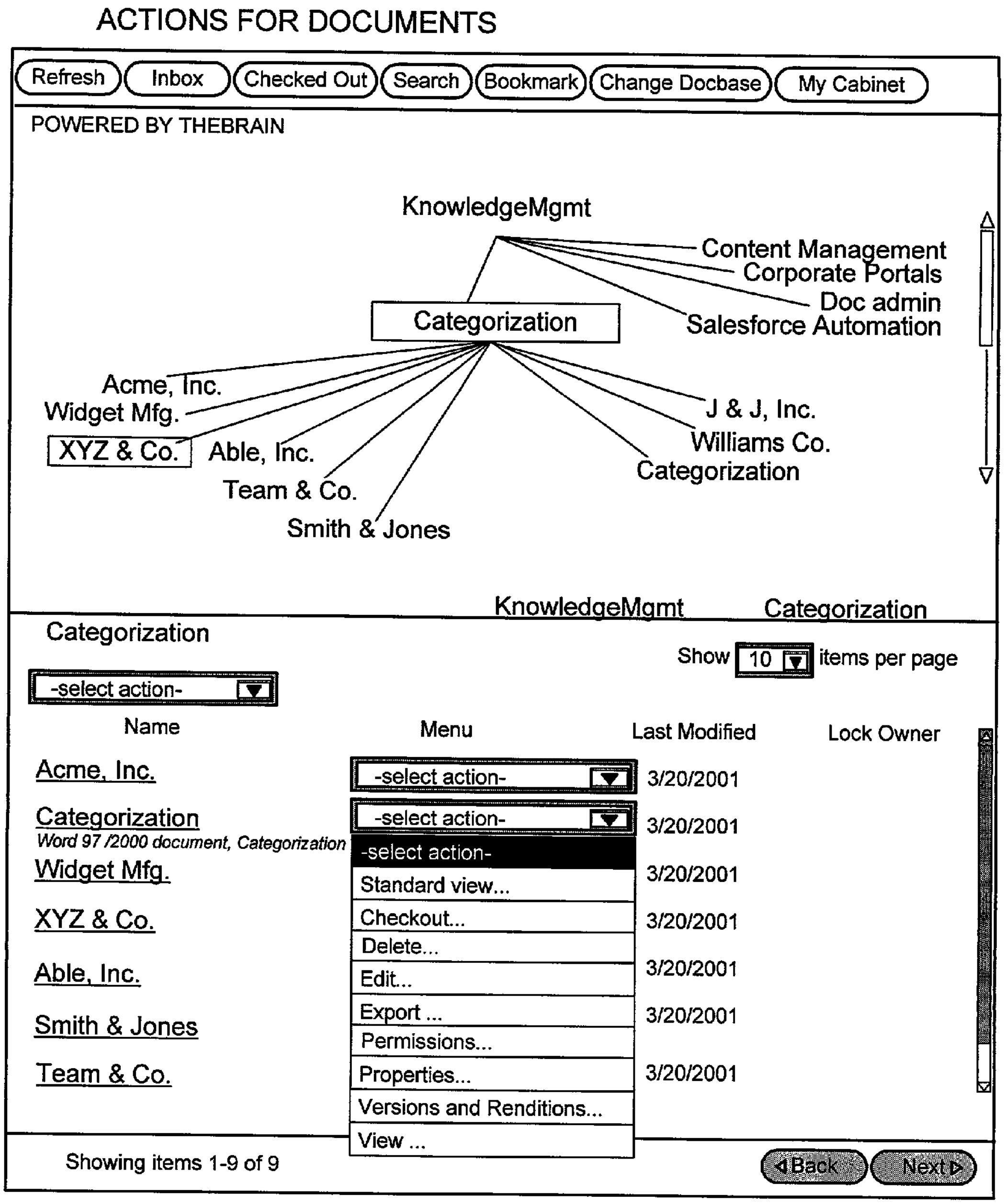

FIG. 62

Figure 63 --- Fully Connected Brain: Modifying an Item, No Conflict

| | Client A | Client B | Server |
|---|---|---|---|
| 3390 | Log in | | |
| 3391 | Ask server for info about starting thought 1 | | |
| 3392 | | | Find info about starting thought 1 |
| 3393 | | | Return |
| 3394 | Display | | |
| 3395 | | Log in | |
| 3396 | | Ask server for info about starting thought | |
| 3397 | | | Find info about starting thought 1 |
| 3398 | | | Return |
| 3399 | | Display | |
| 3400 | Begin modification of data item 1 (thought 1 name, link, property, contents, etc.) | | |
| 3401 | Send lock request | | |
| 3402 | | | Check for existing lock |
| 3403 | | | None found |
| 3404 | | | Lock data item 1 for A |
| 3405 | End modification | | |
| 3406 | Send modification to server and unlock | | |
| 3407 | | | Check for other existing lock |
| 3408 | | | None found, confirm and unlock |
| 3409 | Display changed data item 1 | | |
| 3410 | | Begin modification of data item 1 | |
| 3411 | | Send lock request | |
| 3412 | | | Check for existing lock |
| 3413 | | | None found |
| 3414 | | | Lock item for B |
| 3415 | | End modification | |
| 3416 | | Send modification to server and unlock | |
| 3417 | | | Check for existing lock |
| 3418 | | | None found, confirm and unlock |
| 3419 | | Display changed data item 1 | |

Figure 64

Fully Connected Brain - Modifying an Item - Conflicts Found

| | Client A | Client B | Server |
|---|---|---|---|
| 3420 | Log in | | |
| 3421 | Ask server for info about starting thought | | |
| 3422 | | | Find info about starting thought |
| 3423 | | | Return |
| 3424 | Display | | |
| 3425 | | Log in | |
| 3426 | | Ask server for info about starting thought | |
| 3427 | | | Find info about starting thought |
| 3428 | | | Return |
| 3429 | | Display | |
| 3430 | Begin modification of data item | | |
| 3431 | Send lock request | | |
| 3432 | | | Check for existing lock |
| 3433 | | | None found |
| 3434 | | | Lock item for A |
| 3435 | | Begin modification of data item | |
| 3436 | | Send lock request | |
| 3437 | | | Check for existing lock |
| 3438 | | | Locked by Client A |
| 3439 | | | Inform Client B |
| 3440 | | Locked - inform user. | |
| 3441 | End modification | | |
| 3442 | Send modification to server and unlock | | |
| 3443 | | | Check for other existing lock |
| 3444 | | | None found, confirm |
| 3445 | Display changed data | | |

Figure 65

Synchronizing Offline Brains

| | | Client | Server |
|---|---|---|---|
| 3450 | | **Modifying Data Offline** | |
| | a | Begin modifying data item | |
| | b | Update meta-info (at least data item being modified and time) | |
| | c | Add to list of modified data items | |
| 3451 | | **Detecting New or Needed Items** | |
| | a | user selects a thought with links to "missing" thoughts. | |
| | b | add missing thoughts to list of new items. | |
| 3452 | | **Updating the Client for Missing Data Items** | |
| | a | Send list of new items | |
| | b | | Receive list of new items |
| | c | | Add items to list based on synchronization profile |
| | d | | Send data for all items on list |
| | e | Receive data and add to local data store | |
| | f | Empty list of new items | |
| 3453 | | **Updating Client and Server of new Modifications** | |
| | a | Send list of modified data items with meta-data about modification, but not the data itself | |
| | b | request list of all data items modified since last synchronization | |
| | c | | Receive list of modified items |
| | d | | Generate list of items modified on the server since last synchonization |
| | e | | Detect conflicts between two lists. Decide based on conflict rules |
| | f | | When Server Wins Conflict, or When Client Made No Modification: Send data for items |
| | g | | When Client Wins, or When Server Made No Modifications: Request data for items. |
| | h | Make modications to items for data received on local data store | |
| | I | Send data for items requested | |
| | j | | Receive data items and make modifications on server data store |
| | k | Clear list of modified items | |

Figure 68

Composite System – Activating a New Thought

| | Brain Client (3470) | Brain Server (3471) | Composite Connector (3472) | Connector A (3474) | Connector B (3475) |
|---|---|---|---|---|---|
| 3490 | Thought 1A is active | | | | |
| 3491 | Click Thought 2A | | | | |
| 3492 | | What thoughts are related to Thought 2A? | | | |
| 3493 | | Contact Connector | | | |
| 3494 | | | Translate Thougth ID "2A" into | | |
| 3495 | | | Repository A, "ID 2" | | |
| 3496 | | | | Query Repository A for links to Thought "ID 2" | |
| 3497 | | | | Return from Repository: "ID 4, Child" | |
| 3498 | | | Translate link from Connector A "4, Child" as ID "4A, Child" | | |
| 3499 | | | Put ID "4A" onto list of related thoughts | | |
| 3500 | | | Check Composite Repository for cross-repository links to ID "2A" | | |
| 3501 | | | Return from Composite Repository "1B, Jump" | | |
| 3502 | | | Add "1B, Jump' to list of related thoughts | | |
| 3503 | | | Return List | | |
| 3504 | | Return List | | | |
| 3505 | Activate 2A as new central thought, with Thought ID "1B" as a Jump, and Thought ID "4A" as a Child. | | | | |
| 3506 | | Repeat Procedure for Siblings, Grandchildren, if applicable. | | | |

Figure 69

Composite System -- Making a Link

| | Brain Client (3470) | Brain Server (3471) | Composite Connector (3472) | Connector A (3474) | Connector B (3475) |
|---|---|---|---|---|---|
| 3510 | Thought 1A is Active | | | | |
| 3511 | User draws jump from Thought 1A to Thought 1B. | | | | |
| 3512 | | Make Jump Link Thought 1A to Thought 1B | | | |
| 3513 | | Contact Composite Connector | | | |
| 3514 | | | Translate Thougth ID "1A" into Repository A, "ID 1" | | |
| 3515 | | | Translate Thougth ID "1B" into Repository B, "ID 1" | | |
| 3516 | | | Same Repository? | | |
| 3517 | | | No ==>Add link to Composite Repository. | | |
| 3518 | | | Yes==> Contact Connector A or Connector B, as fit. | | |
| 3519 | | Success Reported | | | |
| 3520 | Modify Display to Plex 3481 | | | | |

Figure 70
Composite System -- Creating a Thought

| | Brain Client (3470) | Brain Server (3471) | Composite Connector (3472) | Connector A (3474) | Connector B (3475) |
|---|---|---|---|---|---|
| 3521 | Thought 1A is Active | | | | |
| 3522 | User creates child Thought | | | | |
| 3523 | | Create Child | | | |
| 3524 | | Contact Composite Connector | | | |
| 3525 | | | Translate Thougth ID 1A into Repository A "ID 1". | | |
| 3526 | | | Any special rules for children of thoughts of the type of "ID 1"? | | |
| 3527 | | | No ==> Send to Connector A. Yes ==> Send to Repository B. | | |
| | | | | If requested, add to Repository A. Return "success" and thought type to Client. | |
| 3528 | | | | | If reuqested, add to Repository B. Update Composite Connector |
| 3529 | | | Return results to Server; Update Composite Repository if Child was placed in different repository than parent. | | |
| | | Return Results | | | |
| | Modify Display to Plex 3484, conform contents to any special rules. | | | | |

Brain to Brain Links System

Figure 72

Activating a Thought

| | Client 5430 | Directory Server 5431 | Brain A Server 5432 | Brain B Server 5433 |
|---|---|---|---|---|
| 5440 | Plex 3482. Click 2A | | | |
| 5441 | Check local directory cache for location of Brain Server A | | | |
| 5442 | Found | | | |
| 5443 | Request to Brain A re: thought info for thought 2 | | | |
| 5444 | | | Query DB for info and links re thougth 2. | |
| 5445 | | | Links from 2 to 1B is found | |
| 5446 | | | Return list | |
| 5447 | Check results for for inter-Brain links. | | | |
| 5448 | Find 1B | | | |
| 5449 | Check local directory cache for location of Brain Server B. | | | |
| 5450 | Not found. | | | |
| 5451 | Query: Where is B? | | | |
| 5452 | | Look up location of B | | |
| 5453 | | Return | | |
| 5454 | Add B's location to local directory cache | | | |
| 5455 | Request to Brain B for thought info for thought 1 | | | |
| 5456 | | | | Query for info |
| 5457 | | | | Return |
| 5458 | Change to display Plex 3482 | | | |

Figure 73

Linking a Thought (assumes both are onscreen)

| | Client 5430 | Directory Server 5431 | Brain A Server 5432 | Brain B Server 5433 |
|---|---|---|---|---|
| 5460 | Link 1A and 1B (jump) One thought may be active in the plex the other already as a pin or in the past thought list (both are multi-brain enabled) | | | |
| 5461 | Check local dir cache for location of A | | | |
| 5462 | Found | | | |
| 5463 | Send message to A describing link from 1 to 1B (relationship, thought id, brain id "jump, unique brain id of B") | | | |
| 5464 | | | Store link from 1 to 1B | |
| 5465 | Check dir cache for B | | | |
| 5466 | Found | | | |
| 5467 | Send message to B describing link from 1 to 1A ("jump, unique brain id of A") | | | |
| 5468 | | | | Store link from 1 to 1B |
| 5469 | Display link | | | |

Figure 74

Creating a Thought

| | Client 5430 | Directory Server 5431 | Brain A Server 5432 | Brain B Server 5433 |
|---|---|---|---|---|
| 5470 | Create new thought from 1A (jump) | | | |
| 5471 | Check local dir cache for location of A | | | |
| 5472 | Found | | | |
| 5473 | Send message to A describing new thought from 1 (relationship, name/content "jump, alan") | | | |
| 5474 | | | Create new thought and store content | |
| 5475 | | | Store link between id 1 and new id | |
| 5476 | | | Return new thought and link info | |
| 5477 | Display | | | |

Figure 75

Finding Other Brains

| | Client | Directory Server | Brain C Server |
|---|---|---|---|
| 5480 | Request list of Brains or search for a Brain | | |
| 5481 | | Look for Brains that match request | |
| 5482 | | Return results (Brain name, id, location) | |
| 5483 | Add locations to cache | | |
| 5484 | Display results in a window. | | |
| 5485 | User selects a Brain (Brain C) | | |
| 5486 | Look up Brain in cache | | |
| 5487 | Ask for starting thought | | |
| 5488 | | | Query DB for info and links. |
| 5489 | | | Return |
| 5490 | Display | | |

Finding Thoughts in Other Brains

| | Client | Directory Server | Brain A Server | Brain B Server | Brain C Server |
|---|---|---|---|---|---|
| 5491 | Search for a Thought (may specify a list of Brains to search in via a list obtained from the directory server, or search a default set) | | | | |
| 5492 | Ask directory server to perform search | | | | |
| 5493 | | Query each Brain server | | | |
| 5494 | | | Check for matching thoughts | Check for matching thoughts | Check for matching thoughts |
| 5495 | | | Return list | Return list | Return list |
| 5496 | | Compile results into a single list with all info (Brain id & location, thought info & id) | | | |
| 5497 | Add locations to cache | | | | |
| 5498 | Display results in a window. | | | | |
| 5499 | User selects a Thought | | | | |
| 5500 | Activate thought | | | | |

Figure 76

File Structure for Multiple Files Per Thought

*Single Document Architecture*

5510 *The Headcase*

| | Thought ID | Name | Type | Property | Document |
|---|---|---|---|---|---|
| 5511 | 1 | Thought 1 | - | - | doc_r |
| 5512 | 2 | Thought 2 | - | - | doc_n |
| 5513 | 3 | Thought 3 | - | - | doc_m |
| 5514 | 4 | Thought 4 | - | - | doc_q |

*Multiple Document Architecture*

5515 *Thought Table*

| | Thought ID | Name | type | property |
|---|---|---|---|---|
| 5516 | 1 | Thought 1 | - | - |
| 5517 | 2 | Thougth 2 | | - |
| 5518 | 3 | Thought 3 | - | - |
| 5519 | 4 | Thought 4 | - | - |

5527 *Document Table*

| | Doc ID | Document Location |
|---|---|---|
| 5528 | r | c:\doc_r |
| 5529 | n | c:\doc_n |
| 5530 | m | c:\doc_m |
| 5531 | q | c:\doc_q |
| 5532 | z | c:\doc_z |

5520 *Link Table*

| | Thought ID | Doc ID |
|---|---|---|
| 5521 | 1 | r |
| 5522 | 1 | n |
| 5523 | 2 | m |
| 5524 | 3 | q |
| 5525 | 4 | z |
| 5526 | 4 | n |

Figure 77
Before User Interaction
After User Interaction
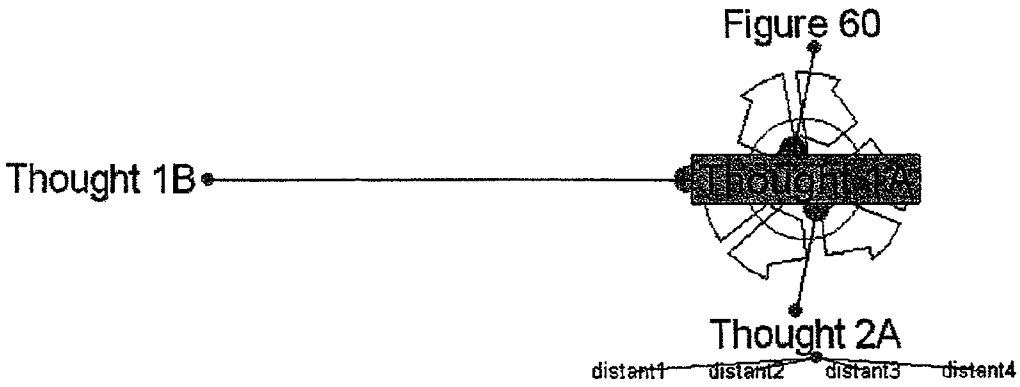

METHOD AND APPARATUS FOR SHARING MANY THOUGHT DATABASES AMONG MANY CLIENTS

I. CROSS-REFERENCE TO RELATED APPLICATION

This application is a continuation-in-part of application Ser. No. 09/919,656, filed Jul. 31, 2001 now abandoned, entitled, "Method and Apparatus for Displaying A Thought Network form a Thought's Perspective."

II. FIELD OF THE INVENTION

This invention relates to methods and apparatus for organizing and processing information, and more particularly, to computer-based graphical user interface-driven methods and apparatus for associative organization and processing of interrelated pieces of information, hereinafter referred to as "thoughts."

III. BACKGROUND

The general-purpose digital computer is one of the most powerful and remarkable information processing tools ever invented. Indeed, the advent of the digital computer, and the proliferation of a global digital information network known as the Internet, has thrust the world headlong into what is now recognized by many analysts as an "information era" and an "information economy," in which the ability to access and process information in an effective manner is one of the most important forms of economic power.

The potential impact of the digital computer and the Internet on information distribution and processing is undeniably revolutionary. Yet, conventional software environments are generally organized around metaphors and principles from earlier eras. Text-based operating systems like Microsoft® DOS essentially treat the computer as a giant filing cabinet containing documents and applications. A strictly hierarchical file directory provides a rigid, tree-like structure for this digital file cabinet. Individual documents are the "leaves" of this tree hierarchy. The directory structure generally does not include or express relationships between leaves, and users generally access documents and applications individually, using the directory structure. Even the now ubiquitous graphical "desktop" computing environment, popularized for personal computers by the Apple Macintosh® and Microsoft Windows® operating systems, also simulates a traditional office environment. Individual documents and applications, represented by graphical icons, are displayed on the user's screen, to be accessed one-at-a-time. Once again, a strictly hierarchical, tree-like directory structure is imposed to organize the contents of the desktop.

Although the desktop and file cabinet metaphors have been commercially successful, the limitations and drawbacks of these traditional metaphors become clear when one considers the strikingly different way in which the world's other powerful information processing machine—the human brain—organizes information. Instead of being confined and limited to strictly hierarchical file directory structures, the human brain is thought to interconnect numerous pieces of information through flexible, non-hierarchical, associative networks. As those of skill and experience in the art are aware, it is often clumsy for users of traditional, prior art operating system interfaces to process multiple pieces of information if these pieces are contextually related in some way, but are stored in separate files and/or are associated with different application programs. Too often, the prior art of organizing information lead users to "misplace" information amongst hierarchical categories which often lose their relevance soon after the user creates them. Intended to assist users, traditional hierarchical structures and "desktop" metaphors compel users to organize their thought processes around their computer software, instead of the reverse. The inadequacy of "real-world," hierarchical metaphors for information management was recognized prior to the advent of the computer, but until now has not been successfully remedied.

The recent deluge of digital information bombarding everyday computer users from the Internet only heightens the need for a unified, simple information management method which works in concert with natural thought processes. Additionally, users' ready enthusiasm for the World Wide Web graphical "hypertext" component of the Internet demonstrates the appeal of associative, nonlinear data structures, in contrast to the limiting structure of computerized desktop metaphors. And yet, prior art web browsers and operating systems awkwardly compel users to navigate the associative, non-dimensional structure of the World Wide Web using linear, or at best hierarchical user interfaces.

What is desired is an effective methodology for organizing and processing pieces of interrelated information (or "thoughts") using a digital computer. The methodology should support flexible, associative networks (or "matrices") of digital thoughts, and not be limited to strict, tree hierarchies as are conventional, prior art technologies. A related goal is to create an intuitive and accessible scheme for graphically representing networks of thoughts, providing users with access to diverse types of information in a manner that maximizes access speed but minimizes navigational confusion. Finally, that methodology should be optimized to enable users to seamlessly manage, navigate, and share such matrices consisting of files and content stored both locally on digital information devices, as well as remotely via digital telecommunications networks such as local area networks, wide area networks, and public networks such as the Internet.

Another problem that the embodiments of the present invention solve is the interface needs of a network web server with various repositories. On the Internet today, various companies and organizations maintain their own private repository of data. The ease of access to the data in these repositories range from limited to full access. In some cases, these companies and organizations allow the public to access the data in their repository. In other cases, these private repositories are strictly for internal use. In addition, regardless of whether the data was public or private, these databases were programmed with different languages that posed some communication difficulties.

The ease of use of the data in these repositories range from cumbersome to difficult. When the data involves relational databases, current methods of viewing data are confined to tables, columns, and folder hierarchies. The only way to visualize the aggregate of data contained within relational databases was to print complex reports. What is needed is a system or method that allows users to communicate with these various types of repositories or external software systems so that the data therein can be used in an effective and meaningful way. Preferably, that system would (i) permit access to and visualization of multiple repositories of different types simultaneously under a single user interface; and (ii) where made possible by properly preparing those repositories, reduce communications complexity by permitting clients to access those repositories directly.

Another requirement to the advancement in the art of associative interfaces is enabling multiple users to access and edit common sources of associative data. In some instances, it will be convenient for those users to access those data sources in real-time. In the past, a token system ensuring that only a single user is permitted to change a single item of associative data at a time. But further implementation and variations of such a system of reconciling conflicting user requests is needed. In other instances, it will be more convenient for users to modify the data from those sources offline, and synchronize their edits when they reconnect to the shared data sources.

As has been previously taught, there will be instances that require multiple documents to be associated with a single item of associative data, such as versioning and others. A more articulated file architecture will be needed to support multiple items of data referencing multiple documents.

IV. SUMMARY OF THE INVENTION

The present invention enables users to organize information on a digital computer in a flexible, associative manner, akin to the way in which information is organized by the human mind. Accordingly, the present invention utilizes highly flexible, associative matrices to organize and represent digitally-stored thoughts.

A matrix specifies a plurality of thoughts, as well as network relationships among the thoughts. Because the matrix structure is flexible, each thought may be connected to a plurality of related thoughts. A graphical representation of a portion of the matrix is displayed, including a plurality of user-selectable indicia (such as an icon) corresponding to the thoughts, and in some embodiments, a plurality of connecting lines corresponding to the relationships among the thoughts. Each of the thoughts may be associated with at least one thought document, which itself is associated with a software application program.

Users are able to select a current thought conveniently by interacting with the graphical representation, and the current thought is processed by automatically invoking the application program associated with the current thought document in a transparent manner. Upon the selection of a new current thought, the graphical representation of the displayed portion of the matrix (the "plex") is revised to reflect the new current thought, all thoughts having predetermined relations to that current thought, and the relations therebetween.

Users can modify the matrix by interactively redrawing the connecting lines between thoughts, and relationships within the matrix are then redefined accordingly. Further aspects of the invention include techniques permitting automated generation of thought matrices, delayed thought loading to facilitate navigation through a plex without undue delay due to bandwidth constraints, and matrix division and linking to allow optimal data structure flexibility.

Furthermore, the present invention is interoperable with digital communications networks including the Internet, and offers an intuitive methodology for the navigation and management of essentially immeasurable information resources that transcends the limitations inherent in traditional hierarchical-based approaches.

Furthermore, the present invention enables a single source of associative data to be modified by numerous users in real-time using a token-type system to avoid conflicting requests, or using a synchronization system to enable changes to be made offline and then to modify the shared source of data in a synchronization step according to rules.

With respect to different repositories, in accordance with one embodiment of the present invention, the Brain system generates and visualizes large relational databases and gives users immediate access to edit and present data. The Brain system offers a solution that facilitates the capture of information from a company's relational database and showcases it in an engaging and dynamic visual interface. Furthermore, in accordance with another embodiment of the present invention, the Brain system can access data that are located in multiple databases and seamlessly regenerate the graphical matrices in a way that makes the existence of multiple databases transparent to the user. The Brain accomplishes this by providing a connector system that serves as an interface between the Brain server and whatever repositories are employed to store data. The connector system utilizes a common API that allows users to communicate with any type of repository. The data in these repositories are used to generate the matrix in accordance with the various embodiments of the present invention.

A special implementation of that connector system, a "composite connector," enables the Brain to interface with a number of data repositories at disparate network locations and of different types simultaneously. In another embodiment, when those data repositories themselves can be preconfigured under the thought/link definitions of the Brain, a Brain Client can be configured to interact with those repositories directly. In either case, means are taught for navigating among thoughts, creating new links among thoughts from same or different repositories, and of creating new thoughts.

A more fully articulated file architecture permitting multiple thoughts to reference multiple documents is also explained.

V. BRIEF DESCRIPTION OF THE DRAWINGS

FIG. 10 discloses an algorithm which may be implemented in an embodiment of the present invention.

Figure 11:
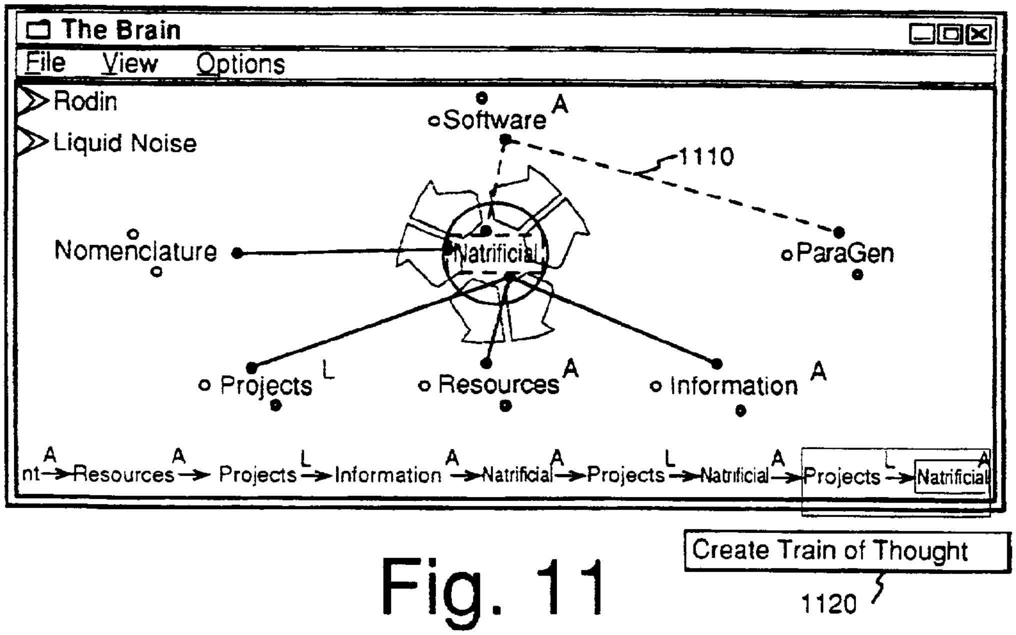

FIG. 11 illustrates a graphical user interface screen display, in accordance with another aspect of the present invention.

Figure 12:
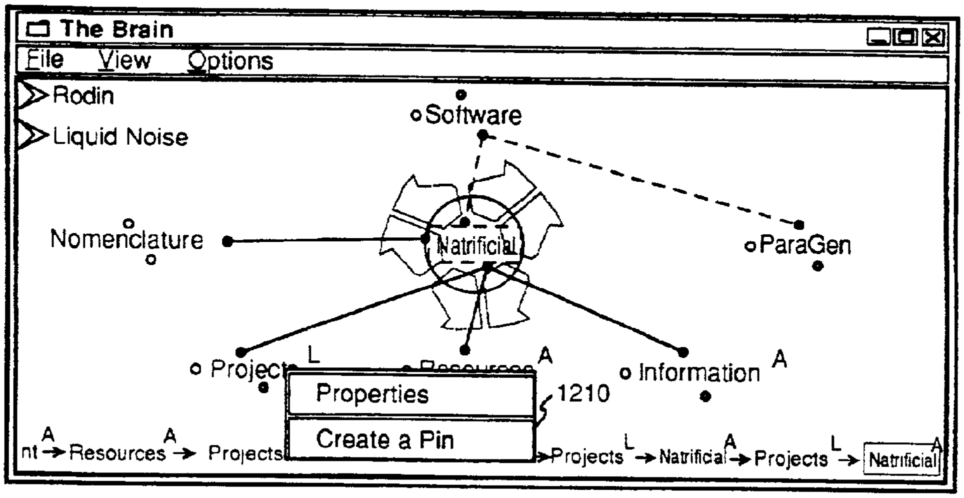

FIG. 12 illustrates a graphical user interface screen display, in accordance with another aspect of the present invention.

Figure 13:
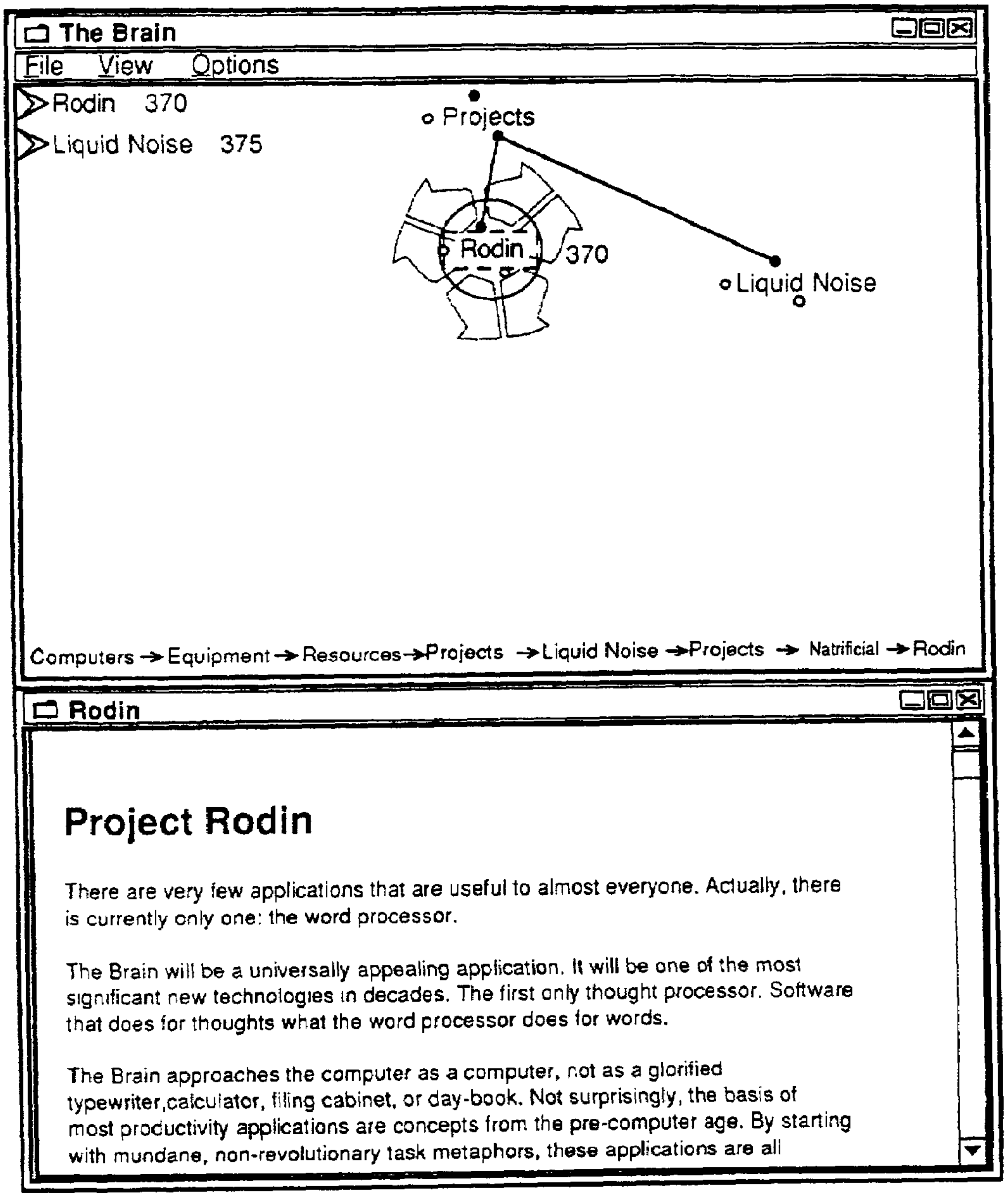

FIG. 13 illustrates a graphical user interface screen display, in accordance with another aspect of the present invention.

Figure 14:
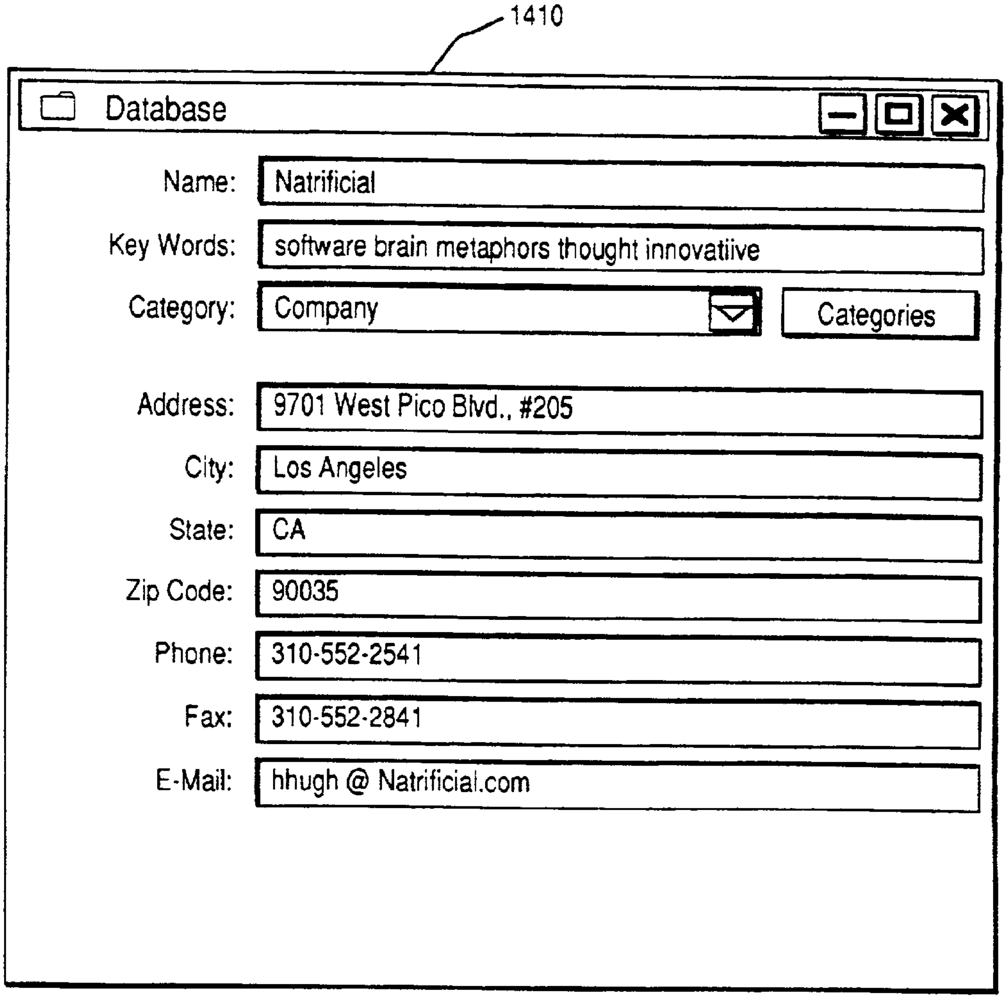

FIG. 14 illustrates one embodiment of a dialog window for editing thought fields.

Figure 15:
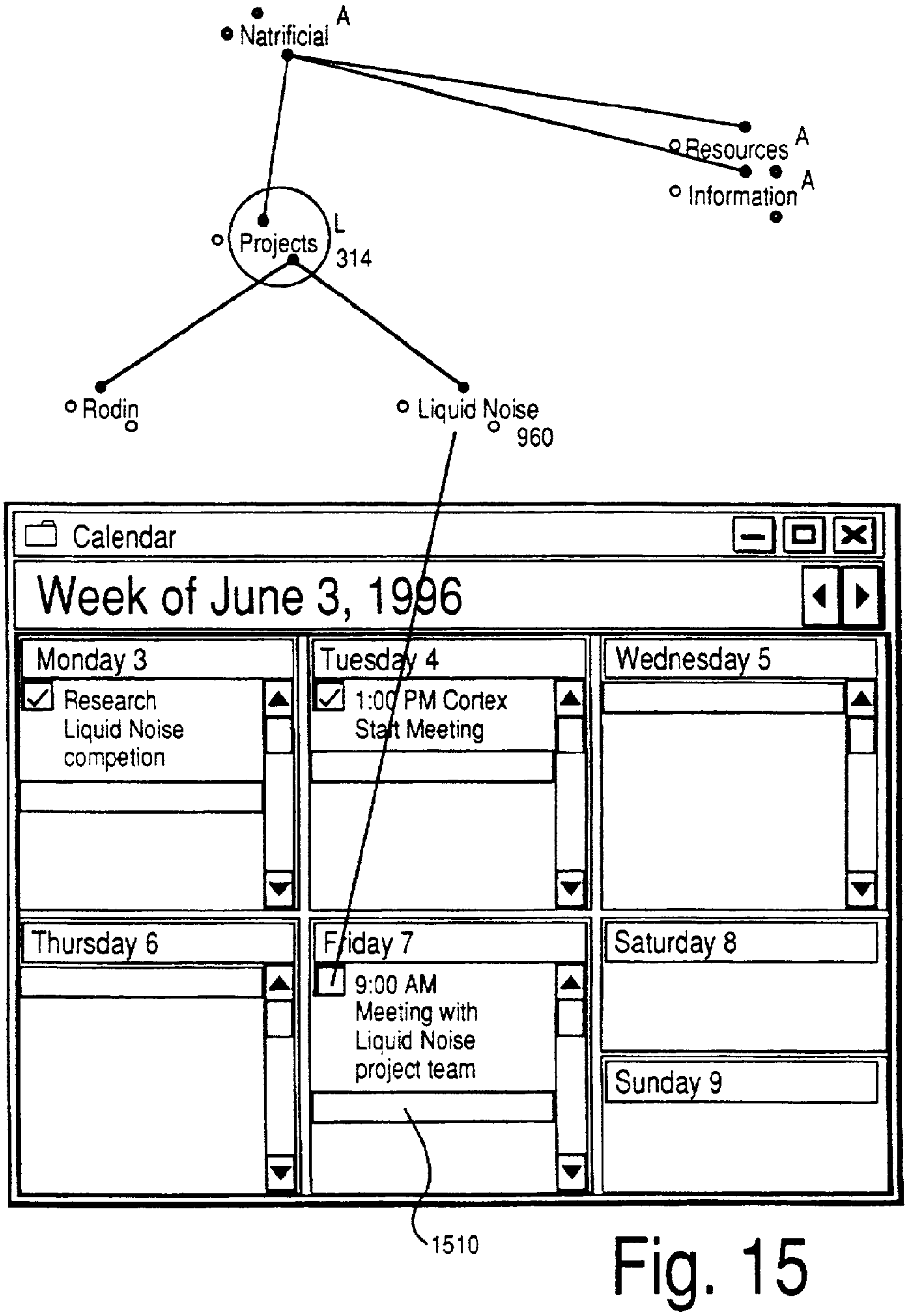

FIG. 15 illustrates one embodiment of a calendar window in conjunction with a hypothetical plex.

Figure 16:
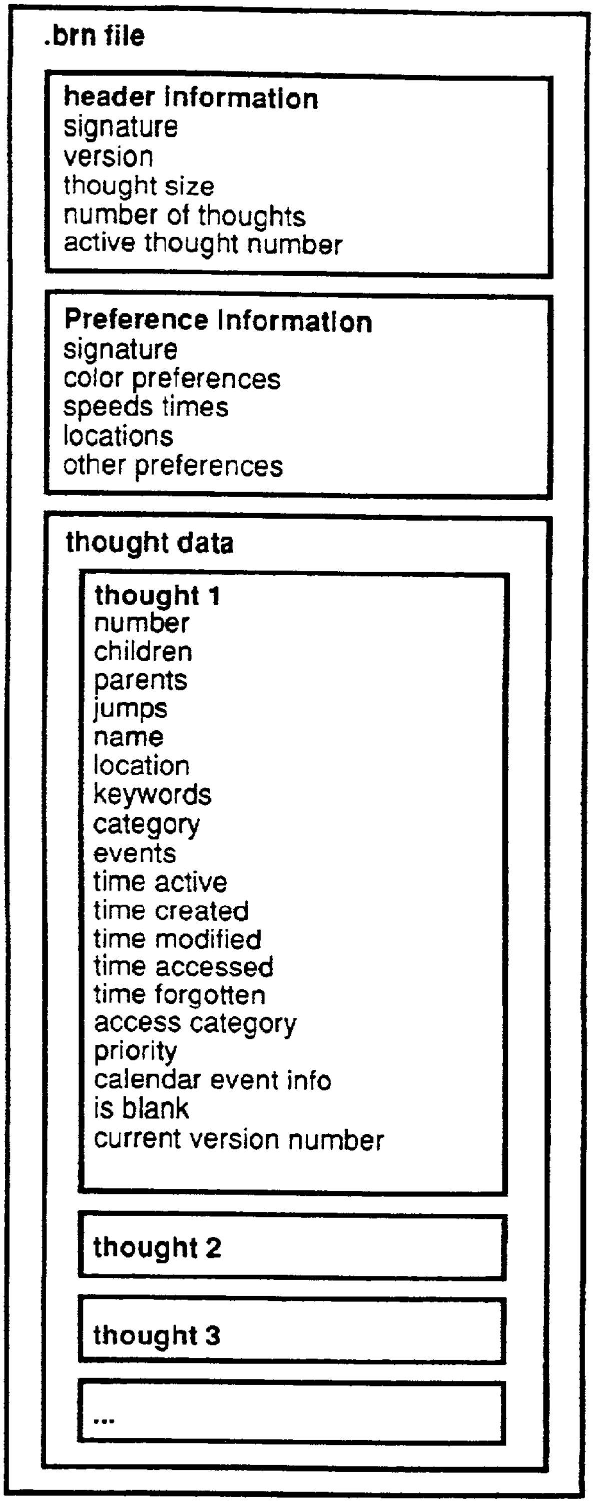

FIG. 16 illustrates the data architecture of one embodiment of the ".brn" (modified headcase) file of the present invention.

FIG. 17 sets forth algorithms for implementing forgetting and remembering operations that are used with one embodiment of the present invention.

Figure 18:
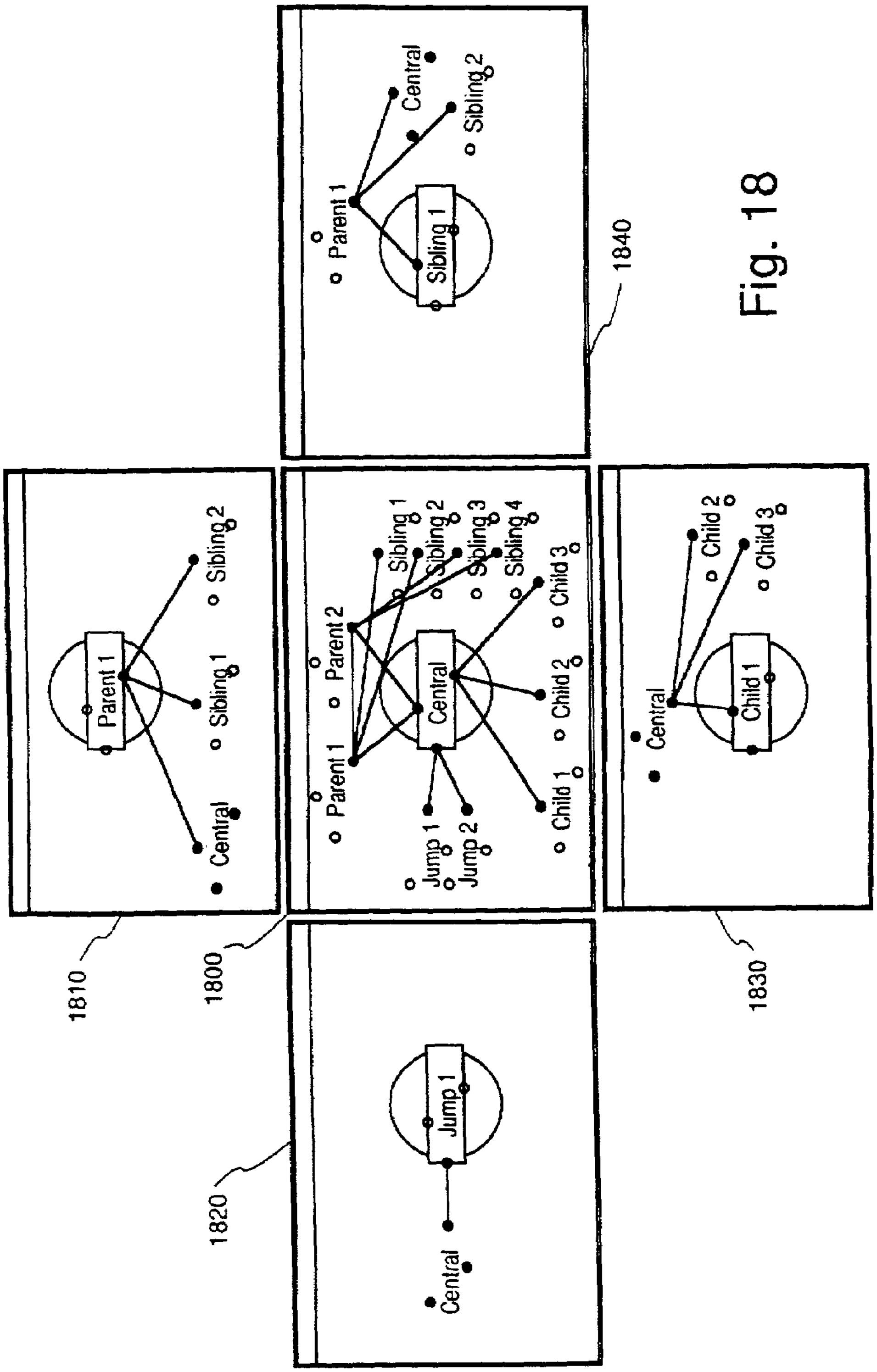

FIG. 18 depicts five interrelated screen displays of one embodiment of the present invention.

Figure 19:
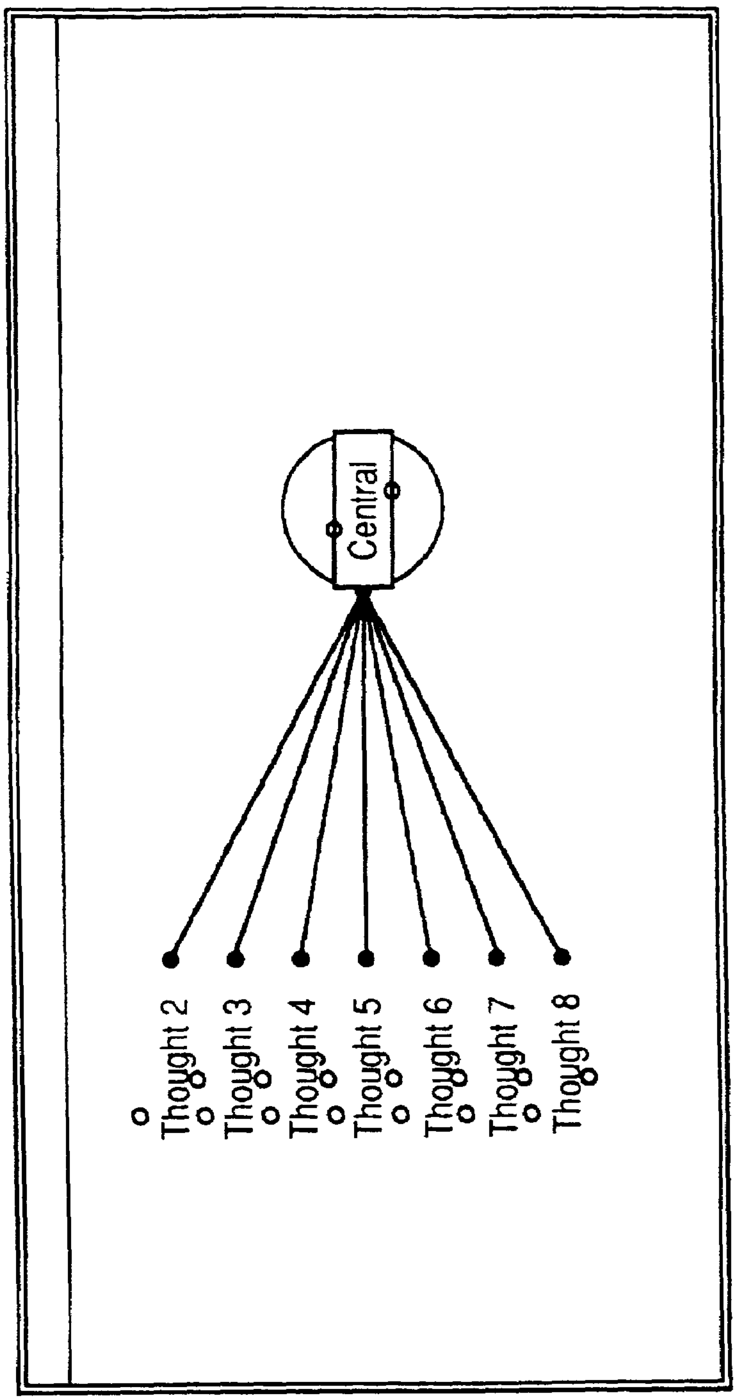

FIG. 19 illustrates a hypothetical screen display of an information storage arrangement having non-differentiated links.

Figure 20:
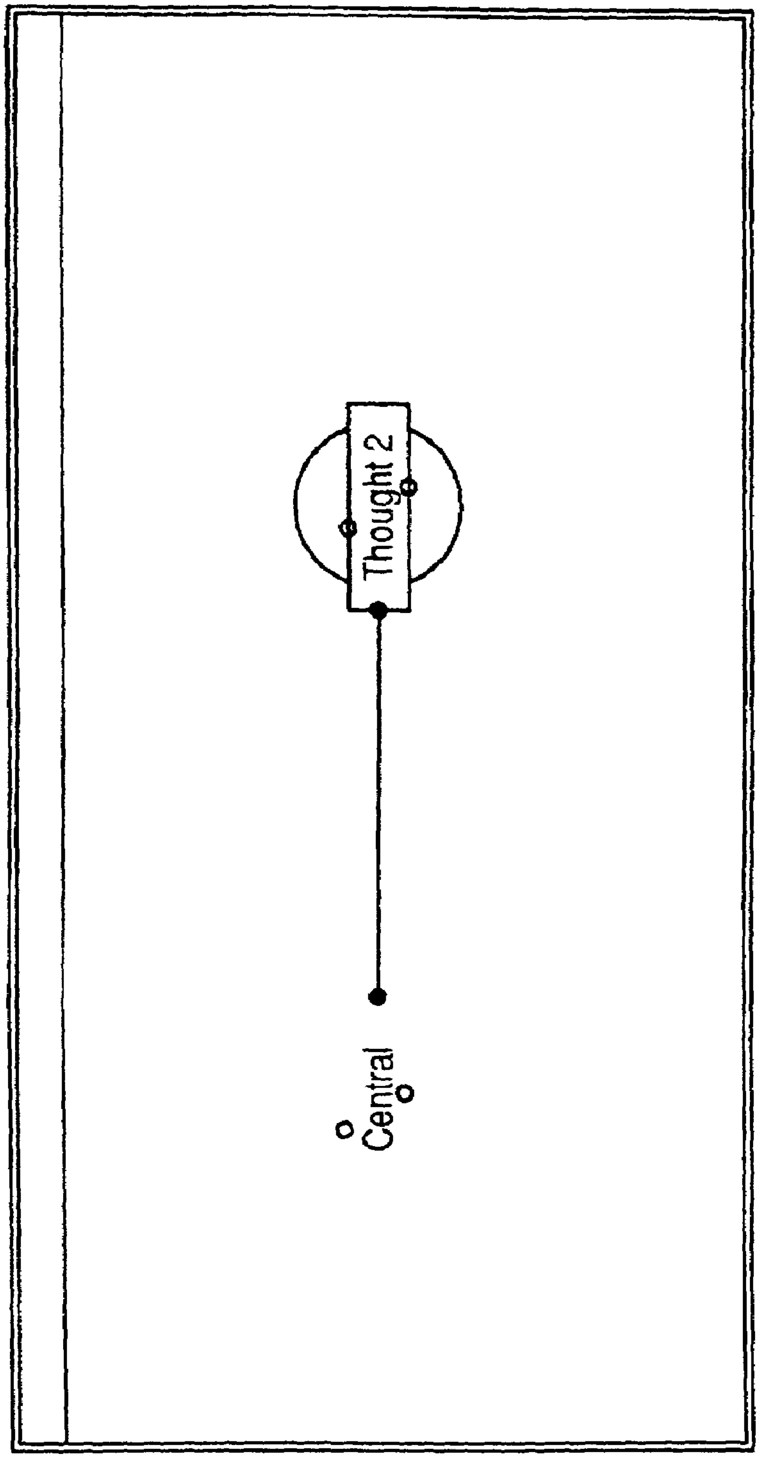

FIG. 20 illustrates the screen display that would result upon the selection of an element from the hypothetical screen display of FIG. 19.

Figure 21:
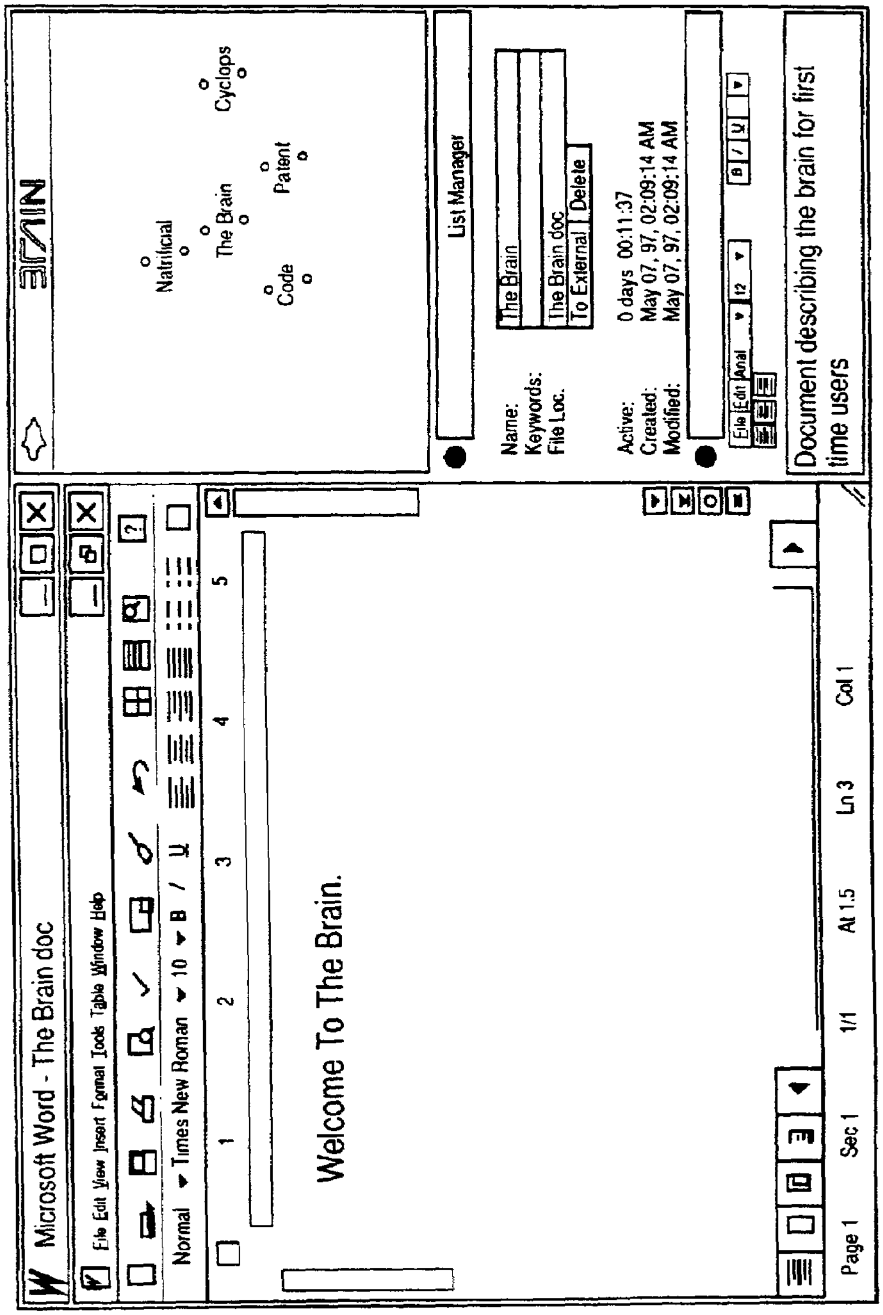

FIG. 21 illustrates an alternative graphical user interface screen display, in accordance with one embodiment of the present invention.

Figure 22:
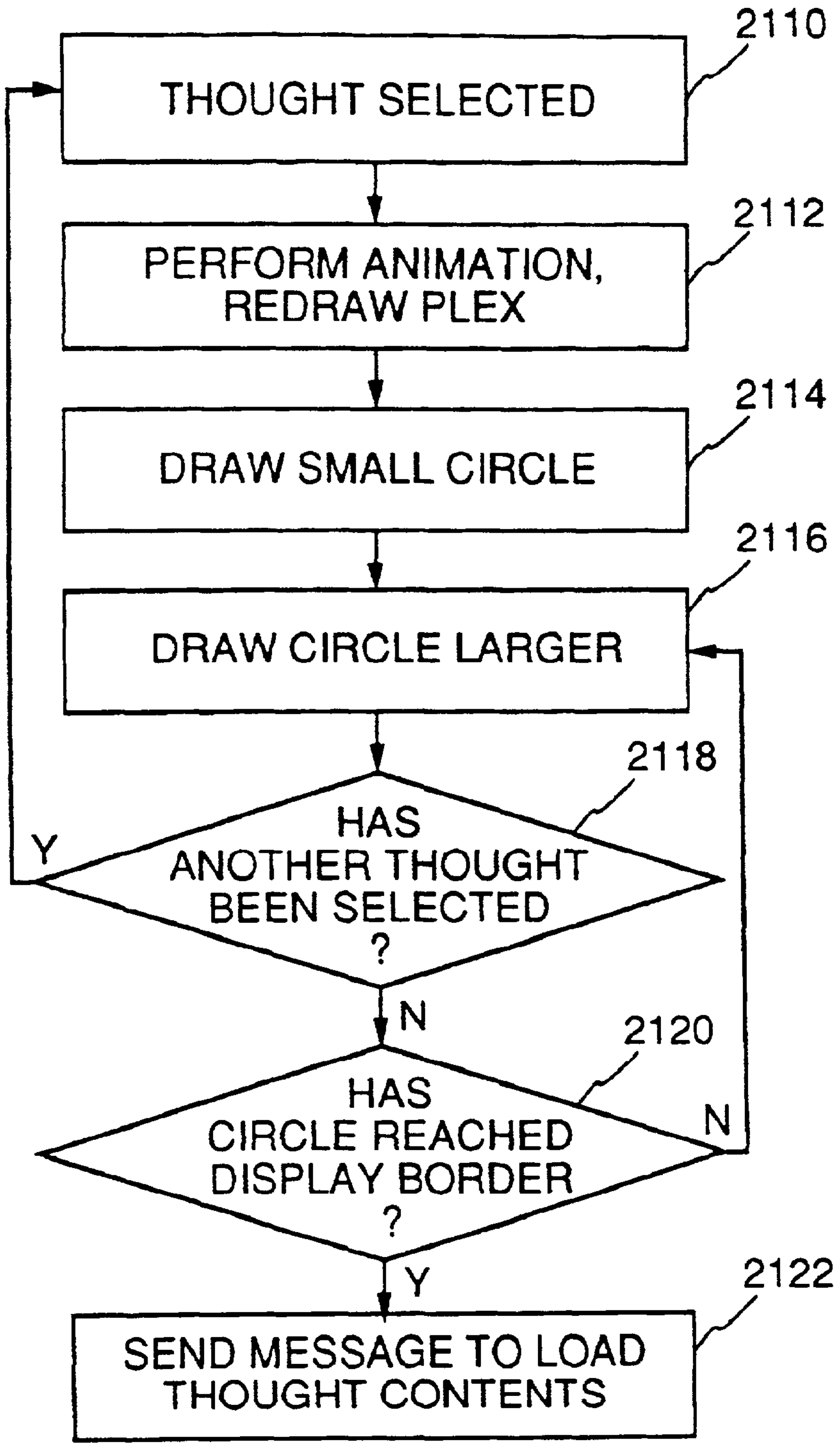

FIG. 22 illustrates a flow chart describing one method for implementing the delayed loading feature of one embodiment of the present invention.

FIG. 23 illustrates a method for drawing a plex having distant thoughts.

FIG. 24 illustrates an alternative algorithm for searching thoughts that may be implemented in an embodiment of the present invention.

Figure 25:
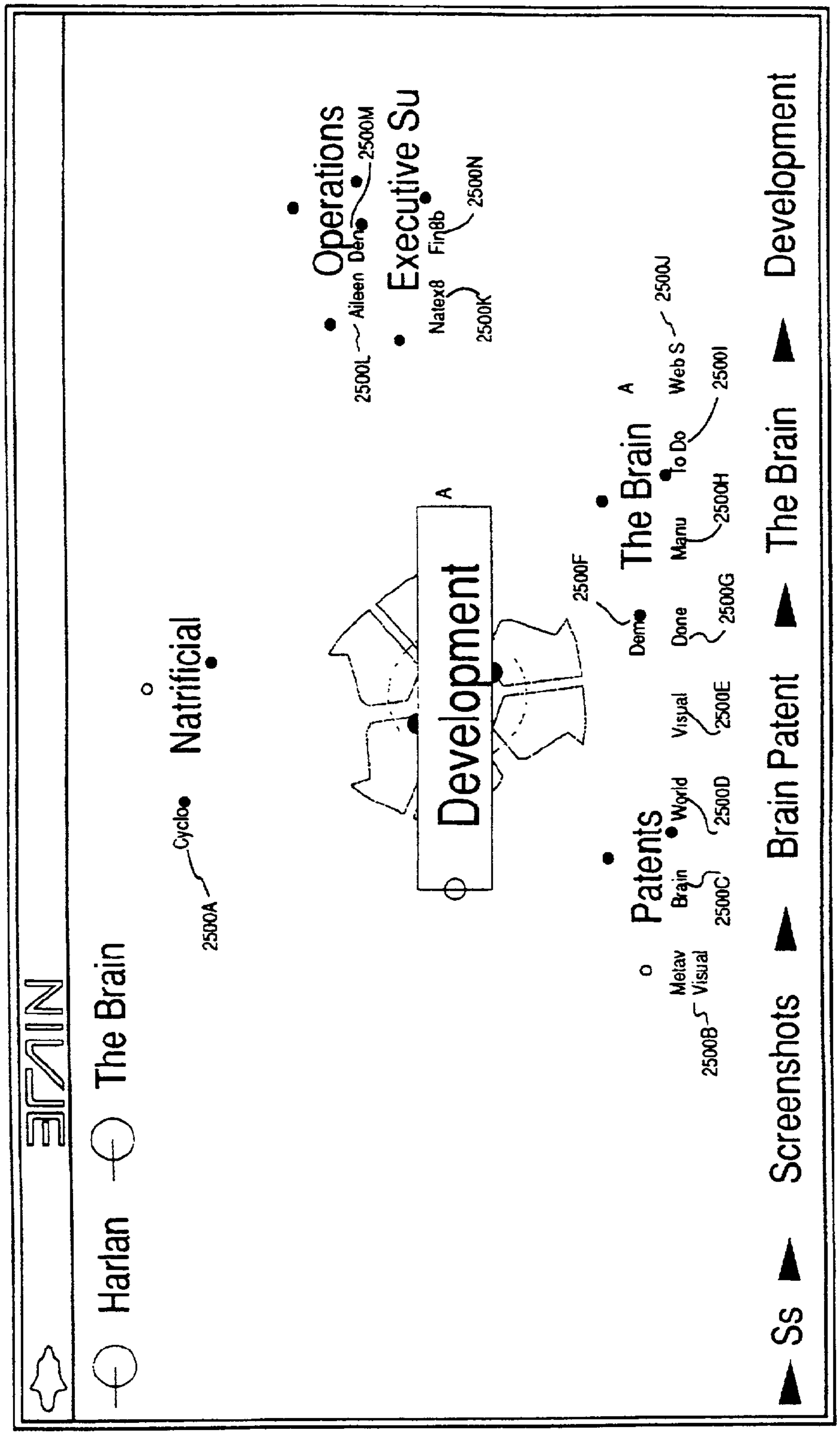

FIG. 25 illustrates a graphical user interface screen.

Figure 26:
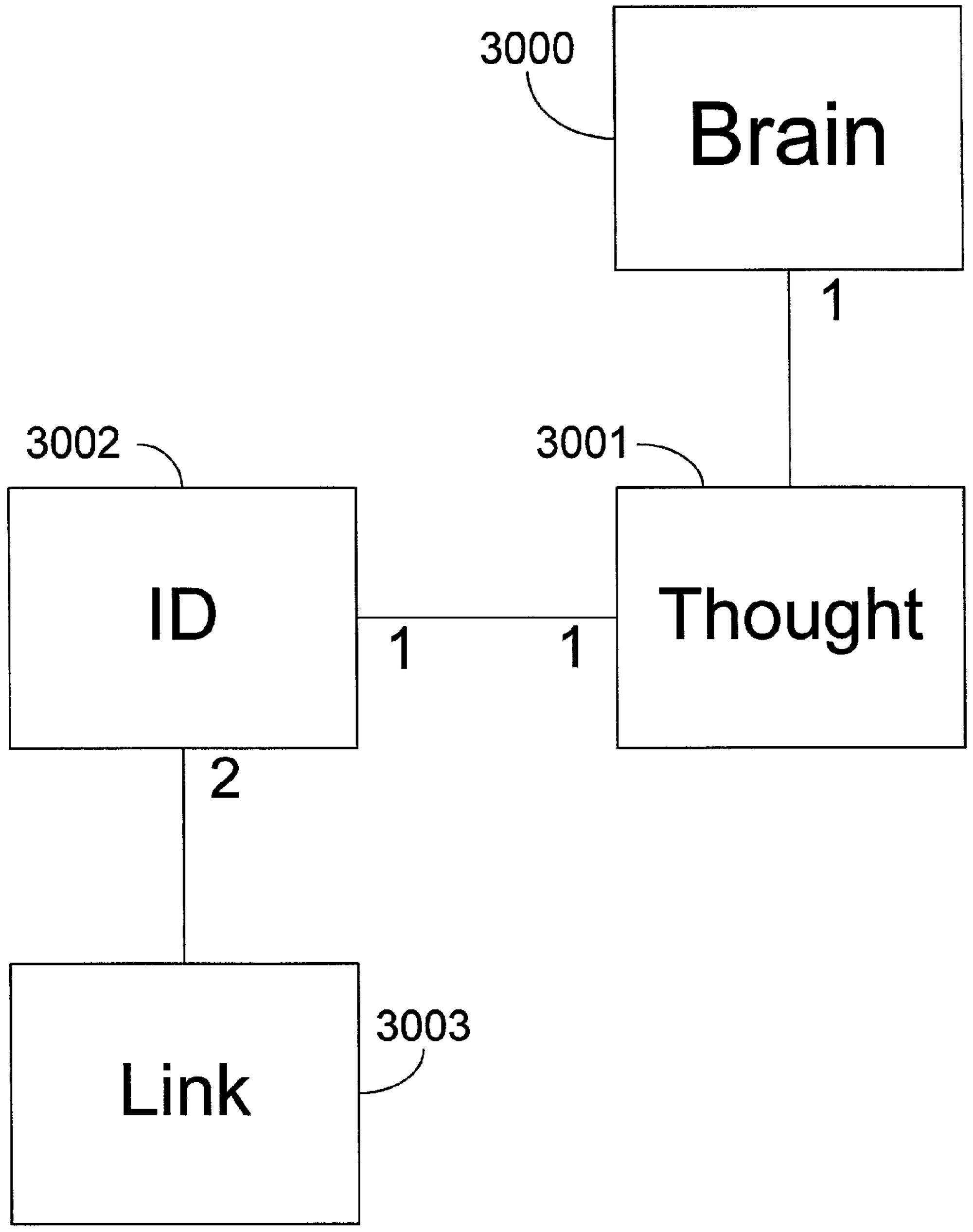

FIG. 26 shows a high level diagram of the relationship among the "Brain," "thought," "ID," and "link."

Figure 27:
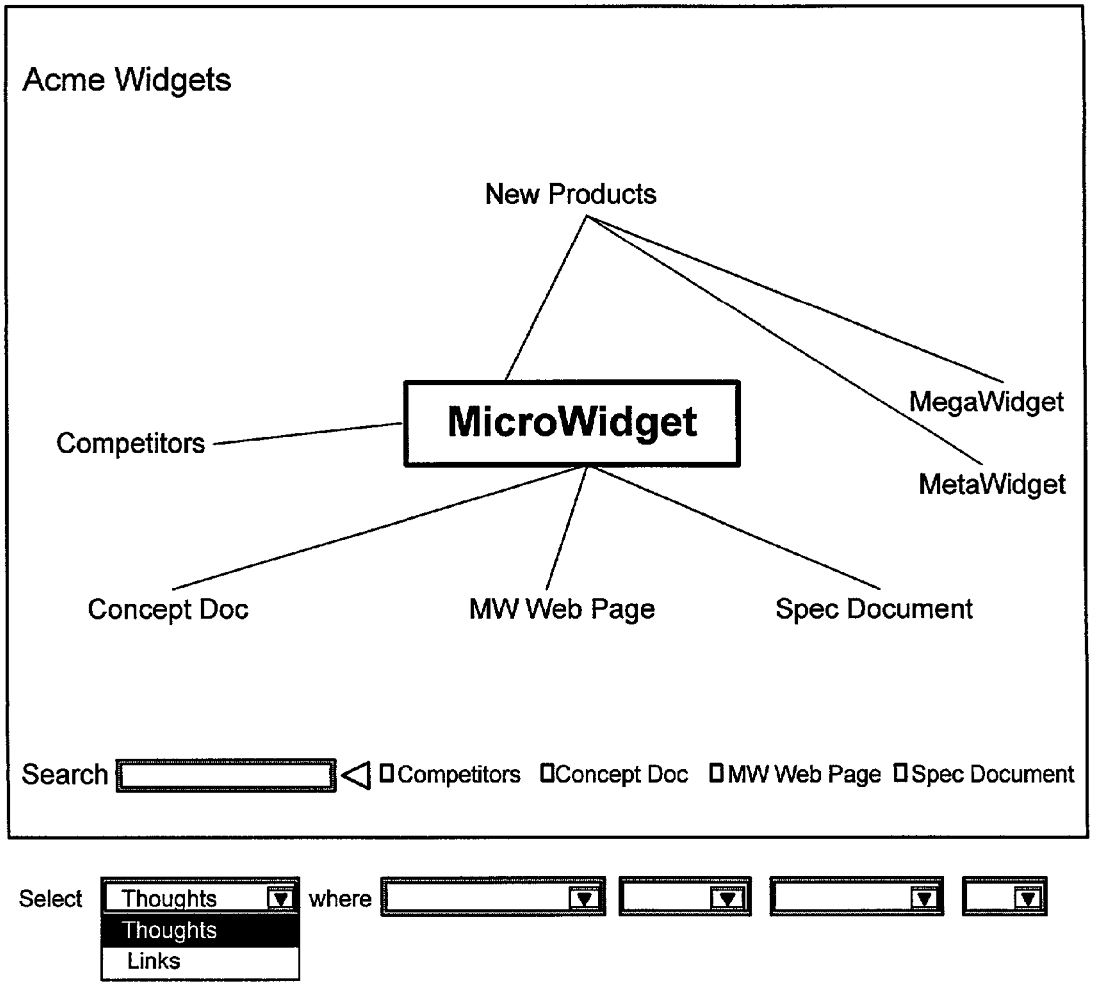

FIG. 27 shows a sample user interface and an exemplary plex, where the filter is selected.

Figure 28:
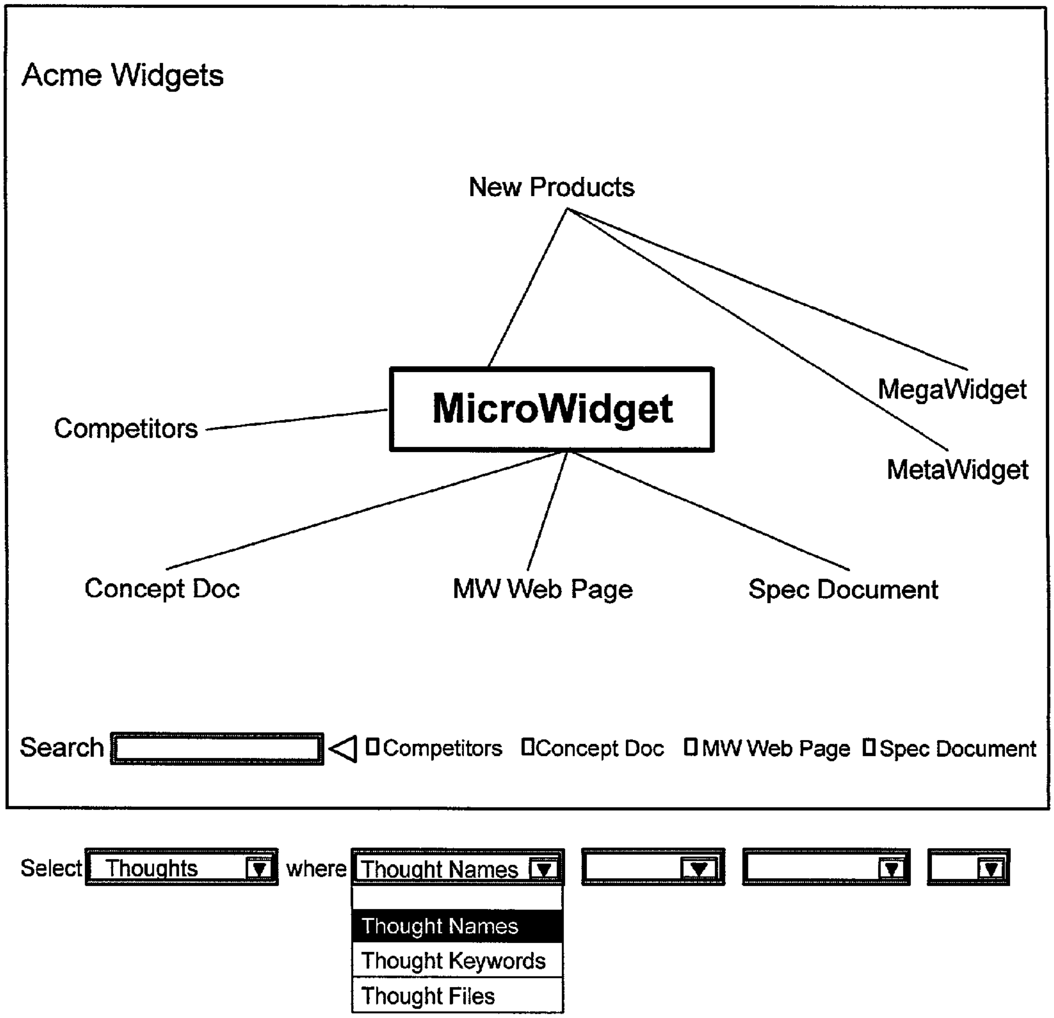

FIG. 28 shows a sample user interface and an exemplary plex, where the type of thought filter is selected.

Figure 29:
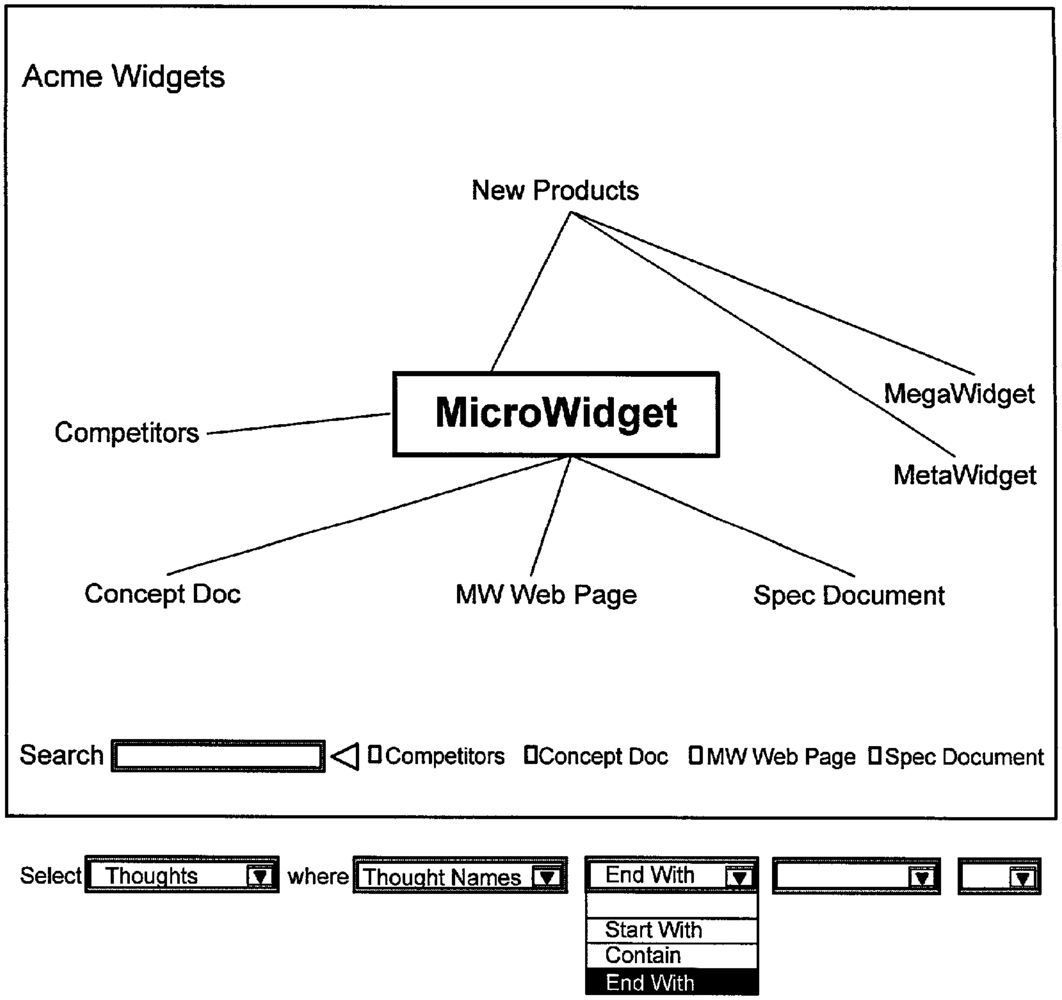

FIG. 29 shows a sample user interface and an exemplary plex, where a first operator is selected.

Figure 30:
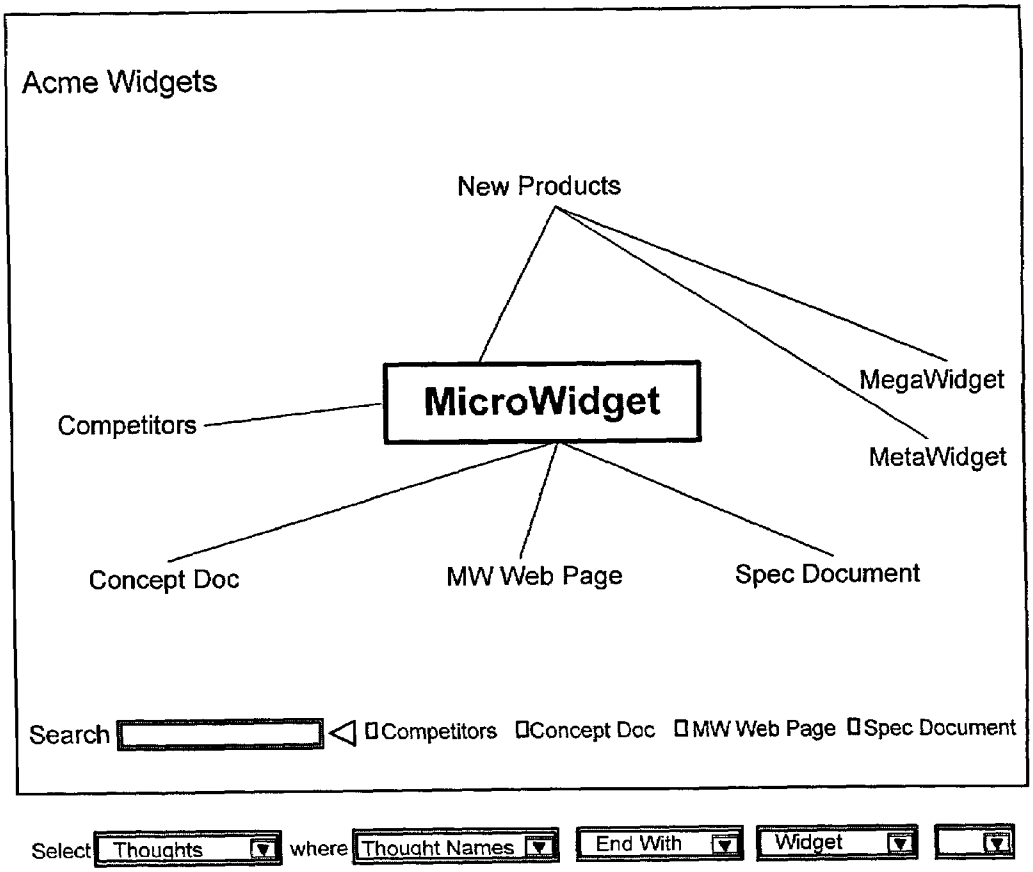

FIG. 30 shows a sample user interface and an exemplary plex, where an argument for the first operator is selected.

Figure 31:
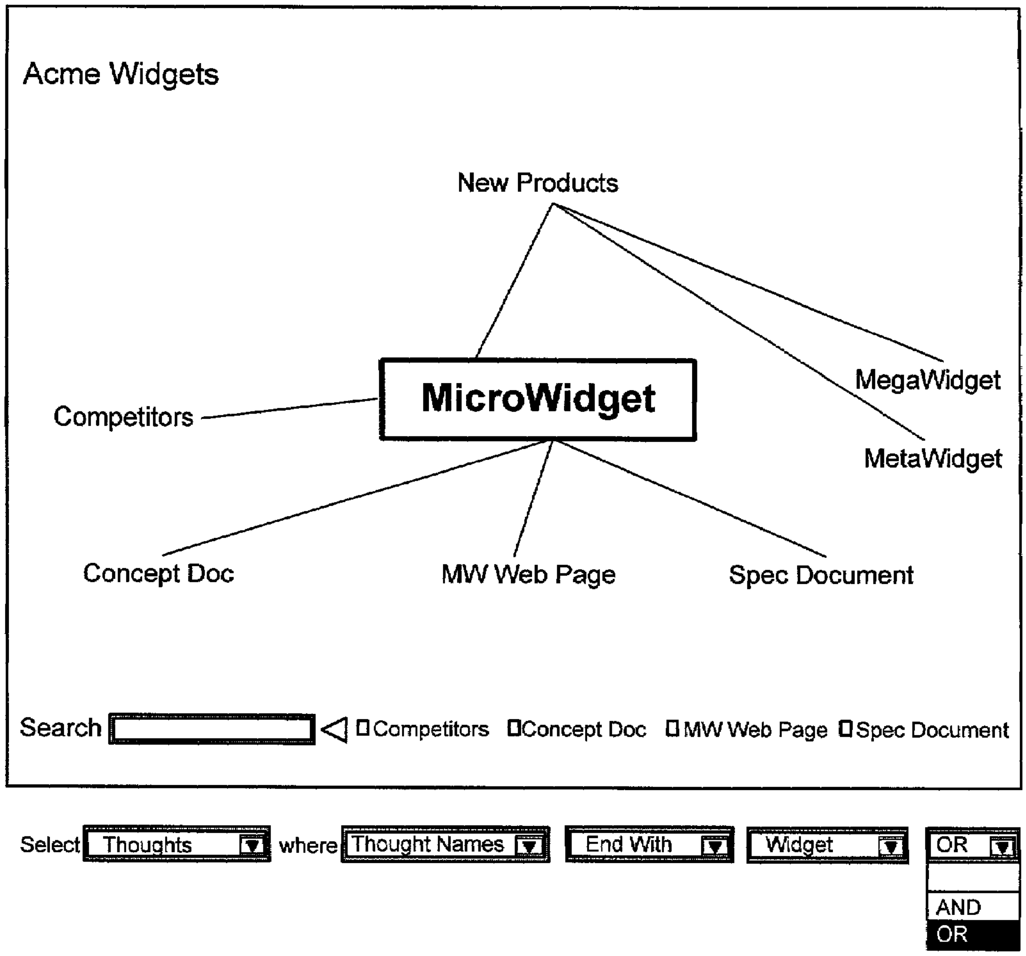

FIG. 31 shows a sample user interface and an exemplary plex, where a Boolean operator is selected.

Figure 32:
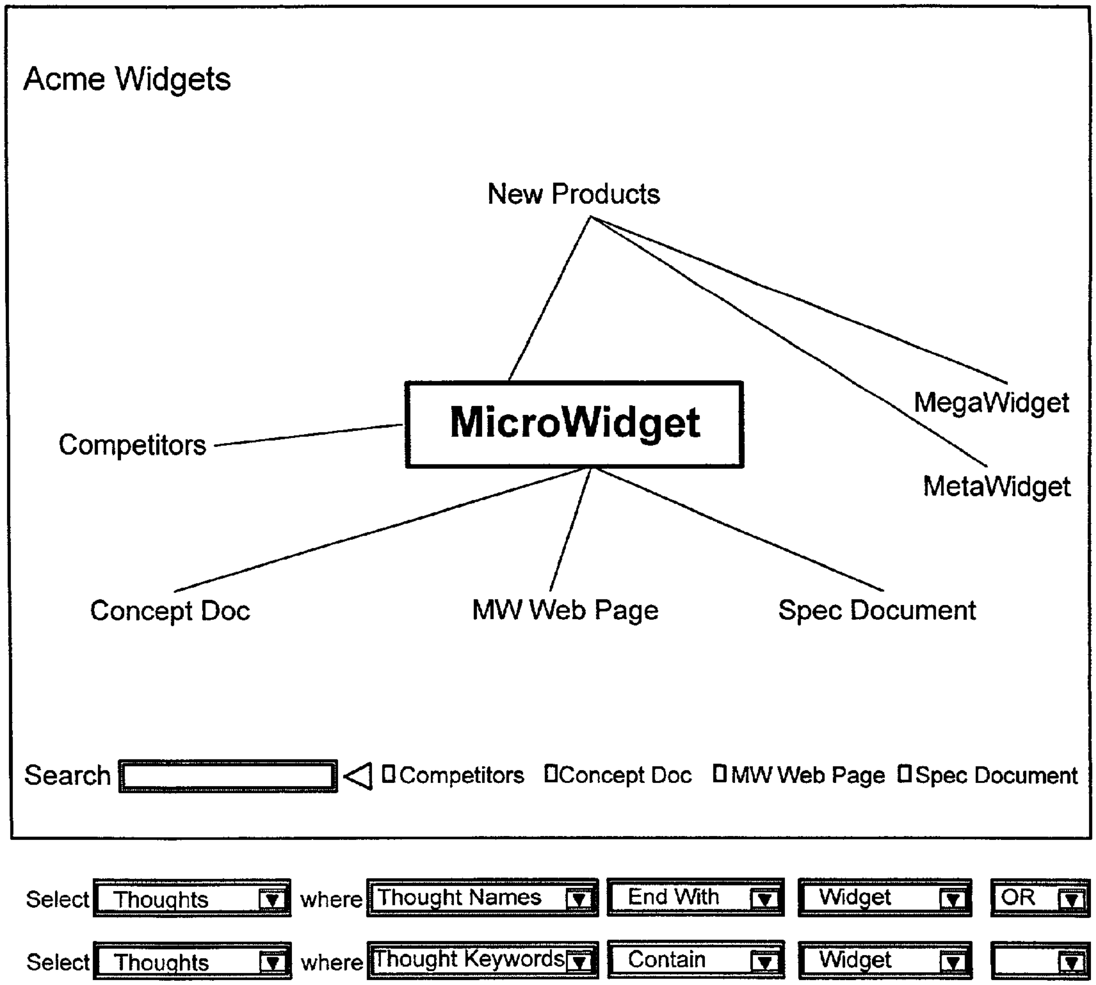

FIG. 32 shows a sample user interface and an exemplary plex, where a second line of filter criteria is displayed.

Figure 33:
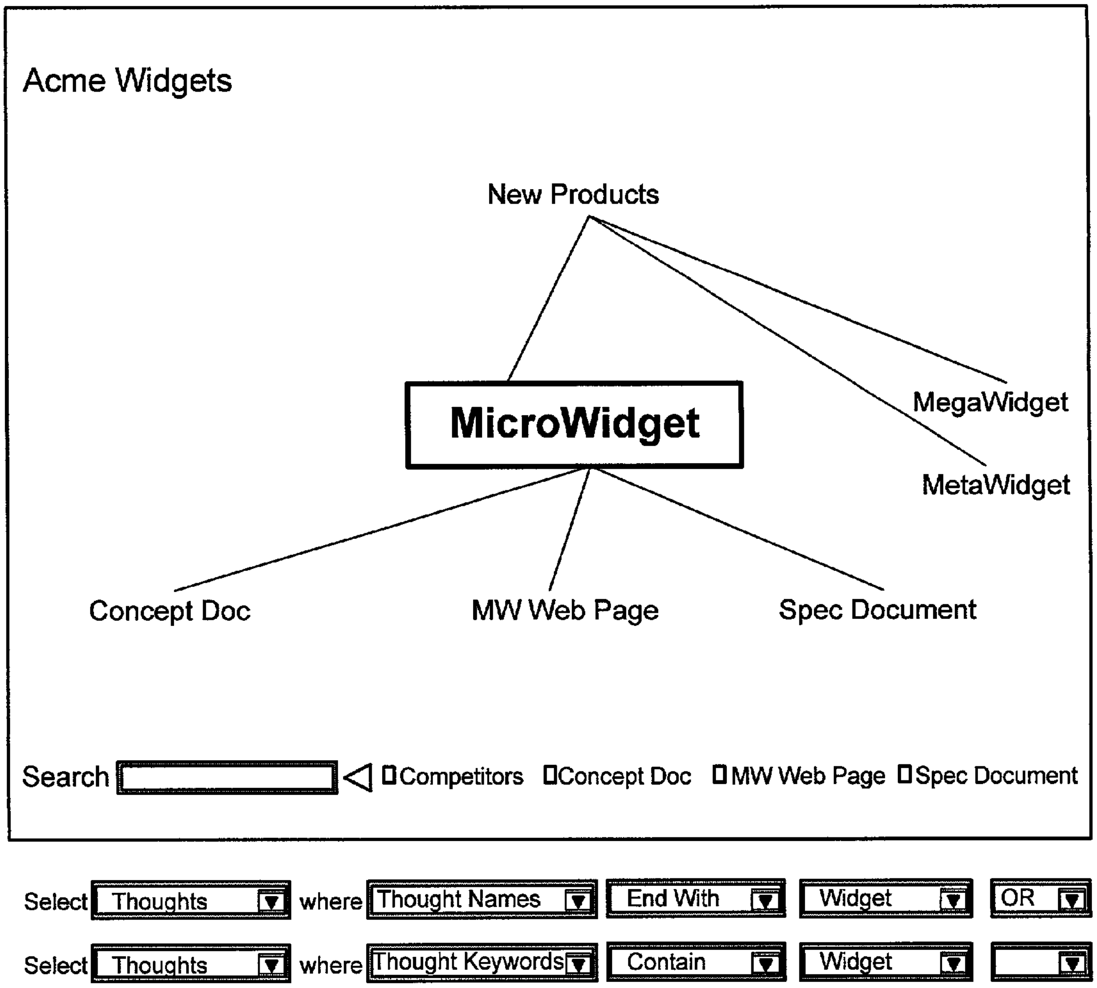

FIG. 33 shows a sample user interface and an exemplary filtered plex, based on the filter criteria selected in FIGS. 27–32 above.

Figure 34:
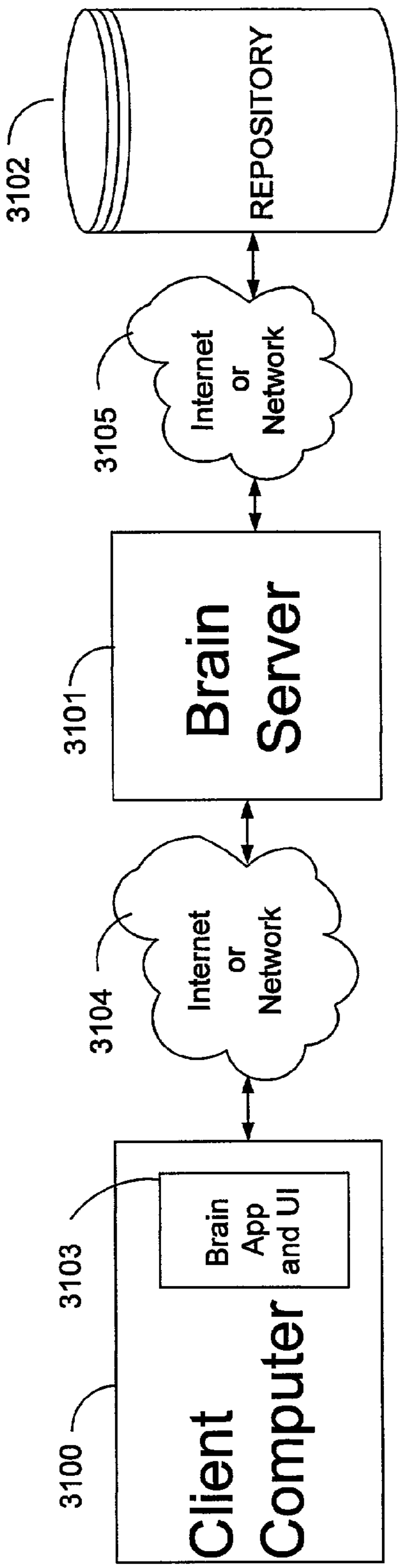

FIG. 34 shows the Brain system coupled to a repository where the data for the matrix is stored.

Figure 35:
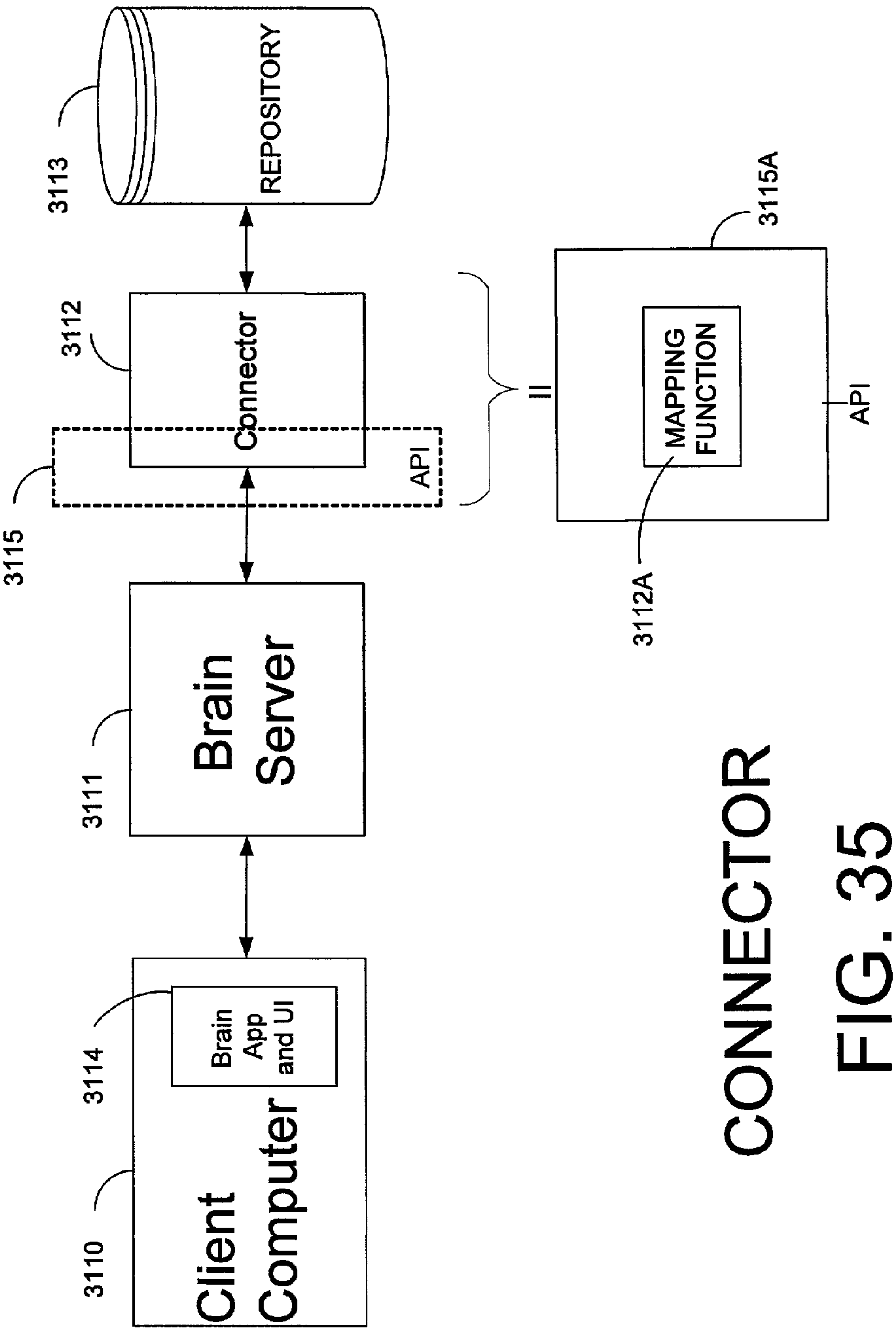

FIG. 35 shows a connector coupled to a repository in accordance with one embodiment of the present invention.

Figure 36:
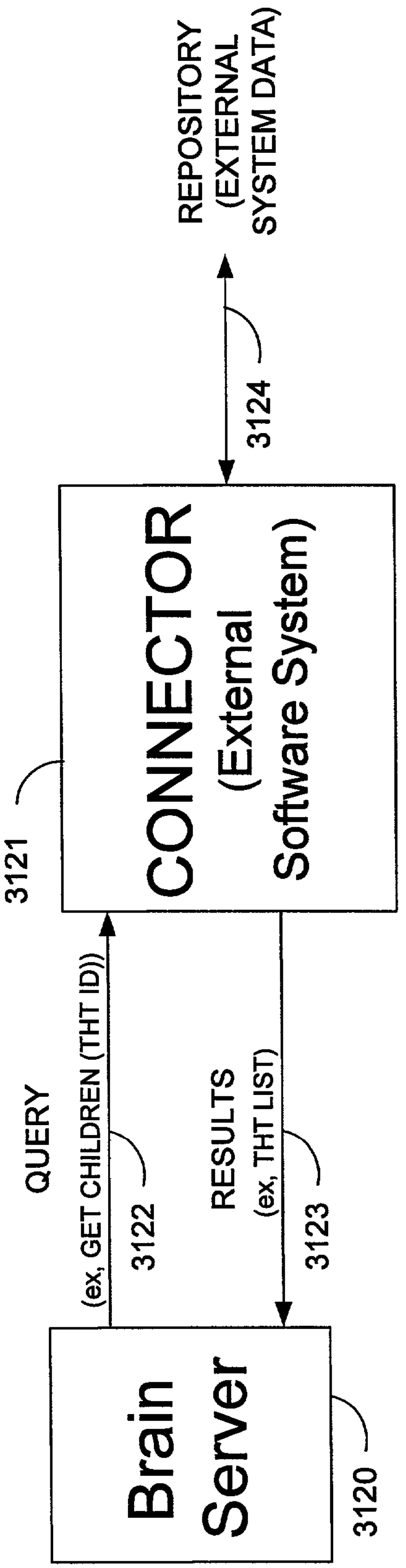

FIG. 36 shows one example of the communication between the Brain server and the connector in accordance with one embodiment of the present invention.

Figure 37:
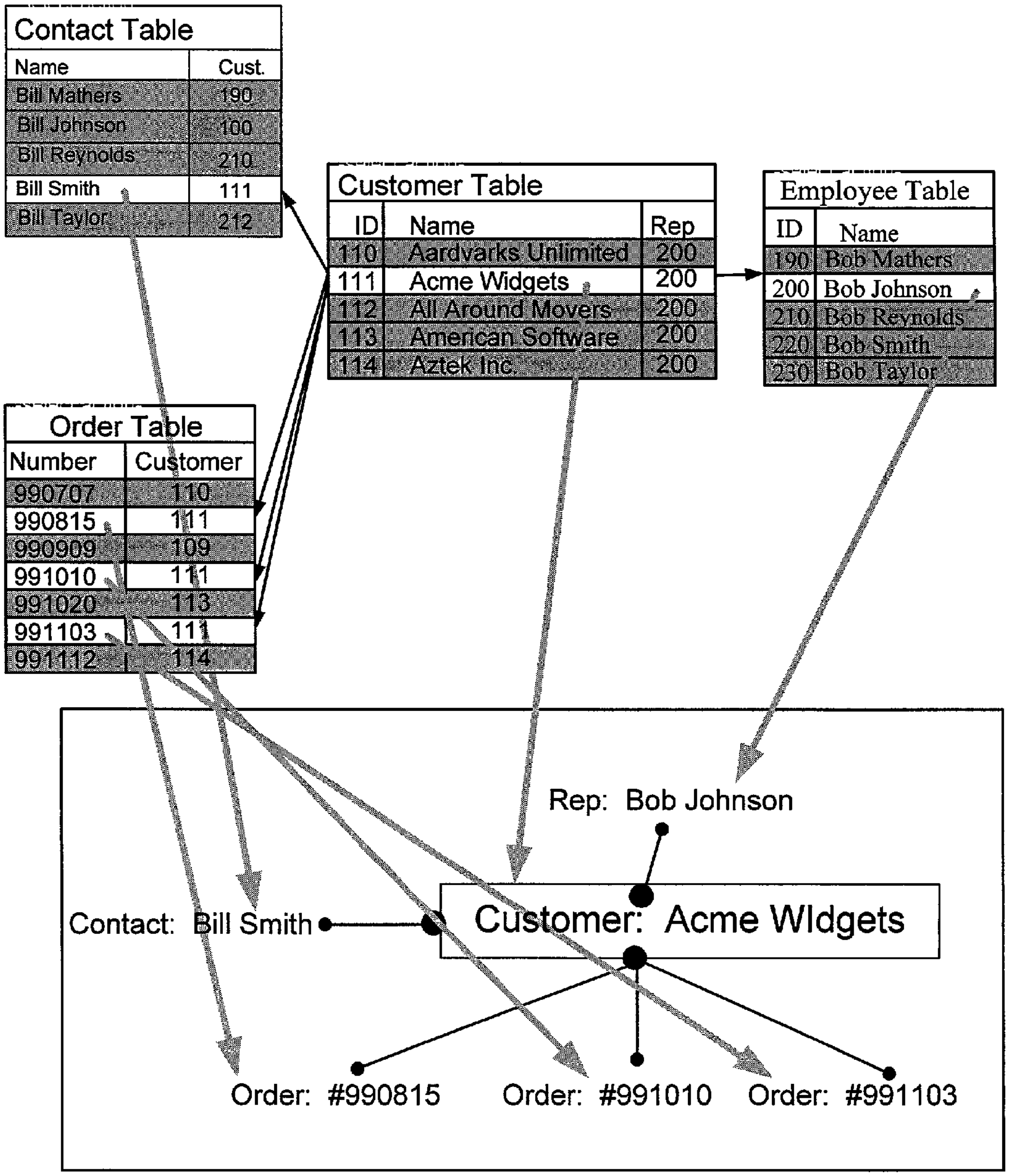

FIG. 37 shows the relationship between the tables in a relational database and the Brain matrix in accordance with one embodiment of the present invention.

Figure 38:
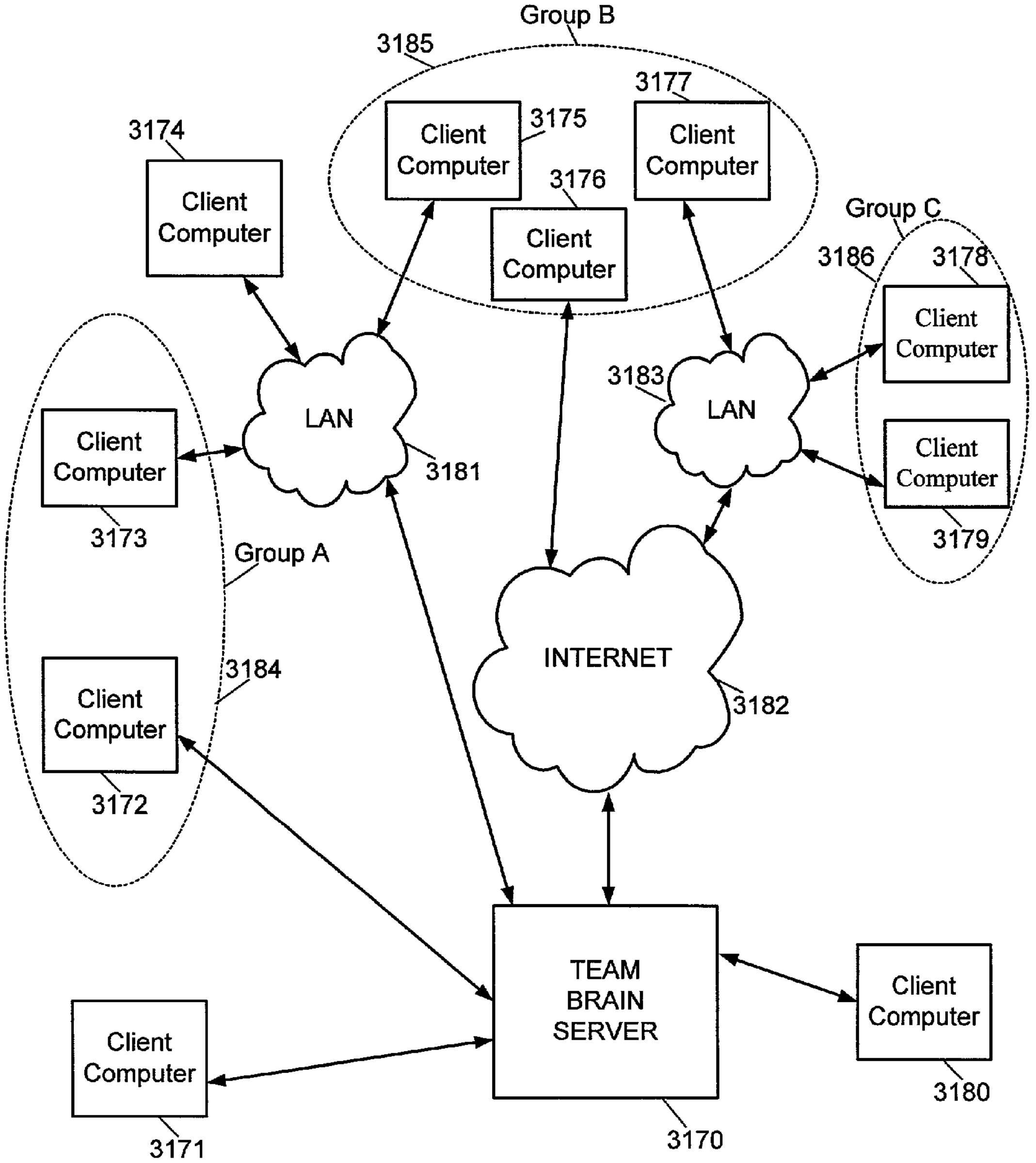

FIG. 38 shows a collaboration environment in accordance with one embodiment of the present invention.

Figure 39:
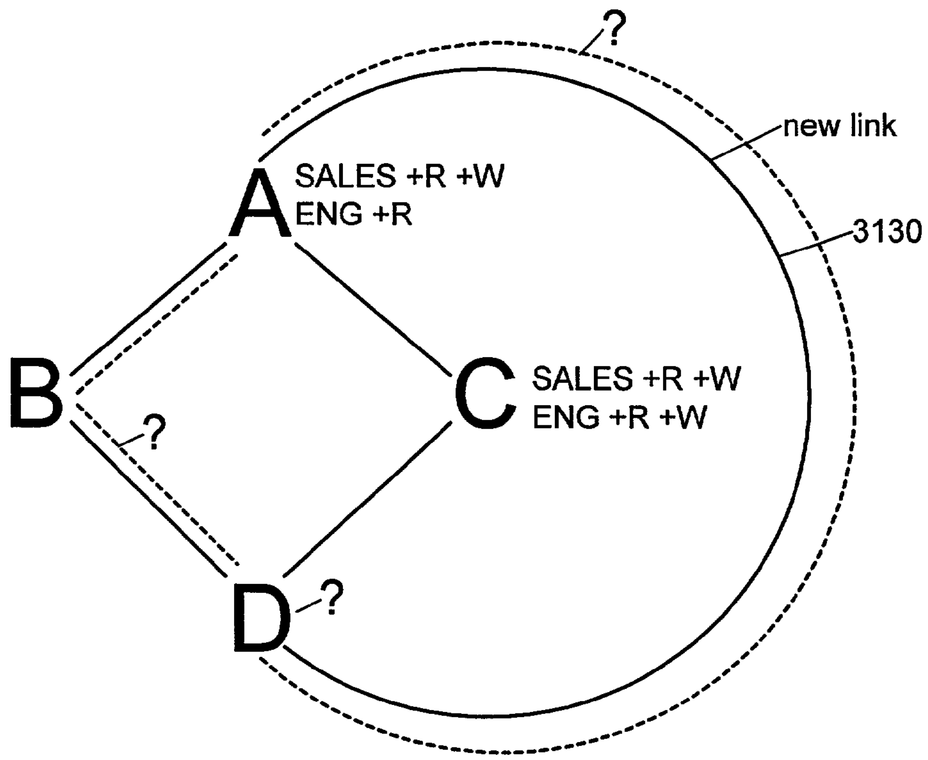

FIG. 39 shows an illustration of a sample matrix and the inheritance issues that arise as users attempt to add links.

Figure 40:
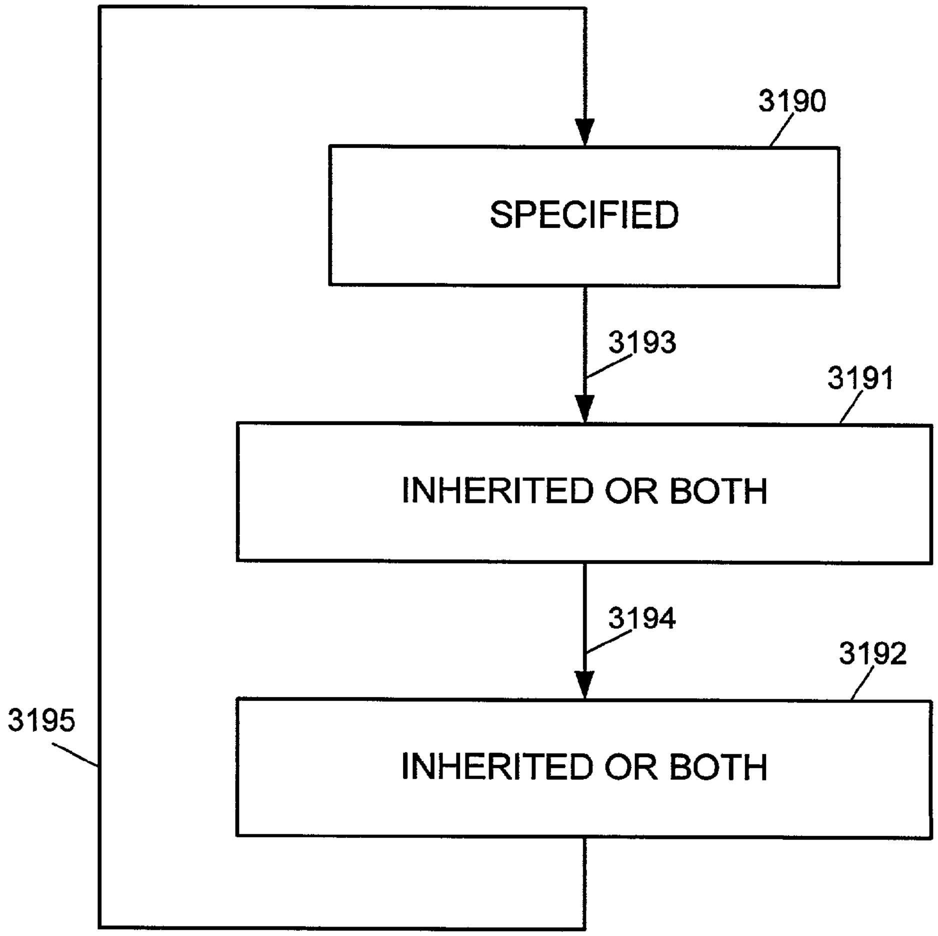

FIG. 40 illustrates an inheritance relationship among thoughts that is allowed by the Brain in accordance with one embodiment of the present invention.

Figure 41:
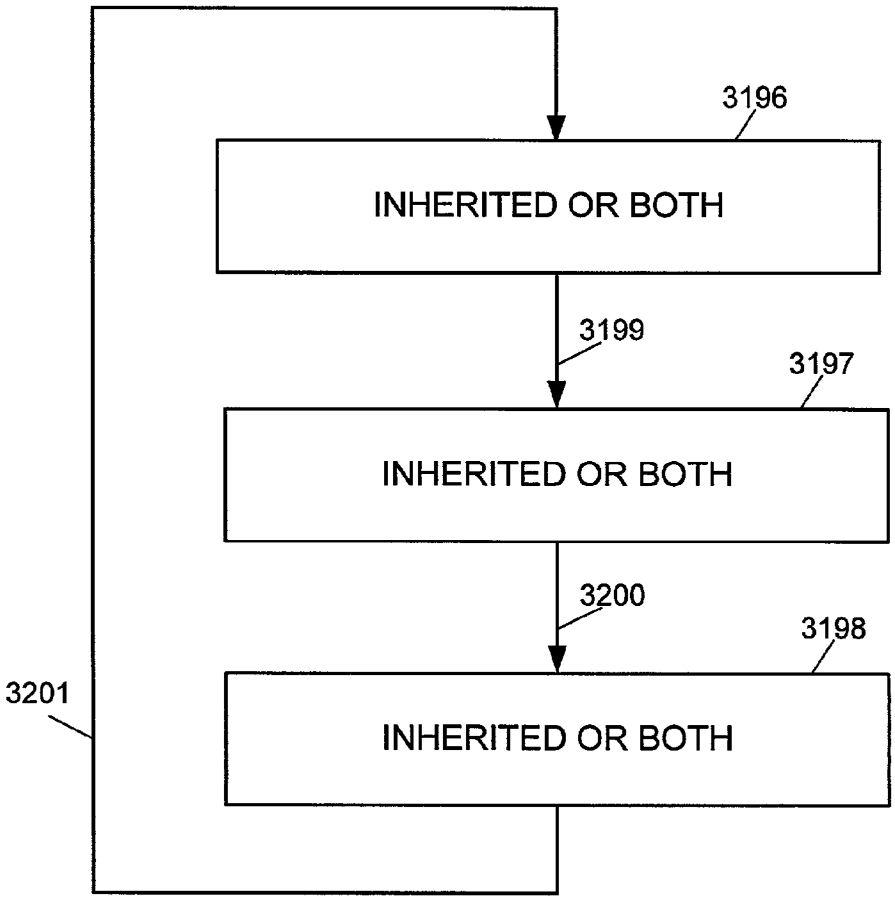

FIG. 41 illustrates an inheritance relationship among thoughts that is not allowed by the Brain in accordance with one embodiment of the present invention.

Figure 42:
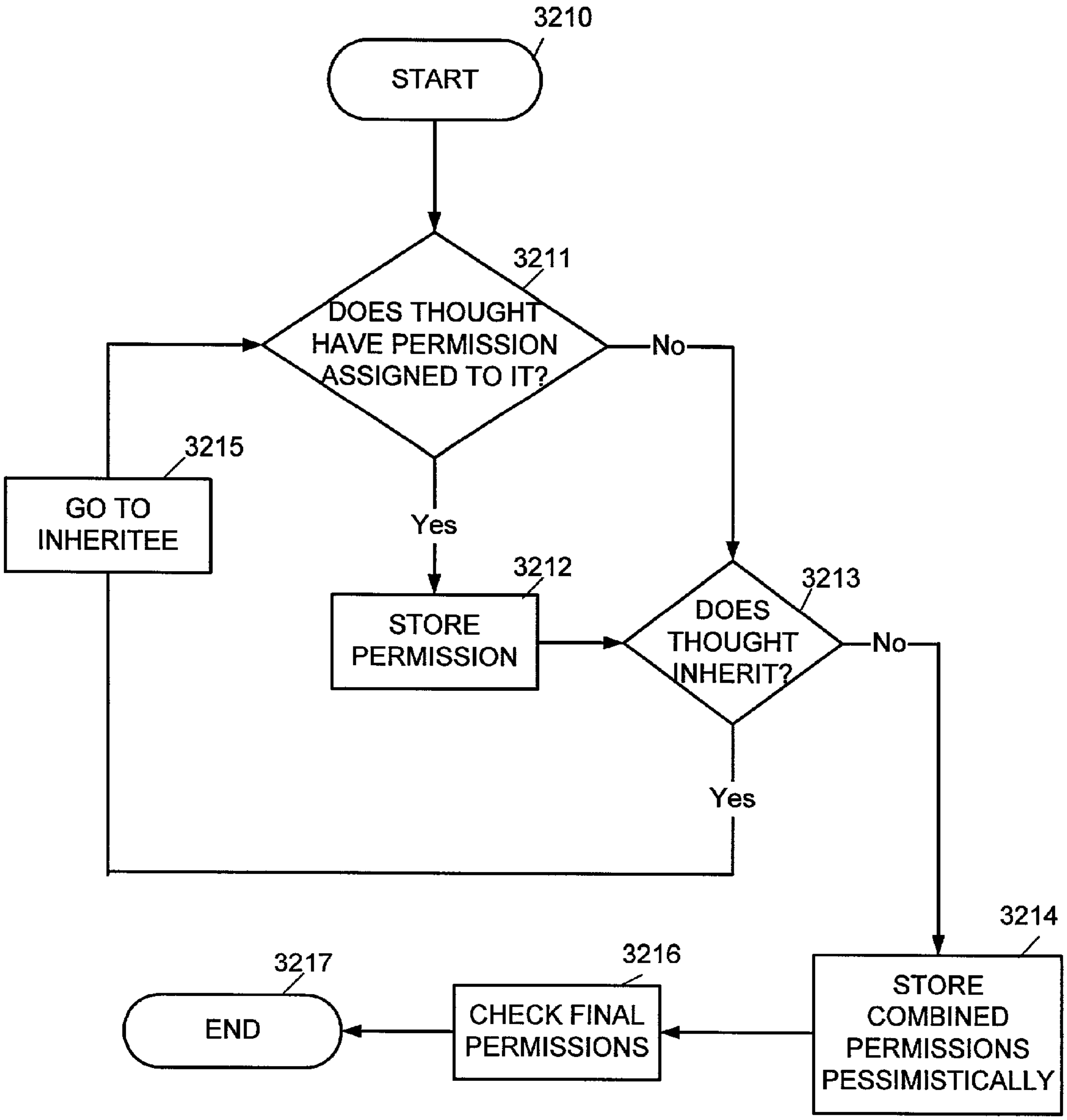

FIG. 42 shows a flow chart which the Brain system uses to check permissions of a thought in accordance with one embodiment of the present invention.

Figure 43:
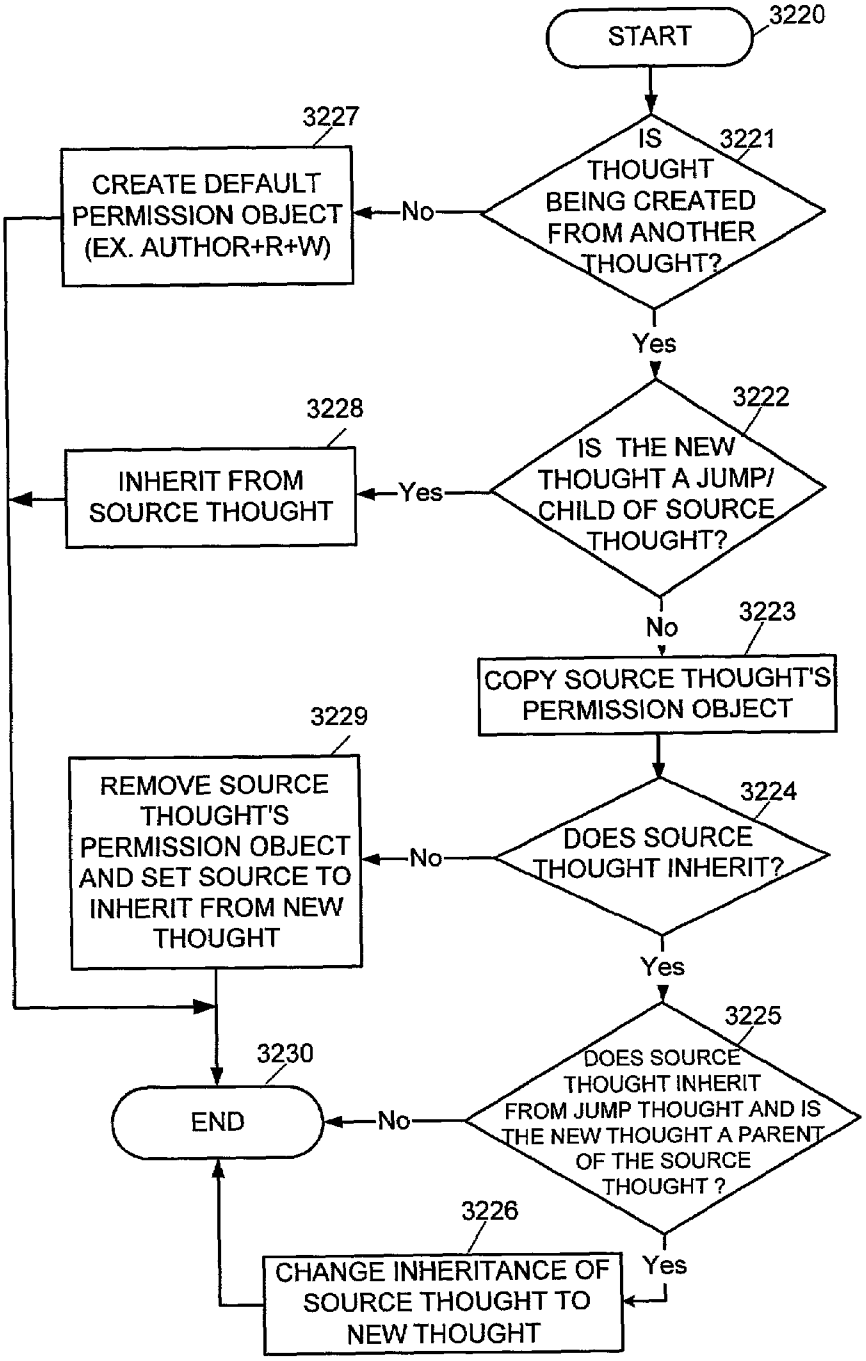

FIG. 43 shows a flow chart which the Brain system uses to determine whether a new thought should be assigned permissions or inherit permissions in accordance with one embodiment of the present invention.

Figure 44:
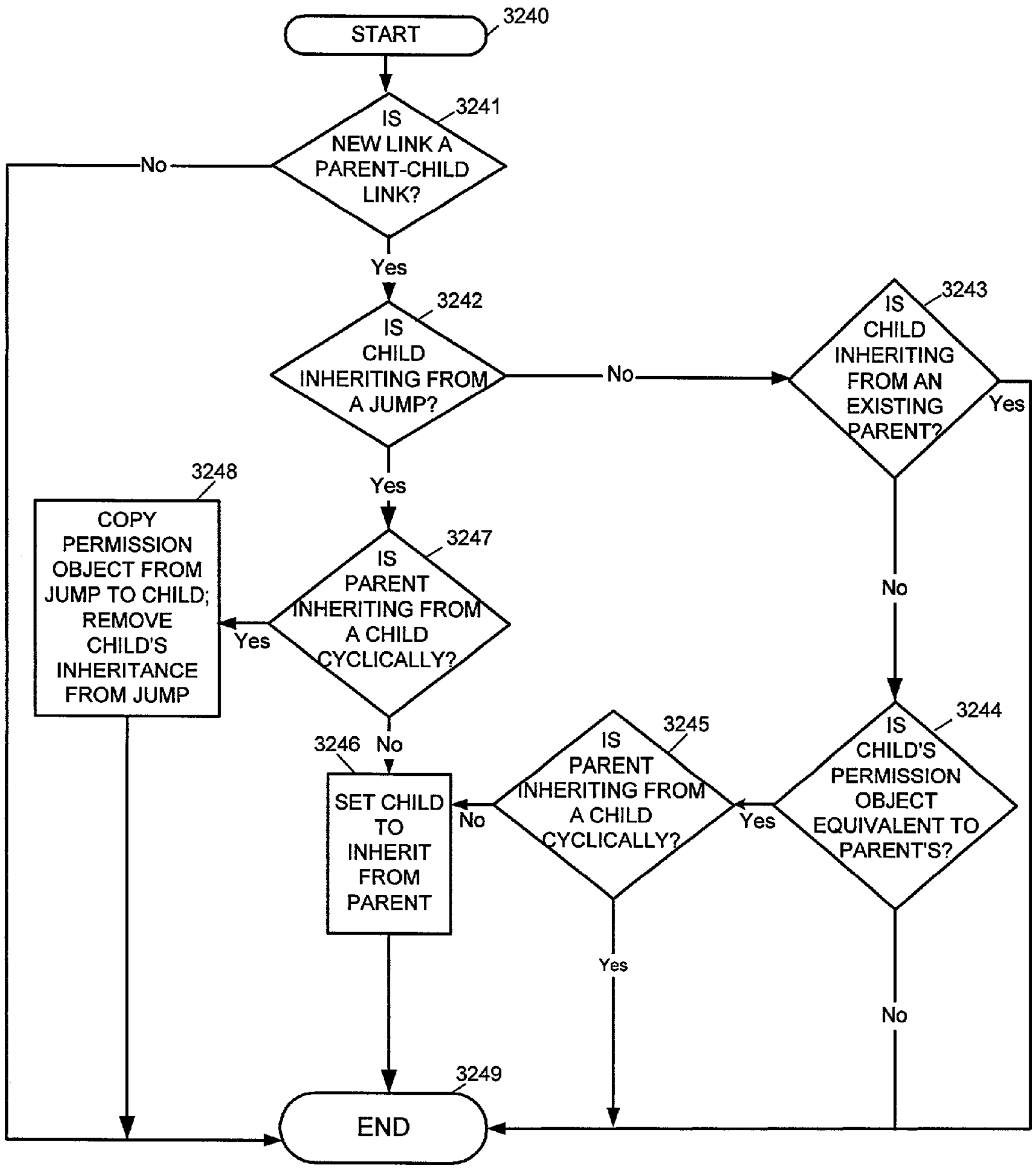

FIG. 44 shows a flow chart which the Brain system uses to determine permissions when links are created in accordance with one embodiment of the present invention.

Figure 45:
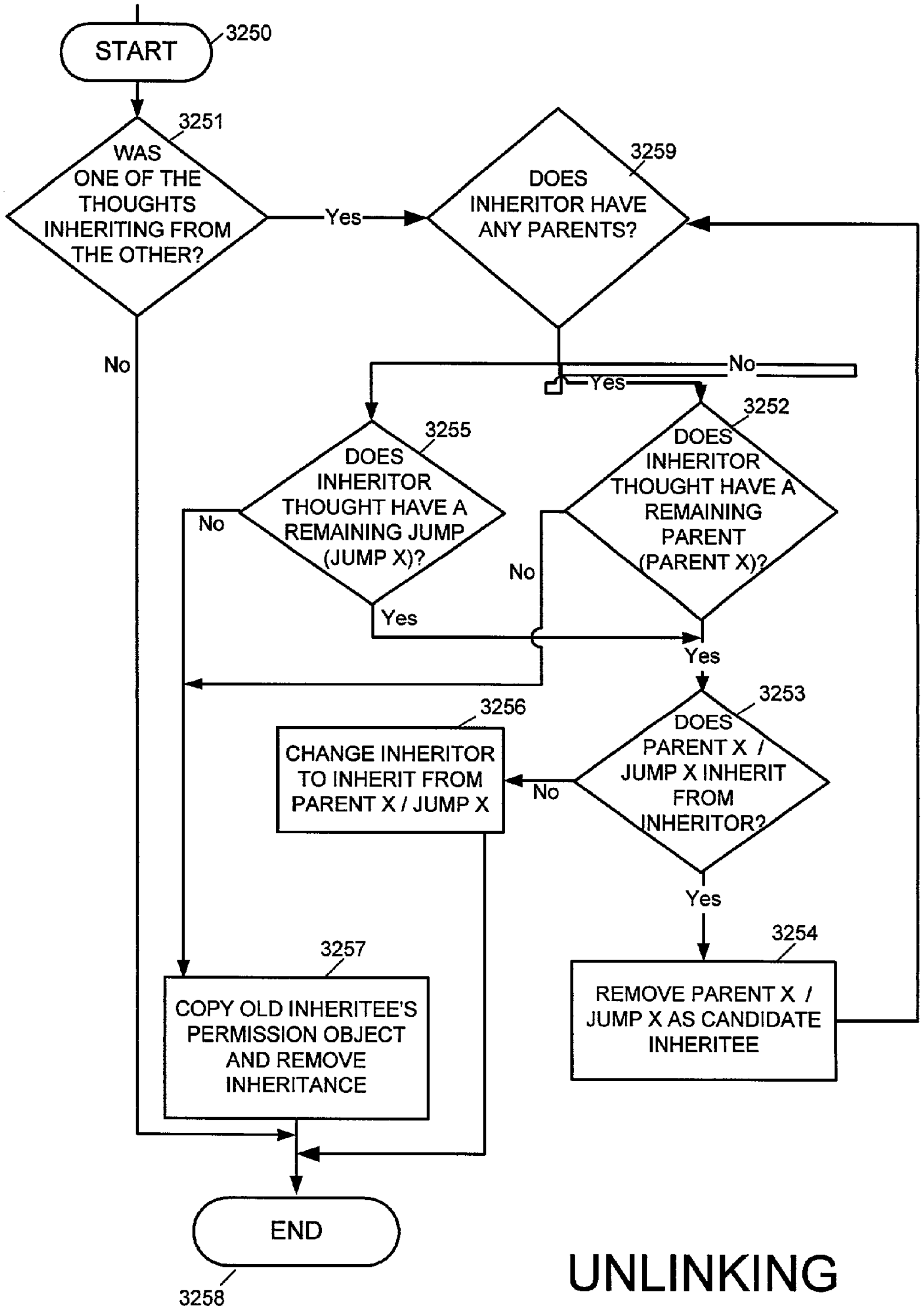

FIG. 45 shows a flow chart which the Brain system uses to determine permissions when links are deleted in accordance with one embodiment of the present invention.

Figure 46:
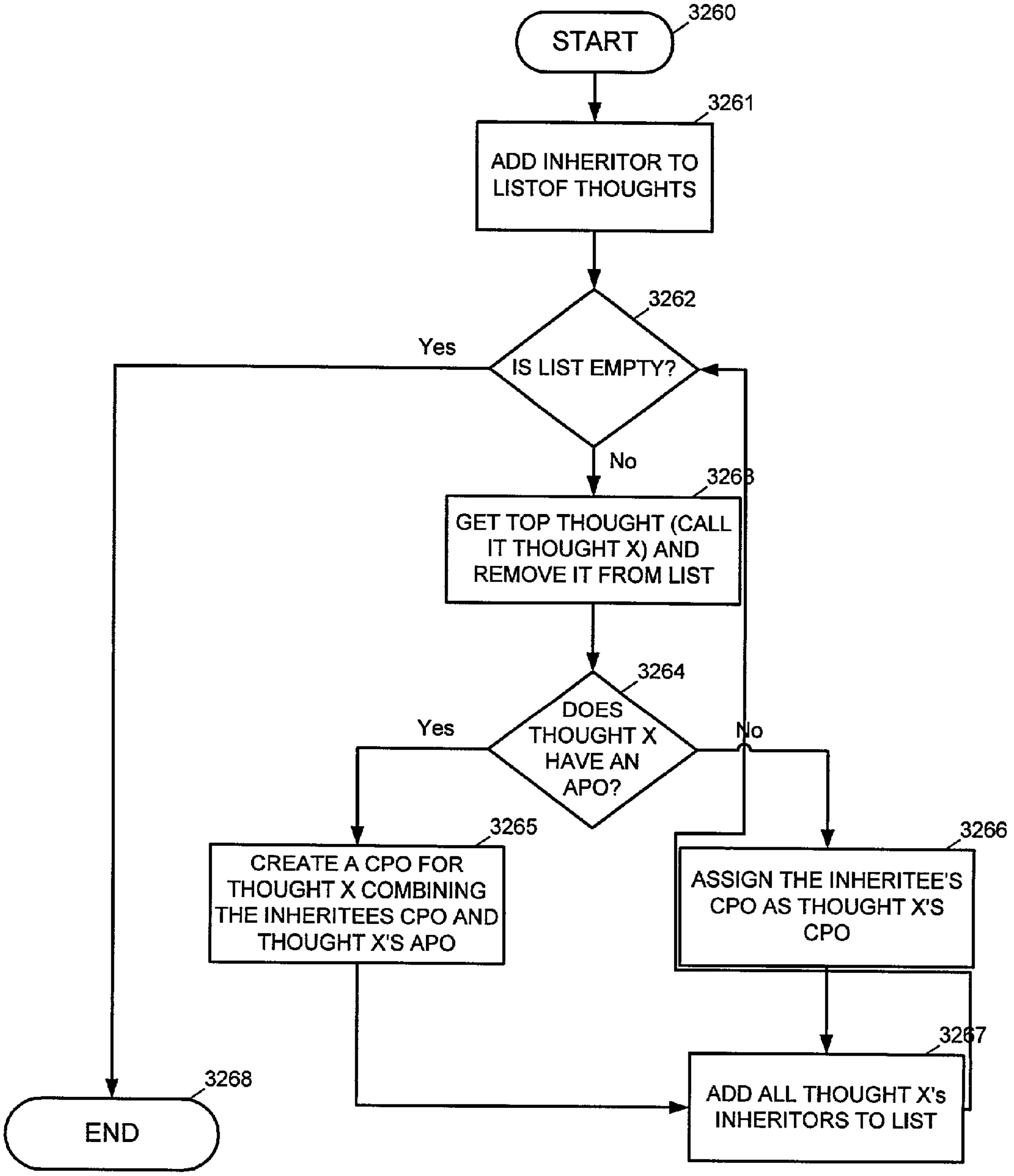

FIG. 46 shows a flow chart of how the Brain system optimizes permissions in the matrix in accordance with one embodiment of the present invention.

Figure 47A:
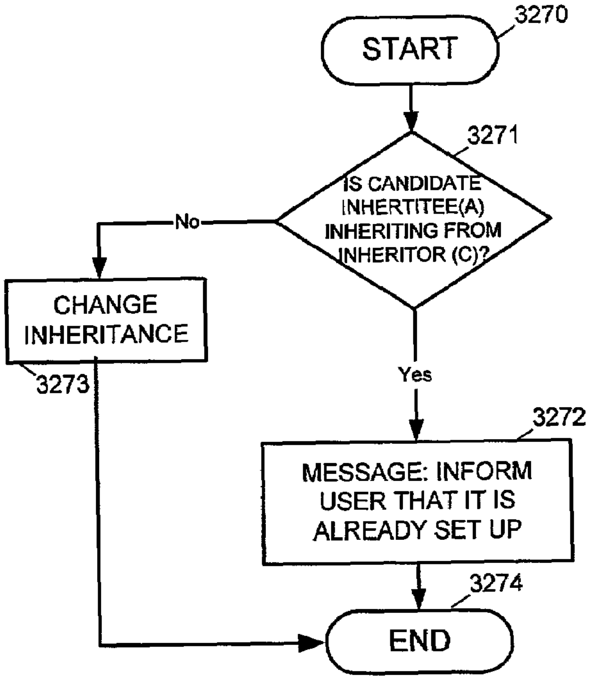
Figure 47B:
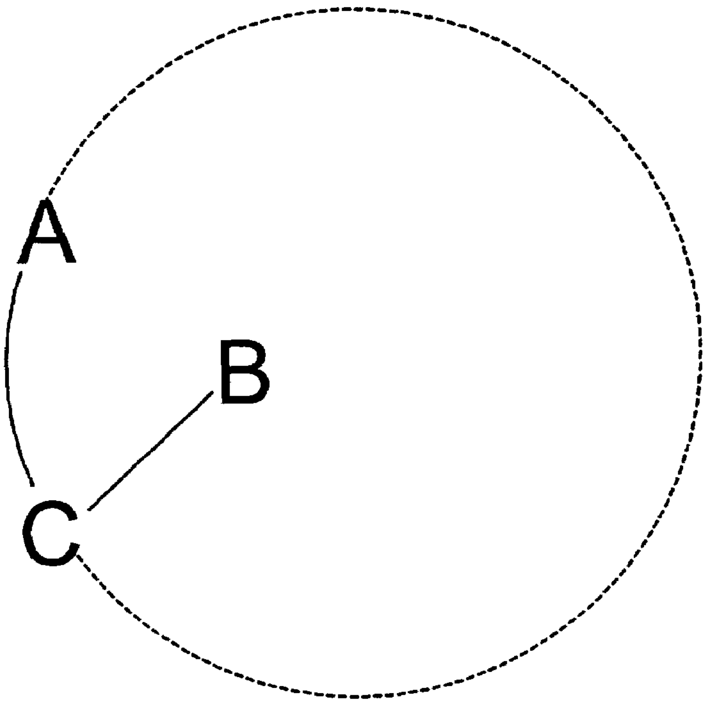

FIG. 47A shows a flow chart for determining how permissions are assigned and FIG. 47B shows a sample matrix used to illustrate the concepts in FIG. 47A in accordance with one embodiment of the present invention.

Figure 48A:
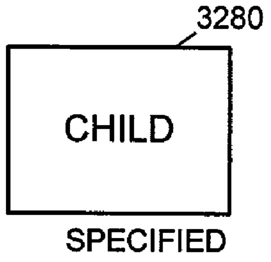
Figure 48B:
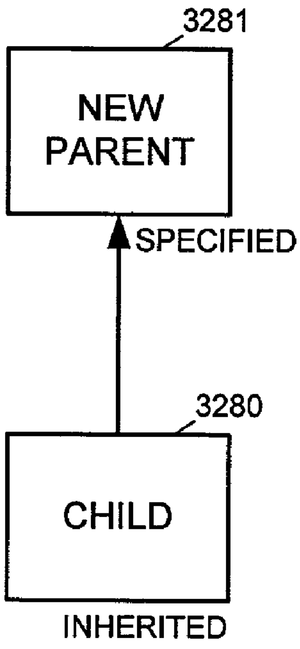

FIGS. 48A and 48B illustrate the application of an inheritance rule when users create a new parent thought for a child thought who has no parents or jumps in accordance with one embodiment of the present invention.

Figure 49A:
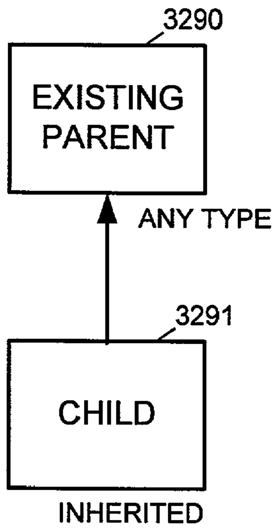
Figure 49B:
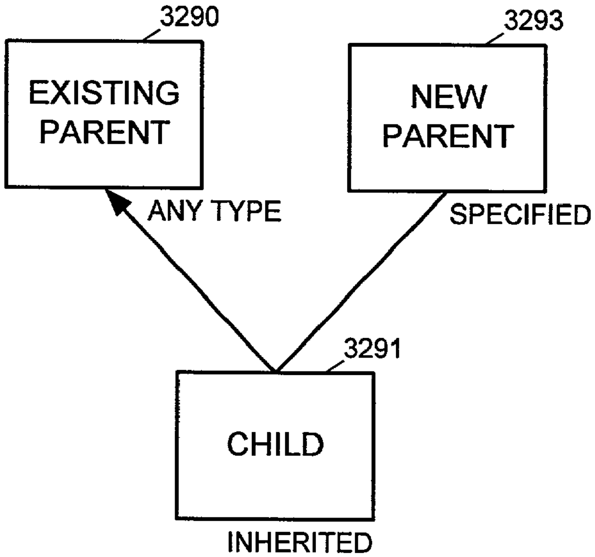

FIGS. 49A and 49B illustrate the application of an inheritance rule when users create a new parent thought for a child thought who has one or more parents and the child is inheriting from one of the existing parents in accordance with one embodiment of the present invention.

Figure 50A:
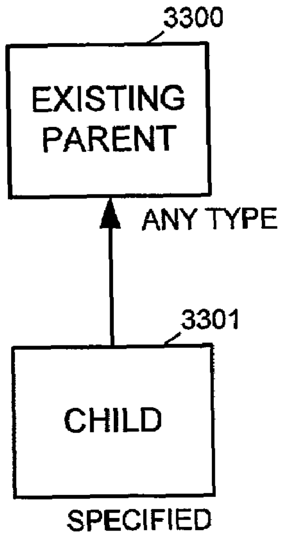
Figure 50B:
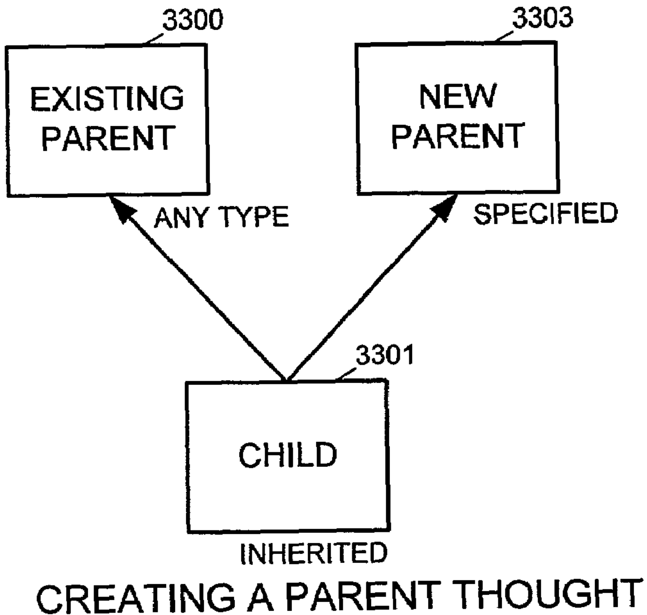

FIGS. 50A and 50B illustrate the application of an inheritance rule when users create a new parent thought for a child thought who has one or more parents and the child's permissions are specified in accordance with one embodiment of the present invention.

Figure 51A:
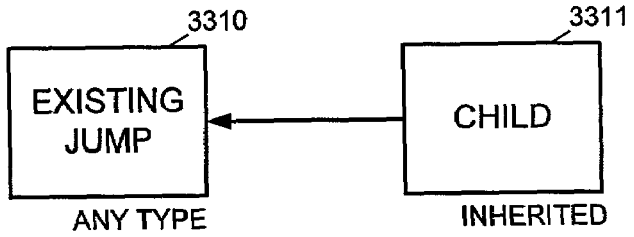
Figure 51B:
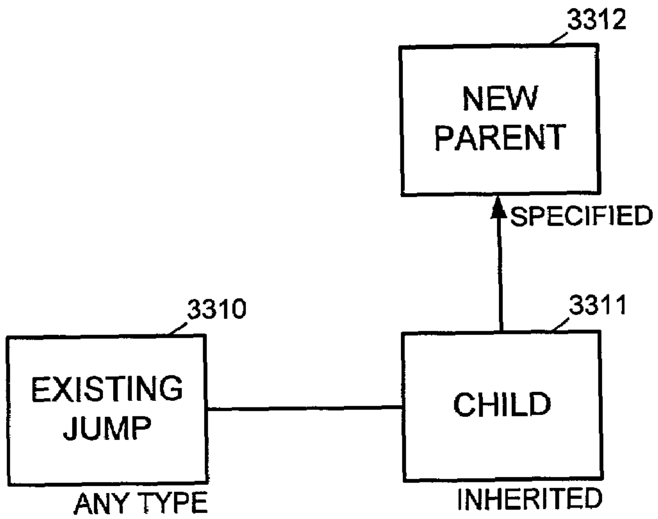

FIGS. 51A and 51B illustrate the application of an inheritance rule when users create a new parent thought for a child thought who has one or more jumps but no parent thoughts in accordance with one embodiment of the present invention.

Figure 52A:
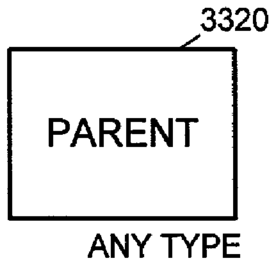
Figure 52B:
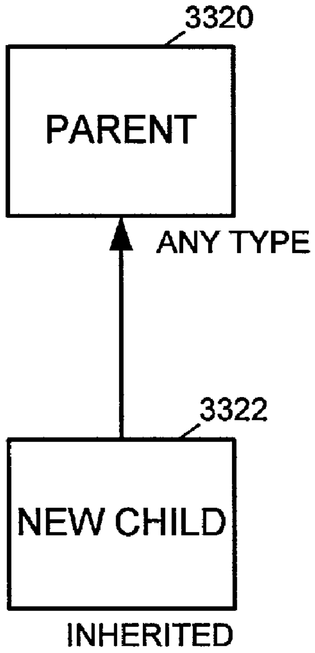

FIGS. 52A and 52B illustrate the application of an inheritance rule when users create a new child thought in accordance with one embodiment of the present invention.

Figure 53A:
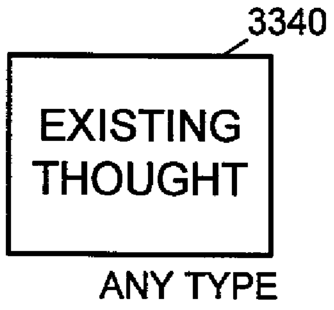
Figure 53B:
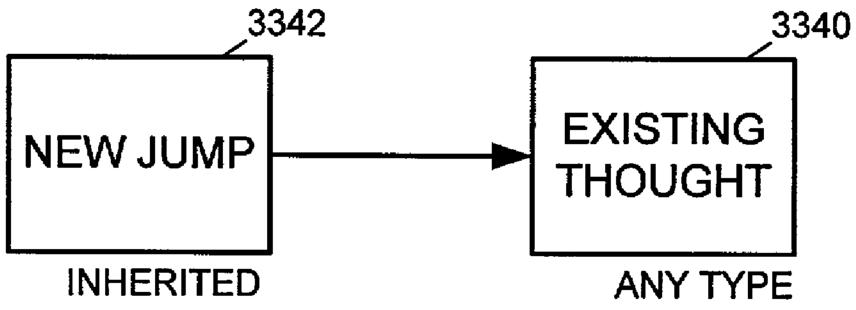

FIGS. 53A and 53B illustrate the application of an inheritance rule when users create a new jump thought in accordance with one embodiment of the present invention.

FIGS. 54A–54D illustrate the application of an inheritance rule when users create a new parent-child link where the child thought has zero or more jumps but no parents, and the permissions of the parent are equivalent to the permissions of the child, and inheriting permissions from the parent will not cause recursion, in accordance with one embodiment of the present invention.

FIGS. 55A–55F illustrate the application of an inheritance rule when users create a new parent-child link where the child thought has zero or more parents or jumps, and the permissions of the parent are not equivalent to the permissions of the child, in accordance with one embodiment of the present invention.

Figure 56A:
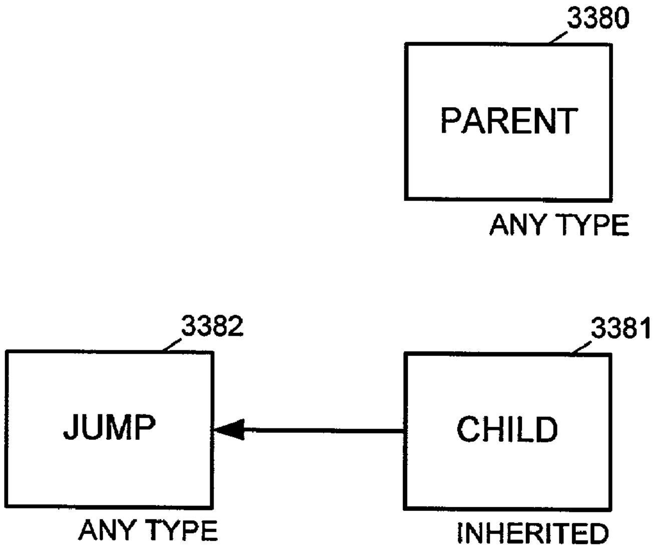
Figure 56B:
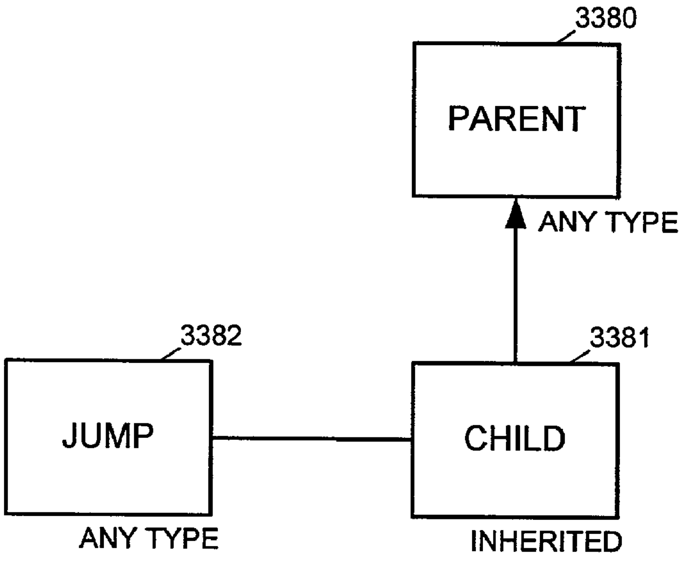

FIGS. 56A and 56B illustrate the application of an inheritance rule when users create a new parent-child link where the child thought has no parents, and is inheriting permissions from a jump, and inheriting permissions from the parent will not cause recursion, in accordance with one embodiment of the present invention.

Figure 57A:
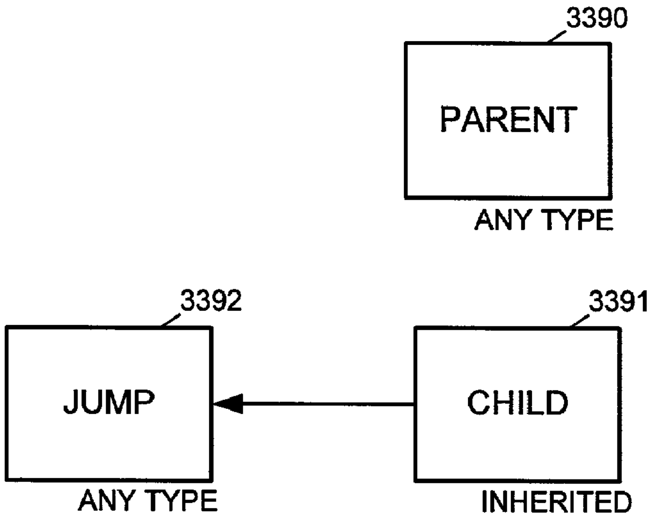
Figure 57B:
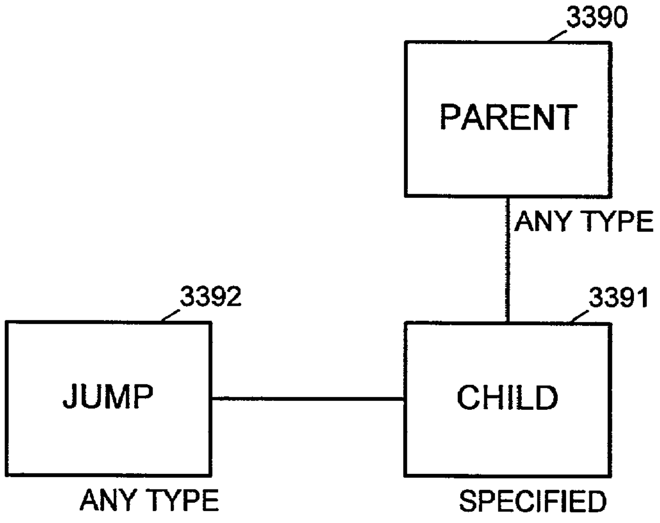

FIGS. 57A and 57B illustrate the application of an inheritance rule when users create a new parent-child link where the child thought has no parents and is inheriting from a jump, and inheriting permissions from a jump, and inheriting permissions from the parent will cause recursion, in accordance with one embodiment of the present invention.

Figure 58A:
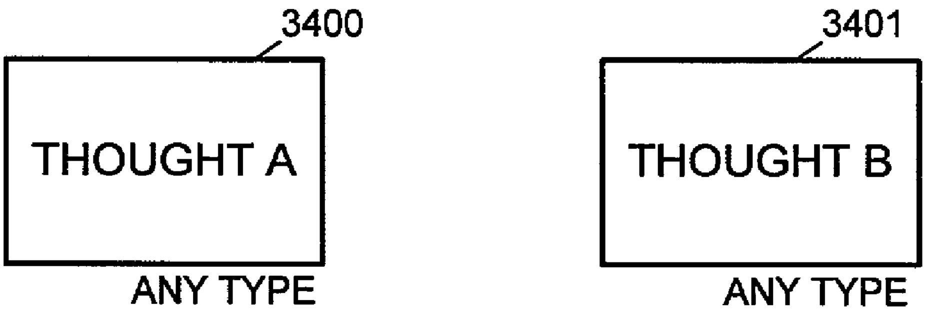
Figure 58B:
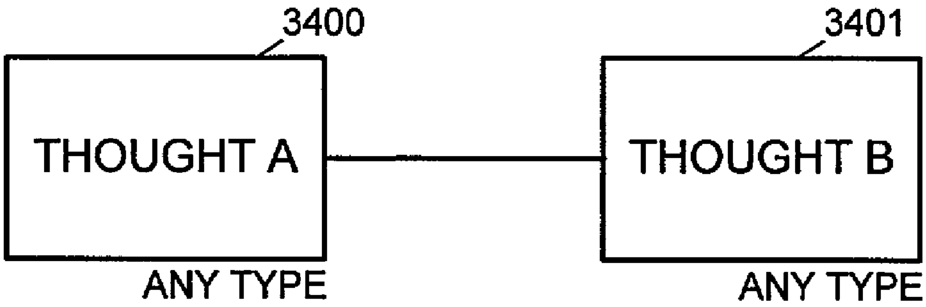

FIGS. 58A and 58B illustrate the application of an inheritance rule when users create a new jump link between two thoughts where each thought has zero or more parents and zero or more jumps, in accordance with one embodiment of the present invention.

Figure 59:
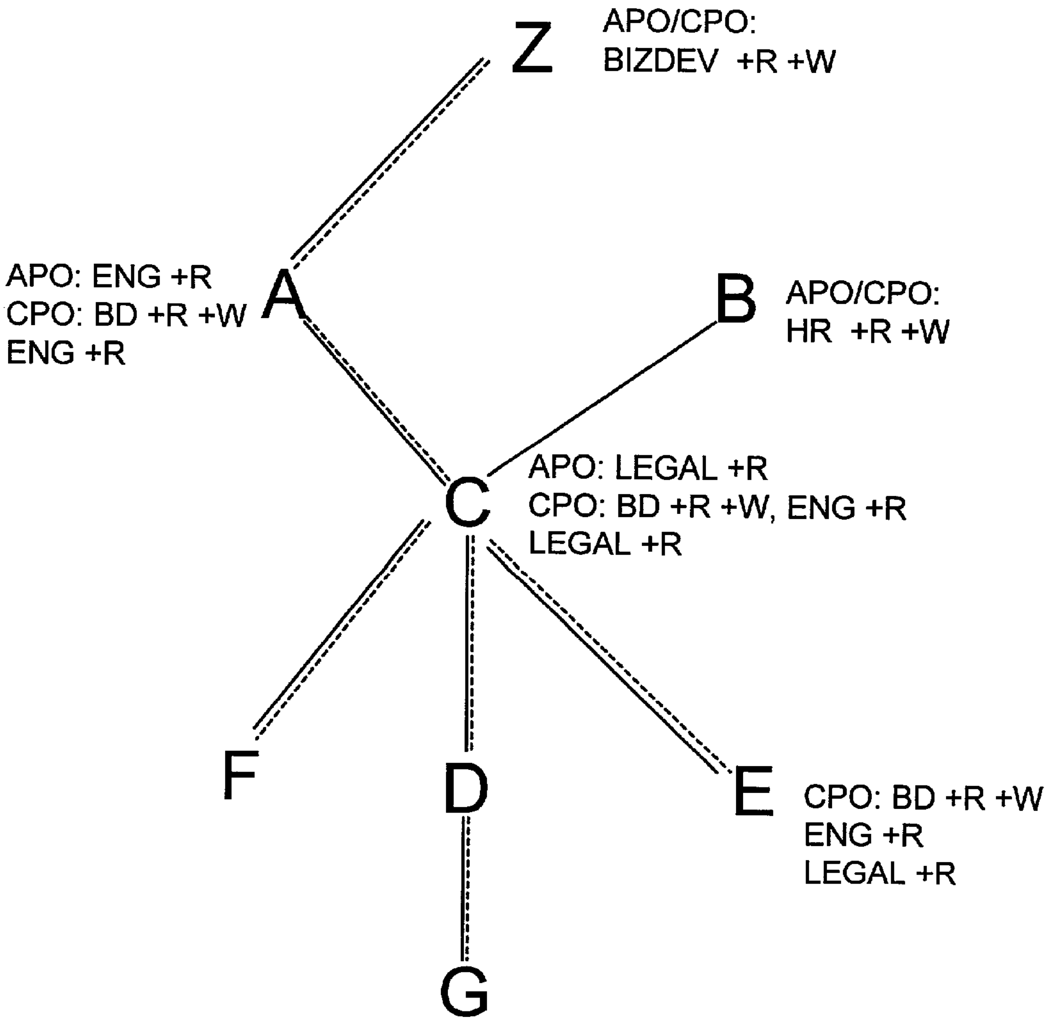

FIG. 59 shows a sample matrix to illustrate the concept of optimizing permissions by propagating combined permission objects in accordance with one embodiment of the present invention.

FIG. 60 shows a sample user interface in accordance with one embodiment of the present invention.

FIG. 61 shows a sample user interface where the user clicks on a drop-down menu choice of one of the thoughts in the matrix, in accordance with one embodiment of the present invention.

FIG. 62 shows a sample user interface where the user clicks on another drop-down menu choice of another thought in the matrix, in accordance with one embodiment of the present invention.

FIG. 63 illustrates the flow of communications required to modify information in a Brain that is shared via a fully-connected network, when there are no conflicting requests.

FIG. 64 illustrates the flow of communications required to modify information in a Brain that is shared via a fully-connected network, when conflicting requests are made.

FIG. 65 illustrates the flow of communications required to synchronize Brain data that have been modified offline.

Figure 66:
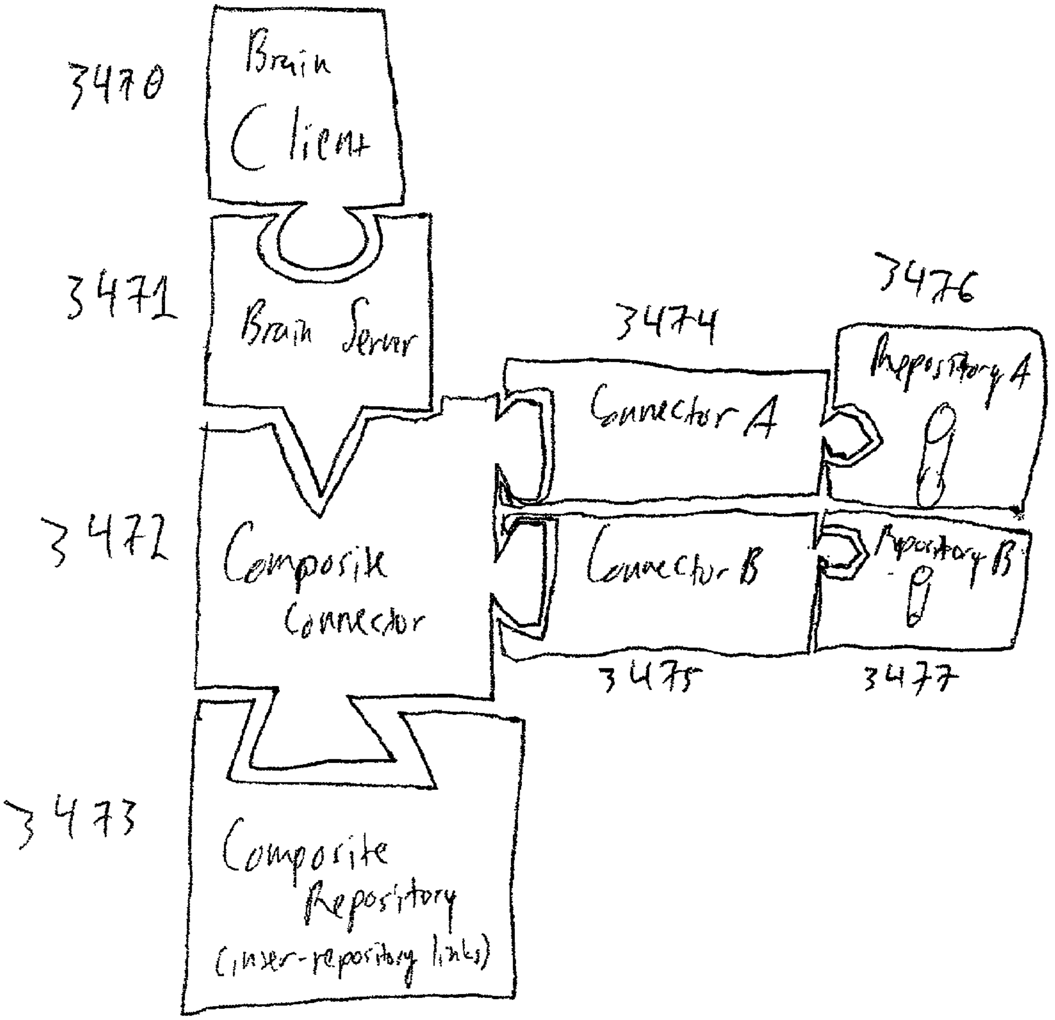

FIG. 66 illustrates the nodes of a system permitting interaction via a Brain Client with data retrieved from disparate data repositories that are not prepared for the Brain architecture.

Figure 67:
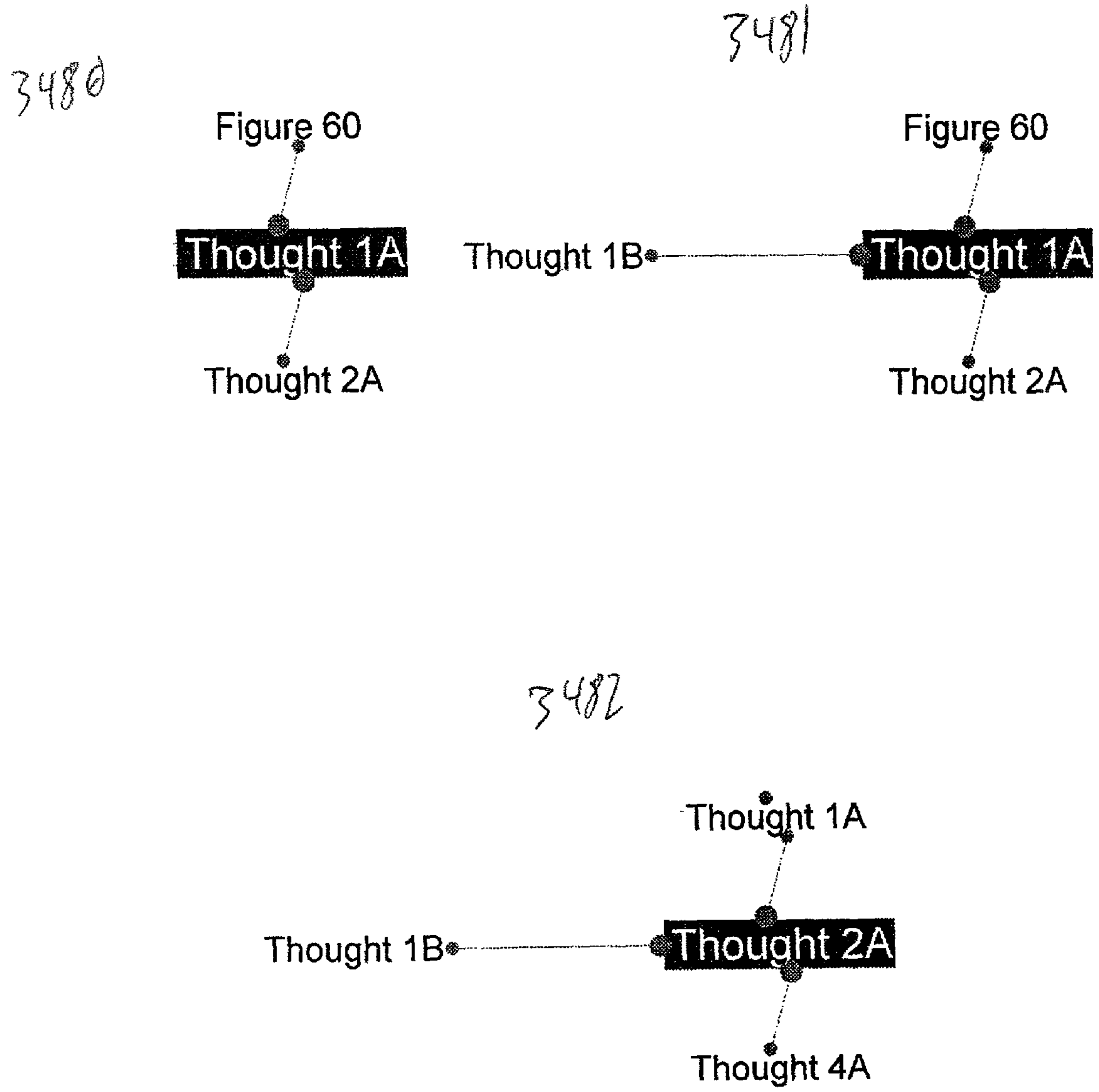

FIG. 67 shows the user interface of an original Plex, a Plex showing a new jump thought, and a Plex resulting from a user navigating to a different active thought.

FIG. 68 illustrates the flow of communications required to activate a thought in a composite repository system.

FIG. 69 illustrates the flow of communications required to make a link in a composite repository system.

FIG. 70 illustrates the flow of communications required to create a new thought in a composite repository system.

Figure 71:
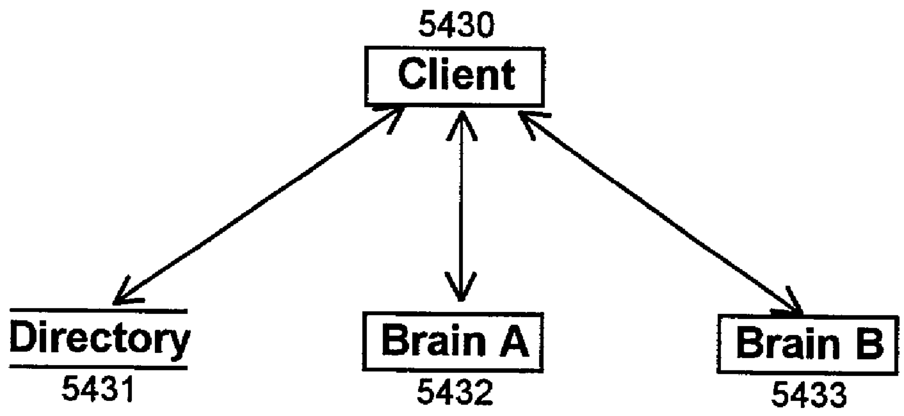

FIG. 71 illustrates the notes of a system permitting interaction via a Brain client directly with disparate Brain-enabled data repositories.

FIG. 72 illustrates the flow of communications required to activate a thought in a Brain-to-Brain repository system.

FIG. 73 illustrates the flow of communications required to make a link in a Brain-to-Brain repository system.

FIG. 74 illustrates the flow of communications required to create a new thought in a Brain-to-Brain repository system.

FIG. 75 illustrates the flow of communications required to search for other Brains, or for thoughts within other Brains, in a Brain-to-Brain repository system.

FIG. 76 illustrates an alternative file structure for a thought containing multiple files.

FIG. 77 shows a plex display that hilights distant thoughts upon mouse-over.

VI. NOTATION AND NOMENCLATURE

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

One aspect of the present invention relates to the organization, storage, and retrieval of information with highly-flexible associative data structures, and it is therefore convenient to explain the disclosed processes by analogy to processes commonly associated with human cognition. For example, as explained above, items of information that are processed in accordance with the present invention are referred to by the label "thoughts," and designations such as "forgetting" are used metaphorically to refer to functions or relations relating to the associative data structure of the present invention. These analogies are employed merely to facilitate explanation of the present disclosure. Based on everyday assumptions regarding the way humans think, the distinctions between the presently disclosed computer-implemented invention and actual human cognitive operations must not be overlooked. The interrelations among these thoughts are sometimes similarly defined by reference to genealogically-derived terms such as "parent" and "child" thoughts. In the spirit of the present invention, the assignment of these terms is based largely on human intuition, as they reflect relations between thoughts that may easily be grasped by users not proficient with the use of non-traditional information storage schemes. The terms are merely labels that serve to enhance the clarity of the disclosure. They should not be construed as restricting the flexibility of the described information storage structure. Finally, the term "the Brain" is used in the following disclosure as a label to refer to the methods or apparatus of the present invention.

"The Brain" is a trademark of the assignee of this patent application.

VII. DETAILED DESCRIPTION OF THE INVENTION

A. General System Architecture

Figure 1:
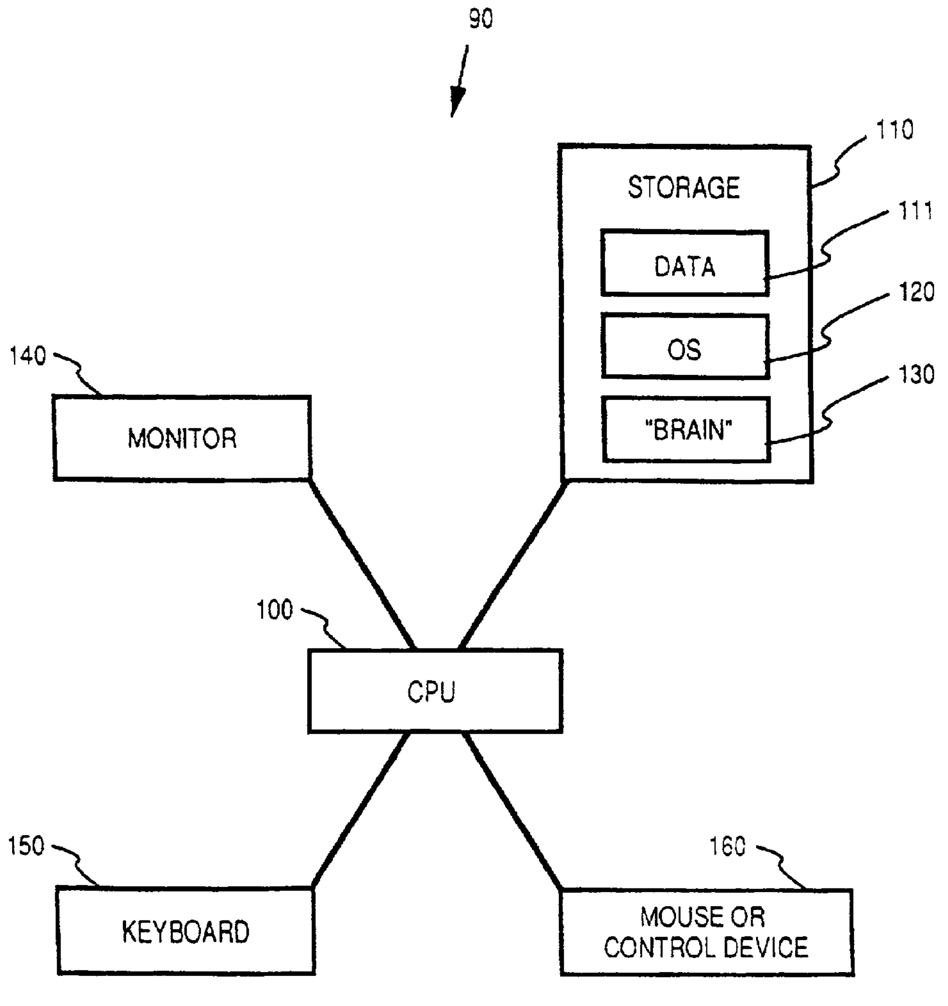
FIG. 1 illustrates the basic architecture of a computer system for use in implementing one embodiment of the present invention.

FIG. 1 depicts the general architecture of a digital computer system 90 for practicing the present invention. Processor 100 is a standard digital computer microprocessor, such as a CPU of the Intel x86 series. Processor 100 runs system software 120 (such as Microsoft Windows®, Mac 0S® or another graphical operating system for personal computers), which is stored on storage unit 110, e.g., a standard internal fixed disk drive. "Brain" software 130, also stored on storage unit 110, includes computer program code for performing the tasks and steps described below, including the digital representation of matrices, the display of graphical representations of such matrices, and the processing of such matrices in accordance with the principles of the present invention. Display output, including the visual graphical user interface ("GUI") discussed below, is transmitted from processor 100 to an output device such as a video monitor 140 for display to users. Users utilize input devices such as standard personal computer keyboard 150, cursor control device 160 (e.g., a mouse or trackball), touch-screen sensors on the monitor display, virtual reality gloves, voice input, or similar techniques to enter the GUI input commands discussed below, which are then transmitted to processor 100. Software for implementing the Brain may be stored in a variety of locations and in a variety of mediums, including without limitation, RAM, data storage 111, a network server, a fixed or portable hard disk drive, an optical disk, or a floppy disk.

B. Internal Implementation of a Thought

Figure 2:
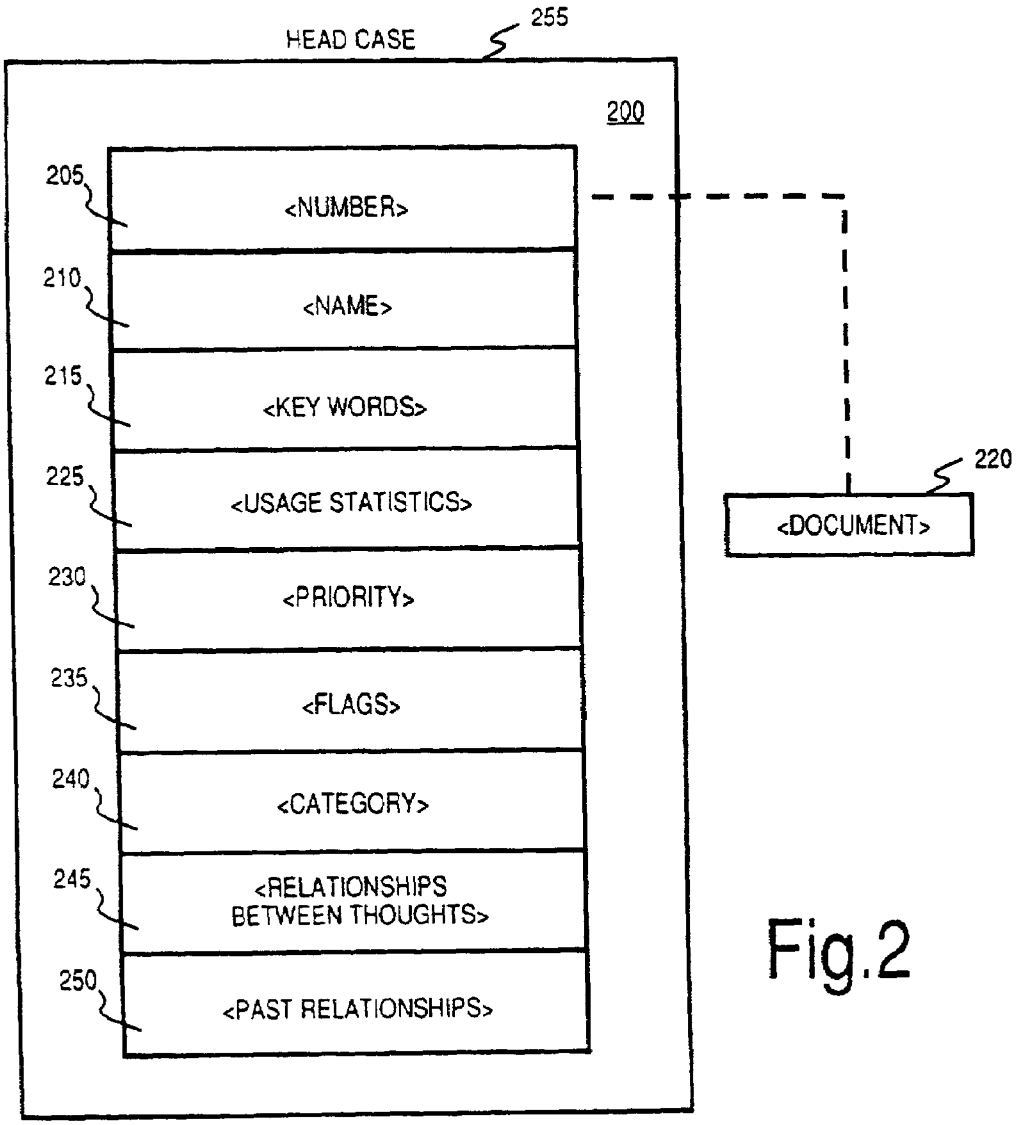
FIG. 2 illustrates one embodiment of the data architecture for thoughts, in accordance with the present invention.

In one embodiment of the present invention as illustrated in FIG. 2, a plurality of interrelated thoughts collectively make up a "thought." Each such thought (i.e., a piece of information, such as a collection of spreadsheet data) is represented internally as comprising various elements, including properties and relationships. Properties can include, as in the example of thought 200: number 205, name 210, key words 215, document 220, usage statistics 225, priority 230, flags 235, category 240. Relationships can include currently linked thoughts 245 and past linked thoughts 250. Except for document 220, all of the data for all thoughts is stored in a set of files 255 (which we designate "the headcase" in one embodiment), which is invisible to the user and is transparently loaded to RAM and saved to data storage 111 as the user works.

Number 205. Each thought has a unique number which, in some embodiments of the present invention, is invisible to the user but is used internally, by other thoughts or lists, to reference the thought. References to each thought thus occupy only a small amount of internal storage, and changes to a thought's user-specified name do not affect internal references.

Name 210. The "name" of a thought is intended to be a brief, textual description of that thought, written by the user. One purpose of a name is to enable users to identify the associated thought in a convenient manner.

Key Words 215. The "key words" of a thought are a list of descriptive terms inputted by the user, which list may be interactively searched using the search methods described in more detail below (see "Searching").

Document 220. Each thought includes an associated "document," which stores all of the specific content for that thought, such as word processing data or spreadsheet data. Each such document is stored internally in its own file in data storage 111 or separately stored in mass storage devices accessible by the computer system.

In some embodiments of the invention, the document name is based on the associated thought's number. In other embodiments, the document name may be based on the name of the associated thought. More particularly, the document name can be the same as the thought name, unless a preexisting file with the identical name already exists. If such a file already exists, the method of the present invention can name the location by appending a number to the name. For some embodiments of the Brain used with operating systems that use filename extensions, the extension for the location may be determined by the thought type in accordance with common practices in the art, for example, ".tht" for thought editor documents, and ".htm" for web pages.

When the name of a thought is changed, the location of the document it references is not changed. This allows the user to use the location to share the file with users who are not using the method of the present invention and therefore must access these files through traditional operating system methods. Of course, a user may edit the location of a document by the same methods used to edit all other thought properties. If the user makes the location point to a nonexistent or unsupported file, the Brain will be unable to edit the document. The referenced file may be either locally or remotely located.

Referenced files may also be used as sources for Microsoft Windows® drag and drop operations known in the art and extensively documented in Windows® Software Development Kits. These operations are capable of exchanging file locations between programs for the purpose of making references, embedding, copying, and pasting. By implementing these operations into the Brain, a user can use the Brain as a drop source. A file stored in the Brain may thereby easily be copied to a Windows Explorer® folder or any other application supporting file drag and drop.

As discussed below, the user need not consciously manage these files. Instead, accessing a thought automatically provides the user with a seamless, transparent way of accessing the document contents, calendar information, notes and other information associated with thought, along with the appropriate application program(s) or utility(ies) for processing those contents.

Usage Statistics 225. "Usage statistics" may be generated and stored for each thought as the user works on that thought, as discussed in greater detail below in the "Additional Features" section.

Priority 230. A priority number set by the user indicates the relative importance of a particular thought. The priority is normally manually set by the user, but can be calculated based upon the usage statistics and the relationships at the user's request. The priority can then be used to filter thoughts when searching or creating thought lists.

Flags 235. Flags provide a mechanism for designating the state of each thought. In one embodiment of the invention, each flag can be in one of three states: on, off, or default. When a flag is in default, the thought value is determined by the category of thought (see Category, below). Flags can be user-defined, or may be automatically provided by the system. One example of a system flag is one that states whether a thought is part of long term memory.

Category 240. A thought's "category" is a number which designates a thought to be of a specific category. Thought categories are defined and named by the user. Each category specifies that thoughts of that category will have certain attributes or "fields," as well as certain default flag values (see the discussion of "flags" above). An example of a category might be "Person," in which case an example field might be "City of Residence." The use of fields to perform indexed searching is discussed in further detail below, in the "Processing Thoughts" section. Category definitions may be stored separately, as templates.

Relationships Between Thoughts 245. In one embodiment of the invention, at least three types of relationships are possible among thoughts: child, parent, and jump. Each thought includes a separate list for each type of relationship. The utility of enabling at least three types of links among thoughts is discussed more fully below. Each such relationship list stores a list of the other thoughts (identified by number) that are related to the instant thought by the instant type of relationship. The relationship lists are used to generate and navigate graphical representations of the matrix, as described in detail below, and are otherwise invisible to the user.

Past Relationships 250. In some embodiments of the invention, there is another set of at least three lists: for child, parent, and jump relationships, respectively, which archive information about those relationships which have been severed or "forgotten" but which may be reattached or remembered upon request by the user. Essentially, this provides a long term memory facility that allows users to recall previous relationships when desired, without cluttering the current display with non-current data, as discussed below.

C. Graphically Representing and Navigating a Matrix

Figure 3:
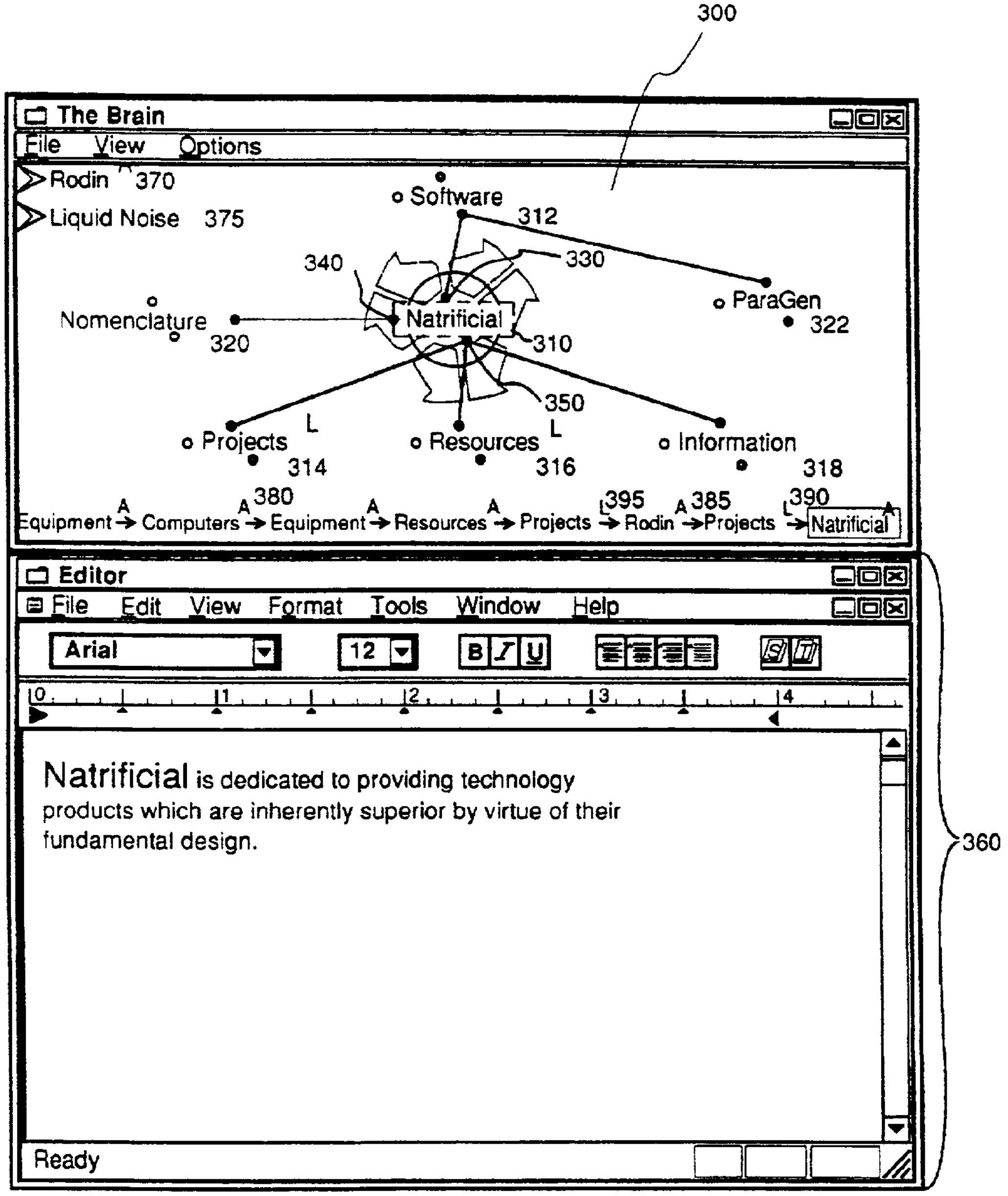
FIG. 3 illustrates a graphical user interface screen display, in accordance with an aspect of the present invention.

The present invention simultaneously enhances navigational efficiency 5 through its strategic graphical arrangement of display icons representing thoughts. The placement of the thoughts reflects second-level relations that may not be as easily communicated by techniques employing arbitrary thought placement. FIG. 3 illustrates a typical, graphical representation ("plex 300") of a matrix of related thoughts which will be displayed on the monitor 140, in accordance with one embodiment of the present invention. FIG. 21 illustrates an example of an on-screen display of an alternative embodiment of the present invention, in which the plex is displayed in the upper-right-hand section of the screen, the thought document is on the left-hand portion of the screen, and properties, list manager, and notes windows are on the lower right section of the screen.

Thought Types and Interrelation. In the example of FIG. 3, central thought 310 labeled "Natrificial" is displayed in the center of the plex, preferably surrounded by a circle, a dashed rectangle, and a rotating or blinking graphic that visually draws attention to the central thought. Thoughts that are directly related to the central thought 310 are represented in the plex 300 by display icons connected by lines to the central thought. In one embodiment of the present invention, multiple categories or types of thought relationships can be specified, in the interests of providing users maximum organizational flexibility and clarity. Specifically, the present invention allows a plurality of parent thoughts, a plurality of child thoughts, a plurality of sibling thoughts, and a plurality of jump thoughts.

Sibling thoughts (such as the thought "ParaGen" 322), are child thoughts of any and all parent thoughts (such as the thought "Software" 312) of the current central thought ("Natrificial" 310). For example, in the embodiment illustrated in FIG. 3, above the central thought 310 are related parent thoughts. In this plex there is only one, "Software" 312. Below the central thought are child thoughts. In this plex there are three: "Projects" 314, "Resources" 316, and "Information" 318. To the left of the central thought are jump thoughts; in this plex there is only one: "Nomenclature" 320. Finally, to the right of the central thought are sibling thoughts which share a parent with the central thought. In this plex there is only one—"ParaGen" 322. The underlying significance and semantics of these or other categories of thought relationships is entirely unique to the individual practitioner and user. In one embodiment, parent thoughts are displayed in three columns extending upward from the central thought, jump thoughts are displayed in a single column extending upward from the central thought and to the left of the parents, and children are displayed in four columns beneath the central thought and extending downward.

The display of sibling thoughts is not required for navigation through a plex. For this reason, some embodiments of the present invention allow the user to elect in the preferences not to display siblings. Such an election may conserve display space, but will do so at the cost of displaying fewer available thoughts.

One embodiment of the invention is configurable in the display preference settings to display other more distantly related thoughts (collectively "distant thoughts"), including grandparents, grandchildren, and partner thoughts. Grandparent thoughts are the parents of the parents, and may be displayed above the parents in two columns extending upward. Grandchildren are the children of the children, and are displayed below the children in four columns extending downward. Partners are the parents of the children, and may be displayed to the left of the active thought and below the jumps. If there are many partners or many jumps, the jumps may be shifted to accommodate the partners. Graphical representations of distant thoughts may be smaller than those for thoughts more directly related to the central thought, and may not contain gates from which relationships may be originated; these distant thoughts can be highlighted as the selection cursor passes over them. One method for graphically representing a plex having distant thoughts is outlined in FIG. 23. As this figure illustrates, this process includes generating a list of thoughts to be drawn and their respective screen locations, drawing connecting lines between these thoughts, and then drawing the thoughts themselves. FIG. 25 is an illustrative screen display having distant thoughts 2500A–N, as described above.

Parent, child and jump thoughts are all equally related insofar as each is 5 directly linked to that central thought. The jump thought is unique in that no thought related to a jump thought is displayed within the plex, unless that thought is itself a parent, child, or sibling of the central thought. Sibling thoughts are secondary relations, connected to the central thought only indirectly through parent thoughts and children thoughts. The distinctions amongst the types of thought relationships can be symbolized within a single plex by displaying lines connecting the thoughts. Those distinctions achieve added significance in the plexes resulting from a user navigating the matrix, activating a different thought as the new central thought. Preserving the distinctions amongst types of thought relationships permits a data management structure which at once lends itself to easy, logical navigation-like hierarchical structures and yet enjoys the dimensionless and unlimited flexibility of a totally associative structure.

The differing relations among thoughts are reflected in the following general rules, which define the collection of thoughts graphically represented in a plex as well as the nature of this representation in some embodiments of the present invention.

Depending upon the defined interrelations between the old central thought and the newly selected central thought, the other thoughts in the old plex may be included or excluded from the new plex. The old central thought, however, will always remain in the new plex. Parent thoughts are related to all of their child thoughts, and child thoughts are related to one another. Therefore, when a child thought is selected, all the other children will remain in the plex as siblings. Likewise, when a parent is selected, the other children of the parent (i.e., some or all of the siblings of the current central thought) will remain in the plex. Furthermore, sibling thoughts are related to each other and their parents, so that when a sibling is selected, all of its siblings (some or all of the siblings of the original central thought) will remain in the plex as siblings.

Jump thought relationships link the jump thought with only the central thought and no other thoughts; therefore, when a jump thought is selected, typically only it and the current central thought will remain in the plex. Non-contextual links such as those inserted into hypertext are effectively the same as jump links, as they do not help to define relationships beyond those that are directly linked. The availability of such non-contextual links within, for example, hypertext documents, expands the breadth and enhances the flexibility of the presently disclosed invention and therefore increases its capacity to provide an optimally intuitive and adjustable structure for organizing information.

Graphical Representation of Matrix. In one embodiment of the invention, each thought in a plex has three circles near it. These circles are thought "gates" (e.g., gates 330, 340, and 350 in FIG. 3), and are used to show and create the relationships between thoughts. The location of each gate tells what kind of relationship it represents. Thus, gate 330 above thought 310 is for relationships to parent thoughts; gate 350 below thought 310 is for relationships to child thoughts; and gate 340 on the side of thought 310 is for relationships to jump thoughts. Note that each thought in the display of FIG. 3 is connected to central thought 310 by the appropriate gate. Each gate circle being used (i.e., a gate through which a thought is connected) may be filled (e.g., gate 330); if no thought is connected through a gate, that gate's circle is empty (e.g., gate 340). In addition, gates may be color-coded according to the currently displayed thoughts. For example, in one embodiment, if a gate is red (e.g., gate 350), this indicates that all the thoughts to which it connects are currently displayed. If a gate is green (e.g., gate 365), this indicates that there are other thoughts to which it is connected and which are not displayed within the plex at this time.

Display of the plex may be configured based upon the current thought. More specifically, the display positions of thoughts are determined by the way they are related and the number of thoughts that are related in that way. Thus, in one embodiment, the central thought (e.g., 310) is always drawn in the center. Above the central thought are the parent thoughts (e.g., 312), which are drawn in up to two columns extending upward. Below the central thought are the child thoughts (e.g., 314, 316, 318), which are drawn in up to four columns extending downward. The jump thoughts appear to the left in a single column which extends up and down until it hits the child thoughts, at which point it begins to extend only upward. Sibling thoughts appear to the right of the central thought in a single column which extends up and down until it hits the child thoughts, at which point it begins to extend only upward. In practice, the actual drawing sequence on screen may be performed as follows. First the background is cleared. The scaling circle and the lines that connect the thoughts are then drawn. Next, the lines are drawn between the locations of the gates representing the appropriate relationships. Finally, the actual thought names and the gates are drawn.

Occasionally a central thought will be linked to so many thoughts that it will be impossible to simultaneously display all thoughts in a plex. In one embodiment of the present invention, the Brain will display arrows above and/or below thoughts with particular relations to thoughts that could not be accommodated on the display. By clicking on or dragging these arrows, the user may scroll through the entire list of thoughts. When second-level thoughts are displayed, only those which are linked to the thoughts displayed will be displayed.

Figure 4:
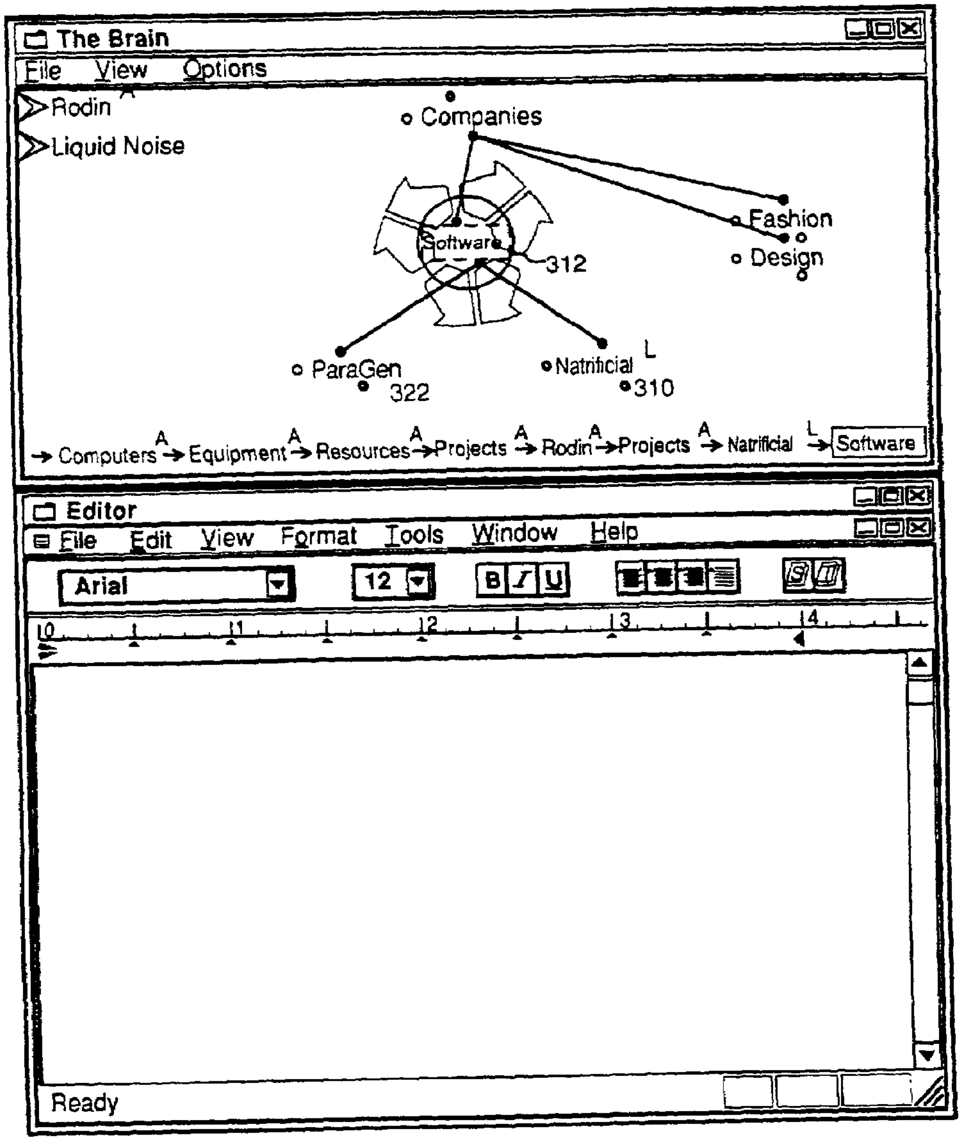
FIG. 4 illustrates the graphical user interface of FIG. 3, reflecting the selection of a new current thought by a user.

Matrix Navigation. Navigation and movement through the matrix is accomplished by selecting the thought to be moved to, using control device 160 or keyboard 150. In one embodiment, navigation is accomplished by selecting a thought indicium with a cursor control device such as a mouse. When a thought in the plex is selected to become the new central thought, the plex is rearranged according to the links associated with the newly selected central thought. In some embodiments, this process may be graphically reflected with animation showing the movement of the thoughts. For example, FIG. 4 shows the plex of FIG. 3, but rearranged after a user has interactively selected Software 312 as the new central thought, in place of Natrificial 310. Window 360 is used to display and edit the document for the current thought, as discussed below in the section entitled "Processing Thoughts."

One method of navigation using a keyboard utilizes the arrow keys in connection with other keys. In one particular embodiment, thoughts may be activated using a combination of the [Alt] key and the arrow keys. Upon the depression of the [Alt] key, a cursor is initially displayed over the central thought. Subsequent depression of the [Up] key may move the cursor to the closest parent, [Down] to the closest child, and so on. Within a group of thoughts, the arrow keys can be used to move the cursor among the group. The [Left] key may be assigned to return to the central thought from the siblings, and the [Right] may be assigned to return to the central thought from the jumps. The [Down] key will only return to the central thought from the parents if the cursor is over the bottom parent thought. The [Up] key will only return to the central thought from the children if the cursor is over the top child thought. If the display includes scroll-bars, the [Up] and [Down] keys may be used to scroll. A selected thought may then be activated by the release of the [Alt] key, or in another embodiment, the [Alt] key may be pressed once to begin a thought selection routine and a second time to activate a selected thought.

Navigation Example. FIG. 18 illustrates five related screen displays of one embodiment of the Brain. These connected displays demonstrate the practical significance of the novel interrelations among the different types of thought relationships of the present invention. Specifically, using differentiated types of thought relationships enhances the relevancy of the plex, by displaying only the most interrelated thoughts. The center screen 1800 illustrates a hypothetical plex, and each of the four screens bordering this hypothetical plex 1810, 1820, 1830, and 1840 illustrates the plex that would be displayed upon the user's selection of a particular one of the thoughts from the original hypothetical plex to be the central thought. As FIG. 18 shows, the original plex 1800 comprises a central thought ("Central") in the center of the plex, surrounded by and connected to a multiplicity of jump, parent, sibling, and child thoughts. For simplicity, this example presumes that, contrary to thoughts in a typical plex, none of the thoughts in the original plex are connected to any thought outside the original plex, and that each thought is connected to that central thought by only one type of thought relationship. Also for simplicity's sake, FIG. 18 assumes that sibling thoughts are the only indirect thought relationships displayed, and that the illustrated embodiment will not display distant thoughts.

The screen 1810 above the original plex illustrates the plex that would result if the user selected the "Parent 1" thought from the original plex. As FIG. 18 illustrates, the Parent 1 thought in the original plex was connected only to the central thought and to the thoughts labeled Sibling 1 and Sibling 2. Upon the selection of "Parent 1" from the original plex, the Parent 1 thought moves to the center of the plex display, and the thoughts linked thereto move accordingly into position around the Parent 1 thought. The names assigned to the thoughts in each of the five screens are based on the position of the thoughts in the original (center) plex, and were not changed so that one could follow the movement of each thought from the original plex to each of the peripheral plexes. Therefore, Sibling 1 and Sibling 2, which were siblings of the original central thought and therefore were displayed on the right-hand side of the plex, move into position under Parent 1 in the top plex because Sibling 1 and Sibling 2 are children of Parent 1 (the new central thought). As explained above, children thoughts are displayed at the bottom of the plex. The original central thought, labeled "Central," is also a child of Parent 1 and therefore is also displayed below Parent 1. Jump 1 and Jump 2 were related only to the central thought within the original plex, are not directly related to Parent 1, and are therefore not displayed within the new plex. Child 1, Child 2 and Child 3 are now grandchildren and are not displayed. Neither is Parent 2 which is now a partner, nor Siblings 3 and 4 which are related to Parent 1 only through three thought relationship links ("links").

The plex 1840 to the right of the original plex 1800 is the plex that would result upon the selection of Sibling 1 as the new central thought. Specifically, as shown in the original (center) plex, Sibling 1 is directly connected only to Parent 1. Therefore, the new plex shows Sibling 1 as the new central thought, with Parent 1 (Sibling 1's parent) connected above. Furthermore, because Sibling 1, Sibling 2 and Central share Parent 1 as a common parent, they are siblings of one another. Sibling 2 and Central are displayed as sibling thoughts to the right of Sibling 1 in the new plex. Again, Jump 1 and Jump 2 were related only to the central thought within the original plex, are not directly related to Sibling 1, and are therefore not displayed within the new plex. Child 1, Child 2 and Child 3, Parent 2, Sibling 3, and Sibling 4 are not displayed because each is at least three links removed.

The plex 1830 below the original plex 1800 is the plex that would result upon the selection of Child 1 as the new central thought. Specifically, as shown in the original (center) plex, Child 1 is directly connected only to the original central thought. Therefore, the new plex includes Child 1 as the new central thought and includes the original central thought as a parent thought displayed above Child 1 (because Child 1 is a child of Central, Central is a parent of Child 1). Furthermore, as the original plex shows, Child 1, Child 2, and Child 3 share Central as a common parent and therefore are all siblings. Thus, Child 2 and Child 3 are displayed as siblings of Child 1 on the right-hand side of the plex. Again, Jump 1 and Jump 2 were related only to the central thought within the original plex, are not related to Child 1, and are therefore not displayed within the new plex. Parents 1 and 2 would now be grandparents and are not displayed. Neither are Siblings 1, 2, 3 and 4 which are at least three links removed from Child 1.

Figure 5:
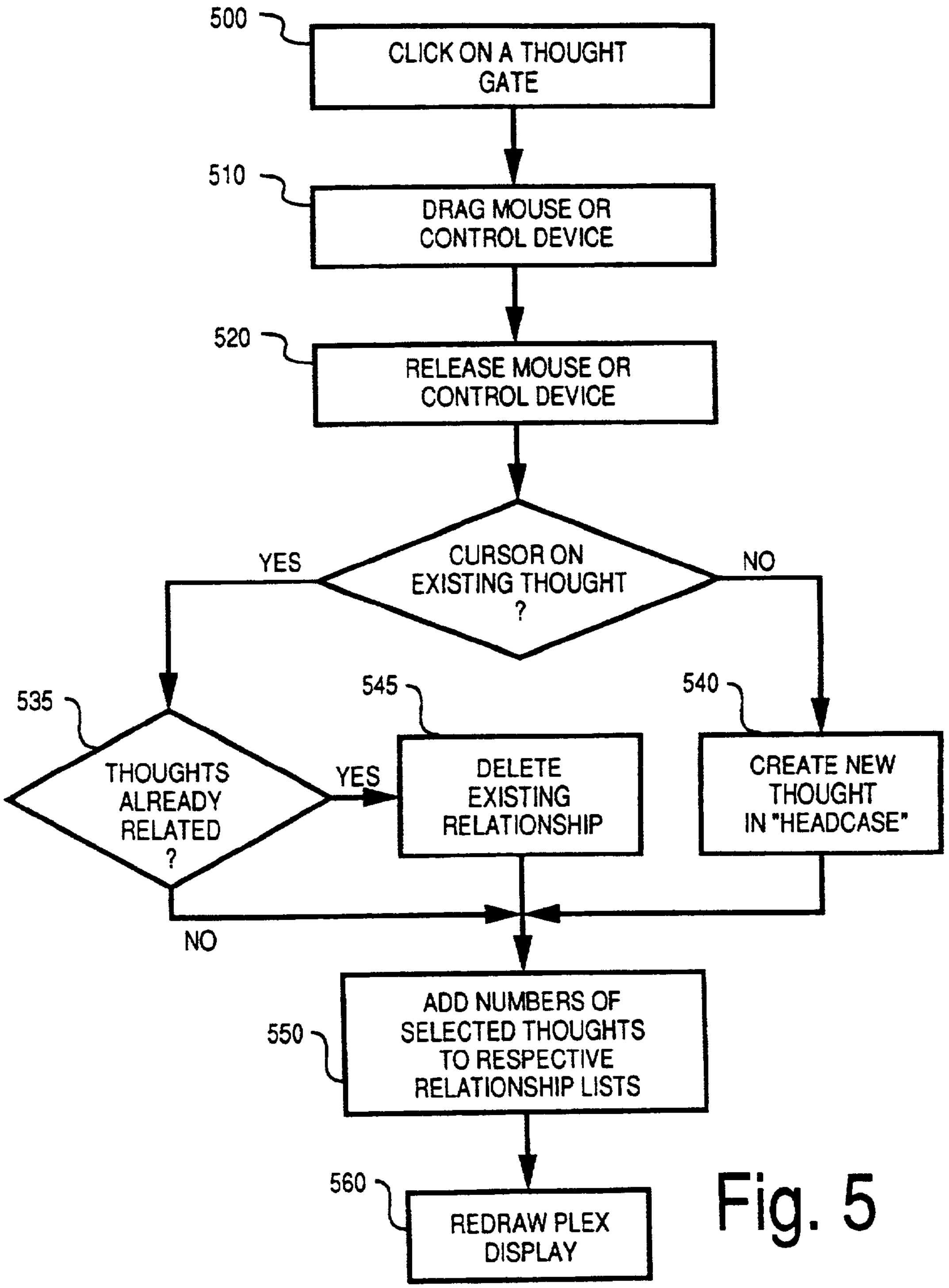
FIG. 5 is a flow diagram showing the process for creating and relating thoughts in an embodiment of the present invention.
Figure 7:
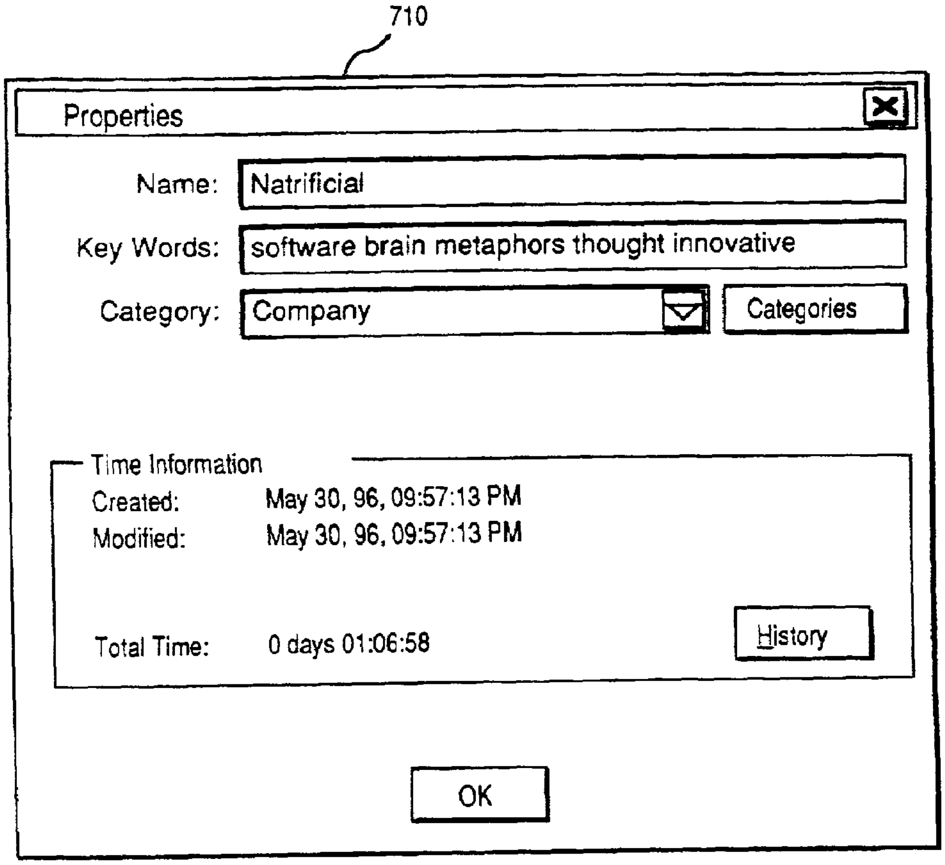
FIG. 7 illustrates a graphical user interface screen display, in accordance with another aspect of the present invention.

The plex 1820 to the left of the original plex 1800 is the plex that would result upon the selection of Jump 1 as the new central thought. Specifically, as shown in the original (center) plex, Jump 1 is directly connected only to the original central thought, and is not directly related to any other thoughts in the around an existing thought. FIG. 5 provides a flow diagram showing the basic steps of this process. At step 500, the user selects by clicking on a gate of an existing thought (a "source thought"), to which the new thought is to be related. At step 510, the user drags control device 160 away from the source thought; during this step, a "rubber-band" line may be displayed coming out of the source thought gate and tracking the cursor controlled by mouse/control device 160. At step 520, the mouse/control device's 160 button is released. At that point, if the cursor controlled by mouse/control device 160 is located over an existing thought (a "target thought"), as indicated at decision point 530, then the system assumes the user desires to create a new relationship between the source thought and the target thought, as will be described shortly below. In order to create a new thought, the user simply releases mouse/control device 160 with the cursor at an unoccupied location on the screen. In that case, as shown at step 540, a new thought is created and added to headcase 290. In one embodiment, a dialog box 710 (see FIG. 7) appears and asks for the new thought's name and/or other properties; a unique new thought number is created to refer to this thought; all of the new thought's data fields are initialized to default values; and the thought's number is added to a global list of all thoughts. At this time a user may specify a plurality of thoughts to be linked in the same manner. The Brain can automatically link preexisting thoughts specified at this time.

Next, at step 550, a relationship is created between the source thought and the new thought, based in some embodiments upon the type of gate of the source thought that was selected at step 500. In particular, the new thought's number is added to the appropriate relationship list (245) of the source thought, and the source thought's number is added to the appropriate relationship list (245) of the new thought. Finally, at step 560, the updated plex is redrawn, reflecting the newly created thought and its relationship to the source thought.

Relating Existing Thoughts. Existing thoughts may be related using the same method as is used to create new thoughts. Referring again to FIG. 5, steps 500 through 520 are the same. However, at decision point 530, control device original plex. Therefore, the resulting plex includes only Jump 1 as the new central thought and Central as a jump thought.

Advantages of Associative Interrelations. As this example graphically illustrates, the relatedness of particular thoughts is reflected in the manner in which those thoughts are displayed as the user navigates the matrix. By choosing one type of link over another, the user has the power to affect the content of the plexes that are displayed upon the selection of any thought from the current plex as the new central thought. The method of the present invention utilizes intuitively-derived thought interrelations and graphical representations to optimize the benefits human users will obtain from the Brain. Harnessing this power offers the user informational displays that are as or more relevant than hierarchical displays, yet free of the artificial spatial limitations inherent in hierarchies and "real world" metaphors.

These advantages become particularly clear when the interface and storage structure of the present invention are contrasted against a system having nondifferentiated links. A hypothetical screen display of such a system is shown in FIG. 19. This display is one possible representation of a central thought related to eight other thoughts. However, no information about the nature of this interrelation may be gleaned by the graphical representation of FIG. 19. The inherent limitations of systems capable of only a single type of association are strikingly apparent when one considers the plex that would result upon the selection of one of the thoughts depicted in FIG. 19. As FIG. 20 illustrates, the plex resulting from the selection of a thought from the hypothetical plex of FIG. 19 would contain only two individual thoughts connected by a single non-differentiated link. The present invention overcomes these deficiencies and allows an optimally flexible, intuitive, and therefore efficient means for organizing information.

D. Defining a Matrix

Creating New Thoughts. New thoughts may be created by interactively clicking and dragging, using mouse/control device 160, from any of the gates 160 is determined to have been released with the cursor located over an existing thought (the "target thought"). In that case, at step 535, the relationship list 245 (FIG. 2) of the source thought and target thought are checked to ensure that the thoughts are not already directly related. If such a relationship does exist, it may be deleted at step 545 by removing the source and target thoughts' numbers from each other's current relationship lists, to avoid any ambiguities. Next, at step 550, the source and target thoughts' numbers are added to each other's appropriate relationship list (245), as determined by the source thought's gate type originally selected at step 500. The redefined matrix is redrawn at step 560. If such a relationship does not exist, then step 545 is inapplicable and step 550 is processed immediately after step 535 is executed.

Reordering Relations. Related thoughts are drawn in the plex according to the order they are listed in the relationships list of the central thought. By dragging the thoughts in the display, the user can specify in what order they should be listed and as a result, where they will appear. In reference to FIG. 3, FIG. 8 provides an example of the display 800, in one embodiment, which would result if a user were to interactively reverse the order of thoughts 316 and

Figure 8:
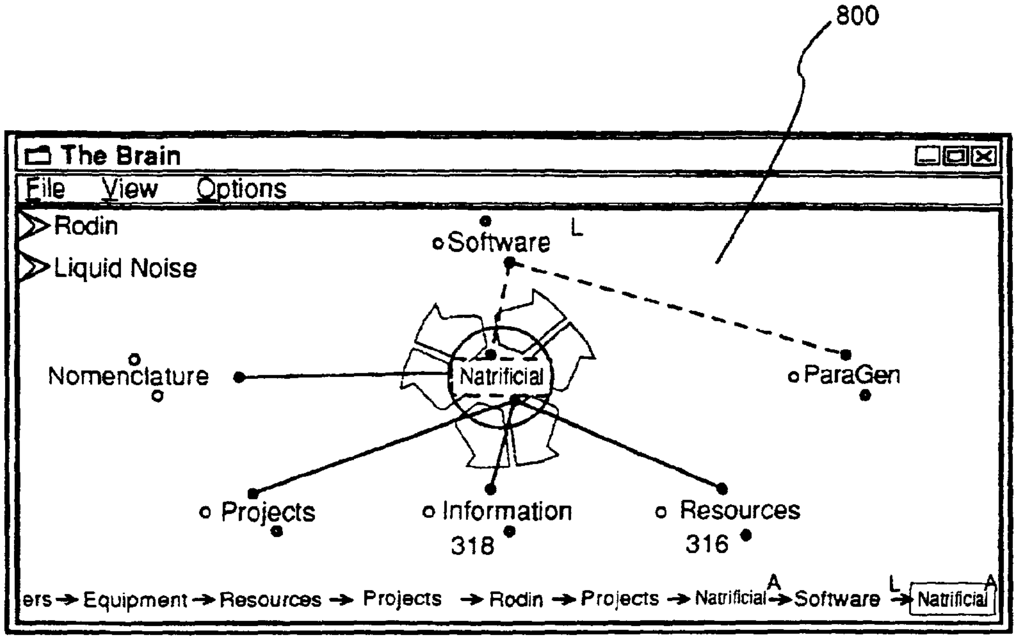
FIG. 8 illustrates a graphical user interface screen display, in accordance with another aspect of the present invention.

318, causing the icons representing those thoughts 316 and 318 to switch horizontal positions as demonstrated by the positions of those thoughts 316 and 318 in FIG. 8 or if a digital computer were to reorder those thoughts based upon an alphanumeric sequence, usage statistics, or other logical criteria.

Figure 6:
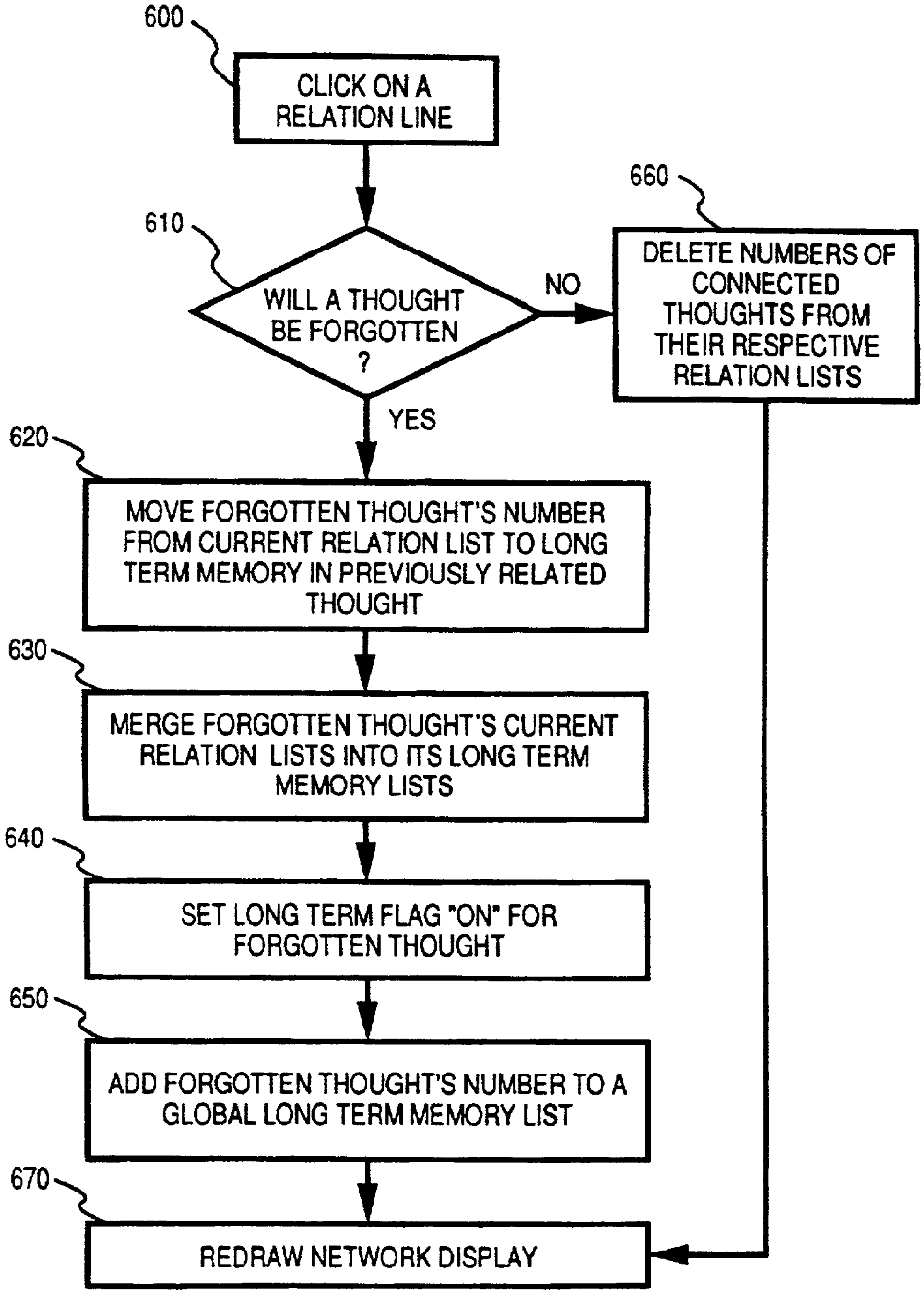
FIG. 6 is a flow diagram showing the process for severing relationships between thoughts in an embodiment of the present invention.

Severing Relations Between Existing Thoughts. It is possible to sever the relationship between two existing thoughts, such as central thought 310 ("Natrificial") and child thought 314 ("Projects"), using a process similar to the process used to define a new relationship between existing thoughts. As the flow diagram in FIG. 6 outlines, at step 600, the user requests that a particular relationship be severed by clicking on the lines which connect two thoughts such as the line connecting thoughts 310 and 314 in FIG. 3. Next, at decision point 610, a check is made to see if the requested severing would involve the special case of "forgetting," as will be explained shortly. If no "forgetting" will occur, then at step 660 the numbers of the two thoughts are removed from each other's relationship lists and the line between thoughts 310 and 314 in the graphical display shown in FIG. 3 may be removed.

The special case of "forgetting" an existing relationship will now be 5 explained. Consider the example plex shown in FIG. 3. If the relation between thought 314 ("Projects") and central thought 310 ("Natrificial") is severed, then there will be no path at all connecting thought 314 with central thought 310, and thus no way to access thought 314 from the current thought. Thought 314 will be isolated. In that sense, thought 314 will be "forgotten" if the severing is performed. Therefore, in the process depicted by FIG. 6, decision point 610 detects such cases (see below, "Determining if thoughts will be isolated"). In such cases, the number of the "forgotten" thought (i.e., thought 314) is deleted from the current relationship list 245 (FIG. 2) of central thought 310 at step 620, and is added to the corresponding past relationship list 250 of central thought 310. Recall that the past relation lists 250 are included as part of each thought's data structure, as illustrated in FIG. 2. Next, the forgotten thought's own fields are revised to reflect its status as a "forgotten" thought: namely, at step 630, thought 314's current relationship lists 245 are merged into its past relations lists 250 (i.e., copied from 245 to 250 and then erased from 245), and at step 640 its "long term memory" flag is set to "on." At step 650, forgotten thought 314 may be added to a global long term memory thought list. At step 670, the plex is redrawn, reflecting the absence of forgotten thought 314. It is possible to forget more than one thought at once, in which case all of the forgotten thoughts will be modified as described for thought 314.

By reference to particular usage statistics, the forgetting operation may be automated. More precisely, the present invention may automatically forget a thought that has not been accessed within some user-definable period of time, as reflected by the usage statistics associated with that thought.

Determining If Thoughts Will Be Isolated. A thought will be isolated when it is not possible to return to the central thought via any link other than that link which is being severed. Similarly, any thoughts ("Rodin" 950 and "Liquid Noise" 960 in FIG. 9) related to the severed thought ("Projects" 314) will be forgotten so long as their only link to the central thought existed via the severed thought ("Projects" 314). One method of determining whether it is possible to return to the central thought from a thought whose link has been severed is illustrated by the recursive algorithm disclosed in FIG. 10.

An alternative method that may provide enhanced performance is disclosed in FIG. 24. This method relies on a programming object termed a ThoughtList, which utilizes a map of bits representing thought numbers. Each bit in the map corresponds to a thought, with a (1) indicating a thought on the list and a (0) indicating a thought not on the list. In accordance with this methodology, one can store the existence or nonexistence of over a million thoughts using merely 128 kilobytes of storage. The storage required for this technique is determined by the highest possible thought number divided by eight. All memory or storage used for this list is zeroed out, and is subsequently modified (to 1's) at locations corresponding to thoughts. Specifically, when a thought is added to the list, the bit number X of byte number Y is set, where X is the remainder of the thought number divided by eight, and Y is the thought number divided by eight. This method may also be used for storing normal thought lists.

Parentless Thoughts. An alternative embodiment of the Brain maintains a list of parentless thoughts (thoughts without parents) that is updated whenever changes are made. When a thought is created, linked, or unlinked, the affected thoughts are checked for parents. If these thoughts have parents, they are removed from the list; otherwise, they are added to the list. If necessary, the list of parentless thoughts may easily be regenerated by checking all thoughts for parents. Because this list is maintained, it is not necessary to ensure that all thoughts are connected. Thoughts may therefore be unlinked without verifying the existence of alternative return routes to the original thought.

Forgetting and Remembering Without Searching. When thoughts are unlinked without searching, it becomes necessary to have an alternative interface for forgetting. Among the possible methods for accomplishing this result are dragging the thought to a forget icon or selecting a command. The thought will then be forgotten along with all of its childward descendants that do not have other partners and are not the active thought. To decide which thought to forget, the Brain makes a list that includes the thought to be forgotten and all thoughts childward of it. The Brain does not add the active thought to this list. To remember the thoughts, the user can drag a thought to a remember icon or select a command. The thought and all its forgotten childward descendants will thereby be remembered. More detailed algorithms for implementing these forgetting and remembering operations are set forth in FIG. 17.

Accessing Long Term Memory. To access thoughts that are stored in long term memory, in some embodiments the user can interactively activate the display of long term memory relationships (for example, by means of a menu selection or function key). The display will then be refreshed, and thoughts related by long term memory relationships will become visible and are connected (as shown in FIG. 11) to the central thought with a line, such as line 1110, of a different sort than that used for normal relationships. A long term relationship can then be recreated as a current relationship by using the "Relating Existing Thoughts" technique described above. In that case, the appropriate thought numbers (see FIG. 2) are copied from past relationship lists 250 to the appropriate, current relationship lists 245. The appropriate thought numbers are then moved in the global long term and short term memory lists, and the display is once again redrawn.

In an alternative embodiment of the present invention, each thought's headcase does not include a list of past relationships. Rather, each thought's headcase merely contains a flag identifying it as a forgotten thought or a present thought. When a user interactively turns on a display of long term memory within this alternative embodiment, forgotten thoughts and their relationships to present thoughts are added to the display, and severed relationships between present thoughts will not reappear. This alternative embodiment may offer certain advantages, including without limitation (i) presenting the user with a simpler, more readily comprehensible set of information regarding past relationships within the matrix; and (ii) reducing the complexity of the matrix's data structure and hence the computing resources used to operate the matrix.

These same principles used for implementing long and short term memories are equally applicable for creating many other classes or levels of memory. A plurality of memory levels may be created and thereafter any or all of the relationships stored at each level or in each class may be selectively chosen for viewing. For example, a user may elect to display only the top level, all levels, up to a specified level, or particularly designated levels having no immediate connection.

Permanently Deleting a Thought. It is also possible to permanently remove a thought from the matrix. This is accomplished by clicking on a line (such as line 1110) which connects a thought which is already in long term memory. When severing a relationship in this manner results in a thought or thoughts becoming isolated, this thought or thoughts are removed from the global thought list and from the past relationships list 250 of the central thought. Although a portion of the thought data relating to a deleted thought will be erased, in one embodiment of the invention, the space occupied by the thought in the flat file database will be retained so that the Brain does not have to remove all references to it. The Brain may be unable to remove all such references because they may occur on other lists or in other matrices which the Brain cannot control. Furthermore, comprehensive elimination of references may be computationally prohibitive, and leaving the thought's space in the flat file database requires relatively little storage space.

Dividing a Matrix. When a user selects a link that will result in the isolation of particular thoughts, the user may optionally forget the thoughts, permanently forget the thoughts, or split the matrix into two parts. Splitting the matrix into two parts will create a new thought that has the same name as the first thought to be isolated, but the document associated with this newly created thought will be a new matrix that is named after this first thought to be isolated. This new matrix will consist of all the thoughts which will be isolated in addition to the thought located at the position of the last link to be selected. That thought will reference the original matrix, and will be named after the original matrix.

Creating New Thought Flags and Types. To define a new thought flag, the user interactively selects a thought and then enters a flag name and its default state. To define a new thought type, the user enters the name of the new type, its default flag states, and any fields that the type has. The new types and flags can thereafter be referenced by the user when creating new thoughts or changing thought properties. The type of a thought dictates which application program is used to edit the information associated with that thought. Application programs may be directly associated with a thought in the same way that the document window 360 in which a thought may be edited is associated with active thought 330. One embodiment of the invention assigns a preferred thought type to thoughts, but the user can override this thought type assignment by selecting another thought type either at the time of creation or by changing the default thought type in the preferences. Acceptable thought types include any computer application capable of communicating with the Brain employing the methods disclosed herein. In some embodiments, the correct thought type for a document is determined by the file extension that the location specifies.

Thought Pins. Thought pins are used to get instant access to commonly used thoughts. In the upper left corner of FIG. 3 are two thought pins 370 and 375, labeled "Rodin" and "Liquid Noise." Thought pins can be moved by the user to any location or deleted. To create a new thought pin, the user simply moves the cursor (using mouse/control device 160), and clicks on or otherwise highlights the existing thought for which a thought pin is to be created, and then selects a "Create Pin" command or the like from an ensuing pop-up command menu (such as menu 1210). Alternatively, pins may be created by dragging thoughts to predefined zones within the display. Selecting an existing thought pin (e.g., using mouse/control device 160 to position the cursor over the pin, then clicking the control device's button) makes the pin-represented thought into the new central thought of the current plex. For example, selecting thought pin 370 ("Rodin") in FIG. 3 would result in the plex transforming into the plex displayed in FIG. 13, with thought 370 ("Rodin") as the central thought. Note that thought pins may be represented internally by the number(s) of the thought(s) they reference and an explicit, user-specified display location.

Brain Messaging System. An embodiment of the present invention utilizes a brain messaging system ("BMS") to enhance interoperability between the Brain and the applications used to create, edit, and display documents; this messaging system plays a central role in matrix creation, as discussed below. Applications that comply with the BMS are referred to as "Brain-enabled" applications. Some embodiments of the present invention only interoperate with Brain-enabled applications. Other embodiments take advantage of the program-to-program interface features of operating systems such as Windows® by Microsoft to enable any application to be launched and operated within documents associated with thoughts, without need for a specialized BMS. Whether or to what extent a BMS is necessary to enable Brain-application interoperability depends partly upon the capabilities of the underlying operating system. A Windows® embodiment of the present invention, for example, allows the user to specify a list of Windows® applications which will create, read and write to files corresponding to thoughts of a certain "type."

For instance, a spreadsheet application such as Microsoft Excel® would enable the creation of Excel-type thoughts which, when activated by the user, launch Excel, and load the Excel document associated with the specified thought. Further, in one embodiment of the present invention, the display icons corresponding to thoughts are specialized according to thought type. For example, a thought of the Excel type would be symbolized by a display icon graphically depicting the thought as such an Excel type. A BMS may not be required under Windows® to enable the limited interoperability described in this paragraph. Methods of processing thoughts are described in greater detail below.

Even in Windows®, however, the incorporation of a BMS enables improved interoperability between the Brain and Brain-enabled application programs. Brain-enabled applications permit users to link thought directly to objects within Brain-enabled application documents by dragging to the document windows. With applications that incorporate hyperlinks, the BMS allows the user to drag thoughts directly to those hyperlinks and associate with the objects that they reference. The BMS can be configured to work in concert with messaging systems native to the operating system. For example, Microsoft Windows® uses Dynamic Date Embedding ("DDE").

Using the program-to-program messaging capabilities of known operating systems, the BMS permits the Brain to provide specific instructions to Brain-enabled applications. For instance, the BMS may include the following core messages from the Brain to the application. The Brain may request the identity of the document over which the mouse pointer presently resides; the application would respond with the current document name and file location using the name and address symbol of the native operating system, or the hyperlink's name and file location. The Brain may signal the activation of a particular thought, and the Brain will provide the number, name, and location of this thought; if a thought is being created, the Brain will also provide the template parameter(s) corresponding to this new thought; in response, the application will save the current document and load or create the new document if the new document is of the same type, and if creating the new document, will use the template parameter to open the default document. The Brain may request that the application move its window to the top; in response, the application will make its window visible over any other applications. Finally, the Brain may request that the application move its window in a requested manner, save, rename, or relocate its document; in response, the application will do so, as instructed by the Brain.

The BMS may also include by way of example the following core messages from applications to the Brain. An application may ask the Brain to identify the active thought; the Brain will respond with the active thought's number, name, and location using Brain-specific symbols. An application may ask the Brain to activate a thought with a specified number, name, and location, and the Brain will do so. An application may ask what thought corresponds to a particular number, name, and location; the Brain responds with the thought's number, name, and location, or will return "false" if the specified thought does not exist. An application may ask the Brain to create or link a specified thought, related by designated child/parent links to another designated thought; if requested, the Brain performs the specified operation. Finally, an application may tell the Brain that the application is Brain-enabled, and will provide the information needed to start the application, the application's document types, and their respective descriptions; if so, the Brain stores this information and adds that application's document types to the list of permissible thought types.

Automatic Thought Recognition. The Brain can activate thoughts based on commands sent from other application programs as well, including without limitation, the editor or calendar applications. For instance, the editor may contain a word that is also a thought name. Using the BMS, the editor can identify the specific word or words as being a thought and automatically highlight them on the display. Alternatively, the Brain could be queried when the user selects one of these words. When a word is successfully identified as being a thought and is selected by the user, the application may then send a message to the Brain requesting the activation of the specific thought. A similar process may be used to recognize and activate thoughts through any Brain-enabled application.

Creating Thought Plexes. As described earlier, thought plexes are the graphical displays of a group of related thoughts, consisting of a central thought and any parent, child, jump, and sibling thoughts. There is always at least one thought plex. In one embodiment of the present invention, additional thought plexes can be created by using the control device 160 to position the cursor over any thought other than the central thought, and dragging the selected thought to the desired location of the new plex. Each time a user creates a plex, that plex is added to the screen display along with the other plexes previously presented on the screen display (see FIG. 9).

Figure 9:
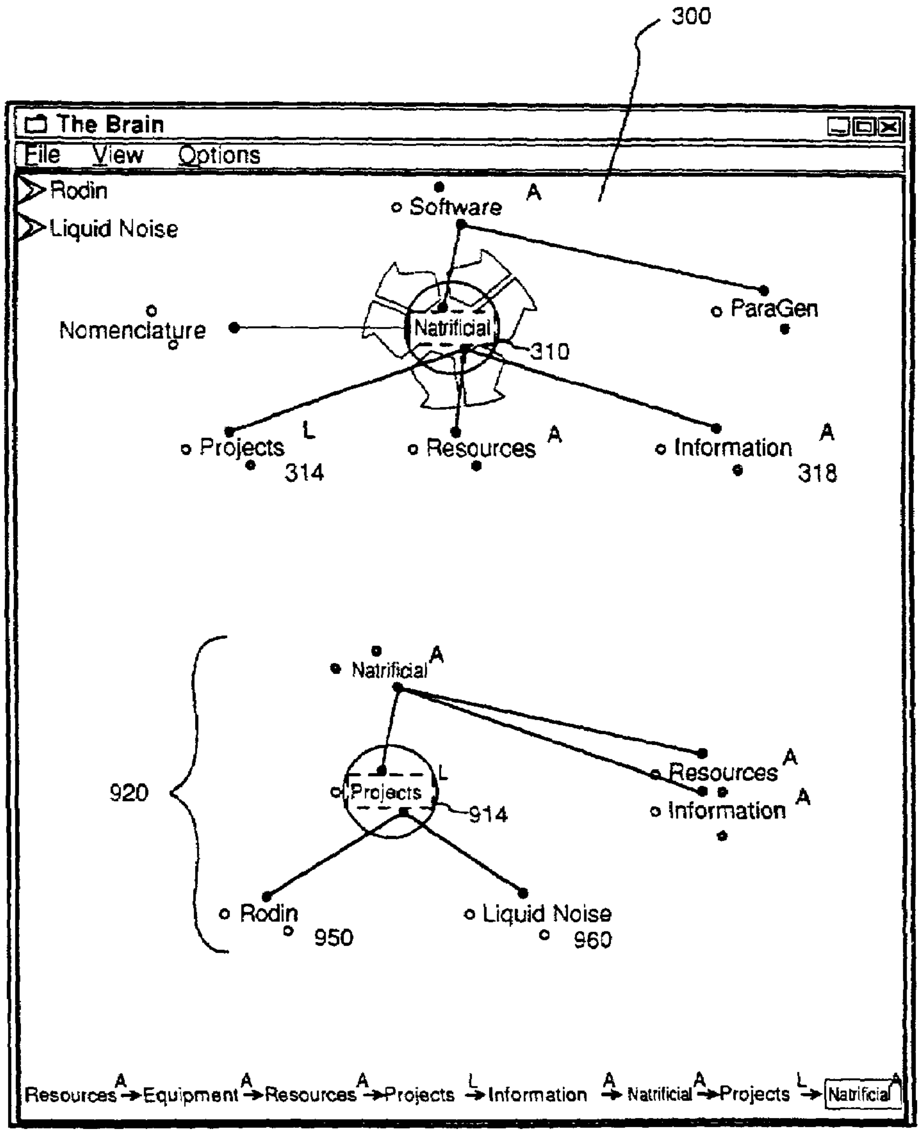
FIG. 9 illustrates a graphical user interface screen display, in accordance with another aspect of the present invention.

The figures demonstrate an example of the manner in which a new plex may be created. First, in FIG. 3, a user interactively selects the thought 314 ("Projects") to be a new central thought by using control device 160 to position the cursor over that thought, then selects the thought by clicking and holding a button on the cursor control device. The user then employs control device 160 to move the cursor to the desired location of the new plex and releases the button. FIG. 9 demonstrates the screen display which results. Plex 920 has been added to the screen display, with the thought 914 ("Projects") as the central thought of new Plex 920. The Plex is the on-screen interface to the matrix in which data is stored.

Automated Matrix Creation. Matrices may be created either on command or, in one embodiment of the present invention, they may be created on the fly. When created on command, matrices are static and will not change unless a user explicitly commands that a change be made. When created on the fly in response to user inputs and navigation, by contrast, a matrix will change as the information represented by that matrix changes.

Automated matrix creation has many potential applications, including the automatic creation of a matrix representing a standard hierarchy such as those commonly used in directory structures. In this application, the Brain begins at the root of the hierarchy and creates a child thought for every file and folder, and then goes into each folder and repeats the process. This recursive process effectively generates a plex representing a directory structure, and as discussed above, can be performed on the fly or as the user navigates amongst thoughts. The Brain begins by displaying the current thought within the hierarchy. Each item within the presently displayed thought is displayed as a child, and children that contain other items are displayed with a highlighted child gate to indicate the same to the user. The level of the hierarchy that contains the current item is displayed as a parent, and the other items within the level containing the current item are displayed as siblings.

The automated conversion of a standard hierarchy to a Brain matrix allows users to subsequently modify the resulting matrix in a nonlinear nonhierarchical manner, thereby creating a nonlinear nonhierarchical information structure with a minimum of effort. Furthermore, the ability to view and activate siblings may be valuable irrespective of whether nonhierarchical relationships are established within the matrix.

The present invention additionally may automatically generate matrices reflecting self-referencing hierarchies, such as those used to organize the World Wide Web ("WWW"). When an item in a self-referencing hierarchy is encountered and has already been added to the matrix, the present invention links to the existing thought rather than creating a new thought. This technique may result in "wrap around" structures and multiple-parent structures that actually exist in a self-referencing hierarchy and can now be displayed with the advent of the present invention.

Similarly, the present invention permits a matrix to be automatically generated from a hypertext document. This document becomes the central thought, and the linked items within the document become children thoughts. Those linked children may subsequently be explored in a similar manner. In cases where hypertext uses somewhat predictable link names, the present invention may link thoughts in a more context-sensitive manner. For instance, files located on a remote computer or Internet URL may be displayed as jump thoughts, and files which are disposed in a hierarchical directory location above the current directory may be displayed as parent thoughts. This method for automated generation of matrices may be restricted so that it does not create overly cumbersome plexes. For example, it may be designed so that it does not create thoughts relating to files located on remote machines.

A matrix may also be created on the fly to reflect a user's navigation within a collection of hypertext content such as the Internet's World Wide Web. In this embodiment, each hyperlinked document selected by the user is linked as a child to the document from which it was selected, and the hyperlinked document becomes the active thought. Once such a structure has been created, the "back" command may be used to activate the parent thought, thereby moving the user to the previous page. Similarly, the child thought is activated if the user selects the "Forward" command. The added benefit to using this matrix arises in cases where the user selects a different hyperlink rather than the "Forward" command; in such cases, the new hyperlink is added as a child thought. Also, if a user navigates to a page which has already been visited, there will already be a thought representing that page which will be linked to as a child. In this fashion, users may generate a matrix that is exceptionally useful for tracking browsing history relative to traditional methods.

Furthermore, matrices representing the results of a database search may also be generated. Such searches are typically performed in response to words input by the user, and the results are usually displayed in an ordered list arranged by some measure of frequency or relevance. One embodiment of the present invention parses such lists to identify other common words or themes from among the results. In accordance with the result of this parsing step, a matrix is created with the query as the central thought and with the other common words or themes as child thoughts. Results that do not share common words or themes are displayed as children. When a child thought is activated, if the child has a common word or theme, the results sharing that commonality are broken down again. If the child is a result, then results that are contained within that result are displayed as children, and items related to that result are displayed as jumps.

Moving Thought Pins and Plexes. In one embodiment of the invention, thought pins can be repositioned by dragging them with the mouse or other control device. Thought plexes can be repositioned by dragging their central thought with the mouse or other control device. Thought pins and plexes can be deleted by dragging them off of the display. Eliminating a plex from the display does not result in any thoughts being forgotten. Forgetting involves a different user-interactive process discussed above (see "Severing Relations Between Existing Thoughts").

Resizing a Thought Plex. In one embodiment, a thought plex can be sized by dragging the circle which surrounds the central thought. Making the circle bigger makes the entire plex bigger and vice-versa.

Changing a Thought Pin. In one embodiment of the present invention, a thought pin can be made to reference a different thought simply by dragging the desired thought onto the pin.

The Brain Freeze. In response to a user's request or in response to a regularly scheduled system request for backup, a "Brain Freeze," in one embodiment, saves the state of all parts of a matrix at a given point in time, copying all the information to a read-only format for later use.

E. Processing Thoughts

Naming Thought Files. By default, a thought does not have a matrix or operating system file location specified when it is created. If the user selects an active thought without a specified location, a Windows® embodiment of the Brain opens a dialog that allows the user to select the type of file to create. After the user selects a file type, that Brain uses standard operating system methods to create a file of the selected type and thereafter names the file by appending the file type to the name of the thought. The file associated with that thought is placed in a Brain specified folder Lbrn folder) (discussed below) and is opened immediately. The file name and the thought name are independent, and the renaming of a thought does not compel the renaming or relocating of its file within the network or operating system. Therefore, if the file is shared, other programs and users not operating the Brain will still be able to locate it.

Opening a Thought. A thought's headcase file may specify an item (a thought document) within a traditional file system that is associated with the thought. This thought document may reside in the storage system of a local computer, or may be retrieved through a network, including without limitation a LAN or the Internet. When a thought is activated, the Brain may request that the operating system open the thought document associated with the selected thought. When a thought document is saved, it will typically be stored by most application programs to the file location from which it was loaded. This location is, of course, the location that the thought references. Accordingly, a user may both open and close files from the Brain without navigating a traditional operating system's file reference means, and irrespective of the storage location of that file.

A user may optionally limit automatic thought document loading to those documents having specified file types or residing in certain locations. File extensions typically may be used to distinguish among file type. For example, file location, usually placed before the filename and separated from the filename by a backslash, allows a Windows® embodiment of the invention to discern the location of each file; periods and forward slashes allow a UNIX or Internet embodiment the same utility.

Editing Thought Documents. Each thought's document contents are displayed in document window 360, as illustrated in FIG. 3. When the current thought is changed, the last thought's document is saved (unless otherwise directed by the user) if necessary and then the new current thought's document is loaded automatically. The user never has to issue "save" or "open" commands to access thought documents, nor does the user need to explicitly identify or invoke an editor or other application program to process the thoughts. These operations are performed automatically by the Brain, seamlessly and transparently. When a thought is activated by the user, the Brain saves the previously active thought, if it has changed, then loads the newly active thought. Well-known computer programming object technologies, including without limitation Microsoft's Object Linking and Embedding ("OLE"), allow the document to make references to data which is created and edited by other programs. Using standard operating systems calls, the present invention can display and allow the user to edit these objects with the appropriate computer programs. In addition, the document may also store references to the location of other documents on the storage systems available to the computer, allowing the user to open them with the appropriate computer programs using a more traditional operating system method.

Linking to Remote Files. Using the BMS or another method of inter-process communication, the Brain can request an application to identify the file it presently has open. The availability of this technique allows the Brain to create thoughts representing files that are open in other application programs. In one embodiment, the user may do so by simply dragging a link from a thought and releasing the selection button on the cursor control device when the pointer is situated over the desired application window. Upon the performance of these steps, the Brain queries the application for the identity of the file it has loaded, and the Brain creates a thought and sets the name and location of this thought in accordance with the application's response to the Brain's query. The thought (in this case, the active document in the application window) is thereby linked to the gate from which the user dragged the cursor. For instance, if the document is a Hypertext Markup Language ("html") World Wide Web site stored remotely on the Internet being viewed using a web browser application such as Navigator® by Netscape, the Brain will name a new thought based upon the document's Internet URL (Uniform Resource Locator) or the contents of an html "title" tag. When, in later use, a user reactivates this thought, practicing methods described above, the Brain will launch the user's preferred web browser application, and request that the web browser download the html file from the remote URL.

Delayed Loading. In some instances, the loading of the contents of a thought may require the expenditure of considerable computing resources, and it may be desirable to allow the user to navigate through a series of thoughts without loading the content of every thought through which a user passes along the path to reaching a particular destination thought. This functionality is implemented in accordance with the flow chart illustrated in FIG. 22, and allows the passage of a duration of time noticeable to the user before loading the contents of a selected thought. More particularly, upon the selection of a thought by the user at step 2110, the plex is redrawn in step 2112 using the animation techniques discussed herein, and a loading delay procedure initiates. One embodiment of the present invention uses an expanding circle to appraise the user of the status of the loading delay. At step 2114, this expanding circle begins as a small circle oriented within or about the area representing the central thought, and the circle expands with the passage of time. At step 2116, the circle is enlarged and is redrawn. Next, at step 2118, the method queries whether another thought has been selected. If so, the routine returns to its beginning, step 2110, and the loading delay process is initiated with respect to the newly selected thought. If another thought has not yet been selected, in step 2120 the routine queries whether the circumference of the circle has grown to reach the periphery of the Brain window in which the present plex is graphically displayed. If so, the routine generates and sends a message to load the contents of the selected thought in step 2122. If not, the routine returns to step 2116 where the circle is enlarged and redrawn, and the routine continues. With this method, thoughts are not loaded during a predetermined period of time after their selection, and are not loaded if another thought is selected during this time. This delayed loading may be used to allocate optimally the computing power available to a user.

Some prior Internet browsing means require every World Wide Web site to incorporate user navigation methods within hypertext documents. Those methods inefficiently force users to download irrelevant information, merely for the purpose of navigating through it. One strikingly powerful application of the present invention's delayed loading technique allows expedited navigation through Internet pages or files without waiting for the content of intermediate pages or files to load.

Changing Thought Properties. Thought properties such as name, flags, priority, and category can be changed using a thought properties dialog box, such as dialog box 710, which is accessed by the user employing mouse/control device 160 and/or keyboard 150 to select a particular thought and then the thought properties dialog box. In some embodiments, the properties dialog box remains visible at all times, and changes to reflect the properties of the current central thought.

Editing Thought Fields. Thought fields can be edited in a dialog box or window such as 1410 in FIG. 14. In one embodiment, the field names are displayed to the left and their contents to the right. Thought fields are automatically loaded and saved, in the same fashion as are the contents of thought documents, invisibly to the user every time a thought field is modified. All thoughts of a certain category possess the same available thought fields, which fields are defined by the user in establishing and modifying thought categories (see above, "Category").

In one embodiment, every thought category 240 possesses at least two fields. Those default fields are the "Name" field and the "Key Words" field. The contents of these default fields are identical to the contents of the properties called "Name" and "Key Words" respectively.

Rewinding and Replaying Previous Operations. An event list is created automatically by the Brain, as the user works. The event list is a recording of each action the user takes. It stores how to undo each action and how to repeat each action. At the user's request, the Brain can then use this information to "rewind" and "replay" the actions of the user.

Thought Lists. Internally, within a computer, the Brain stores thought lists as a list of thought numbers. To the user, the Brain displays as a list of thought names. One embodiment of the present invention keeps a list of all short term memory thoughts and long term memory thoughts. In addition, a list of thoughts is created for each defined thought type. Lists of thoughts can also be manually created (see below, "Trains of Thought" and "Searching"). The user can activate a thought in a list (make it central in the current plex) by clicking on it. Thought lists can also be used to perform group operations on thoughts such as printing, changing properties, or even saving (to save only a selected portion of the matrix). One embodiment used to maintain thought lists, using bitmap lists, is discussed in the "Determining If Thoughts Will Be Isolated" section above.

The Past Thought List. One special example of a thought list is the past thought list. FIG. 3 illustrates how a past thought list 380 can be created automatically as the user works. Each time the user changes the current thought, the number of the new central thought and the time it was activated are added; when the user stops working, a null and the time are added. In this manner, the Brain tracks the user's work with reference to the timeframe in which it was performed, and this information is recorded for later reference. In the one embodiment, it is possible to display the past thought list as a list (such as past thought list 380) of thoughts which scrolls along the bottom of the display as the user activates thoughts. For example, each time a user activates a separate thought, the previously activated thought is placed at the right-hand end of past thought list 380 pushing the older thoughts to the left of the screen. The oldest thought that cannot fit on screen is eliminated from view from the left-hand end of past thought list 380. This list may be scrolled to reveal thoughts that have disappeared.

Trains of Thought. Another special example of a thought list is the "train of thought," which lists a series of thoughts in a particular sequence as desired by the user. A train of thought can be created by simply navigating through the desired thoughts in the same order as the user wants them to appear in the train of thought. This will automatically cause the desired sequence of thoughts to become part of the past thought list, as noted above. As shown in FIG. 11, the user then interactively selects the desired section of the past thought list using mouse/control device 160. In the case of FIG. 11, the user has selected "Projects" and "Natrificial"—the two most recent thoughts—for inclusion in a train of thought. The user then interactively selects the Create Train command 1120 by using a pull down menu, function key or similar means. In response, the selected sequence of thoughts is copied to a new thought list and the user is asked to name it, thus creating a new "train of thought" thought list.

Trains of thought can be used for accomplishing tasks that involve a number of pre-existing parts. For example, an attorney might use a train of thought to assemble a number of pre-existing sections of text (stored in separate thought documents) into a new contract, or an engineer or computer programmer can use trains of thought to assemble a new computer program out of a pre-existing library of subroutines.

In one embodiment of the invention, a selected train of thought may be identified in a plex so that it is easier for a user to follow. Specifically, the active thought in a train may be identified, and the next and previous thoughts on the train may be highlighted in the plex. If the active thought is not in the train, then any thoughts in the train are highlighted. Optionally, arrows may also be drawn between thoughts in the plex to reflect the order of the train of thought.

Searching. Thought lists can be filtered or "searched" according to thought category, priority, name, flags, fields, or any other subject stored within a thought's headcase file or document. This allows the matrix to be used as a searchable database. For example, one thought type might be the type "Person," which might include the attribute "City." Each thought of the Person type would then be assigned a specific "City" value by the user. Users could then request a search of the matrix for all thoughts involving persons they know who live in a certain city, by requesting a display of all thoughts on the "Person" type list, filtered as to those whose "City" attribute equals the desired value.

Similarly, the Brain enables users to create project plans, daily agendas, or to-do lists or other task-oriented thought lists and create relevant thought lists. First, the user assigns priority levels (e.g., "urgent," "important," "unimportant") or flags (e.g., "completed" or "incomplete") to thoughts as they work (see "Changing Thought Properties" above). The present invention enables users later to create a to-do list, for example, by searching for thoughts associated with a flag set in the "incomplete" position and a priority level of "urgent." The matrix search engine operates in a method similar to those widely used in commercially available database programs.

Layers. A set (or sets) of layers may be applied to every document in the Brain. Subsequently, these layers may be selectively activated and deactivated. Layers that are "on" are displayed and available for editing, while layers that are "off" are hidden. Examples of layers can be found in many applications well known in the art such as AutoCAD® by Autodesk and Photoshop® by Adobe.

Usage statistics. Usage statistics suitable for keeping track of billable time, productivity, work habits or efficiency may be generated and stored for each thought as the user works on that thought, according to the system clock. These statistics include time of creation, time of last modification, time of last access by user and the time (if applicable) at which the thought was "forgotten." Each thought also stores the total number of seconds the user has so far spent processing it, the number of "events" (keyboard and mouse clicks) that occurred, and the thought's modification history (e.g., a list of all dates when that thought was modified and how long each such modification took).

In some embodiments, the system supports interactive commands for requesting the display of these usage statistics. For example, in one embodiment, a user can request to view usage statistics falling within a given time period. The Brain preferences can be set so that the display reflects different aspects of the usage statistics. FIG. 3 demonstrates how one embodiment of the present invention can display usage information automatically. By default, some embodiments show a "C" next to each thought which was recently created (380); an "A" next to each thought which was recently accessed (380, 385); an "L" next to the last active thought (390, 395); and an "M" next to each thought which was recently modified (not illustrated). Alternatively, usage statistics may be reflected by differences in the color of thoughts, or by the addition of markers. For example, thoughts that have not been accessed for a relatively extended period of time might be displayed in a color such as gray that is less likely to attract the attention of the user.

Undoing and Redoing. Undoing and redoing of operations may be supported by an internally stored event list which keeps track of how data is affected and what is necessary to undo the effects of each event. When something is undone the undo event is recorded to the redo list to enable redoing.

Calendar Scheduling. By storing thought numbers in events, appointments, schedule data, or other time-based items, it is possible to associate 5 time-based events with thoughts. A calendar can then be used by the user to keep track of events and link related thoughts to the events. For example, in one embodiment, rather than displaying thoughts graphically in plexes, thoughts can be displayed on a calendar as demonstrated in FIG. 15. For example, the calendar event 1510 ("9:00 am meeting with Liquid Noise project team") may be associated with "Liquid Noise" thought 960. Some embodiments of the present invention permit a user to create that association by using the mouse/control device 160 to draw a line connecting the calendar event 1510 and the desired thought 960. When a user interactively selects calendar event 1510, thought 960 becomes the new central thought (as illustrated).

In addition, thoughts may be associated through calendar events with computer program operations. For example, if calendar event 1510 were associated with an alarm program, then at 9:00 am, the alarm would sound, and the present invention could also be configured to display a reminder message, or activate "Liquid Noise" thought 960 as the new central thought.

Preferences. Particular preferences relating to the operation of the presently disclosed technique may be selected by the user. The user may designate, for example, the set of colors to be used in the graphical representation of the interface and content organized thereby, the speed of the animation, the loading delay, the levels of thoughts to be displayed (e.g., which of the distant thoughts), and the wallpaper. Also saved to this table is information about the positioning of the various windows comprising the user interface and the information organized thereby.

Furthermore, all necessary information about the location of the present computer is stored with the preferences. Storage of this location information allows the user to move a matrix to another computer while preserving one's ability to access the files referenced by that matrix, provided that the files resident on the remote computer remain accessible from the computer to which that matrix is transferred.

F. Network-Related Features

Some embodiments of the Brain include features that enhance operability of the Brain in connection with both local and remote networks, including the Internet, as discussed below.

Remote Access to a Brain. Some embodiments of the present invention allow the use of a matrix with a second computer, although the matrix was originally created on a first computer. To the extent the files on this first computer may be locally accessed, for example through a local network, the present invention will simply access these local files. However, if the files on the first computer are not locally accessible, the Brain can copy such files from the first computer to the local computer; so that this change is incorporated into the operation of the present invention, the Brain will additionally change the location of the computer with the file (to the second computer) so that the file may be locally accessed.

Sharing Thought Documents. With most current operating systems, document sharing is based on the location of a file within a hierarchical file system. The Brain locates thought documents according to the desired sharing properties. When the user sets the sharing properties of a thought, the document is moved to a folder that possesses the requisite sharing properties. When thoughts are created, they are assigned the same sharing properties as the thoughts from which they are created. The user may optionally change the sharing properties of several thoughts by using the List manager to create a list of thoughts and subsequently assigning the desired sharing characteristics to the thoughts on this list.

Version Control. By associating a thought with a special document type that stores the names of multiple documents, a thought may be made to contain a plurality of documents. The initial steps for creating a thought that contains more than one version of a document are the same as those normally used for creating a thought. When the user wishes to create a second version, however, the create version command is interactively selected, and the user can name the new version and select its type. The user may alternatively select the default type for the new version, which is that of the old version. With this process, the location property is changed to a new file which lists the versions of the document and contains a name and location for each version. In the thought's data within the headcase, the current version number is set to the current version. The names and locations of different versions of a thought can be changed using the thought properties dialog box. A version control is displayed in proximity to an active thought having multiple versions. The user may select this control to display a list of all versions of that active thought, and may thereafter select a desired version from this list.

Selection Feedback. One embodiment of the present invention facilitates the user's navigation through the matrix by monitoring the position of the user's cursor or pointer and highlighting the elements on the display that the user could select given the present position of the user's pointing device. In other words, this feedback system indicates the elements that would be activated upon the depression of a selection button resident on the user's pointing device, in view of the present position of the pointing device. For example, a gate, link, thought, or any other display element could change color to indicate that the element would be selected if the user depressed a mouse button.

Matrices Referencing Other Thought Matrices. A thought type can be a matrix, so it is possible for one matrix to reference another matrix. For example, in one embodiment of the present invention, when an active thought is itself a matrix, a second instance of the Brain is started and it loads the appropriate matrix. This matrix is then displayed in a separate window. The ability of a user to create several matrices makes the present invention adaptable to a wide range of information storage needs, and accordingly diminishes the requisite complexity of individual matrices in cases suitable for multi-matrix storage schemes. In most of these cases, this added flexibility would likewise reduce overall system complexity. Furthermore, such an arrangement advantageously facilitates sharing of matrix data, as for example, a computer network administrator can more readily assign access privileges to single or multiple discrete matrices.

Linking Matrices. One embodiment of the present invention allows the user to link matrices together. In particular, when two matrices are displayed in separate windows, the user may copy a second matrix into a first matrix simply by dragging (with the cursor control device) from the first matrix to the second. The matrix that is dragged, the first matrix, is thereby linked to the active thought of the matrix to which it is dragged, the second matrix. The two matrices and all of their linked thoughts are thereby incorporated into the first matrix. Each of these thoughts from the second matrix that are copied into the first matrix must be renumbered during the copying process so that they do not conflict with previously-existing thoughts associated with the first thought matrix.

Matrix Sharing. A token system is used in one embodiment of the invention to allow multiple users to simultaneously modify a single matrix. In accordance with this system, when a user requests a modification, all other users are not permitted to make modifications until the matrix is updated to reflect the first user's modification. In a multiuser environment, the past thought list and other usage data may be stored once for each user, and optionally may be unified to produce data for all of the users.

Semi-Hierarchical Arrangement. In some instances, a user may prefer to arrange portions of their information in a traditional hierarchical manner. This may occur, for example, if the data is particularly susceptible to storage in a highly-structured manner and if the user has some preexisting familiarity with a hierarchical information storage structure. One embodiment of the present invention therefore allows users to store information in a purely hierarchical structure, and to access this data through traditional operating system methods. This traditional storage structure, however, may be integrated with the storage structure of the present invention to allow Brain-based storage of other data. For example, a company may wish to store information organized by the management divisions within the company. The company could create a set of folders for each division and then a second level of folders for each employee within a division; then, matrices may be placed within each employee folder, for example, corresponding to each individual employee.

Server Model for Sending Plexes. When a large matrix is created and subsequently must be accessed over a communications channel having a relatively narrow bandwidth, it is possible to send only data that is relevant to a user's location within that matrix. This is accomplished with client/server computer network architecture. In one embodiment, the client Brain identifies for the server the presently active thought. The server Brain then sends the numbers of all thoughts within the present plex, as well as the numbers of all thoughts that would become part of the plex upon the selection of any thought within the present plex. In other words, the server will send the number of the active thought, its children, parents, jumps, and siblings, as well as the children, parents, jumps, and siblings of those thoughts. This list of numbers is used by the client to determine which thoughts are already in the client's cache. Those thoughts that are already in the client's cache should be removed from the list, and then the list is returned to the server. At this point, the server sends the data corresponding to all thoughts remaining on the list. The above-described cycle is repeated upon the selection of a new central thought.

In another embodiment of the invention, an alternative procedure may be used to implement client-server communication. Specifically, on a client's first interaction with a server, the client sends an initialization message to the server that includes its location on the network. The server creates a blank list that may be of the same type as the ThoughtList used to identify isolated thoughts, and uses this list to identify the thoughts already sent to the client. Then, for each thought activated by the client's user, the client identifies the presently active thought to the server. In response, the server generates a list of thoughts having a predetermined relation (e.g., within a set number of generations) to the active thought, removes from the list any thoughts already present on the client, sends to the client the data corresponding to all thoughts remaining on the list, and adds these sent thoughts to its list of thoughts present on the client.

In accordance with these methods, the present invention minimizes the extent to which data is unnecessarily downloaded, and assures that data relating to the next-selected plex will be immediately accessible. The above-described methods enhance performance by minimizing the delay inherent in a client-server system constrained by a narrow bandwidth telecommunications facility.

Integration With Hypertext. One can incorporate matrices into hypertext by embedding so that the Brain is launched and displays the file when the hypertext page is loaded by a browser program. Alternatively, the file could be loaded and displayed in response to the selection of its link by the user. Furthermore, it is possible to define a matrix using text that is transferred to the Brain in a format such as: [Thought Number, Thought Name, Thought Location, Parents, 0, Children, 0, Jumps, 0]. Such a format could be embedded and created using a typical hypertext editor, and the Brain would simply convert this format into the normal file format and display it. Hypertext languages could also be modified to be more similar to the matrix structure simply by identifying links as either parent, child, or jump links. Such a modification would allow the present invention to base matrix creation directly upon a reading of the hyperlinks, without the need for an intermediate format conversion step.

Spider Site. Using the methods disclosed above, the present invention has the capacity to automatically generate a matrix corresponding to a map of a web site. A server can be employed to create and store such matrix-maps, and to send cached versions of the matrix-maps upon request. The sites to be mapped by this server may be identified through a list provided to the server, or the server could use web crawler techniques presently known to those of ordinary skill in the art to identify sites to be mapped.

G. Alternative Matrix File

In an alternative embodiment of the present invention, the characteristics of the above-described matrix and Headcase files may be modified to permit improved functionality for certain applications. The data architecture of this modified file, hereafter referred to as the ".brn" file, is illustrated in FIG. 16. As can be seen, the .brn file contains additional elements and a different organizational structure than the headcase file illustrated in FIG. 2. While multiple file structures are clearly permissible, the selection and implementation of a single standardized structure may be particularly advantageous; the use of a universal file format allows data to be transferable across different operating platforms. For example, a Brain created in a Microsoft Windows® operating environment could be read by a UNIX-based Brain. With this background, the principal differences between the .brn file and a generic matrix file are addressed below.

The .brn file stores all information describing the interrelation among thoughts. The file may be named by the user, and is assigned the extension ".brn." The Brain also creates a folder that is assigned a name similar to the .brn file, except that the folder is given the extension "_brn." A preponderance of the .brn file is composed of a flat file database. This structure allows thoughts to be located based on their numbers. As FIG. 16 illustrates, a thought's location in the .brn file is equal to the size of the header information, added to the size of the preference information, added to one less than the number of the thought multiplied by the size of a thought ("thought size" in the header information).

The _brn folder. All information specific to a Brain that is not contained in the .brn file is stored in the _brn folder. This folder may contain an index file for locating thoughts within the thought data, using either thought name or location. It may also contain a variable field length database for storing information relating to thoughts having unpredictable sizes, notes, and perhaps even files and versions of files. These notes may be created by a simple word processor capable of including OLE objects and thus pictures, spreadsheets, and other data. In one embodiment, notes relate to individual thoughts and are automatically loaded and saved as the associated thought is activated and deactivated. The _brn folder may also contain the past thought list, as well as the list of parentless thoughts.

Internal and External Files. Internal files, such as files located in the _brn folder, are deleted when their thoughts are permanently forgotten. Internal files are convenient because they are aggregated at a single location and are easily copied or backed-up along with the remainder to the _brn folder. External files are those not in the _brn folder, such as those in another folder, or stored remotely on a computer network including, for example, the Internet. As distinguished from internal files, these external files are not deleted when their thoughts are permanently forgotten because they could have some other use.

The user can request that an external file be converted to an internal file by selecting a "To Internal" command and specifying a location. In response, the Brain will then move the files to the specified location and will change the location of the thought file. The user can similarly use a "To External" command to convert an internal file into an external file stored at a specified location. The Brain implements this change by moving the file to the specified location and changing the location of the thought file. If the Brain attempts to create or move a file into the _brn folder, but the file name is already in use, the Brain will add a number to the end of the file name and will continue to increment that number until the conflict is resolved.

VIII. Thought/Link Filter

A. General System

As stated before, the "Brain" software is a computer program code for performing the tasks and steps described herein, including the digital representation of matrices, the display of graphical representations of such matrices, and the processing of such matrices in accordance with the principles of the present invention. Depending on the size of the matrix, the "Brain" software shows the entire matrix or a portion (i.e., the "plex") of the matrix on the display window.

As mentioned above, "thoughts" are pieces of interrelated information. A "matrix" is a flexible, associative network of digital thoughts. A matrix specifies a plurality of thoughts, as well as network relationships among the thoughts. Because the matrix structure is flexible, each thought may be connected to a plurality of related thoughts. A graphical representation of a portion of the matrix is displayed, including a plurality of user-selectable indicia (such as an icon) corresponding to the thoughts, and in some embodiments, a plurality of connecting lines corresponding to the relationships among the thoughts. In accordance with one embodiment of the present invention, the "Brain" allows filtering based on thoughts.

A "link" represents a relationship between at least two thoughts. In one embodiment of the invention, at least three types of relationships are possible among thoughts: child, parent, and jump. Each thought includes a separate list for each type of relationship. Each such relationship list stores a list of the other thoughts (identified by number) that are related to the instant thought by the instant type of relationship. The relationship lists are used to generate and navigate graphical representations of the matrix, as described in detail above, and are otherwise invisible to the user.

In some embodiments of the invention, the "Brain" contains another set of at least three types of relationships: for child, parent, and jump relationships, respectively, with archived information about those relationships which have been severed or "forgotten" but which may be reattached or remembered upon request by the user. These are past relationships. Essentially, this provides a long term memory facility that allows users to recall previous relationships when desired, without cluttering the current display with non-current data, as discussed above. ***

FIG. 26 shows a simplified class diagram of the Brain. It is a high level diagram of the relationship among the "Brain," "thought," and "link." Referring to FIG. 26, a Brain 3000 contains zero or more thoughts. Each thought 3001 belongs to one Brain. In some embodiments, each thought 3001 belongs to only one Brain 3000. Each thought 3001 is associated with a unique ID 3002, and each ID 3002 represents exactly one thought 3001. A link 3003 contains a reference to two IDs. These two IDs represent the tow connected thoughts, since a link connects two thoughts. In this sense, an ID represents a thought to the link. Thus, an ID may be referenced by zero or more links.

Generally, viewing the original matrix may suffice for most purposes. If whatever thought he's looking for is not found within the current plex, the user merely chooses a different central thought (and hence a different plex) to view other related thoughts. However, in many cases, viewing a filtered version of the matrix may facilitate the user's current task and may be more effective than merely choosing a different plex of the same matrix.

In another embodiment of the present invention, one aspect of the "Brain" software further reduces the visual complexity of the matrix presented to the user based on certain selected filter criteria. As further described below, various filtering techniques are implemented to provide the user with a flexible computing environment. Based on the filter criteria, portions of the original matrix are either included, excluded, or otherwise processed in the filtered view. The filter aspect of the present invention provides additional layers of control for the user to further fine tune the display to the user's preferences. Even without the filter, of course, one of the main purposes of the "Brain" software is to present a view to the user that is more useful and intuitive than the standard hierarchical view that is normally found on computer desktop windows.

With or without the filter in accordance with one embodiment of the present invention, the "Brain" will still display a view of the matrix as described above. However, the filtering mechanism allows the user to include, exclude, or otherwise fine-tune the original matrix based on thoughts and/or links as specified by the user. Within these thoughts and links, the user can select additional filter criteria.

By implementing the filter in accordance with one embodiment of the present invention, the "plex" (the displayed portion of the matrix) may be altered depending on which portion of the matrix is displayed. If the plex is that portion of the matrix that was affected by the filter, then the "Brain" displays a plex that is different from the one that would otherwise have been displayed without the filter. However, if the plex is that portion of the matrix that was not affected by the filter, then the "Brain" displays a plex that is the same as the one that would otherwise have been displayed without the filter.

B. Thought Filter

In accordance with one embodiment of the present invention, the system provides functionality for regenerating the original Brain matrix based on certain filter criteria that are associated with thoughts. Depending on the thought criteria input by the user, the system regenerates the matrix and displays the regenerated matrix in the manner specified by the user.

Various thought filter types are provided to allow the user to customize his matrix view. These filter types include Thought name, Thought keyword, Files associated with thoughts, Access control lists or permissions, Pinned thoughts, Visited thoughts, Other data associated with a thought, and Thought relationships to other thoughts. The user may specify the filter mechanism to filter based on these filter types or combination of these filter types. These various filter types will be discussed in more detail below.

Similarly, the user may customize the appearance of the regenerated matrix. The system may display those thoughts that match the filter criteria, that do not match the filter criteria, or otherwise visually indicate those thoughts that either did or did not match the filter criteria. In another embodiment, the user may toggle among these various display options very easily. These display options will be discussed below.

1. Thought Filter Display Options

If the user decides to implement the filter to "regenerate" the matrix, the Brain software can display the resulting filtered version in one of four ways. These four ways are as follows:

(1) Match only. The system does not display thoughts that do not match the filter criteria, so that the user only sees the thoughts that match the filter criteria. In this method, as the system reads a thought from the store, the thought is passed through a filter. If the thought matches the filter criteria, the system loads the thought into the matrix in memory, and is available for display. If the thought does not match the filter criteria, the system does not load the thought into the matrix, and will not be displayed.

(2) No match only—special indicator. The system displays thoughts that do not match the filter criteria in a distinctive manner (different color, font, or size) so that the user may easily see the difference between thoughts that do and do not match the filter criteria. In this method, as a thought is about to be displayed, it is passed through a filter. If the thought matches the filter criteria, the thought is displayed using normal colors. If the thought does not match the filter criteria, the thought is displayed using an alternate set of colors. For example, the unmatching filtered thoughts may be displayed using a special color (e.g., yellow, fluorescent green), underline, italicized, or some other method of clearly identifying the matched thoughts.

(3) Match only—special indicator. The system displays thoughts that match the filter criteria in a distinctive manner (different color, font, or size) so that the user may easily see the difference between thoughts that do and do not match the filter criteria. In this method, as a thought is about to be displayed, it is passed through a filter. If the thought matches the filter criteria, the thought is displayed using special colors. If the thought does not match the filter criteria, the thought is displayed using normal colors. For example, the matching filtered thoughts may be displayed using a special color (e.g., yellow, fluorescent green), underline, italicized, or some other method of clearly identifying the matched thoughts.

(4) No Match only. The system does not display thoughts that match the filter criteria, so that the user only sees the thoughts that do not match the filter criteria. In this method, as the system reads a thought from the store, the thought is passed through a filter. If the thought does not match the filter criteria, the system loads the thought into the matrix in memory, and is available for display. If the thought matches the filter criteria, the system does not load the thought into the matrix, and will not be displayed. This case is the opposite of the first case, where only matched thoughts are displayed.

In another embodiment, the user can switch among these four views with the click of a button. In essence, the user is capable of toggling among the four displays. So, at one instant in time, the user views the regenerated matrix where only those thoughts that satisfied the filter criteria are shown. In another instant, the user clicks a button so that he can view the regenerated matrix where only those thoughts that did not satisfy the filter criteria are shown. Finally, clicking a button (the same button or a different button) again will cause the system to display a regenerated matrix where those thoughts that matched (or alternatively, did not match) the filter criteria are displayed with special visible markers or indicators. With these four display techniques in mind, the system performs filtering on the original matrix based on several different types of filters.

Generally speaking, the user will typically use only display options (1) Match only and (2) No match only—special indicator. The user will want to view those thoughts that matched his filter criteria and perhaps view the unmatched thoughts in addition to the matches. However, all four views are supported in the system.

2. Thought Filter Types

The system provides a number of different types of thought filter functionality. Of course, within each filter type, the user must specify instances to activate the filtering mechanism. The following filter types are available:

Thought name

Thought keyword

Files associated with thoughts

Access control lists or permissions

Pinned thoughts

Visited thoughts

Other data associated with a thought

Thought relationships to other thoughts

The system also allows the user to filter the matrix using any combination of the above filter types using Boolean algebra (e.g., AND, OR, NOT). The following discussion further elaborates these filter types.

a. Thought Name

The system can filter based on thought names. Some examples of specific instances of thought names are as follows:

thought names starting with "MA"

thought names containing "so"

thought names ending with ".com"

thought names not starting with "Cj"

thought names not containing "no"

thought names not ending with "net"

So, to illustrate, the user can regenerate his matrix based on entering the filter criteria of thought names starting with "MA." Furthermore, the user may want the matrix to display only those thoughts that match this criteria. In a different session, he may enter a different thought name criteria like thought names ending with ".com" and request the system to only display those thoughts that do not match that criteria.

b. Thought Keywords

The system can filter based on thought keywords. Note that these are not thought names, but rather keywords that can be associated with one or more thoughts. Some examples of specific instances of thought keywords are as follows:

thoughts containing the keyword "specification"

thoughts containing the keywords "specification" and "internal"

thoughts not containing the keyword "external"

So, to illustrate, the user can regenerate his matrix based on entering the filter criteria of thought keywords of those thoughts containing the word "specification." Furthermore, the user may want the matrix to display only those thoughts that match this criteria. In a different session, he may enter a different thought keyword like "internal" and request the system to only display those thoughts that do not match that criteria.

c. Files Associated with Thoughts

The system can filter based on files associated with thoughts. Some examples of specific instances of files are as follows:

thoughts associated with a spreadsheet file thoughts not associated with an HTML file thoughts associated with a file name starting with "Br"

thoughts associated with a file name containing "spec"

thoughts associated with a file name ending with ".txt"

thoughts associated with a file name not starting with "Ad"

thoughts associated with a file name not containing "not"

thoughts associated with a file name not ending with "bak"

So, to illustrate, the user can regenerate his matrix based on entering the filter criteria of those thoughts that are associated with an HTML file. Furthermore, the user may want the matrix to display only those thoughts that match this criteria. In a different session, he may enter a different filter criteria like spreadsheet files and request the system to only display those thoughts that do not match that criteria.

IX. Access Control Lists or Permissions

The system can filter based on access control lists or permissions. Some examples of specific instances of access control lists or permissions are as follows:

thoughts that this user is permitted to read thoughts that this user is permitted to update So, to illustrate, the user can regenerate his matrix based on entering the filter criteria of thoughts that the user is permitted to read. Furthermore, the user may want the matrix to display only those thoughts that match this criteria. In a different session, he may enter a different or same filter criteria and request the system to only display those thoughts that do not match that criteria.

A. Pinned Thoughts

The system can filter based on pinned thoughts. As described above, thought pins are used to get instant access to commonly used thoughts. In the upper left corner of FIG. 3 are two thought pins 370 and 375, labeled "Rodin" and "Liquid Noise." Thought pins can be moved by the user to any location or deleted. To create a new thought pin, the user simply moves the cursor (using mouse/control device 160), and clicks on or otherwise highlights the existing thought for which a thought pin is to be created, and then selects a "Create Pin" command or the like from an ensuing pop-up command menu (such as menu 1210). Selecting an existing thought pin (e.g., using mouse/control device 160 to position the cursor over the pin, then clicking the control device's button) makes the pin-represented thought into the new central thought of the current plex. Note that thought pins may be represented internally by the number(s) of the thought(s) they reference and an explicit, user-specified display location. Some examples of specific instances of pinned thoughts are as follows:

thoughts that are not pinned thoughts.

thoughts that are pinned thoughts.

So, to illustrate, the user can regenerate his matrix based on entering the filter criteria of those thoughts that are pinned thoughts. Furthermore, the user may want the matrix to display only those thoughts that match this criteria. In a different session, he may request the system to only display those thoughts that do not match that criteria.

B. Visited Thoughts

The system can filter based on visited thoughts. Visited thoughts are thoughts that have been the active thought at some time during the current session using TheBrain. Some examples of specific instances of thought names are as follows:

thoughts that have not been visited.

thoughts that have been visited.

So, to illustrate, the user can regenerate his matrix based on entering the filter criteria of those thoughts that have been visited. Furthermore, the user may want the matrix to display only those thoughts that match this criteria. In a different session, he may request the system to only display those thoughts that do not match that criteria.

C. Other Data Associated With the Thought

The system can filter based on other data associated with thoughts. For example, in the case where the thoughts in the matrix represent rows of data from tables in a relational database, data from the row represented by the thought, or data in rows of related tables may be used to filter the thought. Some specific examples are as follows:

thoughts associated with the SALES table where "TOTAL_SALES" is greater than 1,000 thoughts associated with the CUSTOMER table where PRODUCT_ORDERED equals "My First Book"

thoughts associated with the EMPLOYEE table where "HIRE_DATE" is earlier than Dec. 31, 1998

So, to illustrate, the user can regenerate his matrix based on entering the filter criteria of those thoughts associated with the EMPLOYEE table where "HIRE_DATE" is earlier than Dec. 31, 1998. Furthermore, the user may want the matrix to display only those thoughts that match this criteria. In a different session, he may request the system to only display those thoughts that do not match that criteria.

D. Thought Relationships to Other Thoughts

A thought may be included or excluded based in information in one or more related thoughts as described in the thought type descriptions above. Some examples of specific instances of thought relationships to other thoughts are as follows:

thoughts linked to any thought with a name containing "mind"

thoughts linked to any thought associated to a spreadsheet file

So, to illustrate, the user can regenerate his matrix based on entering the filter criteria of those thoughts that are linked to any thought with a name containing "mind". Furthermore, the user may want the matrix to display only those thoughts that match this criteria. In a different session, he may request the system to only display those thoughts that do not match that criteria.

E. Any Combination of the Above Using Boolean Algebra

Thoughts may be filtered on a more complex criteria based on a combination of the criteria described above using Boolean operators. The available Boolean operators include AND, OR, and NOT.

thoughts with a name containing "spec" AND associated with a word processing document AND has not been visited OR thoughts containing "Project" AND NOT containing "Project X"

So, to illustrate, the user can regenerate his matrix based on entering the filter criteria of those thoughts with a name containing "spec" AND associated with a word processing document AND has not been visited OR thoughts containing "Project" AND NOT containing "Project X". Furthermore, the user may want the matrix to display only those thoughts that match this criteria. In a different session (or the same session), he may request the system to only display those thoughts that do not match that criteria.

F. Other Operators

The system in accordance with one embodiment of the present invention supports various other operators to facilitate the filtering operation, in addition to the Boolean ones. These other operators are as follows:

Whole Word Searches

Only whole words are searched. If the user enters the word "car" as a search term, a document containing the sentence "the most luxurious car on the road today" would match a whole word search but not a file containing the "the driver of the NASCAR vehicle" or "cartoon," unless these documents also had the word "car" as a separate word somewhere else in it.

Case Sensitive

The system can search based on case sensitivity—lowercase, uppercase, or combinations thereof. The default setting is non-case-sensitive.

Wildcard

The system supports wildcards such as "*" anywhere in the word. Use of a single "*" means that the system will search for all available characters and any number of characters at the location where the "*" was placed.

Paranthesis

Parentheses are also allowed to group terms as preferred by the user.

"Fuzzy" or

The system will retrieve all thoughts and documents having any of the words that are entered in the filter criteria.

NEAR Operator

The NEAR operator requires the two phrases or terms to be within a specified word count of one another to be counted as a successful search result. No maximum separation in word count is provided. The NEAR operator also does not care which phrases or terms on either side of the argument comes first, just so long as the two phrases or terms are within the specified distance.

BEFORE

The BEFORE operator works in the exact same manner as the NEAR operator, except that the user can specify which terms or phrases need to come first or second. For the BEFORE operator, the first term or phrase must occur before the second term or phrase within the specified word distance.

AFTER

The AFTER operator works in the exact same manner as the NEAR operator, except that the user can specify which terms or phrases need to come first or second. For the AFTER operator, the first term or phrase must occur after the second term or phrase within the specified word distance.

Ranking of Filtered Results

A document can contain various kinds of content, some of which may or may not be shown when a user views the document. These kinds of content include title, description, keywords, and the body of the document. Most of these types of content are provided by the author of the document. For example, the author creates the document and gives it its title. Using proprietary algorithms, when a filter criteria is evaluated by the system, the system can associate the filtered results with a relevancy ranking. In web search engines, for example, relevancy rankings are used to determine how the search results will be listed, with the most relevant results listed topmost and the least relevant search results listed at or near the bottom.

In accordance with one embodiment of the present invention, the system can also rank documents and although a list will not be displayed, the relevancy rankings will be presented near each thought or link. Though not hard and fast, five factors influence the ranking of a thought/link in a given filter query:

1. Order that a keyword term appears. Keyword terms that appear sooner in the document's listing or index tend to be ranked higher.
2. Frequency of keyword term. Keywords that appear multiple times in a document tend to be ranked higher.
3. Occurrence of keyword in the title. Keywords that appear in the document's title or description or keyword description fields (if any), are given higher weight than terms only in the document body.
4. Rare, or less frequent, keywords. Rare or unusual keywords that do not appear as frequently in the document are often ranked more highly than common terms or keywords.
5. Document/Thought visits. Keywords that appear in documents that have been opened or "visited" usually results in that document being given a higher relevancy ranking. Those documents that have been less "visited" are given lower relevancy rankings.

Thus, in accordance with one embodiment of the present invention, the relevancy ranking will be displayed adjacent to each thought/link based on the filter criteria. This may be a textual indication such as "72%" next to the icon representing the various thoughts in the plex.

X. Link Filter

In accordance with one embodiment of the present invention, the system provides functionality for regenerating the original Brain matrix based on certain filter criteria that are associated with links. Depending on the link criteria input by the user, the system regenerates the matrix and displays the regenerated matrix in the manner specified by the user.

Various link filter types are provided to allow the user to customize his matrix view. These filter types include Thought name, Thought keyword, Files associated with thoughts, Access control lists or permissions, Pinned thoughts, Visited thoughts, Other data associated with a thought, and Thought relationships to other thoughts. The user may specify the filter mechanism to filter based on these filter types or combination of these filter types. These various filter types will be discussed in more detail below.

Similarly, the user may customize the appearance of the regenerated matrix. The system may display those thoughts and links that match the filter criteria, that do not match the filter criteria, or otherwise visually indicate those links that either did or did not match the filter criteria. In another embodiment, the user may toggle among these various display options very easily. These display options will be discussed below.

A. Link Filter Display Options

If the user decides to implement the link filter to "regenerate" the matrix, the Brain software can display the resulting filtered version in one of four ways. These four ways are as follows:

(1) Match only. The system does not display links that do not match the filter criteria, so that the user only sees the links that match the filter criteria. In this method, as the system reads a link from the store, the link is passed through a filter. If the link matches the filter criteria, the system loads the link into the matrix in memory, and is available for display. If the link does not match the filter criteria, the system does not load the link into the matrix, and will not be displayed.

(2) No match only—special indicator. The system displays links that do not match the filter criteria in a distinctive manner (different color, font, or size) so that the user may easily see the difference between links that do and do not match the filter criteria. In this method, as a link is about to be displayed, it is passed through a filter. If the link matches the filter criteria, the link is displayed using normal colors. If the link does not match the filter criteria, the link is displayed using an alternate set of colors. For example, the unmatching filtered links may be displayed using a special color (e.g., yellow, fluroescent green), dotted lines, bolded thicker lines, or some other method of clearly identifying the matched links.

(3) Match only—special indicator. The system displays links that match the filter criteria in a distinctive manner (different color, font, or size) so that the user may easily see the difference between links that do and do not match the filter criteria. In this method, as a link is about to be displayed, it is passed through a filter. If the link matches the filter criteria, the link is displayed using special colors. If the link does not match the filter criteria, the link is displayed using normal colors. For example, the matching filtered links may be displayed using a special color (e.g., yellow, fluroescent green), dotted lines, bolded thicker lines, or some other method of clearly identifying the matched thoughts.

(4) No Match only. The system does not display links that match the filter criteria, so that the user only sees the links that do not match the filter criteria. In this method, as the system reads a link from the store, the link is passed through a filter. If the link does not match the filter criteria, the system loads the link into the matrix in memory, and is available for display. If the link matches the filter criteria, the system does not load the link into the matrix, and will not be displayed. This case is the opposite of the first case, where only matched links are displayed.

In another embodiment, the user can switch among these four views with the click of a button. In essence, the user is capable of toggling among the four displays. So, at one instant in time, the user views the regenerated matrix where only those thoughts that satisfied the filter criteria are shown. In another instant, the user clicks a button so that he can view the regenerated matrix where only those thoughts that did not satisfy the filter criteria are shown. Finally, clicking a button (the same button or a different button) again will cause the system to display a regenerated matrix where those thoughts that matched (or alternatively, did not match) the filter criteria are displayed with special visible markers or indicators. With these four display techniques in mind, the system performs filtering on the original matrix based on several different types of filters.

Generally speaking, the user will typically use only display options (1) Match only and (2) No match only—special indicator. The user will want to view those thoughts that matched his filter criteria and perhaps view the unmatched thoughts in addition to the matches. However, all four views are supported in the system.

B. Link Filter Types

The system provides a number of different types of link filter functionality. Of course, within each filter type, the user must specify instances to activate the filtering mechanism. The following filter types are available:

Type of Link
Access Control Lists or Permissions
Thought Name of one or both of the Thoughts
Thought Keywords of one or both of the Thoughts
Files Associated with one or both of the Thoughts
Other data associated with one or both of the Thoughts
Other data associated with the Link The system also allows the user to filter the matrix using any combination of the above filter types using Boolean algebra (e.g., AND, OR, NOT). The following discussion further elaborates these filter types.

C. Type of Link

The system can filter based on the type of the link. Some examples of specific instances of link types are as follows:

only jump links
only parent/child links

So, to illustrate, the user can regenerate his matrix based on entering the filter criteria of only parent/child links. Furthermore, the user may want the matrix to display only those thoughts and links that match this criteria. In a different session (or same session), he may enter a different or same filter criteria and request the system to only display those thoughts and links that do not match that criteria.

D. Access Control Lists Or Permissions

The system can filter based on access control lists or permissions. Some examples of specific instances of this type of filter are as follows:

links that this user is permitted to read.
links that this user is permitted to update.

So, to illustrate, the user can regenerate his matrix based on entering the filter criteria of links that this user is permitted to update. Furthermore, the user may want the matrix to display only those thoughts and links that match this criteria. In a different session (or same session), he may enter a different or same filter criteria and request the system to only display those thoughts and links that do not match that criteria.

E. Thought Name of One of the Thoughts

The system can filter based on the thought name of one of the thoughts. Remember, a link has, at most, two endpoints linking two thoughts. This type of filter allows the user to filter based on only one endpoint. Some examples of specific instances of this type of link filter are as follows:

thought names starting with "MA"

thought names containing "so"

thought names ending with ".com"

thought names not starting with "Cj"

thought names not containing "no"

thought names not ending with "net"

So, to illustrate, the user can regenerate his matrix based on entering the filter criteria of thought names not containing "no". Furthermore, the user may want the matrix to display only those thoughts and links that match this criteria. In a different session (or same session), he may enter a different or same filter criteria and request the system to only display those thoughts and links that do not match that criteria.

F. Thought Name of Both of the Thoughts

The system can filter based on the type of the link. As mentioned above, a link has, at most, two endpoints linking two thoughts. This type of filter allows the user to filter based on both endpoints of a link. Furthermore, the system can filter based on a combination of the above matches in addition to comparing the names of the two thoughts to each other. Some examples of specific instances of this type of link filter are as follows:

one thought name starting with "MA" and the other thought name containing "so"

one thought name equal to the other thought name one thought name not equal to the other thought name So, to illustrate, the user can regenerate his matrix based on entering the filter criteria of one thought name equal to the other thought name. Furthermore, the user may want the matrix to display only those thoughts and links that match this criteria. In a different session (or same session), he may enter a different or same filter criteria and request the system to only display those thoughts and links that do not match that criteria.

G. Thought Keywords of one of the Thoughts

The system can filter based on the thought keywords of one of the thoughts. Some examples of specific instances of this type of link filter are as follows:

one thought contains keyword "Think Tank"

So, to illustrate, the user can regenerate his matrix based on entering the filter criteria of one thought containing the keyword "Think Tank". Furthermore, the user may want the matrix to display only those thoughts and links that match this criteria. In a different session (or same session), he may enter a different or same filter criteria and request the system to only display those thoughts and links that do not match that criteria.

H. Thought Keywords of Both of the Thoughts

The system can filter based on the thought keywords of both of the thoughts. As mentioned above, a link has, at most, two endpoints linking two thoughts. This type of filter allows the user to filter based on both endpoints of a link. Some examples of specific instances of this type of link filter are as follows:

both thoughts contain keyword "TheBrain"

one thought contains keyword "document" and the other thought contains keyword "management"

So, to illustrate, the user can regenerate his matrix based on entering the filter criteria of one thought containing the keyword "document" and the other thought containing the keyword "management". Furthermore, the user may want the matrix to display only those thoughts and links that match this criteria. In a different session (or same session), he may enter a different or same filter criteria and request the system to only display those thoughts and links that do not match that criteria.

I. Files Associated With One of the Thoughts

The system can filter based on files associated with one of the thoughts. Some examples of specific instances of this type of link filter are as follows:

one thought associated with a spreadsheet file one thought not associated with an HTML file one thought associated with a file name starting with "Br"

one thought associated with a file name containing "spec"

one thought associated with a file name ending with ".txt"

one thought associated with a file name not starting with "Ad"

one thought associated with a file name not containing "not"

one thought associated with a file name not ending with "bak"

So, to illustrate, the user can regenerate his matrix based on entering the filter criteria of one thought associated with a file name ending with ".txt". Furthermore, the user may want the matrix to display only those thoughts and links that match this criteria. In a different session (or same session), he may enter a different or same filter criteria and request the system to only display those thoughts and links that do not match that criteria.

J. Files Associated With Both of the Thoughts

The system can filter based on files associated with both of the thoughts. As mentioned above, a link has, at most, two endpoints linking two thoughts. This type of filter allows the user to filter based on both endpoints of a link. The system can filter based on a combination of the above matches, in addition to comparing the files associated with the two thoughts to each other. Some examples of specific instances of this type of link filter are as follows:

one thought associated with a spreadsheet file and the other file starting with "Mc"

one thought associated with a file name that is the same as the file name associated with other thought So, to illustrate, the user can regenerate his matrix based on entering the filter criteria of one thought associated with a spreadsheet file and the other file starting with "Mc". Furthermore, the user may want the matrix to display only those thoughts and links that match this criteria. In a different session (or same session), he may enter a different or same filter criteria and request the system to only display those thoughts and links that do not match that criteria.

K. Other Data Associated With One of the Thoughts

The system can filter based on other data associated with one of the thoughts. Some examples of specific instances of this type of link filter are as follows:

one thought associated with the SALES table where "TOTAL_SALES" is greater than 1,000.

one thought associated with the CUSTOMER table where PRODUCT_ORDERED equals "My First Book".

one thought associated with the EMPLOYEE table where "HIRE_DATE" is earlier than Dec. 31, 1998.

So, to illustrate, the user can regenerate his matrix based on entering the filter criteria of one thought associated with the CUSTOMER table where PRODUCT_ORDERED equals "My First Book". Furthermore, the user may want the matrix to display only those thoughts and links that match this criteria. In a different session (or same session), he may enter a different or same filter criteria and request the system to only display those thoughts and links that do not match that criteria.

L. Other Data Associated With Both of the Thoughts

The system can filter based on other data associated with both of the thoughts. As mentioned above, a link has, at most, two endpoints linking two thoughts. This type of filter allows the user to filter based on both endpoints of a link. Some examples of specific instances of this type of link filter are as follows:

one thought associated with the SALES table where "TOTAL SALES" is greater than 1,000 and the other thought associate with the EMPLOYEE table where "NAME" is equal to "Fred"

So, to illustrate, the user can regenerate his matrix based on entering the filter criteria of one thought associated with the SALES table where "TOTAL_SALES" is greater than 1,000 and the other thought associate with the EMPLOYEE table where "NAME" is equal to "Fred". Furthermore, the user may want the matrix to display only those thoughts and links that match this criteria. In a different session (or same session), he may enter a different or same filter criteria and request the system to only display those thoughts and links that do not match that criteria.

M. Other Data Associated With the Link

The system can filter based on other data associated with the link. Some examples of specific instances of this type of link filter are as follows:

Links associated with data in the ORDERS table connecting the BOOKS table and RETAILER table where the order date is after May 1. (in this case information in the BOOKS and RETAILER tables would be represented by thoughts, and information in the ORDERS table is represented by links)

So, to illustrate, the user can regenerate his matrix based on entering the filter criteria of links associated with data in the ORDERS table connecting the BOOKS table and RETAILER table where the order date is after May 1. Furthermore, the user may want the matrix to display only those thoughts and links that match this criteria. In a different session (or same session), he may enter a different or same filter criteria and request the system to only display those thoughts and links that do not match that criteria.

N. Any Combination of the Above Using Boolean Algebra

The system can filter based on any combination of the above using Boolean Algebra. Thoughts may be filtered on a more complex criteria based on a combination of the criteria described above, and the Boolean operators AND, OR, and NOT.

XI. Storage of Thought/Link Filter Data

In accordance with some embodiments of the present invention, the system can store data several different ways. One way is as a file of fixed-length records, each record containing the Thought Name, Keywords, Location (URL), an array of Parent Thought IDs, an array of Child Thought IDs, and an array of Jump Thought IDs. In this case the ID of each thought is an integer corresponding to the record number in the file where the thought is stored. This method allows records to be loaded from the file as needed, and updates can occur on a record by record basis.

Another way the data is stored is as a file of variable-length records, each record containing the Thought ID, Name, Keywords, Location (URL), an array of Parent Thought IDs, an array of Child Thought IDs, and an array of Jump Thought IDs. This method requires the entire file to be loaded at once, and updates can occur only by re-writing the entire file. This file is typically a fraction of the size of the fixed record length file.

A third way the system stores data is as an image file of the Java object model in memory. This method allows the Thought IDs to complex objects instead of simple integers, which provides a mechanism for linking to information outside the Brain file. For example a complex ID could represent a particular thought inside of another Brain file, or it could represent a specific record in a specific table in a relational database. This method requires the entire file to be loaded at once, and updates can occur only by re-writing the entire file.

XII. Exemplary Thought/Link Filter User Interface

FIGS. 27–32 show some sample user interface views illustrating the concepts of the thought/link filter in accordance with one embodiment of the present invention. These figures show a matrix where the central thought is "MicroWidget." The displayed portion of the matrix, or the plex, is shown here with central thought "MicroWidget" linked to parent "New Products" and jump thought "Competitors." Under the parent "New Products" are "Megawidget" and "MetaWidget." Under central thought "MicroWidget" are child thoughts "Concept Doc," "MW Web Page," and "Spec Document."

In FIG. 27, the user interface shows a "Select" drop down menu. Here, the user selects his filtering preference based on "thoughts" or "links." Assume, for the sake of this example, that the user selects "thoughts."

In FIG. 28, the system's user interface shows a "where" drop down menu. Because "thoughts" were selected in the "Select" drop down menu, only those filter types that are associated with "thoughts" are listed in the drop down menu. If the user had selected "links" in the "Select" drop down menu, link type choices would be listed. Here, in this example, the user interface provides the user with three choices—filtering based on "thought names," "thought keywords," and "thought files." Assume, for the sake of this example, that the user selects "thought names."

In FIG. 29, the user interface of the system shows a string operator. In this particular example, three string operators are listed in the drop down menu—"Start With," "Contain," and "End With." Assume, for the sake of this example, that the user selects "End With."

In FIG. 30, the fourth drop down menu lists the various thought names that are contained in the Brain for this matrix. Assume, for the sake of this example, that the user selects "Widget" as the thought name.

At this point, the user may stop and invoke the operation of the filter in accordance with one embodiment of the present invention. However, the user can add more filter criteria. In FIG. 31, the user interface shows two Boolean operators—"OR" and "AND." Assume, for the sake of this example, that the user selects "OR" as Boolean operator.

By selecting the Boolean operator, the system now presents another line of filter criteria to the user, shown in FIG. 32. Here, for the sake of illustration, the user selects "thoughts" again, where "thought keywords" contain "Widget." At this point, the user may stop and invoke the operation of the filter in accordance with one embodiment of the present invention or even continue with a third line of filter criteria.

FIG. 33 shows the filtered matrix. Based on the filtered criteria chosen above with respect to FIGS. 27–32, FIG. 33 shows the plex where the "Competitors" thought has been removed or filtered out. In this example, the thought "Competitors" does not satisfy the filter criteria where the thought name ends with "Widget" or the term "Widget" appears as a keyword. In this example, perhaps the competitors of Acme Widget do not manufacture widgets and thus do not mention them at all.

XIII. Applications

The spectrum of applications covered by the various embodiments of the present invention is broad. The mere concept of organizing things based on thoughts that mirror the human brain's thinking process can be applied to various applications from client-based, client-server-based, and server-based.

A. Search Engines

Searching millions of pages on the Internet for a specific item can be a daunting task. However, the myriad of search engines and directories on the world wide web (WWW) have made it possible for users to find useful pieces of information. Exemplary single search engines and directories include: Alta Vista, Excite, Google, Hotbot, Inference Find, Infoseek, Lycos, Magellan, Megacrawler, Open Text, SavvySearch, WebCrawler, and Yahoo.

Internet directories can also be found on the web to assist users in finding various information. Exemplary internet directories include Argus Clearinghouse, BUBL Search, Net Resources List, Infoseek, Lycos, The Scout Report, Yahoo, and Yanoff's Internet Services List.

Some periodicals are also found on the Internet. Exemplary directories of electronic periodicals on the internet include: Association of Research Libraries, CARL Alliance ejournal access, CIC E-Journal Collection, ejournal, Electronic Newsstand, Guide, Voice of the Shuttle: humanities research, Yahoo's Journal List, and High Wire Press. Exemplary special indices include: Deja News, Four11, GovBot, Internet @ddress.finder, and Reference.com.

In addition to single search engines, other types of search engines have popped up to assist users. These other search engines include "meta" search engines that use various techniques to search across a number of different individual search engines simultaneously to obtain the benefits of each search engine. These "meta" search engines can often be customized for different types of searches allowing the user to select which search engines to use and some offer special categories that are not covered by typical search engines. The search result from a "meta" search engine is a single list of results that satisfy the user's search query. Exemplary "meta" search engines include: Inference Find, Internet Sleuth, MetaCrawler, and SavvySearch.

Another type of search engine is the "multi" search engines. These search engines are similar to "meta" search engines in that the user's search query is delivered to various different single search engines. However, the "multi" search engine does not try to combine the search results into one list. Instead, the "multi" search engine displays results from each search engine in a separate window. "Multi" index interfaces include: All in One and Starting Point.

All these search engines and directories list results in the conventional format. The Brain software in accordance with one embodiment of the present invention can map the search results into a usable thought-based matrix. By clicking on a thought, the browser will deliver the web page corresponding to the URL of that thought. However, because each search engine and directory has a different protocol and design, plug-ins may be required to interface the Brain software with the browser so that the Brain can interact with the search engine/directory effectively.

In accordance with another embodiment of the present invention, the Brain client software works with one or more plug-ins in an integrated fashion. As known to those ordinarily skilled in the art, plug-ins or plug-in applications are supplementary programs to the user's web browser which assist the web browser to provide dynamic content that the web browser alone could not provide, such as playing sound or video. These so-called helper applications run as a separate application and require that a second window be opened. Plug-ins are easily installed and used with the web browser. A plug-in application is recognized automatically by the browser and its function is integrated into the main HTML file that is being presented. Exemplary popular plug-ins are Adobe's Acrobat, a document presentation and navigation program that lets user's view documents just as they look in the print medium; RealNetworks' RealVideo or RealAudio streaming media players, and Macromedia's Shockwave for Director, an interactive animation and sound player. Hundreds of plug-ins are available for download/install on the web or install via CD-ROM.

The plug-ins are generally sponsored by and/or written by various service providers, web merchants, or any company for that matter. By definition, these plug-ins are other software applications in the PC that are called into service whenever the web browser, or in this case, the Brain client software needs them. Because these plug-ins are merely subservient support applications, their functions are controlled or otherwise limited by the Brain client software.

The kinds of functionality that can be supported by the plug-ins are limitless. However, a main function is to translate the user's filter query into a form that is understandable to the search engine or directory associated with that plug-in (e.g., Infoseek plug-in, lycos plug-in). The search engine performs its search, returns results back to the plug-in, and the plug-in interacts with the Brain software to organize the results so that a thought-based matrix is generated and displayed on the computer. If that search engine uses relevancy rankings, these rankings are also displayed in the plex. If the user enters filter criteria in accordance with one embodiment of the present invention, then the Brain software interacts with the plug-in again so that the appropriate communications/syntax protocol is followed. The resulting newly generated matrix is the filtered version of the search results.

In another embodiment, the thoughts are associated with URLs of specific web pages. By clicking on a thought (or right-clicking on a thought and invoking the "go to webpage" command), the Brain software, along with the plug-in accesses the web page associated with that URL. If the web browser is already open, that web page is accessed with the browser. If the web browser is not open, the plug-in opens the web browser and then accesses that desired web page associated with that URL. At this point, the user is free to navigate anywhere on that website, or anywhere else for that matter.

B. Client-Based Solution

As mentioned above, the Brain software resides and functions in the user's PC. At times, the Brain software can access the Internet and communicate with web servers by itself or with the assistance of the web browser. The installation of the Brain software can be accomplished in many different ways. The installation may occur over the web as the software is downloaded from a web server and then subsequently installed in the user's PC. Alternatively, the software can be installed via CD-ROM or floppy disk.

Furthermore, when the user buys a computer, the software may be bundled with the computer equipment so that installation is automatic.

In communicating with the web browser, the Brain software uses Java applets. When the Brain software needs to interact with a web page, the Java applet calls the appropriate ActiveX controls to perform basic functions associated with that web page. The deployment of ActiveX by the Brain software is routine and is known to those ordinarily skilled in the art. In this manner, some aspects of the Brain software are found in various servers that can be downloaded to the local client as they are needed. The basic Brain software however, is installed locally. Thus, as the user navigates from one search engine webpage to another, different functions may be supported. Some webpages may support certain limited filter functions and other webpages may support a much broader list of filter functions. As the user encounters these webpages, the user can download these different functions to extend the capabilities of the Brain software.

In other embodiments, the Brain software does not need the web browser to communicate on the web. After all, the Brain software can contain all functionality that is in the web browser in addition to the functions needed to generate and display the matrix. In a further embodiment, the Brain software is not needed as the web browser provides all the functions that the user will need. A Java applet downloaded via a Java VM can perform all the specialized Brain-related tasks including the thought/link filtering, while the web browser itself allows the user to communicate on the web.

C. Server-Based Solution

In the above description of the client computer, the Brain software is resident in the client to perform such tasks as generation of thought-based matrices, regeneration of thought-based matrices based on various filter criteria, performing some web-related action, and communication with selected web servers. Typically, all the necessary functionality is found in the Brain software. In some cases, however, the software that is needed to perform some functions is downloaded from a designated server on an as-needed basis. In other words, the Brain software in conjunction with a particular supporting web server determines whether a particular functionality is available in the client. If so, then the user can perform his Brain-related tasks by communicating with that web server. If not, the Brain software downloads that functionality from that web server so that the user can employ this functionality with this web server. These functionality may include certain filter operations. For example, one web server may allow filtering based on both thoughts and links, while another web server may allow filtering based on only thoughts. Also, one web server may allow nine different filter operators (e.g., AND, OR, NOT, NEAR, BEFORE, AFTER, WHOLE WORD, FUZZY OR, CASE SENSITIVE), while another web server may allow only three different filter operators (e.g., AND, OR, NOT).

In another embodiment, the server contains all the functionality described above for the client stations to generate the matrix using files that are located either locally or remotely at some server or database. The server also provides the filter functionality to regenerate the matrix based on certain selected filter criteria.

With thousands and thousands of webpages on the web, not every website will support the functionality of the present invention. The user, however, is unaware of which website supports the functionality of the present invention as he navigates from one website to another. Two solutions to this problem are offered—(1) webpage provides indication, and (2) client station provides indication.

In the first solution, the website itself will indicate that it supports the functionality and thus, the user will be able to take advantage of its many benefits. A simple brand logo can be this indication. In other cases, a more lengthy explanation will be provided on the website—something of the form “This website supports the Brain.” This instruction may be coupled with eye-pleasing graphics and other animation to make it clear to the user that Brain is supported. Thus, as the user surfs the web, he will be alerted to those websites that support the Brain functionality of the present invention.

In the second client station-based solution, the client station via the Brain software will provide the indication to the user. In this embodiment, the Brain software is installed in the client computer station. It is resident locally and is part of the System Tray set of applications. Normally, it is “asleep” in that it provides no apparent functionality to the user. However, it is operational and communicates with the web browser or whatever application is used to access the web. The special client software is installed in the client and “wakes up” whenever it detects a webpage that supports the Brain functionality. This is accomplished by providing a code in the accessed webpage.

As discussed above, some websites support the Brain functionality and others do not. Those websites that support the Brain functionality can embed a special code. This special code can be provided as part of the header text. When the user accesses a website that has this embedded code, the Brain software “wakes up” and alerts the user that this website supports the Brain functionality. This alert can be a flashing icon on the Icon Tool Bar of the user’s Windows desktop or some other visual or auditory cue.

In addition, different codes can be used in different webpages (or even in the same webpage) depending on the particular Brain function that it supports. These context- and function-sensitive codes can be detected by the Brain software to alert the user on the various Brain filter functions that these websites support.

The above description also applies to those websites that can show their respective site mapping in accordance with the embodiments of the present invention. In other words, these sites that support the Brain functionality can show a thought-based matrix instead of showing the site map in the conventional form. of course, different sites support different Brain filter functionality.

XIV. Connectors

As described above, TheBrain (or Brain) system is an easy-to-implement and comprehensive solution that provides for the generation and visualization of dynamic Brains based on existing databases. This is accomplished by modeling the underlying data into relationships and presenting the relationship in a user-friendly graphical way that enhance the user’s experience with the underlying data. By increasing access to data and explicitly modeling relationships among data, the Brain transforms raw data into useable information and creates a meaningful user experience.

On the Internet today, various companies and organizations maintain their own private repository of data. The ease of access to the data in these repositories range from limited to full access. In some cases, these companies and organizations allow the public to access the data in their repository. In other cases, these private repositories are strictly for internal use. In addition, regardless of whether the data was public or private, these databases were programmed with different languages that posed some communication difficulties.

The ease of use of the data in these repositories range from cumbersome to difficult. When the data involves relational databases, current methods of viewing data are confined to tables, columns, and folder hierarchies. Until now, the only way to visualize the aggregate of data contained within relational databases was to print complex reports.

In accordance with one embodiment of the present invention, the Brain system generates and visualizes large relational databases and gives users immediate access to edit and present data. The Brain system offers a solution that facilitates the capture of information from a company's relational database and showcases it in an engaging and dynamic visual interface. Furthermore, in accordance with another embodiment of the present invention, the Brain system can access data that are located in multiple databases and seamlessly regenerate the graphical matrices in a way that the existence of multiple databases is transparent to the user.

Referring now to FIG. 34, the Brain server 3101 is provided between a client computer station 3100 and a repository 3102. The client computer 3100 contains a Brain application and graphical user interface 3101 to interface with the Brain server 3101. Although direct connection is possible among these entities, in some embodiments, access is accomplished through a local or wide area network such as the Network 3104 between the client computer 3100 and the Brain server 3101, and Network 3105 between the Brain server 3101 and the repository 3102. of course, Network 3104 and 3105 can be the same network.

In this specific case, the necessary functionality needed for the Brain server 3101 to communicate with the repository 3102 is located within the Brain server 3101. Indeed, the Brain server 3101 and the repository 3102 speak the same language and no translation function is necessary. However, this case is hardly common. Most repositories speak different languages with different limitations and syntax.

A broader case is shown in FIG. 35. Here the set up is analogous to that of FIG. 34. A client station 3110 which includes a Brain application and user interface 3114 is coupled to Brain server 3111. The Brain server 3111 communicates with repository 3113 via connector 3112. The API 3115 contains set of uniform function calls that are known to the server 3111, allowing for the development of connectors to new repositories without the modification of the Brain server 3111. In one embodiment, the connector 3112 allows the Brain server 3111 to interface with any SQL-92 compliant relational database via JDBC or ODBC drivers.

The repository can be any kind of external software system. This external software system can be a database system such as a relational database or a document management system. Exemplary databases that can be Brain-enabled include Oracle, IBM DB2, Microsoft Access, Lotus Notes, Microsoft SQL Server, Sybase, Informix, and Corel Paradox.

In accordance with one embodiment of the present invention, the Brain system generates matrices representing the contents of data from an existing external software system, such as a relational database. From the active thought, which represents a piece of information in the external software system, other thoughts (parents, children, siblings, and jumps) represent other pieces of information in the external software system, related to the piece of information represented by the active thought by a specified relationship.

An example of an external software system is a relational database which will be used below to illustrate this concept. From the active thought, which represents a row in a table of a relational database, other thoughts (parents, children, siblings, and jumps) represent other rows in tables of a relational database, related to the row associated with the active thought by a specified relationship.

The Brain system provides a mechanism for a user to map the relationships that already exist in a relational database to the parent, child, jump, and sibling relationships in a matrix. The user specifies, for each table to be visualized in the database, which tables are to be represented in the matrix as thoughts, which fields within those tables should be used as thought names and other characteristics, which fields within those tables are to be used to link the thoughts, and what visual relationships those links should correspond to (parents, children, or jumps). When a thought in the matrix is activated, the Brain system uses the mapping mechanism to determine how to structure a database query to access rows representing the related thoughts of the new active thought. The Brain takes the information returned by the database query and loads thoughts into the matrix based on the mapping defined by the user for parents, children, jumps, and siblings.

To illustrate this concept and the relationship between a relational database and the Brain's matrix generation and mapping capabilities in greater detail, refer to FIG. 37. Assume the data in this relational database is for company XYZ. This particular relational database has several distinct tables—Customer Table, Contact Table, Employee Table, and an Order Table.

The Customer Table contains a list of customers of company XYZ and their respective ID numbers and sales representative ID numbers. For example, the Customer Table contains a company named Acme Widgets with ID 111. When this record is active in TheBrain, as displayed below the tables, all the related records are displayed as linked thoughts. The sales representative at XYZ company for Acme Widgets has employee ID number 200, which allows TheBrain to find and display the thought for Bob Johnson. The Contact Table contains names and the ID number of the customer that the contact name works for. For instance, Bill Smith has customer ID 111, indicating that Bill Smith is the customer contact for customer ID 111, Acme Widgets. Again, the related record is displayed in TheBrain. The Order Table contains information about orders that were placed for XYZ company's products/services. The information includes, among other possible things, the order number and customer ID number. The customer ID number allows TheBrain to find and display three related records. In order to create this display in TheBrain, a mapping was setup as described above that specified how the tables should be used and how relationships between thoughts should be visualized.

In accordance with one embodiment of the present invention, the Brain server retrieves data in these different tables from the repository database and presents them to the Brain client software. In some embodiments, the Brain server performs the relationship determination (e.g., parent, child, sibling, jump) and matrix generation. In other embodiments, the Brain server passes the relationship information to the Brain client software which in turn generates the matrix. In either case, a matrix is generated and displayed as shown in FIG. 37.

Assuming that the customer "Acme Widgets" (ID 111) has been selected as the active thought by the user of the client computer station, the Brain system determines the thoughts that are connected to this active thought. It can do this by retrieving all parents, children, jumps, and siblings of customer "Acme Widget" even though the records associated with these relationships are located in different tables. The relationships that have been set up in a prior session will be used in this instance.

The parent of thought "customer: Acme Widgets" is sales representative. Based on the table, the particular sales representative for "Acme Widgets" is employee Bob Johnson. They are linked through representative ID 200 in the Customer Table and ID 200 in the Employee Table.

The jump thought of active thought "customer: Acme Widgets" is contact. Based on the table, the particular contact for "Acme Widgets" is Bill Smith. They are linked through customer ID 111 in the Customer Table and customer ID 111 in the Contact Table.

A child thought of active thought "customer: Acme Widgets" is order number. Based on the table, one particular order for "Acme Widgets" is 990815. Similarly, another particular order for "Acme Widgets" is 991010. Finally, another particular order for "Acme Widgets" is 991103. They are all linked through customer ID 111 in the Customer Table and customer ID 111 in the Order Table.

Another example of an external software system is a document management system. In one embodiment of the invention, a shared matrix represents the objects contained by a document management system. When a thought is activated, the Brain system queries the document management system about objects that are related to the object associated with the new active thought. The document management system returns a set of objects and their relationship to the active object. The Brain system examines the set of objects and relationships, and displays thoughts on the plex to represent the objects. The Brain system displays a parent thought to represent any object that "contains" the active thought, a child thought to represent any object that is "contained by" the active object, and a jump thought to represent any object that is "related to" the active object.

The example illustrated in FIG. 37 is a results-oriented example. It illustrates the relationship between the matrix and the tables in a relational database. But it does not describe technically how this is accomplished.

To accomplish this mapping and matrix generation by the Brain system of data in a relational database, the Brain server 3111 communicates with the repository 3113 via the API 3115 of connector 3112 in FIG. 35. The connector 3112 provides a mapping and translation service 3115A for the Brain server 3111 so that, regardless of the kind of repository 3113 that needs to be accessed by the Brain server 3111 (and hence the user using client computer station 3110), the connector will allow the Brain server 3111 to communicate with the repository 3113. Depending on the type of repository, the mapping and translation functionality would need to be modified accordingly. However, if a flexible and robust application program interface (API) can be adhered to by the connector 3112, the mapping and translation function 3115A can be built easily. Thus, one Brain server can communicate with different types of repositories using one API 3115.

One use of the Brain server and the repository is as follows. In terms of the matrix displayed by the Brain, the Brain application 3114 at the client computer station 3110 makes various requests to the Brain server 3111. The user at client computer station 3110 accesses a matrix. The Brain server 3111 accesses the matrix from the repository 3113 via connector 3112. The user selects a thought, let's call this thought "Thought A." One such request is, having selected Thought A in the matrix, what other thoughts (i.e., parents, children, jumps, siblings) are connected to Thought A so that the complete matrix surrounding Thought A can be displayed? The response is to bring back these thoughts. Another exemplary request is, what other thoughts match my criteria? The response is to bring back these matching thoughts.

The Brain server 3111 makes the same request to the repository 3113 via connector 3112. More specifically, the Brain server 3111 uses the API 3115 of the connector 3112 by delivering a command understandable to the API 3115. The Brain server 3111 then communicates with the repository in a language and syntax that the repository 3113 understands to obtain those thoughts that are connected to Thought A.

One possible embodiment of interface classes for API3115 are listed and described in the following table (TABLE A):

A. TABLE A: CONNECTOR API CLASSES

| Class | Description |
|---|---|
| isReadOnly | public boolean isReadOnly( )<br>Gets the read-only status of this BrainStore.<br>Returns:<br>true if this BrainStore is read-only, false otherwise. |
| setReadOnly | public void setReadOnly(boolean val)<br>Sets the read-only status of this BrainStore.<br>Note: Not all classes implementing this interface will be read-write interfaces. After calling setReadOnly(false), it is recommended to call isReadOnly( ) to confirm that the BrainStore is indeed read-write.<br>Parameters: val - true for read-only,<br>false otherwise. |
| open | public BrainData open(java.lang.String name)<br>throws java.lang.Exception<br>Opens this BrainStore object.<br>Note: this BrainStore needs to recognize the string representation of the ID as a valid ID.<br>Parameters:<br>name - the string representation of the startup ID |

-continued

A. TABLE A: CONNECTOR API CLASSES

| Class | Description |
|---|---|
| | Returns:<br>reference to a BrainData object containing the information pertinent to the startup thought corresponding to name.<br>Throws:<br>java.lang.Exception - if name is not the String representation of a valid thought in this BrainStore. |
| close | public void close( )<br>throws java.lang.Exception<br>Closes this BrainStore object. Invoked by the Brain.close( ) method.<br>Throws:<br>java.lang.Exception - if there was an error closing this BrainStore.<br>See Also:<br>Brain.close( ) |
| saveThought | public void saveThought(Thought thought)<br>throws java.lang.Exception<br>Saves a Thought object.<br>Parameters:<br>thought - the Thought being saved.<br>Throws:<br>java.lang.Exception - if there was an error saving the Thought. |
| deleteThought | public void deleteThought(ID id)<br>throws java.lang.Exception<br>Deletes the Thought object corresponding to ID.<br>Parameters:<br>id - the ID of the thought being deleted.<br>Throws:<br>java.lang.Exception - if there was an error deleting the Thought. |
| createLink | public Link createLink(ID sourceId,<br>ID destinationId,<br>byte relType)<br>throws java.lang.Exception<br>Creates a Link object.<br>Note: Links in TheBrain are bi-directional. Creating a link by invoking createLink(idX, idY, Link.PARENT), is the same as creating the link by invoking createLink( idY, idX, Link.CHILD).<br>Parameters:<br>sourceId - the source ID object in the link relation.<br>destinationId - the destination ID object in the link relation.<br>relType - One of<br>Link.PARENT<br>Link.CHILD<br>Link.JUMP<br>Throws:<br>java.lang.Exception - if there was an error creating link.<br>See Also:<br>deleteLink(ID, ID), Link.getOpposite(byte) |
| deleteLink | public void deleteLink(ID sourceId,<br>ID destinationId)<br>throws java.lang.Exception<br>Deletes a Link object from this BrainStore.<br>Note: Links in TheBrain are bi-directional. Deleting a link by invoking deleteLink(idX,idY), is the same as deleting the link by invoking deleteLink(idY,idX).<br>Parameters:<br>sourceId - one of the ID objects in the link relation.<br>destinationId - the other ID object in the link relation.<br>Throws:<br>java.lang.Exception - if there was an error deleting the Link.<br>See Also:<br>#createLink(ID, ID) |
| getGenerations | public Generations getGenerations(ID id,<br>int numberOfGenerations,<br>boolean children,<br>boolean parents,<br>boolean jumps)<br>Gets a Generations object associated to ID.<br>Note: method usually invoked with only one of the boolean parameters set to true, however, in the rare cases when this method is invoked with all parameters set to true or all set to false, the method must return the thought corresponding to ID with a relation type of Link.NA.<br>Parameters:<br>id - the ID of the central thought we want to get the generations for. |

-continued

A. TABLE A: CONNECTOR API CLASSES

| Class | Description |
| --- | --- |
| | numberOfGenerations - the number of Generations we want to retrieve. (Note: currently TheBrain invokes this method with a value of 1).<br>children - true to retrieve children of the Thought with the specified ID, false otherwise.<br>parents - true to retrieve parents of the Thought with the specified ID, false otherwise.<br>jumps - true to retrieve jumps of the Thought with the specified ID, false otherwise.<br>Returns:<br>a reference to a Generations object containing all specified Thoughts and Links related to the Thought specified by ID. |
| getNewThoughtID | public ID getNewThoughtID(ID sourceId, byte relType) throws java.lang.Exception<br>Gets a new ID for this data repository. All IDs returned by this method MUST be unique, there cannot be two thoughts in the same data repository with the same ID object.<br>Parameters:<br>sourceId - a source ID to be used as a model for creating the new ID<br>relType - the relation type from the sourceId to the newly created ID.<br>Returns:<br>a new unique ID object.<br>Throws:<br>java.lang.Exception - if there was an error creating the new ID object. |
| toString | public java.lang.String toString( )<br>Returns the String representation of this BrainStore.<br>Overrides:<br>toString in class java.lang.Object<br>Returns:<br>String representation of this thought. |
| setID | public void setID(ID id)<br>Sets an ID for this BrainStore.<br>Parameters:<br>id - the ID being assigned to this BrainStore instance. |
| getID | public ID getID( )<br>Gets the ID of this BrainStore.<br>Returns:<br>a reference to the unique ID of this BrainStore instance. |

To illustrate the operation of the connector, refer to FIG. 36. A Brain server 3120 is coupled to connector 3121, which in turn is coupled to a repository via line 3124. Although the Brain server 3120 can use a single inter-process connection to communicate with the connector 3121, FIG. 36 shows two lines 3122 and 3123 for the purpose of illustrating its operation. The Brain server 3120 uses API-compliant commands to communicate with the connector.

Assuming that the user selected a thought on a matrix, the Brain server 3120 must now get a list of other thoughts that are connected to this active thought. These other thoughts include the parent, siblings, jumps, and children. For the child thoughts, the Brain server 3120 delivers a command "get children (tht ID)." The connector, after processing the "get children (tht ID)" command, returns a "Tht list" which is presumably all child thoughts connected to the selected active thought.

To illustrate the connector concept, refer to FIG. 37. The connector 3121 process the "get children (tht ID)" command in the following illustrative way:

```
ITEM ID = TRANSLATE TO (THT ID)
TYPE = GET TYPE (ITEM ID)
IF (TYPE == PUBLISHER) {
    CHILDREN = GET EMPLOYEES (ITEM ID)
} ELSE IF (TYPE == TITLE) {
    CHILDREN = GET BOOKSTORES (THT ID)
} ELSE...
RETURN CHILDREN
```

B. Mapping

The mapping functionality will now be discussed. As shown in FIG. 35, the mapping functionality resides in 3112A of the connector 3112. In order to create a custom Brain-enabled application with database access using the Brain connector API, Java code needs to be written that creates the Brain system's own representation of the tables in the database. It is also required to model, inside the application, the table interrelations that are of interest. This is performed creating a Database Mapping (a BSMap) holding BSMapElements (tables in the database), BSMap-Characteristics (columns within tables), and BSMapRelations (relations among BSMapElements).

This requirement forces the creator of new database-aware Brain-enabled applications to code, compile and test new Java source code, customized for his particular database. Changes to the database structure or porting the application from one database to another also require new versions of such programs to be generated.

Even when the process of creating such mapping, writing source code, is not too difficult, the need to hard code the database structure inside Brain-enabled applications can be avoided by having an external program-independent representation of database elements and interrelations. These would act as configuration files for the databases the Brain-enabled application is supposed to access.

Such independent representation should allow database modification without having to re-compile database-aware Brain-enabled applications. It should be possible to even move the application from one database to another, and create new applications just by editing the database representation files.

1. XML Database Mapping

The Database Mapping file format to be used within the connector API should be platform independent, accessible through plain text editors, and be able to represent the databases and relations necessary to map it into a BSMap usable inside Brain-enabled applications. In one embodiment, the XML (extensible markup language) meta-language satisfies these requirements and seems to be a suitable candidate for the task. Using XML also allows the database structure configuration to be available for other applications to use. On the following sections, the XML Database Mapping file format is presented.

2. XML Database Mapping Elements

The following is the list of valid elements to be included in XML Database Mapping representation files. Each of these elements can be represented as an XML tag inside configuration files:

3. BSMap

This is the root element of the XML document, representing an entire Database Mapping. It uses no parameters and can contain one Login element and a set of the rest of the elements defined for the XML format.

XML tags: <BSMap></BSMap>

Attributes: None.

BSMapElement

This element represents a database table inside the mapping. It can contain BSMapContent elements only.

XML tags:

BSMapElement VIRTUALTABLENAME="table name"></BSMapElement>

Attributes: VIRTUALTABLENAME, mandatory, the name of the table this element represents.

4. BSMapCompoundElement

As well as BSMapElement, this represents a database table inside the mapping, but this element can contain compound content; that is, more than one BSMapCharacteristic grouped under one BSMapContent element. It can contain BSMapContent elements only.

XML tags:

<BSMapCompoundElement VIRTUALTABLENAME="table name"></BSMapCompoundElement>

Attributes: VIRTUALTABLENAME, mandatory, the name of the table this element represents.

5. BSMapContent

This tag is a container grouping a set of BSMapCharacteristics (table columns) to provide the content of BSMapElements. It can only hold BSMapCharacteristic elements.

6. XML tags:

<BSMapContent TYPE="content type" SEPARATOR="separator"></BsMapContent>

7. Attributes:

TYPE: mandatory, valid values are: NONE, ID, NAME, LOCATION and METADATA.

BSMapCharacteristics under BSMapContent with type "ID" will be used as BSMapUniqueCharacteristics for the current BSMapElement.

SEPARATOR: optional, a character to be written between the set of elements that form this type of content, default value is ",".

8. BSMapCharacteristic

Represents a column inside a table. It can only contain the characteristic name.

XML tags:

<BSMapCharacteristic TYPE="characteristic type" TYPENAME="type name">characteristic name </BSMapCharacteristic>

Attributes:

TYPE: mandatory, the type of the BSMapCharacteristic, it can be one of the types defined in java.sql.Types (e.g. "Types.VARCHAR").

TYPENAME: mandatory, type name associated with the type (e.g. "VARCHAR").

9. BSMapRelation

This element represents a relation between two BSMapElements. It can contain one or more SourceMapElement/DestinationElement pairs.

XML tags:

<BSMapRelation TYPE="relation type"></BSMapRelation>

Attributes: TYPE: mandatory, valid values are: JUMP, CHILD, PARENT.

10. SourceMapElement

This tag represents a source BSMapElement in the relation we are describing. The BSMapElement must have been previously defined with its respective tag.

XML tags:

<SourceMapElement CHARACTERISTIC="relation characteristic">source map name</SourceMapElement>

Attributes: CHARACTERISTIC: mandatory, the characteristic to be used in the relation.

DestinationMapElement

This tag represents a destination BSMapElement in the relation we are describing. The BSMapElement must have been previously defined with its respective tag.

XML tags:

<DestinationMapElement CHARACTERISTIC="relation characteristic">source map name</DestinationMapElement>

Attributes: CHARACTERISTIC: mandatory, the characteristic to be used in the relation.

11. BSMapDBRelation

This element represents a BSMapRelation where the relation type is stored inside a BSMapCharacteristic (some column inside a table). It can contain one or more SourceMapElement/DestinationElement pairs.

XML tags:

<BSMapDBRelation VIRTUALTABLENAME="table name"CHARACTERISTIC="characteristic name"></BSmapRelation>

Attributes:

VIRTUALTABLENAME: mandatory, the name of the table to be used in the relation.

CHARACTERISTIC: mandatory, the name of a previously defined BSMapCharacteristic to be used to retrieve relation types. This table column must contain only "H" or "J" values "H" values representing a hierarchical relation and "J" a jump relation.

12. Login

The Login element contains the information needed to connect to the database the BFC application has to access. It is made of one Driver, one URL, one UserId, and one Password element.

XML tags: <Login></Login>

Attributes: None.

Driver

It specifies the driver to use when connecting to the database.

XML tags:

<Driver>driver name</Driver>

Attributes: None.

13. ConnectionURL

This is the URL pointing to the database the BFC application needs to access

XML tags:

<ConnectionURL>database URL</ConnectionURL>

Attributes: None.

UserId

This element defines the user name to use when accessing the database.

XML tags:

<UserId>user name</UserId>

Attributes: None.

Password

This is the password for the user defined in the UserId element.

XML tags:

<Password>user password</Password>

Attributes: None.

The following are optional tags to be included inside the Login element. They are used to specify parameters for the database connection:

ConnectionPoolSize

XML tags:

<ConnectionPoolSize>size</ConnectionPoolSize>

ConnectionPoolMax

XML tags:

<ConnectionPoolMax>maximum</ConnectionPoolMax>

ConnectionUseCount

XML tags:

<ConnectionUseCount>count</ConnectionUseCount>

ConnectionTimeout

XML tags:

<ConnectionTimeout>time</ConnectionTimeout>

Sample XML Database Mapping.

This is the XML representation of the mapping implemented in the jdbcOdbc example included in version 3.0 of the Brain SDK:

```
<?xml version="1.0"?>
<!DOCTYPE BSMap SYSTEM "DTD/BSMap.DTD">
<BSMap>
<Login>
    <Driver>sun.jdbc.odbc.JdbcOdbcDriver
    </Driver>
    <ConnectionURL>jdbc:odbc:BasicBrainDB
    </ConnectionURL>
    <UserId>sa
    </UserId>
    <Password/>
</Login>
<BSMapCharacteristic TYPE="Types.VARCHAR" TYPENAME="VARCHAR">
Rel
</BSMapCharacteristic>
<BSMapElement VIRTUALTABLENAME="Thoughts">
    <BSMapContent TYPE="ID">
        <BSMapCharacteristic TYPE="Types.INTEGER" TYPENAME="INTEGER">
        id
        </BSMapCharacteristic>
    </BSMapContent>
    <BSMapContent TYPE="NAME">
        <BSMapCharacteristic TYPE="Types.VARCHAR" TYPENAME="VARCHAR">
        Name
        </BSMapCharacteristic>
    </BSMapContent>
    <BSMapContent TYPE="LOCATION">
        <BSMapCharacteristic TYPE="Types.VARCHAR" TYPENAME="VARCHAR">
        location
        </BSMapCharacteristic>
    </BSMapContent>
    <BSMapContent TYPE="METADATA">
        <BSMapCharacteristic TYPE="Types.VARCHAR" TYPENAME="VARCHAR">
        meta
```

-continued

```
            </BSMapCharacteristic>
        </BSMapContent>
</BSMapElement>
<BSMapElement VIRTUALTABLENAME="Links">
        <BSMapContent TYPE="NONE">
            <BSMapCharacteristic TYPE="Types.INTEGER" TYPENAME="INTEGER">
            AID
            </BSMapCharacteristic>
        </BSMapContent>
        <BSMapContent TYPE="NONE">
            <BSMapCharacteristic TYPE="Types.INTEGER" TYPENAME="INTEGER">
            BID
            </BSMapCharacteristic>
        </BSMapContent>
</BSMapElement>
<BSMapDBRelation VIRTUALTABLENAME="Links" CHARACTERISTIC="Rel">
        <SourceMapElement CHARACTERISTIC="id">
        Thoughts
        </SourceMapElement>
        <DestinationMapElement CHARACTERISTIC="AID">
        Links
        </DestinationMapElement>
        <SourceMapElement CHARACTERISTIC="BID">
        Links
        </SourceMapElement>
        <DestinationMapElement CHARACTERISTIC="id">
        Thoughts
        </DestinationMapElement>
</BSMapDBRelation>
</BSMap>
```

The Brain system is a powerful means to enable various applications where data already exists in relational databases or other third-party repositories. In particular, the Brain system supports powerful dynamic web applications such as Help Desk/Online Help Information, Product catalogs and online sales, research (e.g., pharmaceutical, educational), educational courses, and course catalogs, just to name a few. The Brain system can also be potentially very useful in the application development areas of project and knowledge management, corporate directories, CRM, decision support systems, and internal application front-end.

XV. Permissions and Access Control

The substantive benefits and user-friendly aspects inherent in the Brain system provide an ideal context for collaborative communication. TeamBrain, or the Brain system in a collaborative environment, allows people to view relationships among the various pieces of information. These relationships are not just between documents stored in TeamBrain, but also the relationships to web pages and network files. The collaborative environment allows people to understand information in the context of a much larger global picture. An example of shared content is the matrix of thoughts described in this patent specification. As in the non-collaboration context, TeamBrain allows thoughts to be associated with content and notes. Thoughts can contain files, web page shortcuts, network file shortcuts, and annotation notes.

A. Collaborative Environment

An example of a collaborative environment is shown in FIG. 38. A TeamBrain server 3170, which is the Brain server that has been modified for the collaborative computing environment, resides at the heart of this network. The TeamBrain server 3170 can be coupled to one or more repositories and one or more connectors, as described above in the Connectors section. However, these connectors and repositories are not shown in FIG. 38 for clarity.

The TeamBrain server 3170 can be coupled to client computer stations 3171, 3172, and 3180 directly. The TeamBrain server 3170 can also be coupled to client computer stations 3174 and 3175 through a local area network 3181. The TeamBrain server 3170 can also be coupled to client computer station 3176 through a wide area network (WAN) such as the Internet 3182. Finally, TeamBrain server 3170 can also be coupled to client computer stations 3177, 3178, and 3179 through both the wide area network (WAN) like the Internet 3182 and a LAN 3183. The configuration possibilities are not limited to that shown on FIG. 38.

In this example, the collaborative environment contains three groups (groups A, B and C) and three individual client stations (3171, 3174, and 3180) that do not belong to any group. In one embodiment, each client computer station belongs to some group even if that group contains only one member. Thus, six groups are shown in FIG. 38—groups A, B, and C, along with individual client stations 3171, 3174, and 3180, who each belong to its own group. The group a client station is in is not fixed for that physical machine, but rather it is determined by the group the user that is logged onto that client station is in.

B. Multiple Levels of Access

The ability of many users to collaborate on a single shared matrix may require multiple levels of access for different users. Effective collaboration is based on the ability to share required information and work without sharing too much. TeamBrain allows content owners to control the degree of sharing by assigning any number of groups or users the permission to read, edit, delete, or link to each piece of content.

As mentioned above, the TeamBrain server 3170 allows a plurality of users to access a shared matrix. Depending on the permissions and access control configurations of each user and group, the ability of a user to access or perform some action on the matrix can be controlled. To use one example, a user at one client station can publish the matrix (or a portion of the matrix) to a shared network of other users. A user at another client station can access and modify that shared matrix. However, another user can access that shared matrix but cannot modify it. Still another user cannot even access a high security-sensitive portion of the matrix while others can.

Login

A simple login is the access point for TeamBrain. TeamBrain stores information pertaining to each user including, but not limited to, username, user ID, and password. Each user is identified to TeamBrain when they log in to the TeamBrain system, which compares the login data entered by the user with the stored user ID and password in order to authenticate the identity of the user. Each user may belong to one or more groups, and a group may, in turn, belong to another group. Depending on which group a user belongs to, if any, access control will vary. The User information can be stored either internally in the TeamBrain server or in some external system.

In addition to these logins, TeamBrain allows for anonymous logins. The anonymous login option provides the ability to create read only access for a large number of users with minimal administrative overhead. User IDs and passwords do not have to be created for anonymous users. Group membership can be centrally controlled by a single administrator, or distributed among a number of users, controlling groups on a project-by-project basis.

In essence, TeamBrain allows each user to have a different point of view based on their login. The relationships (or links) that are visible will be different based on the permissions granted to that user in the access control lists.

C. Access Control Lists

Each thought has a unique Access Control List (ACL) associated with it, and an ACL for each of the content items belonging to that thought. As the thought is loaded from the shared matrix, the TeamBrain server checks the user's access privileges for the thought. If the user does not have access privileges to read the thought, the thought is not displayed on the plex. If the user does have access privileges to read the thought, the thought is displayed on the plex as usual. However, if a user does not have access privileges to modify a thought, the relevant user interface controls to modify the thought will not be displayed. When the user initiates some action on a thought, such as renaming the thought, the TeamBrain server again checks the user's access privileges for the thought and the performs the action if and only if the user has sufficient access privileges to perform the action. This also applies to files within a thought.

In the case where thoughts in the shared matrix represent data in an external software system, the TeamBrain system uses the permissions system in the external software to protect the integrity of the existing data. In one embodiment, the thoughts in the matrix represent documents in a third party document management system. As a thought is loaded from the shared matrix, the TeamBrain system queries the external system to determine the user's access privileges for the thought. If the user does not have access privileges to read the thought, the thought is not displayed on the plex. If the user does have access privileges to read the thought, the thought is displayed on the plex as usual. When the user initiates some action on a thought, such as deleting the thought, the TeamBrain system checks the user's access privileges for the thought and performs the action if and only if the user has sufficient privileges to perform the action.

Access Control attributes that apply to the internal contents of a thought include:

A—administrator control: ability to change attributes or ACL assignment.

F—full control: overrides R, W, C, D, L, U, and M; user also has the ability to change attributes or ACL assignment.

R—read access: user can read this thought.

W—write access: user can modify the internal contents of this thought.

C—create access: user can create parent, child, and jump thoughts of this thought.

D—delete access: user can delete this thought.

L—link access: user can link to other thoughts from this thought.

U—unlink access: user can unlink other thoughts from this thought.

M—move link access: user can move a link among the active thought's parent, child, and jump gate.

Access Control attributes that apply to the contents attached to a thought include:

F—full control: overrides R, W, C, D.

R—read access: user can read the external contents of this thought.

W—write access: user can modify the external contents of this thought.

C—create access: user can create new external contents for this thought.

D—delete access: user can delete external contents for this thought.

Each access control attributes can have one of three values:

Allow this access (e.g., "R" or "+R")

Deny this access (e.g., "−R")

Unspecified: access is denied by default.

To illustrate the use of the above terminology, a Sales Group that is associated with "+R+W" access control attributes means that the users in that group have read and write capabilities. On the other hand, an Engineering Group with "+R" access control attribute only has read access.

Storage

Assume that the following table describes one particular TeamBrain group:

TABLE B

STORAGE EXAMPLE

| User | Group | Permission Objects | Thought Objects | Type |
|---|---|---|---|---|
| Joe Smith | Sales | Sales +R +W | Q | specified |
| Jane Doe | Sales | ENG +R | P | inherited |
| Jim Johnson | Engineering | | | |
| Jeff Jackson | Engineering | | | |
| Julie Jefferson | Engineering | | | |

Two thoughts exist in this matrix, Q and P. Five users are associated with two groups, Sales and Engineering. Each of these users and groups are associated with permission objects. Here, the sales team has read and write access to thought Q, while the Engineering group has read access to thought P. The permission relationships between thoughts Q and P are also provided. The TeamBrain system stores four pieces of information related to permissions—the permission objects, thought objects, the groups and users, and the type of permission.

D. Inheritance—Generally

When users access the same shared matrix, one of the primary issues is the handling of permission inheritance. As users add thoughts, delete thoughts, add links, and delete links, what kinds of access control attributes should be assigned to the thoughts in the modified matrix? Depending on the relationships between the thoughts (parent-child, jump-child, child-sibling, etc.), the TeamBrain system makes some access control attributes "inherited" while others are "specified."

Generally, thoughts comprise three groups:

Thoughts with an ACL inherited from another thought

Thoughts with an ACL specified for the thought and not inheriting an ACL from another thought Thoughts with an ACL inherited from another thought and an additional ACL specified for this thought As mentioned above, ACLs can be specified, inherited, or both. The inheritance rules below dictate how ACLs should be handled for the various thoughts as these thoughts are created/deleted and links are created/deleted. They answer the following questions for the variety of situations that can be encountered: Should the ACL be specified or inherited? Should a prior pre-specified ACL be removed from a thought and have the thought inherit from another thought instead? Should a prior inherited ACL be removed and have the ACL specified instead?

In a hierarchy or tree structure, used by operating systems like Unix® or Windows®, each file or folder only has one possible place to inherit an ACL from, namely the folder that contains that item. In a hierarchical system, ACL inheritance is trivial, because any item has exactly one potential item to inherit an ACL from. Inheritance of ACLs in the Brain is a difficult problem to overcome, because of the rich and complex relationships that may be created in a Brain matrix. Any thought may have a multiplicity of parent, child or jump relationships, each of which could be a potential source of ACL inheritance. In a Brain matrix, a thought can be its own grandchild.

A simple illustration of the problems related to implementing inheritance in a network structure will now be discussed with respect to FIG. 39. FIG. 39 shows thought A as a parent to thoughts B and C. Thought A has an access control list of the SALES group having read and write permissions and the ENGINEERING group having just read permission. As shown by the dotted line, thought B inherits from thought A so it inherits the access control list of thought A. Thought C, however, has a specified ACL of the SALES group having read and write permissions and the ENGINEERING group having read and write permissions. Thought D is a child of both thoughts B and C. Should it inherit from thought B or C? Should it its permissions be specified instead? When a new link 3130 is created between thoughts D and A, what should the inheritance relationships be for these thoughts in this matrix? Should the parent A inherit from its grand-child D? If thought D inherited from thought B, should thought A inherit from thought D?

One brief example will shed some light on the inheritance rules that are outlined below. When a parent "P" is created, it automatically gets its permissions set (specified) to those of the thought "A" it is being created from. This is different from inheriting them as setting the permissions occurs only at the time of creation of the thought "P". If the new parent "P" is the only parent of thought "A," and thought "A" had permissions set for it, they are removed and thought "A" begins inheriting from the newly created parent "P" instead.

Access control lists (ACL) are inherited through parents or, if no parent exists, jumps. In the case of multiple parents, one parent is designated the primary parent and serves as the inheritee (the thought permissions are inherited from). In the case of a thought without parents, one jump is designated as the primary jump and serves as the inheritee. A thought cannot inherit permissions from a child. All thoughts without parents or jumps must have ACLs assigned to them. Primary jumps and parents are initially determined based on which thought was linked first, but can be changed via a user specification.

The Brain user interface also shows some indication of the inheritee-inheritor relationship on the plex. The plex displays the active thought with an outline showing the identity of its inheritee.

E. Inheritance—Rules

The following eleven (11) rules dictate how inheritance principles are applied to the creation/deletion of thoughts and the creation/deletion of links:

1. The ACL for a thought must be explicitly specified if the thought has no parent and no jump thoughts; inheritance is not allowed.
2. Inheritance cannot be recursive. A thought cannot inherit an ACL from a thought that (directly or indirectly) inherits an ACL from it.
3. If a thought has no parent thoughts, but one or more jump thoughts, then it will inherit an ACL from the primary jump thought, unless the thought is specifying but not inheriting an ACL.
4. If a thought has one or more parent thoughts, then it will inherit an ACL from the primary parent thought, unless the thought is specifying but not inheriting an ACL.
5. When unlinking a thought from the thought it is inheriting an ACL from, and one or more parent thoughts remain, the first acceptable (non-recursive) parent that can be found will be the primary parent. If no acceptable parent thought can be found, the ACL for the thought will be specified to be the same as the effective ACL before the unlinking. (See rules 2 and 4)
6. When unlinking a thought from the thought it is inheriting an ACL from, and one or more jump thoughts remain but no parent thoughts, the first acceptable (non-recursive) jump that can be found will be the primary jump. If no acceptable jump thought is found, the ACL for the thought will be specified to be the same as the effective ACL before the unlinking. (See rules 2 and 3)
7. When unlinking a thought from the thought it is inheriting an ACL from, and no parent thoughts or jump thoughts remain, the ACL for the thought will be specified to be the same as the effective ACL before the unlinking. (See rule 1)
8. When adding a parent link to a thought where no other parent thoughts exist and the thought is inheriting from a primary jump thought, the new parent will be the primary parent and the thought will now inherit an ACL from it. (See rule 4)
9. When adding a parent link to a thought which has specified an ACL, where this specified ACL is equivalent to the ACL that would be inherited from the new parent thought, and inheriting the ACL from the new parent thought would not cause inheritance recursion, the new parent will be the primary parent and the thought will now inherit the ACL from it. (See rule 3)
10. When creating a new thought that is a child thought of an existing thought, the existing thought will be the primary parent for the new thought and the new thought will inherit the ACL from the existing thought. (See rule 4)

11. When creating a new thought that is a jump thought of an existing thought, the existing thought will be the primary jump for the new thought and the new thought will inherit the ACL from the existing thought. (See rule 3)

F. Inheritance—Application of Rules

The rules outlined above will now be discussed in greater detail. In many cases, examples will be used to teach the invention.

Rule 1

1. The ACL for a thought must be explicitly specified if the thought has no parent and no jump thoughts; inheritance is not allowed.

This is a very basic rule. A thought can be created in isolation without any reference to any other thought. If a thought has no parents and jumps, it has no source for an ACL other than having an ACL specified for it. Only if a thought has a parent or jump, can it inherit an ACL.

Rule 2

2. Inheritance cannot be recursive. A thought cannot inherit an ACL from a thought that (directly or indirectly) inherits an ACL from it.

FIG. 40 shows an inheritance relationship that is allowed. FIG. 40 shows three thoughts 3190, 3191, and 3192. Thought 3190 is a parent of thought 3191 via link 3193. Thought 3191 is in turn a parent to its child thought 3192 via link 3194. Thought 3190 has a specified ACL, while thoughts 3191 and 3192 have an inherited ACL and, optionally, an additional specified ACL. Thus, thought 3191 inherits from thought 3190 and may additionally have a specified ACL. When a loop-back link 3195 is created between thought 3192 and 3190, making thought 3190 a child of 3192, thought 3190 cannot inherit an ACL from thought 3192.

FIG. 41 shows an inheritance situation that is not allowed. FIG. 41 shows three thoughts 3196, 3197, and 3198. Thought 3196 is a parent of child thought 3197 via link 3199. Thought 3197 is in turn a parent to its child thought 3198 via link 3200. Finally, thought 3198 is a parent of child thought 3196 via link 3201. Thoughts 3196, 3197, and 3198 have an inherited ACL and, optionally, a specified ACL. Each thought, (3196, 3197, and 3198) would indirectly inherit an ACL from itself. Although a Brain matrix supports circular references between thoughts, Rule 2 prohibits this type of inheritance in order to prevent this circular reference paradox.

Rule 3

3. If a thought has no parent thoughts, but one or more jump thoughts, then it will inherit an ACL from the primary jump thought, unless the thought is specifying but not inheriting an ACL.

Unlike a hierarchy, a thought in a Brain matrix does not have to have a parent. This rule provides a mechanism for thought inheritance in the cases in a Brain matrix where a thought has no parents.

Rule 4

4. If a thought has one or more parent thoughts, then it will inherit an ACL from the primary parent thought, unless the thought is specifying but not inheriting an ACL.

Because a thought in a Brain matrix can have more than one parent, one of these parents will be designated the primary parent, which the thought may inherit an ACL from. Primary parent and jump thoughts can be determined many ways. One way is to assign a parent (or jump) as a primary parent (or jump) based on the user's preferences. Another way is to assign a parent (or jump) as a primary parent (or jump) based on a first-in-time rule. In FIG. 49A, a child thought 3291 inherits ACL from an existing parent thought 3290. The existing parent thought 3290 can have an ACL that is inherited or specified. When a new parent 3293 is linked to this same child thought 3291, as shown in FIG. 49B, the child thought 3291 still retains its inherited ACL from the primary parent thought 3290.

Rule 5

5. When unlinking a thought from the thought it is inheriting an ACL from, and one or more parent thoughts remain, the first acceptable (non-recursive) parent that can be found will be the primary parent. If no acceptable parent thought can be found, the ACL for the thought will be specified to be the same as the effective ACL before the unlinking. (See rules 2 and 4)

When a thought is inheriting an ACL and it is unlinked from its inheritee parent, this rule defines a way to attempt to allow the thought to continue inheriting an ACL from another parent. Unlinking causes the Brain system to scan the thoughts of the remaining links to determine acceptable parents. Any criteria can be used to determine the order of the remaining parents the Brain system seeks to find the acceptable primary parent. One order is random; that is, the Brain randomly selects another parent thought to examine its acceptability. Another order is time-based; that is, the Brain selects another parent thought that is the next oldest in creation date or the next oldest date in which this selected parent thought was linked to this child thought.

Rule 6

6. When unlinking a thought from the thought it is inheriting an ACL from, and one or more jump thoughts remain but no parent thoughts, the first acceptable (non-recursive) jump that can be found will be the primary jump. If no acceptable jump thought is found, the ACL for the thought will be specified to be the same as the effective ACL before the unlinking. (See rules 2 and 3)

As in rule 5 above, when a thought is inheriting an ACL and it is unlinked from its inheritee, this rule defines a way to attempt to allow the thought to continue inheriting an ACL from a jump.Unlinking causes the Brain system to scan the thoughts of the remaining links to determine acceptable jumps, if no parents exist. Any criteria can be used to determine the order of the remaining jumps the Brain system seeks to find the acceptable primary jump. One order is random; that is, the Brain randomly selects another jump thought to examine its acceptability. Another order is time-based; that is, the Brain selects another jump thought that is the next oldest in creation date or the next oldest date in which this selected jump thought was linked to this child thought.

Rule 7

7. When unlinking a thought from the thought it is inheriting an ACL from, and no parent thoughts or jump thoughts remain, the ACL for the thought will be specified to be the same as the effective ACL before the unlinking. (See rule 1)

This rule is related to rule 1. A thought cannot inherit an ACL in isolation. If an unlinking causes the thought to have no parents or jumps, its ACL will no longer be inherited. Rather, its ACL will be specified to be equivalent to the ACL before the unlinking.

Rule 8

8. When adding a parent link to a thought where no other parent thoughts exist and the thought is inheriting from a primary jump thought, the new parent will be the primary parent and the thought will now inherit an ACL from it. (See rule 4)

FIGS. 56A and 56B illustrate this rule. In these figures, the lines with arrowheads at the end point to inheritees. If the child has no parents and is inheriting from a jump thought, and inheriting an ACL from the parent thought will not cause recursion, the child will inherit an ACL from the parent thought.

In contrast, FIGS. 57A and 57B show parent thought 3390, jump thought 3392, and child thought 3391. The child thought 3391 is linked to and inherits from the jump thought 3392. When a link is created between parent thought 3390 and child thought 3391, and such a link will cause recursion, then the child thought 3391 is modified and no longer inherits from the jump thought 3392. The child thought 3391 now has a specified ACL.

Rule 9

9. When adding a parent link to a thought which has specified an ACL, where this specified ACL are equivalent to the ACL that would be inherited from the new parent thought, and inheriting the ACL from the new parent thought would not cause inheritance recursion, the new parent will be the primary parent and the thought will now inherit the ACL from it. (See rule 3)

Figure 54A:
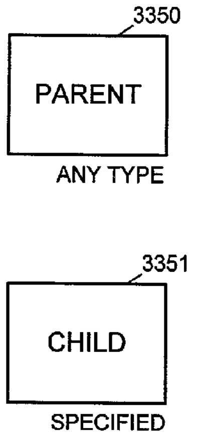
Figure 54B:
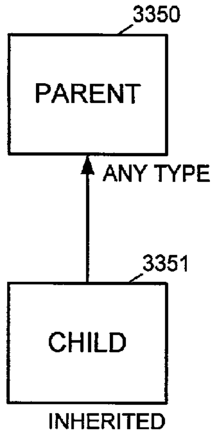

A view of this rule for the creation of parent-child links is shown in FIGS. 54A–54D. In FIG. 54A, a parent thought 3350 and a child thought 3351 are shown. These two thoughts are not linked. The parent thought 3350 has an ACL of any type, while the child thought 3351 has a specified ACL. When a link is created between the two thoughts as shown in FIGS. 54B, and the specified ACL of the child thought 3351 are equivalent to the ACL of the parent thought 3350, the child thought 3351 will inherit from the parent thought 3350. Thus, the specified ACL of the child thought 3351 will be removed and replaced with inherited ACL. Recursion is not allowed.

Figure 54C:
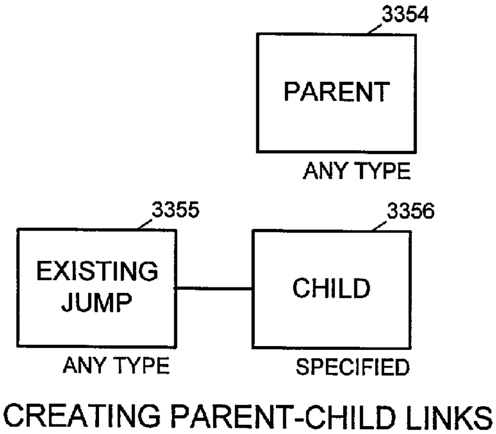
Figure 54D:
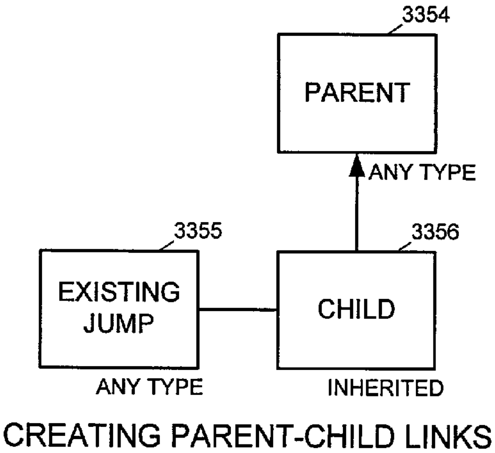

Similarly, in FIG. 54C, a parent thought 3354, a child thought 3356, and a jump thought 3355 are shown. The parent thought 3354 and jump thought 3355 can have any type of ACL, but the child thought 3356 has a specified ACL. The jump thought 3355 is linked to child thought 3356. When a link is created between the parent thought 3354 and the child thought 3356, the child's ACL is modified to now be inherited ACL from the parent thought 3354. Recursion is not allowed.

Figure 55A:
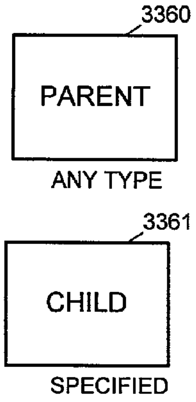
Figure 55B:
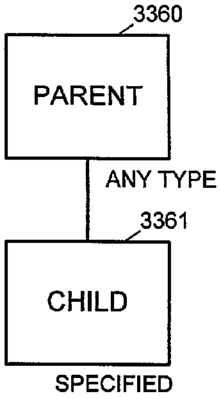

When the permissions of the parent and child are not equivalent when forming the link, the child thought will not inherit from the parent thought. This is illustrated in FIGS. 55A–55D. A parent thought 3360 of any type and a child thought 3361 of specified ACL are shown in FIG. 55A. The ACLs are not equivalent. For example, the parent thought may provide read and write access, but the child thought provides only read access. When the link is created between these thoughts as shown in FIG. 55B, the child thought 3361 still does not inherit from the parent thought 3360.

Figure 55C:
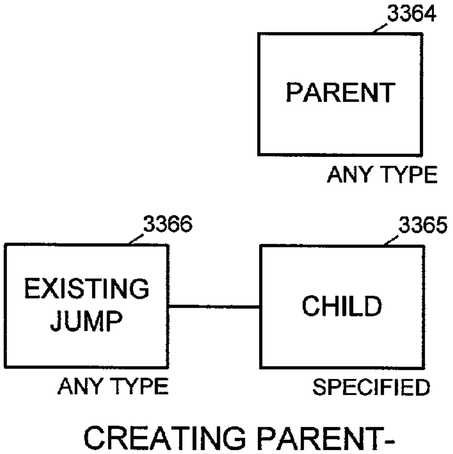
Figure 55D:
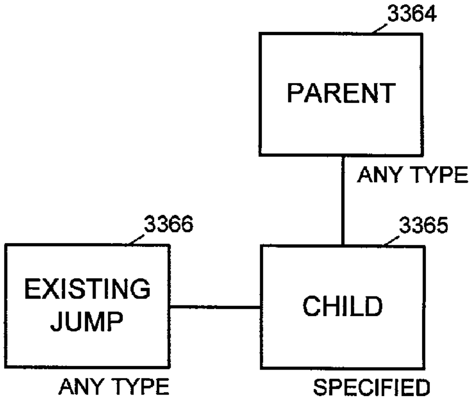

Similarly, in FIG. 55C, a parent thought 3364, a child thought 3365, and a jump thought 3366 are shown. The parent thought 3364 and jump thought 3366 can have any type of ACL, but the child thought 3365 has a specified ACL. The jump thought 3366 is linked to child thought 3365. When a link is created between the parent thought 3364 and the child thought 3365 as shown in FIG. 55D, and the ACLs are not equivalent, the child's ACL is still specified and it does not inherit the ACL from the parent thought 3364.

Figure 55E:
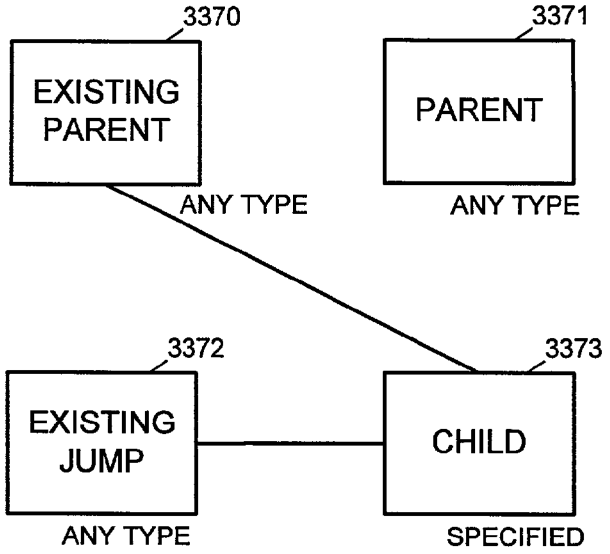
Figure 55F:
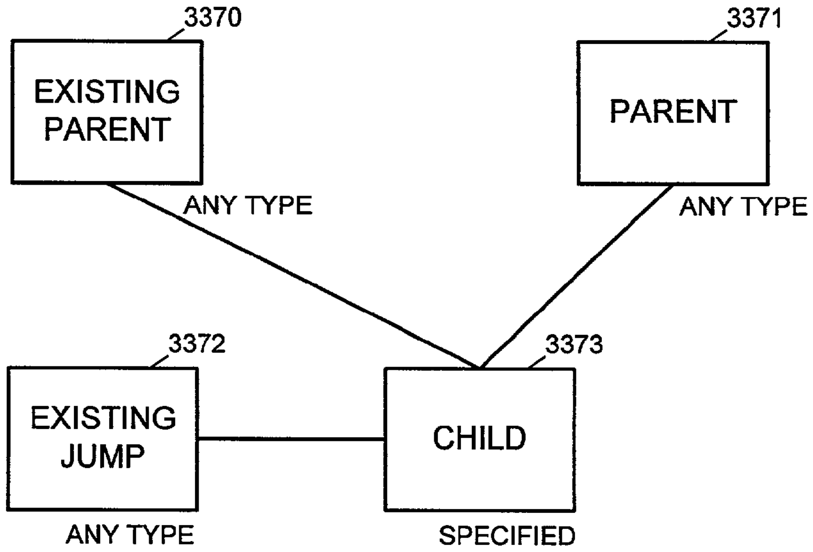

Similarly, in FIGS. 55E and 55F, the situation is similar to that of FIGS. C and D, except that child thought 3373 has an existing parent 3370. Parent thought 3371 is linked to child thought 3373. However, because the ACLs are not equivalent, the child thought 3373 does not inherit from new parent thought 3371.

Rule 10

10. When creating a new thought that is a child thought of an existing thought, the existing thought will be the primary parent for the new thought and the new thought will inherit the ACL from the existing thought. (See rule 4)

FIGS. 52A and 52B illustrate this rule. A parent thought 3320 exists. Its ACL can be of any type. A new child thought 3322 is created from parent thought 3320. This new child thought 3322 now inherits its ACL from parent thought 3320.

Rule 11

11. When creating a new thought that is a jump thought of an existing thought, the existing thought will be the primary jump for the new thought and the new thought will inherit the ACL from the existing thought. (See rule 3)

FIGS. 53A and 53B illustrate this rule. An existing thought 3340 exists. Its ACL can be of any type. When a new jump thought 3342 is created from the existing thought 3340, the new jump thought 3342 inherits its ACL from the existing thought 3340.

G. Permission and Access Control Algorithms

The above inheritance rules can be combined and incorporated into several different algorithms that have been designed into and executed by the Brain system. These algorithms include:

Checking Permissions

Assigning/Inheriting Permissions for New Thought

Creating Links

Deleting Links or Unlinking

Optimizing the Propagation of Permissions

Assigning Inheritance

The two most fundamental operations are the checking of ACLs and the assigning/inheriting ACLs for the new thought. These and the other algorithms listed above will now be discussed in greater detail. Note that these algorithms implement the various inheritance rules described above.

In the discussion below, the terms "assigned permission objects" (or APO) and "combined permission objects" (CPO) will be used. Referring to FIG. 59, thought A has a CPO containing "ENG+R" and "Business Development (BD)+R+W." Child thought C has its own assigned permission object (APO) "LEGAL+R." However, because thought C also inherits from thought A, as indicated by the dotted line, it also inherits the CPO of thought A. Thus, the combined permission object (CPO) for thought C includes "ENG+R" and "BD+R+W" (from thought A) and "LEGAL+R" (its own permission). Note that the CPO of thought B, which is also a parent of thought C, is not inherited by thought C. Other examples are shown in that FIG. 59.

Similarly, the terms "equivalent" permission objects and "equal" permission objects are used. The term "equivalent" permission objects is used to describe a situation where one thought has a mere copy of another thought's permission objects, and nothing more. Although the permission objects may be equivalent now, changing the permission object of one thought does not change the permission object of the other thought. The term "equal" permission objects is used to describe a situation where one thought shares through inheritance a CPO with another thought. Thus, when the permission object of the parent thought is changed, the inheriting child thought's permissions also change because they share the same CPO.

H. Checking Permissions

Checking permissions is a fundamental operation of the Brain system. Permission is initiated by a request to check whether or not a particular user has permission to perform a specific action like viewing, modifying, adding or deleting a thought. Referring to the flow chart of FIG. 42, the operation begins at step 3210. At step 3211, the first inquiry is determining whether a thought has an APO. If the thought has an APO, the permission object is stored at step 3212. Then the operation proceeds to step 3213. If the thought does not have any permission assigned to it, step 3213 determines whether the thought inherits. Note that even if the thought has an APO, the operation still proceeds to step 3213 to determine whether it inherits.

If the thought does not inherit, the operation proceeds to step 3214 where it stores the combined permissions (CPO) pessimistically. At step 3216, the combined permissions are checked to see if the user has permission to perform a specific action. The operation terminates at step 3217.

On the other hand, if the thought inherits permissions at step 3213, the operation proceeds to step 3215 where the inheritee thought is now examined. The operation returns to step 3211 where the entire process is repeated until a thought can be found that does not inherit (step 3213).

I. Assigning/Inheriting Permissions for New Thought

A second fundamental operation involves the assignment/inheritance of permissions for a new thought. Generally, all thoughts must be created from some other thought; otherwise, it's the first thought and the Brain system assigns default permissions for this first thought. The operation is shown in the flow chart of FIG. 43. The operation starts at step 3220.

At step 3221, the operation inquires whether the new thought is being created from another thought. If this new thought is not being created from another thought, the operation proceeds to step 3227 which creates a default permission object and assigns it to that new thought. One default permission object is "AUTHOR+R+W" which indicates that this author has read and write access to this new thought. The operation then ends at step 3230.

Returning to step 3221, if the new thought is being created from another thought, the operation proceeds to step 3222. Step 3222 inquires whether the new thought is a jump or child of the source thought. If so, the new thought inherits its permission object from the source thought at step 3228. The operation then ends at step 3230.

Returning to step 3222, if the new thought is not a jump or child of a source thought, the operation copies the permission object of the source thought in step 3223. At step 3224, the operation inquires whether the source thought inherits from another thought. If the source thought does not inherit from another thought, step 3229 removes the source thought's permission object and sets the source thought to inherit from the new thought. The operation then ends at step 3230.

If, on the other hand, the source thought does inherit at step 3224, the operation inquires whether the source thought inherits from a jump thought and whether the new thought is a parent of the jump thought at step 3225. If not, the new thought is assigned the permission object of the source thought (but not inheriting it) and the operation ends at step 3230.

At step 3225, if the source thought does inherit from a jump thought and the new thought is a parent of the source thought, the operation changes the inheritance of the source thought to the new thought. Thus, instead of inheriting from the jump thought, the source thought now inherits from the new thought. The operation removes the source thought's inheritance from the jump thought and making the source thought inherit from the new thought instead. The new thought retains its permission object. The operation then ends at step 3230.

J. Creating Links

In addition to creating new thoughts, new links can also be created which present inheritance problems and issues. If one thought is newly linked to another thought, should one thought inherit from the other thought? Should these thoughts retain their pre-link permission objects and inheritances? Should an existing inheritance be modified in light of the new link? Referring to the flow chart of FIG. 44, these and other issues are addressed. The operation starts at step 3240.

Once the user creates a new link between two thoughts, the operation inquires whether this new link is a parent-child link at step 3241. If not, the operation ends at step 3249.

If the new link is a parent-child link, the operation inquires whether the child thought is inheriting from a jump thought at step 3242. If so, the operation inquires whether the parent is inheriting from the child (indirectly through a cyclic loop). If the parent is inheriting from the child, the operation copies the permission object from the jump to the child and removes the child's inheritance from the jump at step 3248. The child's permission object is now specified. The operation ends at step 3249.

Returning to step 3247, if the parent is not inheriting from the child (indirectly through a cyclic loop), the operation sets the child to inherit from the parent at step 3246. This also involves removing the child's inheritance from the jump thought. The operation ends at step 3249.

The above procedure is applicable when the child is inheriting from a jump. Returning to step 3242, if the child is not inheriting from a jump, the operation proceeds to step 3243. Here, the operation inquires whether the child is inheriting from an existing parent. If the child is inheriting from an existing parent, the operation ends at step 3249. The child continues to inherit from the existing primary parent despite the creation of the new link between the child and the non-primary parent.

However, at step 3243, if the child is not inheriting from an existing parent, step 3244 inquires whether the child's permission object is equivalent to that of the parent. If they are not equivalent, the operation ends at step 3249. The child will not inherit from the parent despite the creation of this parent-child link.

If the child's permission object is equivalent to that of the parent at step 3244, step 3245 inquires whether the parent is inheriting from the child (indirectly through a cyclic loop). If so, the operation ends at step 3249. No permission object assignments or inheritances have changed. If the parent is not inheriting from the child at step 3245, then the operation proceeds to step 3246 where the child is set to inherit from the parent. The operation then ends at step 3249. Thus, a previously non-inheritance relationship is transformed into an inheritance relationship where the new link causes the child to inherit from the parent.

K. Deleting Links or Unlinking

Just like the creation of new links, the deletion or unlinking of existing links also presents inheritance problems and issues. If one thought is unlinked from another thought, should these thoughts retain any kind of relationship with each other? Should the system create a new inheritance relationship between the thought (whose link had just been severed with another thought) and any of the other thoughts it is linked to? Should these thoughts retain their pre-severance permission objects and inheritances? Should an existing inheritance be modified in light of the deleted link? Referring to the flow chart of FIG. 45, these and other issues are addressed. The operation starts at step 3250 after a link has been deleted.

The operation inquires whether either of the unlinked thoughts is inheriting from the other thought at step 3251. If not, the operation ends at step 3258. The inheritor thought retains its permission objects.

If one of the thoughts is inheriting from the other thought at step 3251, the operation inquires whether the inheritor thought has any parents at step 3259. If it does, the operation proceeds to step 3252, where the operation inquires whether the inheritor has a remaining parent (call it "Parent X"). If not, the operation proceeds to step 3257 where the old inheritee's permission object is copied and the inheritance is removed. The former inheritor thought now has specified permissions. The operation ends at step 3258.

Returning to step 3259, if there are no parents, the operation inquires as to whether the inheritor thought has a remaining jump thought (call it "Jump X") at step 3255. If not, the operation proceeds to step 3257 where the old inheritee's permission object is copied and the inheritance is removed. The former inheritor thought now has specified permissions. The operation ends at step 3258.

On the other hand, at step 3255 or step 3252, if the inheritor thought has a remaining jump thought (Jump X) or parent thought (Parent X), the operation inquires at step 3253 whether Jump X/Parent X inherits from the inheritor (testing for a cyclic inheritance). If it does not inherit from the inheritor thought, then the operation changes the inheritor thought to inherit from Jump X/Parent X at step 3256. The operation then ends at step 3258. The inheritance has changed for the inheritor from inheriting from the previously unlinked inheritee thought to inheriting from the Jump X/Parent X thought.

Returning to step 3253, if the Jump X/Parent X thought does inherit from the inheritor thought, then the operation removes Jump X/Parent X as a candidate inheritee (it is an unavailable inheritee) at step 3254. The operation then proceeds to step 3259 where it begins to look for another remaining parent or jump thought as the candidate inheritee. This process is a looped process which continues until the inheritor thought finds a suitable thought to inherit permission objects from or, if no candidate exists, then it merely copies the permission object from a pre-unlinked time to retain it as its own specified permission object.

L. Propagation of Permissions

Each time permissions are changed for a thought, either explicitly by a change to the Assigned Permission Object (APO) or implicitly due to a change in inheritance, the Brain system propagates the permission changes to all the thoughts that inherit from it. As the propagation proceeds, a combined permission object (CPO) is assigned to each thought the change propagates to. This CPO reflects the new permissions information for the thought, and consists of the inherited permissions (the CPO of the inheritee) and the assigned permissions (APO), if any.

Each time the permissions are changed for a thought, the operation shown in FIG. 46 is performed. The operation starts at step 3260.

First, the operation adds the affected thought (the inheritor) to a list of thoughts at step 3261. This is merely a working list for the purposes of this propagation process. At step 3262, the operation asks if the list is empty. This is a checking step. If the list is empty, then the propagation process is not performed further and the process ends at step 3268. Initially, one thought is on the list since the system placed the thought in there at step 3261.

At step 3263, the operation retrieves the first thought (call it Thought X) from the list and removes it from the list. This Thought X will now be processed to calculate its permissions.

At step 3264, the operation asks if Thought X has an Assigned Permissions Object (APO). If Thought X has an APO, the operation continues at step 3265. If Thought X does not have an APO (in other words, Thought X's permissions are the same as its inheritee's), the operation continues at step 3266.

At step 3265, a combined permission objects (CPO) is created for Though X. The value of the CPO is the combination of the inheritee's combined permission object (CPO) and Thought X's assigned permission object (APO). In mathematical terms, $$CPO\ (\text{Thought}\ X) = CPO\ (\text{Inheritee}) + APO\ (\text{Thought}\ X)$$

After creating a CPO for Thought X, the operation continues at step 3267.

At step 3266, since Thought X's permissions are the same as its inheritee's, Thought X will share the CPO with its inheritee (and possibly other thoughts as well). This step assigns the inheritee's CPO as Thought X's CPO. The operation continues at step 3267.

At step 3267, when a CPO for Thought X has been created or assigned, the operation seeks out all thoughts that inherit from Thought X (i.e., inheritors of Thought X) and adds them to the to the list of thoughts. The operation then proceeds to step 3262. The process repeats by examining whether the list is empty. If the list is empty the operation ends at step 3266.

An example is shown in FIG. 59. The dotted line represents inheritance relationships. Start at the top with thought Z, whose CPO is "BIZDEV+R+W." When the permissions for thought Z are changed, they must be propagated through the system. The inheritor thought, thought A, is placed on the list. The CPO of thought A is the combination of the CPO of thought Z ("BIZDEV+R+W") and the APO of thought A ("ENG+R"). Thus, the CPO of thought A is "BIZDEV+R+W" and "ENG+R". Having completed thought A, now the system propagates the permissions to all thoughts that inherit from thought A starting by placing them on the list. In this case, this is only thought C.

Thought C has its own APO "LEGAL+R." However, because thought C also inherits from thought A, as indicated by the dotted line, it also inherits the permission objects of thought A. Thought A has CPO "ENG+R" and "BIZDEV (BD)+R+W." Thus, the CPO for thought C includes "ENG+R" and "BD+R+W" (from thought A) and "LEGAL+R" (its own APO).

Thought C has three inheritors, F, D and E. These inheritor thoughts are placed on the list. The optimizing process examines each thought in the list and repeats the same process of determining CPOs as described above. Because thoughts F, D, and E do not have an APO, they will share a CPO with thought C.

What about conflicts? What if the permission objects that are being combined conflict each other, such as the same group being assigned read and write privileges for one thought and only read privileges for another thought. The exact CPO is calculated mathematically as follows. Each permission has 3 states, represented by a pair of binary digits, as shown in TABLE C:

TABLE C

| PERMISSION STATES | |
|---|---|
| State | 2-bit value |
| Unspecified value | 00 |
| Grant permission | 01 |
| Deny permission | 10 |

For example, if in the APO for thought H, the Sales group's permission object is set to "+R+W," the read is granted (01) and the write is granted (01). All other permissions are unspecified (00). If, on the other hand, in the APO for thought H, the Marketing group's permission object is set to "+R−W," the read is granted (01) and the write is denied (10). All other permissions are unspecified (00).

When permission objects are combined, the Brain system uses an Inclusive-OR operation; that is, the result is a logic "1" if any of the operands is a logic "1." When the Inclusive-OR operation is performed, four possible values may result, as shown in TABLE D.

TABLE D

| INCLUSIVE OR | | | |
|---|---|---|---|
| Inclusive OR | 00 Unspecified | 01 Grant | 10 Deny |
| 00 Unspecified | 00 | 01 | 10 |
| 01 Grant | 01 | 01 | 11 |
| 10 Deny | 10 | 11 | 10 |

In accordance with one embodiment of the invention, the permission values can be as follows in TABLE E:

TABLE E

| COMBINED PERMISSION VALUES | |
|---|---|
| State | 2-bit value |
| Deny permission | 00 |
| Grant permission | 01 |
| Deny permission | 10 |
| Deny permission | 11 |

For example, assume that during the propagation operation, the CPO of the inhertee thought is "ENG+R−C−D", and the APO of the inheritor thought is "ENG+R+W+C−D". How are these combined to create the CPO for the inheritor? Refer to TABLE F below:

TABLE F

| COMBINED PERMISSIONS EXAMPLE | | | | |
|---|---|---|---|---|
| Permission Object | Read | Write | Create | Delete |
| ENG +R −C −D | 01 | 00 | 10 | 10 |
| ENG +R +W +C −D | 01 | 01 | 01 | 10 |
| Combined total: | 01 | 01 | 11 | 10 |

Here, the 2-bit values obtained from TABLE C are inclusive OR'ed down the column for the each privilege. The result is the combined privileges of the thought for the members of the group "ENG". In this example, the permission object "ENG+R−C−D" has granted read privileges so the value "01" is placed for the read the privileges, It has unspecified write privileges so the value "00" is placed for the write privileges. It also has denied the create and delete privileges, so the value "10" "is placed for the create and delete privileges The permission object "ENG+R+W+C−D" has granted read, write and create privileges and thus, the "01" is used for these values. It also has denied delete privileges, so the value "10"" is placed for delete privileges. Refer to TABLE C for the individual permission states.

To determine the combined read privilege, the read column is inclusive-OR'ed. To determine each of the other combined privileges, each column is inclusive-OR'ed. The result of the inclusive-OR operation for the read and write privileges is "01" while that for the create privilege is "11" And that of the delete privilege is "10." Referencing TABLE E, the "01" indicates a grant while the "10" and "11" indicate a denial. Thus, the combined permission object (CPO) for this thought for the ENG group is a grant of read and write permissions but a denial of create and delete privileges.

M. Assigning Inheritance

Normally, the user need not assign any inheritance to thoughts since this is automatically done by the Brain system as thoughts are created/deleted and links are created/deleted. However, in some cases, the user may wish to assign inheritances manually. Generally, in accordance with one embodiment of the present invention, the user can assign inheritances if the thought has multiple parents, or in the alternative, no parents but multiple jumps.

Referring to FIG. 47B, thought C has two parents, thought A and B. Presently, thought C is not inheriting from its parent thoughts A and B. The user wants to set up the link in the dotted line between thought C and A. In addition, the user wants to make sure thought A inherits from thought C.

Continuing this example, refer now to FIG. 47A. The operation starts at step 3270. Step 3271 inquires whether the candidate inheritee (thought A) is inheriting from inheritor (thought C). If so, step 3272 informs the user that the inheritance has already been set up. Then the operation ends at step 3274. However, if the candidate inheritee (thought A) is not inheriting from inheritor (thought C), then the inheritance is changed at step 3273 to reflect the desires of the user.

N. User Interface

FIG. 60 shows a sample user interface. The upper half shows the plex while the bottom half shows the thoughts listed in the conventional tabular format. Next to each thought is a drop-down menu which the user can select to perform some action on the thought. Here, "Knowledge Management" is the active thought.

FIG. 61 shows the same user interface, but this time, the drop-down menu for the thought "Business Intelligence" is selected by the user. Here, "Knowledge Management" is still the active thought. As shown, the list of actions available for "Business Intelligence" includes: standard view, delete, import, new document, new folder, permissions, and properties.

If another thought is selected, another set of actions shows up. In FIG. 62, the thought "Categorization" is selected as the active thought. Accordingly, the plex changes to reflect the newly selected active thought. The list of actions associated with this thought includes: standard view, checkout, delete, edit, export, permissions, properties, versions and renditions, and view.

The listed actions allow the user to perform various tasks and make changes as desired. Permissions can be viewed and altered as necessary through these actions.

XVI. More on Matrix Sharing

Having described methods for organizing and securing a collaborative Brain environment, in which functionality and data is divided amongst clients and servers in a network, methods of actually updating and synchronizing the data distributed to those nodes will now be described. By implementing the Brain in a multi-user or multi-node shared environment, users are able to collaborate with each other in a manner that is more comprehensive than simply sharing documents or work. Sharing a common Brain data resource permits a group of users to benefit from the associations that each draws among their data. Ultimately, this will lead to a shared, visual model of how their group's data items interrelate. Below as the present invention is described more fully, one example that is offered of a group working in such a shared Brain environment is the staff of an insurance company. For example, an insurance salesperson, finding that often, customers with families who purchase a certain type of life insurance are also often interested in the company's family dental insurance package. The salesperson may draw a jump link in a shared brain data resource between the thought for that life insurance and that dental insurance offering. His fellow salespeople, also using the shared Brain data resource would find that jump link the next time that they go to sell that life insurance offering, and may benefit from the insight of cross-selling the dental policy along with it.

The benefits of permitting multiple users, or for that matter multiple computers, in a network to share a common Brain data resource are manifold. Some of the benefits, like the insurance example above, emanate from peers benefiting from the associations among thoughts created by their colleagues. In other circumstances, managers, or central computer control systems, would make different sections of the Brain, different types of thoughts, various associations, or different levels of content available to various users based on rules. Those rules for who receives access to certain sets of data or associations can be made by rank, job function, or even practical computing constraints like bandwidth or the type of device being used to access the shared Brain data resource. Data synchronization methods of permitting and controlling access and modifications to a shared Brain data resource taught in this section, along with the permissions and access control methods taught above, permit that type of profiling. So certain users can be offered certain types of access to certain types of associative data that is maintained in a shared Brain data resource.

Two general methods of allowing access to a shared Brain data resource are described below—(i) a fully-connected method in which users or nodes on the network are connected to the shared Brain data resource in real time; and (ii) a synchronization method in which a locally stored version of the shared Brain data resource exists at each node, and is synchronized with the shared Brain data resource from time to time.

As an example of when a fully-connected method would be convenient, say that a project team may work together in an office environment on a single Brain where all elements are related to the project, but each team member is given responsibility for updating and maintaining a different section of that Brain. The fully-connected method includes a way to cope with multiple users trying to modify the same item of data simultaneously.

A synchronization method, for example, may particularly benefit remote workers in that project team, sharing that team's Brain data resource. In their case, it may not always be convenient to stay connected full-time to a remote data source. So those remote team members would carry a copy of that data resource, or its relevant part, with them when in their own portable computing devices they are away from the office, and synchronize back with the common source next time they log in. For example, before entering a sales meeting, a traveling sales representative may need to check some thoughts created by a colleague working on the same account. This he could do by checking his own local copy of the Brain on his laptop before the meeting. Once his meeting is completed, he would want to have the information or action items from that meeting available to the rest of his sales force. He does so by logging on to his company network remotely, and synchronizing his local copy of the common Brain resource with the actual shared source back at the home office. While his laptop, and its cached copy of the shared Brain resource is in contact with the original source, the salesman's copy of the Brain is updated with late breaking sales leads that the sales manager wanted to make sure that only his best sales people received. That manager was able to "push" that content out to his team, by logging in himself to the shared Brain resource, under his administrative privileges, which allowed him to designate which groups of users had the privilege to receive these updates.

Therefore, detailed below is a second method of permitting more than one node to share a common Brain resource that relies on synchronization techniques such as are known in the art. That type of synchronization method permits multiple copies of the common resource to maintain a degree of consistency by synchronizing from time to time directly with the shared resource.

Desired are methods of maintaining a common source of data for access under the present invention (e.g. a matrix or repository), which updates or modifies as users (or other computers on a network) operate or modify it. Actually, three general approaches to sharing Brain-related data items between nodes on a network will now be described: (i) a fully-connected system in which the nodes can update one another in real-time using a token system; and (ii) a synchronization system operating under the assumption that the nodes will not always be connected but will update from time-to-time when connected; and (iii) an embodiment that mixes those two systems, functioning under the fully-connected method when that is convenient, and using synchronization methods when that method is more convenient.

In a fully-connected embodiment, at least two nodes share a single repository of data items, updating that repository and getting updates from it in real time. Since conflicts may arise when more than one node attempts to edit a single data item simultaneously, one key element to making such a system operate effectively is a step detecting—if not avoiding such conflicts.

Note that those types of conflicts would not arise in a synchronization system designed to send modifications made on offline copies of the shared data source, when a connection to the shared source becomes available. In a synchronization embodiment, the key obstacles to be addressed are (i) determining which node or which data item is the master and which node or data item is the slave whose information must be made to coincide, and (ii) how to manage situations in which the modifications made by users offline logically conflict (for example, cases in which disconnected nodes have added data occupying the same thought ID numbers, or cases in which disconnected nodes have added data with different identifiers but whose substance is identical.

For the purposes of this discussion about sharing matrices, "information" is used to mean any item or set of data. But a "data item" means the smallest set of data processed under a present invention. Namely, it is preferred that these token or synchronization methods be observed not only at the thought level, but whenever a thought property, link, document, or other thought related contents are added, deleted, or modified in any way.

To introduce the concepts of matrix-sharing described herein, the example of an insurance company is useful to show the different circumstances that could cause an enterprise to prefer using a fully-connected embodiment or a synchronization embodiment. Say the company's staff used the Brain and a common shared Brain data resource for their daily work. Back at the home office, where underwriters and claims adjusters work at personal computers that are connected full-time through a local area network, the fully-connected embodiment could be used to keep each worker interacting with their own computer's graphical interface to a shared Brain data resource. Since they are connected full-time, whenever one of them enters a modification, the shared Brain data resource can be updated in real-time. But to reduce network traffic, or if many underwriters are likely to need simultaneous access to precisely the same riders or insurance provisions (which would cause conflicting requests to modify data), then the insurance company may prefer to use a synchronization method, even in a local area network environment.

Normally, representatives of the insurance company like salespeople or claims investigators, who work outside of the company's office, would connect their computers to the company's network remotely only from time to time. They would not be connected full-time, in the ordinary course of their work. But when a claims investigator connects back to the office network (even remotely), his computer and its locally stored version of a common Brain data resource, would synchronize to the master version of the shared Brain data resource back at the office. His computer would presumably upload the new thoughts and new data items resulting from his investigations, and the shared Brain data resource back at the home office would update his local copy with thoughts relating to the findings of other investigators working on his cases, or new thoughts or data items generally distributed to the entire company, or to the entire claims department.

Due to connectivity constraints, the insurance company may find the fully-connected embodiment to be more suited to the local area network environment at its office, and a synchronization method desirable for its field staff, whose nodes it expects to connect back to the shared Brain data resource only intermittently. But advances in wireless networking, and in bringing computer functionality to wireless devices such as handheld computers and portable phones, there may be circumstances in which a fully-connected system is preferred even when the nodes are diffused over a broad geographic area. For example, the insurance company may find it important that its accident scene investigators, or lead investigators are constantly working from synchronized data, and are constantly updating other people in the company about their findings. When they are at the scene, these investigators may work with tablet PCs, laptops connected with wireless modems, or with handheld PCs that are connected (like the Palm™ VII series of devices) to a common shared Brain data resource. With advances in the displays and computing services available in mobile phones, claims investigators or sales people could even interact with the shared Brain data resource in a taxi on their way to an investigation or a sales call. Either fully-connected or synchronization embodiments could be used in these examples. The constraints governing the company's decision about which technique to use for each circumstances would range from the computing resources (e.g., memory, bandwidth) available at each of these nodes, the reliability of the connection, the urgency of the information to be exchanged. Also significant to their decision would be the likelihood of simultaneous conflicting demands to access the same data items in the centrally stored Brain data resource. A high likelihood augur against employing a fully-connected system, in favor of a synchronization method.

The actors in these matrix-sharing embodiments are referred to as nodes or clients. But note that these actors can actually be any computer program, whether operated by a human user or by another computer. The matrix sharing methods described herein can be useful for sharing and updating common sources of Brain data even where human users are not involved. In the known art of distributed computing, for example, many computers of different descriptions in different locations are used to work on a common task. In the search for extra-terrestrial life, for example, a group at the University of California, Berkeley, offers a computer program which volunteers install on their home PCs which in turn operate to analyze radio signals received from outer space for signs of intelligence (See, www.setiathome.ssl.berkeley.edu/). Other known examples of distributed computing include Internet search engines that utilize clients to "spider" or investigate new sites or resources on that public network, or intrusion detection security systems in which computing devices perform some analysis of data (facial recognition, movement) to report to central monitors.

The matrix sharing methods discussed herein are also suited for those types of environments. Causing computer clients in a network to share and update common Brain data items would avail researchers at Berkeley to interact with the massive amounts of data generated from the Seti@home clients in the Plex interface of the present invention, or would allow security personnel to identify patterns in automatically connected intelligence information by seeing associations among disparate sources of intelligence data gather from intrusion detection computers updating a common source of Brain data items.

These matrix-sharing methods could be ideal for an Internet search engine which is updated and kept current automatically by massively distributed "spider" computer programs each updating a common shared source of Brain data items of its findings. As of this writing, a service permitting Internet users to search for, and navigate amongst websites using the thought-link structure of the present invention is available to the public at the URL www.webbrain.com. That type of service can be created, in large part, by applying the automatic "spidering" techniques for matrix creation (described above) to a publicly available Internet directories such as the "Open Directory Project" (www.dmoz.com). Client computer programs that send information about Internet usage to make the patterns of associations among web pages available to public users are also known. For example, a service called "snapshot" offered at www.alexa.com, adds a toolbar to the browser that suggests to the user how popular their browser's current web page is, and generally what other websites might be associated with that page, or be similar in content to that page. Under a matrix-sharing embodiment of the current invention, simple client computer programs could be distributed which would modify and update a common shared matrix of the Internet. Those clients could be set either (i) to spider the websites they encounter through the user's operation and send information back to the shared matrix; or (ii) in a manner similar to that used by seti@home to farm data analysis jobs to distributed clients, spider websites as ordered by a central command system, using computer resources not in demand by the computer's normal user. Such a system could use a fully-connected method of updating the shared matrix, or a synchronization method, according to the types of operational constraints discussed above.

A. Fully Connected Model

FIG. 63 contemplates a fully-connected embodiment comprised of:

- Clients A and B, which minimally possess a user interface means for viewing data regarding thoughts and the ability to send requests and receive data returns and conflict messages from a Server, and
- a Server minimally capable of receiving requests for data, detecting conflicts in which a second client has requested to modify data which another Client is already in the midst of modifying, and returning data or conflicts messages to Clients.

To detect and prevent conflicts, each time an item of data on the Server is to be modified by a Client, that item is placed onto a list of "locked" items. That list identifies each data item, and the Client "owning" that data item, meaning the Client which initiated the modification thus causing the Server to place the data item on the list of locked items. That list is checked whenever a Client seeks to modify a data item to ensure that two Clients will not be modifying the same data item at the same time. Namely, whenever a Client sends the Server a request to modify a data item that appears on that list, the Server knows to deny permission (or at least alert the requesting Client, or both the requester and the Client which previously had that data item placed on the list, of the conflict). That way, while a Client is modifying a data item, the Server lists that item as being "locked", and in a preferred embodiment, no subsequent request by another Client to modify that data item will be permitted until that data item is "unlocked". The data item is "unlocked" when the Server removes it from the list of locked items once the first Client's request to modify has been completed, as more fully described herein.

For each client making a modification, the following steps are executed:

1. User initiates modification.
2. Client requests permission to modify data item.
3. Server checks whether that data item has been locked (i.e. appears in the list of locked items).
   a. If data item is not found in list of locked items, place it on that list, and identify Client as owning that lock, then return permission to modify.
   b. If data item is found on list of locked items, then deny permission, inform user and end.
4. Client performs modifications and sends to Server.
5. Server modifies and then unlocks data item (i.e. removes it from the list of locked items).

When multiple clients execute these steps, two possible outcomes should be considered, as illustrated in FIGS. 63 and 64.

FIG. 63 illustrates the case of Clients A and B each modifying a single thought or data item residing at Server. Since each modifies the item at separate times, the Server detects no conflict, and permits each set of modifications to be made in serial. Client A accesses and displays a starting thought 1 (steps 3390–3394). Client B does the same (steps 3395–3399). Since Client A has not requested to modify that thought or any of the data items relating to it (thought name, link, contents, properties), so far neither has requested that the Server place any data item onto the list of locked data items. (When a Client has the Server place a data item on that list, in a preferred embodiment, when a different Client sends a request to modify that same data item, the Server would deny permission).

Next, Client A begins to modify at least one of the data items (data item 1) associated with Thought 1 (step 3400). In order to accomplish this, Client A requests from Server the right to modify that data item 1 (step 3401). Finding that data item 1 does not appear in its list of locked items—meaning that no other Client is presently modifying it) (steps 3402–3403)—the Server permits Client A to make that modification (step 3405). Server then "locks" that data item 1 by placing it in the list of locked items, and identifies Client A as "owning" that lock (step 3404). So "locking" that data item 1 will prohibit subsequent requesting Clients from modifying data item 1 until the Server removes data item 1 from its list of locked items, once Client A successfully uploads its modification (step 3406), or presumably, by timing out if Client A does not upload any modification during a pre-defined time period. Once the Server returns a response that the update was successful (possibly after checking for intervening locks) Client A displays the modified data item 1 (steps 3407–3409), and the Server removes data item 1 from its list of locked items. Client B may repeat the same process (steps 3410–3419).

The case of renaming a thought provides a good example of why a "lock" system is important to manage simultaneous attempts to modify the same data item, because it is an action commonly taken by users of the Brain, and each thought has one and only one name, in most embodiments. Adding new thoughts, or even adding new links, would not necessarily cause a conflict which a lock is needed to avoid, since each item in a thoughts table of linked thoughts could be characterized as a separate data item, which could be modified simultaneously by different clients without conflict.

In the example of renaming a thought, suppose that Client A and Client B each attempt to rename a thought. In FIG. 63, since each renames the thought at separate times, the Server detects no conflict, and permits each set of modifications to be made in serial. Client A accesses and displays a thought to be renamed—thought 1 (steps 3390–3394). Client B does the same (steps 3395–3399). Since Client A has not yet requested to rename thought 1 the Server places no "lock" on any of the thoughtname data item, which lock would prohibit two Clients from attempting to modify the same data simultaneously.

Next, at step 3400, Client A begins to rename the thought—thought 1's name being described as "data item 1" in FIG. 63. In order to accomplish this, Client A requests from Server the right to modify that data item 1 (Thought 1's name) by locking other Clients from simultaneously modifying it (step 3401). Finding that no other Client has previously placed a "lock" on Thought 1's name (steps 3402–3403), the Server permits Client A to rename Thought 1 (step 3405). The Server accomplishes this by placing a lock on Thought 1's name (step 3404), which will prohibit subsequent requesting Clients from changing Thought 1's name until that lock is removed by Client A successfully changing Thought 1's name (step 3406), or presumably, timing out. Once the Server returns a response that the update was successful (possibly after checking for intervening locks) Client A displays Thought 1's new name (steps 3407–3409). Client B may repeat the same process (steps 3410–3419) to make subsequent changes to Thought 1's thoughtname.

FIG. 64 illustrates the case of Clients A and B each attempting to modify a single thought or data item residing at Server simultaneously, and as a result at least being informed of the conflict, if not prohibited from making simultaneous modification. In this example, at steps 3430 through 3440, Client B attempts to modify data item 1 after Server has already locked it awaiting receipt of Client A's modification. Minimally, Client B is informed of the conflict, and preferably simultaneous modifications will not be permitted.

Again, in the example of renaming a thought, referring to FIG. 64, suppose Clients A and B each attempt to rename Thought 1 at the same time. As a result, each Client would be informed of the conflict, if not prohibited from renaming Thought 1 simultaneously. At steps 3430 through 3440, Client B attempts to rename Thought 1 (again, Thought 1's name is referred to as "data item 1" in the figure), after the Server has already locked it awaiting receipt of Client A's new name for Thought 1. Minimally, Client B is informed of the conflict, and preferably would be prohibited from renaming Thought 1 until the lock is removed by Client A successfully completing its own prior renaming of Thought 1.

B. Synchronization Model

A fully-connected system maintains a single consistent repository of data by simply ensuring that only a single node at a time may modify that data. But in an environment in which users or their computers may not have full-time access to the network, means are needed for periodically synchronizing users' local copies of shared Brain data, because those copies become differentiated from the source while they are not connected. Such a synchronization method might also be more suited than a fully-connected system for instances when a single source of data is accessed and modified by a large number of users at once. Synchronization allows clients of a heavily used data source to interact with their latest copy of that data offline, and synchronize with a shared online copy online. General techniques of synchronizing an offline source of data with a shared data source available to many notes on a network are known in the art. Examples include products such as the Truesync™ line of computer programs and services offered by Starfish Software, Inc. (www.truesync.com) which, among other benefits, permit users to synchronized their e-mail, contacts and other data created through Lotus Notes or Microsoft Outlook with numerous types of handheld devices such as PalmPilots™ or personalized online portals like MyYahoo. The description below describes applying synchronization techniques to permit multiple nodes interact with and modify a shared repository of Brain related data, and takes into consideration the unique needs of a network structure of data capable of delivering generic or associative data types.

Preferred synchronization techniques will accomplish two relevant tasks—updating the Client version of the shared Brain data resource of changes in the common (Server-maintained) copy of the shared Brain data resource; and updating the common (Server-maintained) copy of the shared Brain data resource of changes made in the Client version of the shared Brain data resource. In embodiments where the Client version is just a subset of the common (Server-maintained) shared data source, the first task (updating Client) also can include updating the Client with data items which it finds missing or needed during the interval since its last synchronization. In embodiments incorporating the "push" features described above, this task can include managers, or the Server s sending new data items or modifications to the Clients based on their position or role in the work group. The second task is to update the common (Server-maintained) Brain data resource with modifications or new items added at the Client during the interval since last synchronization. Again, those updates can be permitted based upon the user's profile (e.g. role in the workgroup, rank, administrative privileges, needed information, classified/confidential information status).

In one embodiment of the present invention, synchronization is accomplished through four phases, as shown in FIG. 65—a modification phase, a detecting phase, a phase of updating the Client for missing data items, and a phase of updating the Server and the Client for items that each have modified. In a modification phase, while the Client is offline, the user may make modifications to his copy of the Brain at step 3450. In a phase of detecting possibly lacking items (step 3451), the Client keeps a list of data items that it finds lacking from its local version of the shared Brain data resource. Each time that the Client encounters the need for data items that are missing, it updates its list of needed or "new" items. That is the list of data items that it will request from the Server's common version of the shared Brain data resource next time the Client synchronizes. For example, a user may navigate the Brain to its "edge" reaching a point where the Client finds no more linked thoughts. But the Client keeps record of each such event of reaching the edge, so that when next it synchronizes, it can detect whether, in fact, more linked thoughts are available beyond that "edge." Then correspondingly, in the phase of updating the Client for missing data items (step 3452), the Client communicates with the Server to retrieve those data items found missing while working offline. Lastly, in the phase of updating Client and Server for new modifications (step 3453), the Client and Server communicate to update one another of items that each may have added or modified since last synchronization.

of course, these synchronization techniques have numerous applications other than maintaining consistent data on a network. They are also important for a user synchronizing data among multiple machines, or among various repositories that he may maintain.

We now proceed to explain an embodiment (shown in FIG. 65) for synchronizing a Server with a Client that has been operating offline on its own local version of the shared Brain data resource.

At step 3450(*a*), the Client commences modifying data items in its local stored copy of the common source of Brain data. When modifying data items, the Client must keep certain meta-data (minimally the time that each data item is modified) updated with respect to each changed item, at step 3450(*b*). Namely, each time the Client adds, deletes or otherwise modifies a data item, it updates the meta-information. In the later synchronization phase, the Server will ultimately reference that meta-data in making its decisions about which updates to accept. That meta data can also include information as to whether modifications are meant to be private to the user or shared, and other parameters relevant to the Server's decision as to whether to accept the updates, and how to make them available to subsequent users. And at step 3450(*c*), the meta data (minimally the identity of the data item being modified or added, and the time of modification) is added to a list of offline modifications which will be sent to the Server upon synchronization.

Phase 3451 is concerned with recording instances in which the Client may have encountered missing data, requiring that it check for additional relevant thoughts or data items at next synchronization. For example, while operating offline, a user may navigate to a thought which has links to thoughts not contained in the locally stored copy of the common Brain data source (the "edge" of the local Brain). Ideally, at synchronization, these "missing thoughts" will be retrieved. At step 3451(*a*) the Client encounters such "missing thoughts," and at step 3451(*b*), the Client updates a stored list of those missing thoughts so that it may inquire at the Server during its next synchronization.

At phase 3452, the Client communicates that list of new items to the Server so that the Server may determine whether the Client is entitled to receive any such new items, and then send the resulting new items to the Client so that they will be available in the Client's locally stored copy of the shared Brain data source for work offline.

Note that the Server may make those determinations, at step 3452(*c*) according to a synchronization profile. That profile is comprised of parameters that the Server can check to determine what new information should be shipped back to that requesting Client.

Here is an exemplary outline of that type of profile:

1) A list predefined according to the user's identity and preference, or an administrator, or even by group, of types of data items to be synchronized. Such a list may be:
   a) a list of thoughts;
   b) a list of thoughts and all thoughts connected as children;
   c) a type of thought
   d) contents or data of certain network addresses only
   e) thoughts created by or modified by certain or predefined users
2) All "missing" thoughts "discovered" by the Client since last synchronization which were beyond the edge of the Client's locally stored copy. These rules could also set whether the Server returns just those "missing" thoughts, or any number of generations beyond that edge, in order that the Client will be equipped with information that the user has not yet requested, but may be likely to before the next synchronization.
3) The Server can also decide to grant different levels of synchronization with respect to any data item, including for example:
   a) types of data items with respect to which the Server receives all updates. Namely, for certain types of data (e.g. field reports, timesheets, invoices, accounts payable or receivable, no conflicts would be permitted to block the system from updating, even if that requires storing multiple instances of a datum.;
   b) types of data items with respect to which the Server sends Clients structural information only (e.g. thought name, ID and link, but no notes, documents or other contents) because those contents are regarded as personal to a user or for other security or privacy reasons;
   c) types of data items which exist, but which the Server is not entitled to send out to any Clients, or certain Clients.

This is just an exemplary list, and any number of other parameters can be included in such a synchronization profile. Those types of master/slave rules or profiles may also be used in the later phase 3453, when the Server and the Client actually exchange modifications. Any of those rules or options could be set as absolutes or as orders of priority for governing conflicts in synchronization.

To complete this phase of updating new items to the Client, the requested information is sent to the Client at step 3452(*e*), and once the Client has successfully loaded the information, the list of needed "new items" is emptied. It will be repopulated as the Client operates offline subsequent to the synchronization.

Phase 3453 is for the Client and Server to exchange modifications made, and new data items added, in the interval since last synchronization. At steps 3454(*a*) and (*b*), the Client sends its list of meta-information about its offline modifications, and requests that the Server send it back the same type of list about items it modified or added since last synchronization.

At steps 3454(*c*) and (*d*), the Server receives that list of offline modifications or additions from the Client, and compares it to the list the Client requested for data items modified or added to the common source of Brain data at the Server since last synchronization. The purpose of that comparison is so that at step 3454(*e*), the server can detect any conflicts between items on the two lists, and determine which data item will win the conflict in each case. As will be explained more fully below, two types of conflicts are possible and must be resolved: data items which differ, but bear the same identifier, and data items of diverse identities, but whose content is the same.

At step 3454(*f*), the Server transmits the data in response to the Client's request for modified or new data items to the extent that no conflict is detected, or to the extent that the Server won the conflict. That transmission can be modified according to the requirements of a synchronization profile such as the exemplary one described above.

At step 3454(*g*), the Server requests that the Client send all of those items on the Client's list of modified items where no conflict existed with the Server, or to the extent that the Client won such conflicts. Again, that request may be modified according to the requirements of synchronization profile such as the example of such a profile outlined above.

At steps 3454(*h*) and (*i*), the Client responds by updating its locally-stored copy of the common Brain data source with the items sent by the Server, and sends the Server the data items it requested. At step 3454(*j*), the Server receives the data items it requested from the Client, and updates the shared Brain data source. The synchronization process is completed at step 3454(*k*) and the Client clears its list of modified items, so that it can be repopulated as the Client operates, in preparation for the next synchronization.

Note that in a fully-connected embodiment, or in an embodiment which synchronizes on each navigation or in near-real-time (See, "Mixed Model," below), the Client can be updated only with respect to the current active thought. By contrast, a synchronization system allows nodes to update large portions of data for future use.

We now describe in more detail the step 3453(*e*) in which conflicts are detected and addressed. As mentioned, at least two types of those conflicts are possible—same content or same ID.

Same Content. A Server may get requests to add redundant copies of the same data. In that case, a Client initiates synchronization to place a new data item on the Server, but the Server had already received the same content from another source in the interval since the Client's last synchronization. For example, suppose that the Client's company recently initiated a project in a given area—say the topic was indicated by a thought named "Used Cars." Two Clients, working separately offline, added thoughts on that topic (say, "Pricing") with identical names with identical links (say, to child thoughts named "Retail" and "Trade-In").

Same ID. Conversely, a Client A may seek to synchronize with the Server, and ask to modify a data item that has already been modified by a different Client (Client B) during the interval since Client A's last synchronization. Clearly, a conflict exists now, since the items bear the same unique ID, yet various aspects of the present invention rely on each item having distinct identifiers. The trouble is, since they were created by two different Clients under entirely different circumstances, they likely differ in content, both items must be considered for updating to the Server.

The first type of conflict is more complicated to detect. In order to detect a same-content conflict, a preferred embodiment of the Server would check for identical or highly similar information in regularly used fields such as the thought name, thought document name, text of the notes, links, or other thought properties (step 3459). In cases where there is a clear match, a slave is set to the same ID as the master item, and added to the list of conflicts. When the system is uncertain about whether a match exists, the user can be presented with the option of deciding whether or not there is a conflict, or the existence of a conflict can be determined through pre-defined rules according to the amount or type of content that matches.

Both same-content and same-ID conflicts can be resolved according to predefined rules such as, a) master wins; b) slave wins; c) last date wins; d) branch to two separately identified items indicating the circumstances in which it was created (e.g. via thought name "Matched Thought—Created by Harlan Sep. 20, 2001").

One problem which the Client should address in order that the system can maintain a non-repetitive set of unique IDs, is to maintain a system for flagging new data items, or to award them a separate set of unique IDs which are temporary, until each new data item can be awarded a permanent ID at synchronization. Without such a mechanism, the Server would not be able properly to detect and address same-ID conflicts. Without some preventative measure, two Clients could easily continue to operate forever presenting same ID conflicts to the Server, and the problem could compound over time. Accordingly, it is desirable for a Client to assign temporary IDs to new data items that it creates, or at least to flag the new items that it creates in order get a permanent ID confirmed only when it synchronizes with the Server. In a preferred embodiment, each Client operates with potentially two different sets of identifiers for its locally-stored data items—those which have been assigned permanent IDs by the Server, and those that have been created locally, are awaiting that assignment, and in the meantime bear a temporary ID or a "temporary" flag. That way, each time the Client synchronizes, it can have any of its new data items assigned permanent IDs which will always be unique in the common Brain data source at the Server, and have integrity when accessed by other Clients as well.

C. Mixed Model for Collaborating Among Nodes

To be sure, a mixture of the two systems (fully connected or synchronized) could also be advantageous, in which the nodes operate in a fully-connected model when possible, updating one another in real-time to provide consistent data to all. Such a mixed system would resort to a synchronization method when necessitated because nodes have been disconnected for a period of time, or have been in "conflict" attempting to simultaneously update a shared data resource. A mixed system would resolve such conflicts by using a synchronization to merge the data resource once the conflict has ended. Other convenient mixtures of the two methods could be efficient as well. In one such embodiment, a system could reduce network traffic or conflicts by having the server regularly update all or a large portion of data on the clients at regularly scheduled intervals, or prior to network logoff or client shutdown/standby to be sure that users have the most up to date information when they disconnect, but then use a fully-connected system to instantly update the server of any modifications actually made by clients.

For example, a customer service call center, in which the customer service representatives answer trouble calls using a knowledge base accessed through the Brain methods of the current invention, could benefit from operating a mixed model (fully-connected and synchronized) of sharing a common Brain data resource. In that case, a large number of users are accessing a single common Brain data resource, with a limited amount of approved information. Presumably, when new trouble calls arise, each customer service representative is able also to initiate a process of adding to the knowledge base, so that subsequent representatives will be able to answer similar calls based on the earlier learnings. But an administrator may wish also to have some power to review modifications before they are loaded into the common Brain data resource.

In that example, as the representatives work and navigate the common Brain, they do so by accessing the common data resource using the just-in-time service methods previously described. When a representative wishes to add to the common Brain, under certain conditions (like establishing a new customer record), the Server would allow them to make the addition as a matter of course. There is little chance that two representatives would be establishing the same customer record simultaneously, so a fully-connected scheme would allow the common data resource to be kept up-to-date with customer contacts in real time.

When the representative has successfully fielded a new type of trouble call, she may wish to modify the common Brain resource, so that her colleagues could benefit from her learnings. She may want to add thoughts, or create links from the new type of problem to some solutions that already exist in the common resource. Since there is a high chance that in a large call center, more than one representative may encounter the same type of new problem simultaneously, there is a chance that under the fully-connected model, more than one CSR would be seeking to modify the same data simultaneously. CSRs are typically compensated by the number of calls they can field per hour. Chances are that if a CSR is denied access under a fully-connected model, they will not wait their turn to offer the modifications later, and the learning would be lost.

Therefore, in the event of more than one CSR attempting to modify the same data item simultaneously, a fully-connected scheme could fall back on synchronization, such that the Client would update to the Server, once the data item was no longer being modified by the second user.

Some modifications would not be suitable for updating to the common resource in real time. For example, administrators may wish to have CSR's inputs on how to solve recurring trouble calls, but would want to have the final say themselves as to whether those suggestions get included in the common Brain data source. A mixed model would allow certain types of modification requests to happen instantly, while more important ones would be reserved for synchronization after they had been approved in the proper quarters. Another exemplary case in which synchronization would be more appropriate is when a CSR is placed onsite to resolve a problem, and will not be online with the common Brain data source until he returns to the office.

XVII. Linking Between Repositories

This patent specification and its predecessors, in the section above entitled "Network Related Features" the subsection headed, "Matrices Referencing Other Matrices and Linking Matrices" has taught general methods enabling the Brain to display links between different matrices. Also described above and in previous applications is a "just-in-time" embodiment enabling a Brain Server using a repository of thoughts and related data to serve those thoughts and other items as demanded by a user navigating the Brain by interacting with a Brain Client. One aspect of the network enhancements under the present invention combines those two methods so that a single user interface at the Client seamlessly can show links among thoughts residing on disparate repositories, just-in-time as the user navigates.

In short, the present invention permits a user to view and navigate, via a Client, in the "plex" format of the current invention, information from multiple relational databases at once. One embodiment permits the user to access, navigate and modify multiple databases that are generic, and not pre-configured for display in a plex. Such an embodiment relies on the Connector apparatus described above to translate a collection of generic data items into the children, parent and jump relationships displayed in a plex. A different embodiment permits a single client to access multiple "matrices" (data collections that are pre-configured as collections of thoughts and links and associated data).

Once again, while two different approaches are described, a hybrid of the two is also possible, in which a single Brain client could access, navigate and modify either generic databases via Connectors, or more than one matrix directly without intermediation.

In the abstract, the two different approaches each bring certain advantages and disadvantages.

The first, or universal, embodiment brings the advantage of portability to databases that have not been specially prepared to interoperate with a basic Client. The Client in that approach actually needs only minimal functionality to provide for (i) the display and navigation of thoughts and links; and (ii) of course the ability to communicate via a network with Connectors. But to its disadvantage, that universal embodiment requires that any instruction to navigate through the plex, or to create or eliminate links or thoughts, be communicated through a special composite connector, as will be more fully described below.

The second, or native, embodiment—in which Clients access multiple repositories of data that are preconfigured for use in the Brain environment—reduces network complexity and communications time because it permits a Client to communicate directly with those prepared repositories. This embodiment is preferred when it is possible to prepare each repository as a matrix of thoughts, links, contents, and related data as is native to the present invention. But that native embodiment does require a more robust Brain Client which, in addition to its basic navigation and communication functions, possesses (i) a cache of network address information for the thoughts and their repositories; and (ii) the ability to direct network requests directly to those multiple sources.

A. Composite Repository

A universal embodiment using Connectors as described above (permitting the Brain Client to display and navigate non-native databases) includes the following elements, as illustrated in the example system of FIG. 66:

A Brain Client 3470 possessing functionality which offers at least the interactive display of thoughts, links and related content and the ability to communicate with a Brain Server via a network or other communications means;

A Brain Server 3471 providing the just-in-time service of thoughts, links and associated data items responsive to the navigation requests of the Brain Client;

A Composite Connector 3472 which (i) translates requests from the Brain Server into addresses that it can use to route those requests to the appropriate Connector, and (ii) interprets which of those requests form the Brain Server deal with links between disparate repositories; that type of request being routed to a Composite Repository 3473 which only possesses data regarding inter-repository links; (Note that in this universal or "composite" embodiment, only the Composite Repository possesses information about links between repositories. This is because those disparate repositories are generic, and not equipped to receive information that is specific to the Brain); and A Connector A 3474 and a Connector B 3475 which translate data and relationships from a inter-repository links).

As indicated by the various shapes in FIG. 66, each Connector is specially adapted to interface with its respective repository.

We will now explain this composite repository method of navigating and linking among disparate data repositories by describing the flow of data between these networked elements necessary to a) activating a new thought; b) creating a new link; and c) creating a new thought. In each case, an operation at the Brain Client 3470 causes the Brain Server 3471 to generate a data request to the Composite Connector 3472. The Composite Connector interprets the requests to seek or send information from the Connector from the appropriate repository, seeks or sends information directly to the Composite Repository relevant to any inter-repository links, and formulates a response or a success message which it sends back to the Brain Server 3471. The Brain Server 3471 then instructs the Brain Client 3470 to offer a display which appropriately represents the response.

The process a Client must follow to activate a thought in a preferred embodiment of the universal, or "composite" system will now be explained more fully. FIG. 68 depicts the flow of communications necessary to navigating from a Plex 3480 with Thought 1A (a thought taken from Repository A 3476) to a Plex 3482 bearing Thought 2A (another thought taken from Repository A 3476) as its central thought.

Starting at step 3490 when Thought 1A (an item from Repository A (3476)) is the active thought, the user clicks Thought 2A (also from that same Repository) to become the new active thought. A Brain Server 3471 receives this request and develops a query for those thoughts that are directly related to Thought 2A so that it will be able to return the Brain Client 3470 the information needed to form the new plex. But unlike the basic just-in-time server discussed earlier, in this embodiment, the Brain Server does not have access to the responsive data in its own native environment. It must reach out to disparate data sources interfaced using a Connectors scheme. As described above, such a Connectors structure provides a program interface between those repositories and the Brain structure.

To assemble the response in a multiple repository system, at step 3493 the Brain Server 3471 sends this query for related thoughts on to a special Connector—a Composite Connector 3472. As defined above, that Composite Connector serves two essential functions. First, it functions as an interface, translating a thought ID and identifying information about data and links to that thought into addresses understandable by Connectors A and B which in turn interface with the data repositories A and B. Secondly, that Composite Connector detects which requests from the Brain Server require information relating to links between disparate repositories. To answer those requests, the Composite Connector accesses a special repository—a Composite Repository 3473. The Composite Repository 3473 possesses the list of links that exist between data elements contained by the disparate repositories (e.g. Repository A 3476 and Repository B 3477). Normally, in the universal (or "composite") embodiment, only the Composite Repository, and none of the disparate repositories, possess information relating to links between repositories. That is because the Composite Repository is specially equipped to interact with the Brain, possessing jump, parent and child relationships between the disparate repositories. Presumably, the universal embodiment is used because it is deemed inconvenient to reconfigure the disparate repositories to possess information that is not native to them—such as those sorts of links to different repositories created by users of the Brain.

Receiving the Brain Server's request, at step 3494, Composite Connector 3472 identifies that the Thought which the Brain Client identified as Thought 2A is actually a data item ID 2 which comes from Repository A. So Composite Connector 3472 sends the request for related links on to Connector A 3474. At step 3496 and 3497, Connector A searches repository A to find that a data item 4 is related to data item ID 2 in a manner which it translates as representing a Child relationship.

Receiving that response at step 3498, the Composite Connector then translates the information into identifiers that will direct the system towards the right repository as further requests come. It then puts the resulting identifier "Thought 4A:" onto the list of related thoughts being assembled to answer the original request from the Brain Client. Then at step 3500 to 3502, the Composite Connector carries out its other function of querying the Composite Repository for inter-repository links with Thought 2A, and finding a result adds Thought 1B (from Repository B 3477) to the list of related thoughts to be returned to the Brain Server and onwards to the Brain Client at Step 3503 and 3504.

Information from disparate non-native sources in hand, the Brain Client displays the resulting plex 3482. Note that for embodiments which display second generation links (siblings and grandchildren) the same process used to identify thoughts related to new active thought 2A must be employed to seek out thoughts from the repositories relating to Thought 4A (child of Thought 2A) (Step 3506).

FIG. 69 depicts the flow of communications necessary to creating a link from active Thought 1A (representing a Thought ID 1 from Repository A) to Thought 1B (representing a Thought ID 1 from Repository B), and thus changing the Plex 3480 of FIG. 67 into the Plex 3481. In order to illustrate a pure case of only creating a link, we chose the example of a jump link, since in a preferred embodiment, only the jump thought, and none of its relations, would be displayed in one plex. Note then when creating a parent relation, for example, the system would use a process similar to that of activating a thought (described above) to find siblings (other children thoughts of the same parent thought).

Starting at step 3510 when Thought 1A (an item from Repository A (3476)) is the active thought, the user draws a jump link (step 3511) to Thought 1B—an item which is presumably already on display as, for example, a thought pin or within the past thought list. At step 3512, Brain Server 3471 receives the request to create that jump link. Again, because this is a composite system, in which the Brain Server needs to retrieve thoughts, links and related information from disparate repositories, it turns to the Composite Connector 3472. As before, such a Composite Connector functions i) to translate the Brain Server's native thought id information into addresses to the appropriate repositories and route requests to the Connectors to the disparate repositories accordingly; and (ii) to check the Composite Repository for any interrepository links, or in this case record new ones.

So at step 3514, The Composite Connector translates the request from the Brain Server regarding a thought id "1A" into a thought identified as "1" from Repository A. Likewise, at step 3515, the Composite Connector translates the request from the Brain Server regarding a thought id "1B" into a thought identified as "1" from Repository B. Then the Composite Connector performs its other function, observing at step 3516 that those two thoughts are not from the same repository, at step 3517, it adds that link to repository of inter-repository links, which we have called the "Composite Repository." Note that if (as in step 3518) the two Brain Server had requested to link two thoughts from the same repository, that information would have been updated in the proper repository by the Composite Connector sending such an update request to the Connector of the appropriate repository. To finish the operation and permit the Brain Client to modify its display to now show Plex 3481, the Composite Connector reports success back to the Client via the Brain Server at steps 3519 through 3520.

Another case which should be considered for implementing the present invention among disparate repositories of data is that of creating a thought. FIG. 70 depicts the flow of communications necessary to creating a new thought to become a child of active Thought 1A (representing a Thought ID 1 from Repository A). The process flows similarly to that of creating a link, as described above. A preferred embodiment will place the children thoughts into the same repository as the parent by default, but permit the children to be written to disparate repositories as required by user choice or special rules, as further described below.

Again starting from a point where Thought 1A is active, the user interacts with Brain Client 3470 to create a new child thought (in a preferred embodiment, by dragging a line downwards from the icon representing Thought 1A) (Steps 3521 to 3522). As before when creating a link, the Brain Server acts to create the child thought by first contacting the Composite Connector (Steps 3523 and 3524). Again, the Composite Connector will serve to translate the identifying information received from that Brain Server into addresses that can be sent to the Connector of the appropriate repository (in this case, Connector A for a child of Thought 1 to be created.) If that new child thought belongs in Repository A, then Connector A updates the repository, and returns success to the Composite Connector, Brain Server, and Brain Client, permitting the displayed plex to be modified accordingly (steps 3526 through 3529).

But in some embodiments, special rules may apply, or the user may be permitted to choose (in some way) to direct children of certain types of thoughts, or certain new thoughts themselves, to be placed into certain repositories. Therefore, when the Composite Connector receives the request to create a new thought, its first move is to check what special rules may apply, placing this child into a different repository than its parent, or even functioning to place children of all thoughts of a certain type into a different repository (Steps 3526–3528).

As an example of those types of special rules, say that Thought 1A represented an upcoming appointment stored in a repository containing group calendar information (such as Microsoft Exchange), and the new child were a presentation to be used at that appointment, it may not be appropriate to store it in the calendar information repository. The user may prefer that the presentation be stored in a different network directory, available to other users by means of the Brain, or other means of access commonly used by other group members to share that presentation (such as BEA Tuxedo, or SAPPortals).

Or, as another example, if Thought 1A just indicates a certain project that the user is establishing, and she is making children to represent the different planning meetings needed to complete the project plan, then those children may be best stored in a repository other than the project plan repository. She may prefer to have all appointments stored in a Microsoft Exchange or Lotus Notes repository, so that users would have access to those appointment invitations in their Microsoft office or Lotus Organizer interfaces in addition to their Brain interfaces. Those choices about which repository to place new thoughts in can be made according to a number of different parameters, but here is an exemplary list:

- User choice in each case.
- User-specified rules generally. (e.g. all new thoughts from me go to my own repository)
- Condition-dependent user choice. (e.g. all new thoughts of type a go to Repository A, all calendar appointments go to a given Microsoft Exchange™ server).
- Administrator-defined rules.
- Dictated by thought type. (e.g. all word processing documents to a PC Docs™ repository; all database entries to an Oracle™ repository.)
- Dictated by user id (different repositories for different security profiles, etc.)
- Dictated by workstation id.

In the present example, it is Connector A which is aware of the rules governing repository choice for new thoughts (step 3526). But the request to create a new thought can be appended with instructions about repository address at any of the other nodes, too. For example, if the decision is based upon a user preference or a user designation in each case, then the Brain Client 3470 would identify which repository is desired. If the choice is defined at the administrator level, or system-wide, then the Brain Server would alert the Composite Connector of the repository choice. If the choices are central, then the Composite Connector could direct the request for new thought to the appropriate Repository Connector. In the present example, the Connector of each Repository would be aware of the new-thought-direction rules for its own respective Repository.

of course, at Step 3528, if the new child is destined for a different repository, then Connector A updates the Composite Repository of the new inter-repository link, and the Composite Repository in turn directs the request for new thought to the address of the appropriate different Connector, which appraises the Composite Connector, Brain Server, and Brain Client when success is achieved so that the plex can be updated.

B. Brain to Brain Links

While the Composite Repository and Connector method eliminates the need for re-indexing or modifying disparate repositories for display and interaction under the present invention, it adds complexity to the communications necessary for basic tasks such as navigating the matrix, linking and creating thoughts. Each of those actions, and in fact almost all interactions with data above the individual thought level under that scheme require processing by the central Composite Connector. As discussed, that Composite Connector serves two key functions: a) translating identifying information from the Client into identifiers understandable by the individual connectors to the repositories and routing appropriate requests to those appropriate connectors; and b) dealing with inter-repository links by accessing and updating a special Composite Repository storing inter-repository links.

There are a number of ways of distributing these functions in a network of databases that are known in the art. By distributing these functions to the Client and by preparing the Repositories in a manner that preserves the link information and other special parameters of the present invention, a system can be designed which reduces the demand for centralized communications and permits the Client to correspond directly with the Repositories.

For the purposes of discussion, we call the native embodiment that permits Clients direct access to multiple preconfigured data repositories, "Brain to Brain Links." In such an embodiment, the function of translating from Client-actuated thought addresses into repository-sensitive addresses resides in a Client, while the inter-repository link function (handled by the Composite Repository in the universal embodiment) is stored along with the data in the disparate repositories themselves. Actually, because they are computer programs that access and control repositories of data that are preconfigured for the Brain, they are Brain Servers. Instead of all requests being routed through a centralized Composite Connector as before, in this embodiment, the Client communicates directly with the data repositories, and makes direct requests (without Connector) to a Directory Server when it lacks information for locating a particular Brain Server.

Making reference to FIG. 71, this embodiment consists of the following elements:

- A Client 5430 comprising a) a user interface under the present invention minimally including the ability to display and permit user interaction and navigation of links, thoughts, and the contents of thoughts; b) the ability to communicate at least with a Directory Server 5431, a Brain Server 5432; and a Brain Server 5433; and preferably with any other source of contents for thoughts such as the World Wide Web; c) the ability to identify the Brain Server from which any thought derives; and d) a local directory cache storing the network location of Brains and thoughts within those brains (as described below), and the ability to revert to the Directory Server when needed information is not present in that cache.
- A Directory Server 5431 whose only purpose is to look up the network addresses of Brain Servers upon request from a client. Unlike the Composite Connector/Repository above, the Directory Server contains no information about the contents of those Brain Servers, no information about inter-repository links, and no ability to identify or correlate contents to Brain Servers—all those purposes now being served either by the Client, the Brain Servers, or both.
- A Brain Server A 5432 and A Brain Server B 5433 which essentially are just-in-time servers of thoughts, links and related contents as discussed above in the single server embodiment. But these Brain Servers also possess all information relating to inter-Brain links relevant to their own thoughts and contents.

We will now explain the Brain-to-Brain method of navigating and linking among disparate Brain-enabled data repositories by describing the flow of data between these networked elements necessary to a) activating a new thought; b) creating a new link; and c) creating a new thought.

FIG. 72 depicts the flow of communications necessary to navigating from a Plex 3480 with Thought 1A (a thought taken from Brain Server A 5432) to a Plex 3482 bearing Thought 2A (another thought taken from Brain Server A 5432) as its central thought, and Thought 1B (a thought taken from Brain Server B 5433) as a jump.

Starting at step 5440 when Thought 1A, an item from Brain Server A (5432) is the active thought, the user clicks Thought 2A (also from that same Brain Server) to become the new active thought. At this point, Client 5430 must locate Brain Server A. Since more than one user or Client may be accessing and modifying the shared resources of this system, in order to navigate this Client (just as the Client in the composite repository embodiment, or as the Client in the single just-in-time model above) must communicate with the appropriate shared Brain for up to date information that must be displayed in conjunction with the new active thought and its plex.

In order to locate Brain Server A 5432 on the network, under a preferred embodiment, at step 5440, Client 5430 first checks its own stored directory cache, which is a list of known network addresses of Brain Servers. If that Client had previously encountered thoughts from that Brain Server A (or had done so during some period or within a certain period of thoughts previously accessed) then that location information would remain within the local directory cache. Assuming that the location of Brain Server A is found in that local directory cache (step 5442), then the Client requests Brain Server A for all relevant, specified or filtered information regarding its Thought 2 (step 5443). On checking its database of thoughts (step 5445), Brain A Server 5432 finds thought 2 and its contents, as well a jump link to a Thought 1B, and returns that result (step 5446).

Upon receiving those results from a Brain Server, before it can display a new plex, the Client 5430 must assemble the information needed regarding any newly appearing thoughts. So at step 5447, Client 5430 checks the results for any inter-Brain links, and finds the identifier "Thought 1B" among the results received from Brain Server A (Step 5448). As before (in the composite repository example), the Client 5430's first place to look is within its own stored directory cache (step 5449). This time, the information is not available there, since presumably that Client has not (at least recently) accessed Brain Server B 5433. Therefore, at step 5451, Client 5430 sends a request to a Directory Server 5431 seeking the location of Brain Server B 5433 (step 5451).

The Directory Server 5431's function is to store the network addresses of all Brain Servers, and to share that information with authorized Clients upon authentic request. Unlike the Composite Repository discussed above, the Directory Server does not contain any thought-specific data (like inter-repository links), and performs no translation functions. Also, the Client does not have a need to communicate with the Directory Server on every communication.

Upon receiving the address information for Brain Server B 5433 from Directory Server 5431, the Client 5430 stores that address in its local directory cache for use the next time Client needs to communicate with that Brain Server (5454). Using the provided addresses and its ability to interpret thought Ids into Brain Server native thought IDs, Client 5430 then requests (step 5455) the Brain Server B 5433 for all necessary information relating to its Thought 1, such as its name, type, properties (for example, any permissions that apply). Again, since Thought 1B is a jump thought in this case, no further checking for related thoughts is necessary. But if Thought 1B were related to the new active Thought 2A as a parent, for example, then in embodiments that display siblings, steps 5444 through 5457 would be repeated for children or other thoughts with relevant links to Thought 1B.

FIG. 73 depicts the flow of communications needed to establish a jump link from Thought 1A (from Brain Server A 5432) to Thought 1B (from Brain Server B 5433), thereby reforming the display from that of Plex 3480 to that of Plex 3481. Steps 5460 through 5463 are the same as those of navigating a plex, checking first with the local directory cache for the network of any needed Brain Server, and checking the Directory Server 5431 if that local check fails to yield an answer. Again, communications between the Client 5430 and the repositories (Brain Servers A 5432 and B 5433) are direct. In this case, at steps 5464 and 5468, the Client updates Brain Server A and Brain Server B, respectively, of the existence of the new link. In that way, whenever in the future a client seeks information regarding either Thought 1A or 1B from either of those Brain Servers, it will be appraised of the existence of that inter-Brain jump relationship.

FIG. 74 depicts the flow of communications necessary to establishing a new thought as a jump from Thought 1A (from Brain Server A 5432). The process is similar to that of establishing a new link relationship, above, except that in the communications between 5474 to 5476, the information (contents, properties, etc.) relating to the new thought is added to the Brain Server A in addition to the link to Thought 1A. The process is a direct communication by the Client 5430 to Brain Server A 5432, updating the new thought name, link type, and other content or information involved. Just as was the case when creating a new thought in the composite repository example, various rules, preferences or defaults can govern whether a new thought is placed in the same Brain Server as its originating thought. But in the Brain-to-Brain embodiment, the communication of that choice is made directly between the Client 5430 and the Brain Server involved. of course, if the new thought is placed in a Brain Server whose address is not stored in the Client 5430's directory cache, then the Client must check the Directory Server for that address, and update its own directory cache appropriately for future need.

One convenient facility that can be added to the Client 5430 in a Brain-to-Brain system is the ability to search for other Brain Servers available for linking, or even of searching for individual thoughts among multiple Brain Server from the client, as depicted in FIG. 75. This facilitates research, because it will expose the user not only to direct search results, but to items related to those results, displaying through the Brain interface, the manner in which they are related.

For example, assume that a student needed to prepare a report about Christopher Columbus who, he was told, discovered America, but had no further information. Traditional methods of research would involve sifting through a great deal of historical material, whose relevance would only emerge after the student had read a certain body of general material relating to the topic. Only then would a structure to the research and her eventual report emerge. But if databases of historical information and texts were prepared as bodies of knowledge available to Brain Clients from Brain Servers, then researching this report could be done in a more straightforward manner.

Entering a search for thoughts in a variety of Brain Servers "Christopher Columbus" appearing in the same sentence as the words, "America" and "discover" might bring hits in (i) a database of articles about early European explorers; (ii) a biography of Christopher Columbus; (iii) a history of Ferdinand & Isabella; and (iv) a research relating to the first discovery of America by Africans. If the student had found these resources through traditional means, he would need to delve into them deeply to discover information pertinent to her topic, and would need to understand all of them in order to start synthesizing observations about their relatedness. If she found them through the Brain interface, she could first navigate them efficiently towards the information needed, in the process learning how earlier researchers had associated and synthesized the body of knowledge. Then she would be able to establish useful associative links between the conflicts among those claiming to have first discovered America, to Columbus' personal profile, the historical context in which he lived, and the modem issues of racism and colonialism that have emerged to generate controversy around his life's accomplishments. In short, adding a search function to a Brain-to-Brain system would shorten the research step, and take the researcher immediately towards synthesis.

C. Multiple Documents per Thought

Sections above described the file architecture of individual thoughts, and referred to them as the "headcase." Generally, that architecture permitted the association or storage of a single document (set of contents) with each thought. Two architectures for associating more than one document with each thought were described, one in which the document associated with the thought itself was a list of links to other documents, and another in which any multiple file architecture was used to allow numerous or successive versions of a single document to be associated with a single thought. What is needed is a more convenient means for associating a single thought with multiple documents, and allowing multiple thoughts to be associated with the same documents without requiring multiple instances of that document in storage.

FIG. 76 illustrates an example of an alternative file architecture for thoughts that reference multiple documents, and multiple thoughts referencing same documents. Headcase 5510 illustrates the previously discussed architecture, permitting types, properties, and a single document to be associated with each thought ID. A multiple document to multiple thought architecture consists of a Thought Table 5515, a Document Table 5527, and a Link Table 5521. These examples are used to illustrated how a Thought ID 1 (items 5516) can be associated with two different documents—a Doc ID "r" located at c:\doc_r, and a Doc ID "n" located at c:\doc_n. To make the explanation simple, the Doc Ids bear a semblance of the locations of their respective files, but in actual practice there is no need for such similarity.

Under this embodiment, when Thought 1 is activated, the system checks the Link Table 5521 to find that Thought ID 1 appears twice (items 5521 and 5522), associated with two different documents, bearing Doc ID "r" and Doc ID "n." Checking with the Document Table 5527, the system finds that documents of those Ids are located at file locations c:\doc_r and c:\doc_n respectively. To be sure, those locations could be expressed according to any file addressing scheme, and those documents may be stored locally on the same computer as the system, or remotely over a network or any means of digital access. Having found the document locations, the system is then prepared to make them available for display, use or other purposes upon the request or preference of any user or other element in the system.

Conversely, the same architecture permits multiple thoughts to reference same documents. Note that in the present example, a Thought identified as Thought ID 4 (item 5519) in the Thought Table 5515 actually references one of the same documents (Doc ID "n", item 5526) as Thought ID 1. Under this architecture Thought ID 1 and Thought ID 4 are able to reference the same document, without requiring that the multiple instances of that document be stored.

D. Interactive Display of Distant Thoughts

As discussed above (See, Interrelations Between Thoughts), a preferred embodiment of the present invention features a user-configurable ability to include distant thoughts (e.g. grandchildren, grandparents and partners) in the plex display. Displaying more than a single or two generations of links can create a cluttered plex that is difficult to understand and use. Under an alternative embodiment of the present invention the display of distant thoughts can be made more interactive to reduce clutter while leaving the facility of distant thoughts available to the user. For example, some of an active thoughts distant relations can be displayed upon mouse over the relevant linked thought. Namely, upon mouse over a child thought, that child thoughts own children (hence the active thought's grandchildren) would be displayed.

Alternatively, distant thought display could be a right mouse button option when a right button is clicked when the cursor is over an active thought, or one (or more) additional generation(s) of thoughts could be an option upon right click on a non-active thought in the plex. of course, this interactive display of distant thoughts could be activated by any other pre-defined user action such as a single or double click, a function key, or even a voice command or touch screen operation.

As illustrated in FIG. 77, it is possible to fade out the other thoughts of the plex, and to highlight the display of distant thoughts, to facilitate viewing the distant thoughts. That technique is especially important in instances when the distant thoughts'Display overlaps the display of other thoughts, in order to be proximate to the lower generation thought to which they are linked.

XVIII. Other Variations

Detailed illustrations of an improved scheme of organizing information by an associative thought process in accordance with the present invention have been provided above for the edification of those of ordinary skill in the art, and not as a limitation on the scope of the invention. Numerous variations and modifications within the spirit of the present invention will of course occur to those of ordinary skill in the art in view of the embodiments that have now been disclosed. For example, while in the described embodiment, the present invention is implemented for a GUI for desktop computers or local area or wide area computer networks (e.g., the Internet), the present invention may also be effectively implemented for any information appliance which can take advantage of the novel associative thought scheme of the present invention. The scope of the inventions should, therefore, be determined not with reference to the above description, but should instead be determined with reference to the appended claims, along with the full scope of equivalents to which such claims are entitled.

What is claimed is:

1. A method of updating a common data source of data items and associations among said data items, wherein said common data source being accessible by more than one client storing copies of at least two of said data items and at least one association between at least two data items, and wherein at least one of said data items is a thought capable of being interactively modified, created, or interconnected by at least one of said clients, comprising:

receiving a request from a client to modify a data item, wherein said receiving step is done any time one of said more than one client operates on said data item;

updating said data source according to said request; and barring other of said more than one clients from modifying said data item between the time the request is received from said client and confirmation is sent to said client.

2. The method of claim 1, further comprising:

sending a confirmation of said updating to said client.

3. The method of claim 1, further comprising:

modifying said copy of said data item.

4. The method of claim 1, in which said receiving step is done any time one of said more than one clients operates on said data item.

5. The method of claim 1, in which said receiving step is done any time one of said more than one clients modifies said data item.

6. The method of claim 1, in which said receiving step is done any time one of said more than one clients deletes said data item.

7. The method of claim 1, in which said receiving step is done any time one of said more than one clients activates a new thought.

8. The method of claim 1, in which said receiving step is done any time one of said more then one clients creates a new thought.

9. The method of claim 1, in which said receiving step is done any time one of said more than one clients creates a new interconnection between at least two of said thoughts.

10. A method for a common data source that is accessible by more than one client to update at least one or said clients that stores a local version of said common data source, said common data source having data items and associations between data items, comprising:

detecting data items missing from said local version;

sending said missing data items to said local version;

updating said missing data items and associations with said missing data items in said local version; and detecting whether more than one of said clients each attempted to send to the common data source the same data item under different identifiers.

11. A method for a common data source that is accessible by more than one client to update at least one of said clients that stores a local version of said common data source, said common data source having data items and associations between data items, comprising:

detecting data items missing from said local version;

sending said missing data items to said local version;

updating said missing data items and associations with said missing data items in said local version; and detecting whether more than one of said clients each attempted to send to the common data source different data items under the same identifier.

12. An apparatus for a client to modify a display of indicia of at least a first data item and a second data item and at least one association between those two data items, comprising:

a first repository storing said first data item;

a second repository storing said second data item;

an intermediary receiving a request from said client and providing interface to said first repository and said second repository, wherein said intermediary causes said display to modify;

a third repository storing said association between said first data item and said second data item; and information that is sent to said intermediary from said first repository or said second repository relevant to whether the requested modification requires the display of graphic representations of additional data items associated with said first data item or said second data item, respectively.

13. An apparatus for a client to modify a display of indicia of at least a first data item and a second data item and at least one association between those two data items, comprising:

a first repository storing said first data item;

a second repository storing said second data item;

an intermediary receiving a request from said client and providing interface to said first repository and said second repository, wherein said intermediary causes said display to modify;

a third repository storing said association between said first data item and said second data item; and information that is requested from said third repository relevant to whether the requested modification requires the display of any associations between any data items from the first repository with any data items from the second repository.

* * * * *